(12) United States Patent
Favor et al.

(10) Patent No.: US 12,498,933 B1
(45) Date of Patent: Dec. 16, 2025

(54) PREDICTION UNIT THAT PREDICTS SUCCESSOR FETCH BLOCK START ADDRESS OF MULTI-FETCH BLOCK MACRO-OP CACHE ENTRY

(71) Applicant: Ventana Micro Systems Inc., Cupertino, CA (US)

(72) Inventors: John G. Favor, San Francisco, CA (US); Michael N. Michael, Folsom, CA (US)

(73) Assignee: Ventana Micro Systems Inc., Cupertino, CA (US)

( * ) Notice: Subject to any disclaimer, the term of this patent is extended or adjusted under 35 U.S.C. 154(b) by 61 days.

(21) Appl. No.: 18/737,414

(22) Filed: Jun. 7, 2024

Related U.S. Application Data

(63) Continuation-in-part of application No. 18/645,269, filed on Apr. 24, 2024, and a continuation-in-part of application No. 18/645,274, filed on Apr. 24, 2024, and a continuation-in-part of application No. 18/645,260, filed on Apr. 24, 2024, and a continuation-in-part of application No. 18/645,272,
(Continued)

(51) Int. Cl.
*G06F 9/38* (2018.01)
*G06F 9/30* (2018.01)

(52) U.S. Cl.
CPC ........ *G06F 9/3844* (2013.01); *G06F 9/30047* (2013.01); *G06F 9/30065* (2013.01)

(58) Field of Classification Search
CPC . G06F 9/3844; G06F 9/30047; G06F 9/30065
See application file for complete search history.

(56) References Cited

U.S. PATENT DOCUMENTS 4,161,026 A 7/1979 Wilhite
5,724,565 A 3/1998 Dubey et al.
(Continued)

OTHER PUBLICATIONS

Burtscher, Martin et al. "Load Value Prediction Using Prediction Outcome Histories." 1999 Technical Report CU-CS-873-98. Department of Computer Science, University of Colorado. pp. 1-9.
(Continued)

*Primary Examiner* — Zachary K Huson
(74) *Attorney, Agent, or Firm* — E. Alan Davis; Huffman Law Group, PC

(57) ABSTRACT

A microprocessor includes a prediction unit (PRU) comprising a fetch block (FBlk) predictor (FBP) that predicts a sequence of FBlks, each FBlk having a corresponding fetch block start address (FBSA), and branch predictors; a macro-op (MOP) cache (MOC) includes MOC entries (MEs) including multi-FBlk MOC entries (MF-MEs) for holding MOPs decoded from instructions of multiple FBlks. The PRU detects a hit of a current FBSA on an MF-ME; performs a set of actions K times: looking up the current FBSA in the FBP and branch predictors to obtain outputs, using the outputs to predict a successor FBSA of a successor FBlk; and making the current FBSA the successor FBSA; and predicts that an FBSA of a successor FBlk to the MF-ME is the current FBSA resulting from performing K times the set of actions. K is a number of FBlks built into the MF-ME (alternatively times a loop unroll factor).

21 Claims, 60 Drawing Sheets

Related U.S. Application Data filed on Apr. 24, 2024, and a continuation-in-part of application No. 18/645,281, filed on Apr. 24, 2024, and a continuation-in-part of application No. 18/645,239, filed on Apr. 24, 2024, and a continuation-in-part of application No. 18/645,249, filed on Apr. 24, 2024, said application No. 18/645,274 is a continuation-in-part of application No. 18/380,150, filed on Oct. 13, 2023, now Pat. No. 12,299,449, said application No. 18/645,249 is a continuation-in-part of application No. 18/380,150, filed on Oct. 13, 2023, now Pat. No. 12,299,449, said application No. 18/645,281 is a continuation-in-part of application No. 18/380,152, filed on Oct. 13, 2023, and a continuation-in-part of application No. 18/380,150, filed on Oct. 13, 2023, now Pat. No. 12,299,449, said application No. 18/645,274 is a continuation-in-part of application No. 18/380,152, filed on Oct. 13, 2023, now Pat. No. 12,282,430, said application No. 18/645,260 is a continuation-in-part of application No. 18/380,152, filed on Oct. 13, 2023, now Pat. No. 12,282,430, said application No. 18/645,249 is a continuation-in-part of application No. 18/380,152, filed on Oct. 13, 2023, now Pat. No. 12,282,430, said application No. 18/645,269 is a continuation-in-part of application No. 18/380,152, filed on Oct. 13, 2023, now Pat. No. 12,282,430, and a continuation-in-part of application No. 18/380,150, filed on Oct. 13, 2023, now Pat. No. 12,299,449, said application No. 18/645,272 is a continuation-in-part of application No. 18/380,152, filed on Oct. 13, 2023, now Pat. No. 12,282,430, said application No. 18/645,239 is a continuation-in-part of application No. 18/380,150, filed on Oct. 13, 2023, now Pat. No. 12,299,449, and a continuation-in-part of application No. 18/380,152, filed on Oct. 13, 2023, now Pat. No. 12,282,430, said application No. 18/645,260 is a continuation-in-part of application No. 18/380,150, filed on Oct. 13, 2023, now Pat. No. 12,299,449, said application No. 18/645,272 is a continuation-in-part of application No. 18/380,150, filed on Oct. 13, 2023, now Pat. No. 12,299,449, said application No. 18/380,152 is a continuation-in-part of application No. 18/240,249, filed on Aug. 30, 2023, now Pat. No. 12,253,951, said application No. 18/380,150 is a continuation-in-part of application No. 18/240,249, filed on Aug. 30, 2023, now Pat. No. 12,253,951.

(60) Provisional application No. 63/547,230, filed on Nov. 3, 2023.

(56) References Cited

U.S. PATENT DOCUMENTS

| | | | |
|---|---|---|---|
| 6,473,832 B1 | 10/2002 | Ramagopal et al. | |
| 6,539,541 B1 | 3/2003 | Geva | |
| 6,799,263 B1 | 9/2004 | Morris et al. | |
| 7,496,726 B1 | 2/2009 | Nussbaum | |
| 7,590,825 B2 | 9/2009 | Krimer et al. | |
| 7,681,019 B1 | 3/2010 | Favor | |
| 7,797,517 B1 | 9/2010 | Favor | |
| 7,814,298 B1 | 10/2010 | Thaik et al. | |
| 7,870,369 B1 | 1/2011 | Nelson et al. | |
| 7,941,607 B1 | 5/2011 | Thaik et al. | |
| 7,949,854 B1 | 5/2011 | Thaik et al. | |
| 7,953,933 B1 | 5/2011 | Thaik et al. | |
| 7,953,961 B1 | 5/2011 | Thaik et al. | |
| 7,987,342 B1 | 7/2011 | Thaik et al. | |
| 8,024,522 B1 | 9/2011 | Favor et al. | |
| 8,032,710 B1 | 10/2011 | Ashcraft et al. | |
| 8,037,285 B1 | 10/2011 | Thaik et al. | |
| 8,103,831 B2 | 1/2012 | Rappoport et al. | |
| 8,370,609 B1 | 2/2013 | Favor et al. | |
| 8,499,293 B1 | 7/2013 | Ashcraft et al. | |
| 8,930,679 B2 | 1/2015 | Day et al. | |
| 9,524,164 B2 | 12/2016 | Olson et al. | |
| 10,579,535 B2 | 3/2020 | Rappoport et al. | |
| 10,896,044 B2 * | 1/2021 | Evers | G06F 9/382 |
| 2002/0087794 A1 | 7/2002 | Jouppi et al. | |
| 2003/0140245 A1 | 7/2003 | Dahan | |
| 2005/0257037 A1 | 11/2005 | Elwood et al. | |
| 2008/0005547 A1 | 1/2008 | Papakipos et al. | |
| 2008/0126771 A1 | 5/2008 | Chen et al. | |
| 2012/0311308 A1 | 12/2012 | Xekalakis et al. | |
| 2013/0212352 A1 | 8/2013 | Anderson | |
| 2014/0006698 A1 | 1/2014 | Chappell et al. | |
| 2014/0007061 A1 | 1/2014 | Perkins et al. | |
| 2014/0143494 A1 | 5/2014 | Whalley et al. | |
| 2014/0229719 A1 | 8/2014 | Smeets et al. | |
| 2015/0100762 A1 | 4/2015 | Jacobs | |
| 2015/0149747 A1 | 5/2015 | Lee et al. | |
| 2017/0139706 A1 | 5/2017 | Chou et al. | |
| 2018/0095752 A1 | 4/2018 | Kudaravalli et al. | |
| 2019/0130102 A1 | 5/2019 | Johnson et al. | |
| 2019/0163902 A1 * | 5/2019 | Reid | G06F 21/53 |
| 2019/0188142 A1 | 6/2019 | Rappoport et al. | |
| 2019/0196833 A1 | 6/2019 | Bouzguarrou et al. | |
| 2019/0303161 A1 * | 10/2019 | Nassi | G06F 9/30054 |
| 2020/0082280 A1 | 3/2020 | Orion et al. | |
| 2020/0110610 A1 | 4/2020 | Lapeyre et al. | |
| 2020/0125498 A1 | 4/2020 | Betts et al. | |
| 2020/0150967 A1 | 5/2020 | Ishii et al. | |
| 2020/0372129 A1 | 11/2020 | Gupta | |
| 2021/0026770 A1 * | 1/2021 | Ishii | G06F 9/3802 |
| 2021/0064533 A1 * | 3/2021 | Schinzler | G06F 9/30156 |
| 2021/0124586 A1 | 4/2021 | Bouzguarrou et al. | |
| 2021/0397452 A1 | 12/2021 | Ireland et al. | |
| 2022/0067155 A1 | 3/2022 | Favor et al. | |
| 2022/0107807 A1 | 4/2022 | Schinzler et al. | |
| 2022/0342671 A1 | 10/2022 | Schinzler et al. | |
| 2023/0305962 A1 | 9/2023 | Dutta | |
| 2023/0367600 A1 | 11/2023 | Dutta | |
| 2024/0045610 A1 | 2/2024 | Favor et al. | |
| 2025/0077438 A1 | 3/2025 | Favor et al. | |

OTHER PUBLICATIONS

Appendix to the specification, 25 Pages, Mail room date Jul. 23, 2007, Doc code Appendix, referred to as "Appendix A" at col. 4, lines 46-47 of U.S. Pat. No. 7,987,342 to Thaik et al. issued Jul. 26, 2011; downloaded Jul. 23, 2024 from https://patentcenter.uspto.gov/applications/11880862/ifw/docs?application=.

Appendix to the specification, 28 Pages, Mail room date Jul. 23, 2007, Doc code Appendix, referred to as "Appendix B" at col. 4, lines 48-49 of U.S. Pat. No. 7,987,342 to Thaik et al. issued Jul. 26, 2011; downloaded Jul. 23, 2024 from https://patentcenter.uspto.gov/applications/11880862/ifw/docs?application=.

White Paper. "Security Analysis of AMD Predictive Store Forwarding." Advanced Micro Devices, Inc. (AMD). Aug. 2023. pp. 1-7.

Liu, Chang et al. "Uncovering and Exploiting AMD Speculative Memory Access Predictors for Fun and Profit." 2024 IEEE International Symposium on High-Performance Computer Architecture (HPCA). Mar. 2-6, 2024. pp. 1-15.

Rotenberg, Eric et al. "Trace Cache: a Low Latency Approach to High Bandwidth Instruction Fetching." Proceedings of the 29th Annual IEEE/ACM International Symposium on Microarchitecture. MICRO 29, Paris, France. 1996. pp. 24-34. doi: 10.1109/MICRO.1996.566447.

Ren, Xida et al. "I see Dead μops: Leaking Secrets via Intel/AMD Micro-Op Caches." 2021 ACM/IEEE 48th Annual Internaitonal Symposium on Computer Architecture (ISCA), Valencia, Spain, 2021. pp. 361-374. doi: 10.1109/ ISCA52012.2021.00036.

(56) References Cited

OTHER PUBLICATIONS

Kotra, Jagadish B. et al. "Improving the Utilization of Micro-operation Caches in x86 Processors." 2020 53rd Annual IEEE/ACM International Symposium on Microarchitecture (MICRO), Athens, Greece, 2020. pp. 160-172. doi: 10.1109/MICRO50266.2020.00025.

Slechta, Brian et al. "Dynamic Optimization of Micro-Operations." HPCA '03: Proceedings of the 9th International Symposium on High-Performance Computer Architecture. Feb. 2003. pp. 1-12.

Petric, Vlad et al. "RENO: A Rename-Based Instruction Optimizer." ACM SIGARCH Computer Architecture News, vol. 33, Issue 2. May 2005. pp. 98-109.

Patel, Sanjay J. et al. "rePLay: A Hardware Framework for Dynamic Optimization." IEEE Transactions on Computers, vol. 50, No. 6. Jun. 2001. pp. 590-608.

Moody, Logan et al. "Speculative Code Compaction: Eliminating Dead Code via Speculative Microcode Transformations." 2022 55th IEEE/ACM International Symposium on Microarchitecture (MICRO) Chicago, IL. 2022. pp. 162-180.

Behar, Michael et al. "Trace Cache Sampling Filter." ACM Transactions on Computer Systems. Feb. 2007. pp. 1-10.

Friendly, Daniel Holmes et al. "Putting the fill unit to work: dynamic optimizations for trace cache microprocessors." MICRO 31: Proceedings of the 31st Annual ACM/IEEE International Symposium on Microarchitecture. Nov. 1998. pp. 173-181.

\* cited by examiner

*FIG. 2*

200 FBP entry

| FBP tag 202 | predicted set index 204 | predicted way number 206 | fetch block length 208 | PC-relative target address 212 | termination type 214 | FBlk hotness counter (FBHC) 217 | translated address bits (spanning predicted set index 204 and predicted way number 206)

*FIG. 3A*

300 FBD

| FBP hit 302 | predicted set index 304 | predicted way number 306 | fetch block length 308 | FBSA 312 | fetch source indicator (FSI) 314 | initial MDR pointers 316 | hot FBlk (HFB) 318 | numMDREs 319 | FBlkID 317 | translated address bits (spanning predicted set index 304 and predicted way number 306)

*FIG. 3B*

330 MTR entry (MTRE)

| MTR tag 332 | numFBlks 335 | initial MDR pointer(s) 336 | numMDREs 339 | training fields (TFs) 331 |

*FIG. 3C*

340 MDR entry (MDRE)

| MOPs 342 | next MDR pointer 344 |

*FIG. 3D*

350 MOC entry (ME)

| MTRE 330 | MDRE 340 | ... | MDRE 340 |

*FIG. 3E*

360 FBlk FIFO entry

| Valid 362 | Type 364 | Data (AIs or MOPs, as indicated by Type) 366 |

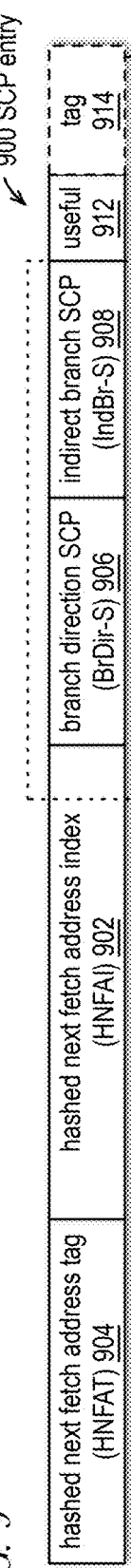
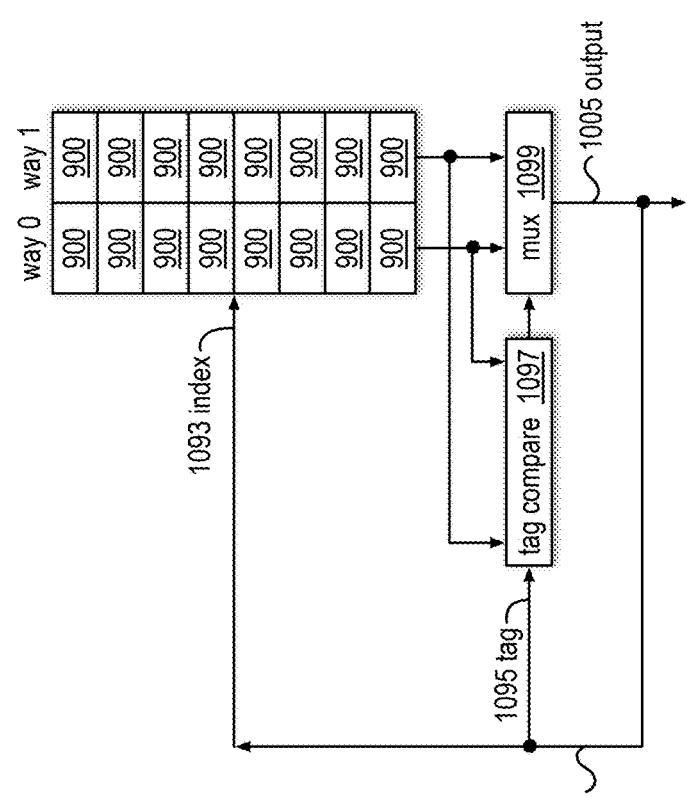
FIG. 9
FIG. 10B
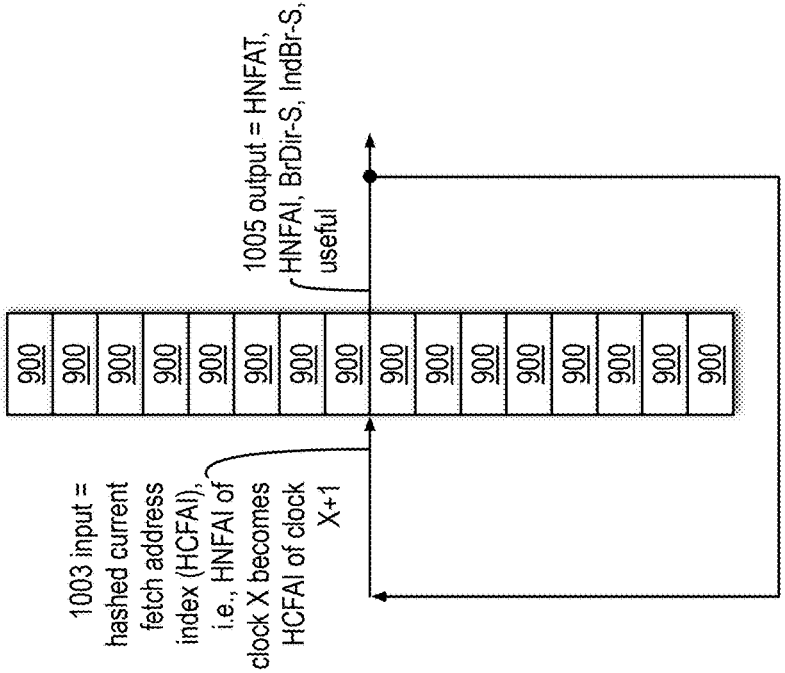
FIG. 10A

FIG. 12

← 102 PRU pipeline stages

| PR1 1201 | PR2 1202 | PR3 1203 | PR4 1204 | PR5 1205 |
|---|---|---|---|---|
| Access SCP to obtain HNFAI, HNFAT, BrDir-S, IndBr-S produced by previous FBlk. SCP is accessed using output (e.g., portion of HNFAI) of SCP provided during immediately previous clock cycle and fed back to SCP input. | Use BrDir-S, IndBr-S, and HNFAI bits and current branch history (e.g., GHist, CPHist, IPHist) to produce updated branch history. Hash updated branch history with HNFAI and HNFAT to generate indexes and tags used to access FSPU structures (e.g., CBP and IBP). Use PR2 as setup time for MTR, FBP, CBP, IBP, RAP RAM structure accesses (RAP may be flip-flop structure). Update current branch history using BrDir-S, IndBr-S, and HNFAI bits. | Use HNFAI and indexes generated in PR2 to initiate access of FSPU RAM structures to obtain MOC hit, initial MDR pointers, FBP hit, predicted set index, predicted way number, FBlk length, PC-relative target address, termination type, conditional branch direction, indirect branch target address, and return target address. Start FBP tag comparisons using HNFAT obtained in PR1 and use tags generated in PR2 to start CBP/IBP tag comparisons and table selections. | Finish tag comparisons and evaluation of table-based predictors to obtain MOC hit, initial MDR pointers and FBP/CBP/IBP/RAP predictions. Form fetch address of next FBlk (next FBSA, i.e., next FA produced by current FBlk), based on FBP/CBP/IBP/RAP predictions and fetch address of current FBlk (current FBSA). Next FBlk is FBlk immediately succeeding current FBlk in program execution order. Current FBSA is next FA of previous FBlk generated in PR4 during previous clock cycle and fed back to PR4 in this clock cycle. Predict BrDir-F/IndBr-F produced by current FBlk based on predictions of termination type, FBlk length, and conditional branch direction. Form FBD of current FBlk and push into FBD FIFO. Update restoration branch history with predicted BrDir-F/IndBr-F. Update RAP. | To check for possible SCP mis-prediction: (1) compare "correct" BrDir-F/IndBr-F produced by current FBlk as predicted by the FSPU against BrDir-S/IndBr-S obtained from SCP produced by the current FBlk as predicted by SCP in PR1 3 clock cycles earlier and fed forward to PR5 this clock cycle; (2) hash next FBSA produced by current FBlk as predicted by the FSPU to generate "correct" HNFAI and HNFAT, then compare against HNFAI and HNFAT obtained from SCP produced by the current FBlk as predicted by SCP in PR1 3 clock cycles earlier and fed forward to PR5 this clock cycle. If SCP mis-predicted: flush PRU pipeline, train SCP, restore current branch history from restoration branch history, restart PRU using "correct" next FBlk information. Push MBRFE (of Fig. 21) into MBRF to build ME, as needed. |

FIG. 20

← 331 training fields of MTRE

- InTraining 2002
- TrainingMode 2004
- DoNotTrain 2006
- consistency counter (CC) (for SEQ Training/ULP Training/Abort Invalidation) 2008
- expectedNextMEId (for SEQ Training) 2012
- LastIterCnt (ULP Training), MinIterCnt (MLIC Training), or HistIterCnt (HLIC Training) 2014
- ULPIterCnt (for ULP Maintenance) 2016
- ULP (for loop body ME/ULP-MF-ME MOC co-residency optimization) 2018
- numFBlksLoopBody 2019
- histogram (for HLIC Training) 2022

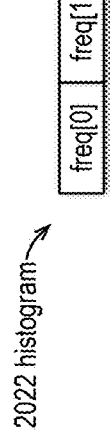

2022 histogram

FIG. 21

← 2100 MBRF entry (MBRFE)

- MeType (SF-ME or MF-ME first, middle, or final) 2102
- BuildValid 2104
- BuildReady 2106
- NumFBlks 2108
- VaTagInfo 2114
- initial MDR pointers 2116
- NumMDREs 2118
- FBlkID 2117

FIG. 19

← 1900 PRU registers

- prevMEId 1902
- currMEId 1904
- nextMEId 1906
- nextMEId-secondary 1908
- loopUnrollFactor (F) 1912
- unrollCnt 1913
- CurrIterCnt 1914
- ULPIterNum 1916
- SequenceState 1918
- start build threshold (SBT) 1922
- MF-ME start build threshold (MSBT) 1923
- continue build threshold (CBT) 1924
- loop build threshold (LBT) 1926
- abort validation threshold (AVT) 1928
- ULPFBSA 1932
- ULPState 1934
- FBlksSeenThisIteration 1936

The thresholds may be software configurable and/or dynamically variable by hardware.

PRU looks up FBSA in FBP and MOC, detects hit in FBP, and detects a multiple-hit in MOC on SEQ-MF-ME (primary) and SF-ME (secondary) 2802

PRU generates FBD using hit entry of FBP and hit SEQ-MF-ME (rather than hit SF-ME), i.e., PRU prioritizes primary SEQ-MF-ME above secondary SF-ME 2804

FIG. 35A set index 3 | ULP-MF-ME (tag=493) | | LB-SF-ME (tag=493) | | | | | way 0 ... way 1 ... way 2 ... way 3 ... way 7

← 173 MTR

FIG. 35B set index 3 | ULP-MF-ME (tag=493) | | LB-MF-ME (tag=493) | | | first SF-ME (tag=493) | | way 0 ... way 1 ... way 2 ... way 3 ... way 7

← 173 MTR

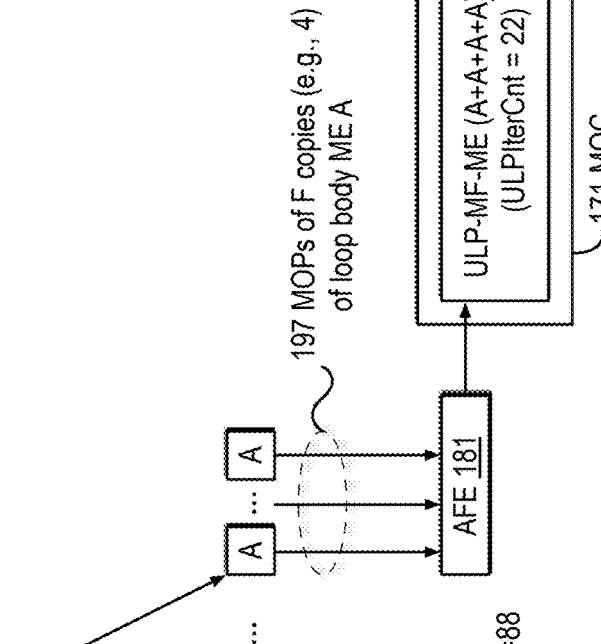
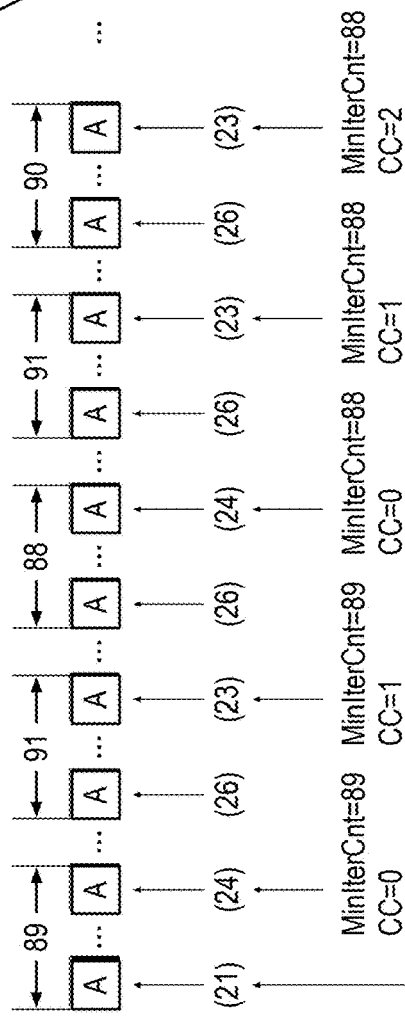
FIG. 41

FIG. 52B

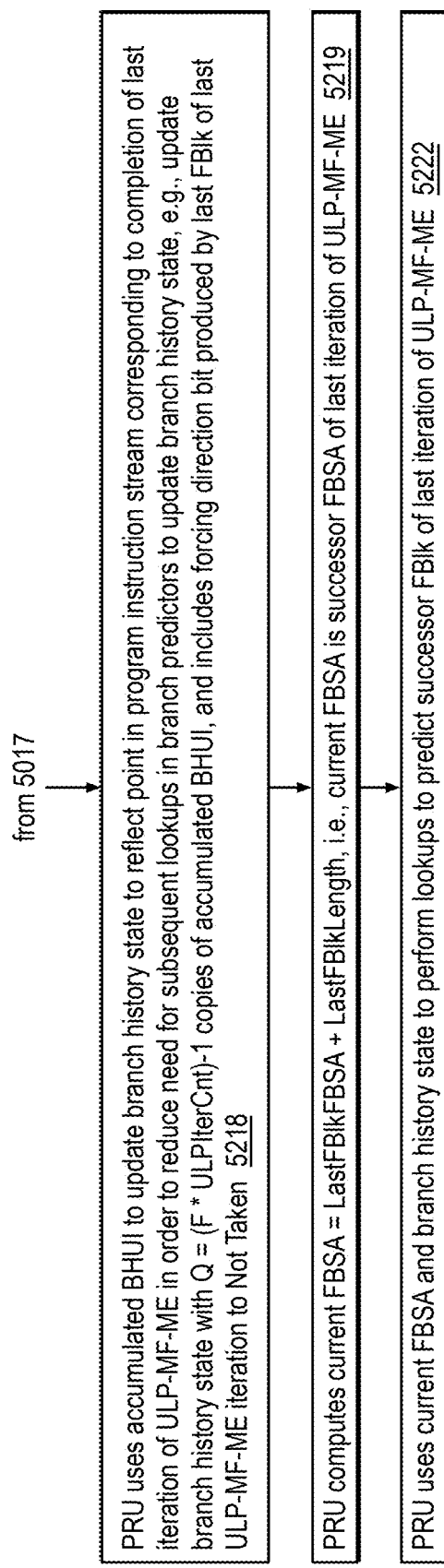

from 5017

PRU uses accumulated BHUI to update branch history state to reflect point in program instruction stream corresponding to completion of last iteration of ULP-MF-ME in order to reduce need for subsequent lookups in branch predictors to update branch history state, e.g., update branch history state with Q = (F * ULPIterCnt)-1 copies of accumulated BHUI, and includes forcing direction bit produced by last FBlk of last ULP-MF-ME iteration to Not Taken 5218

PRU computes current FBSA = LastFBlkFBSA + LastFBlkLength, i.e., current FBSA is successor FBSA of last iteration of ULP-MF-ME 5219

PRU uses current FBSA and branch history state to perform lookups to predict successor FBlk of last iteration of ULP-MF-ME 5222

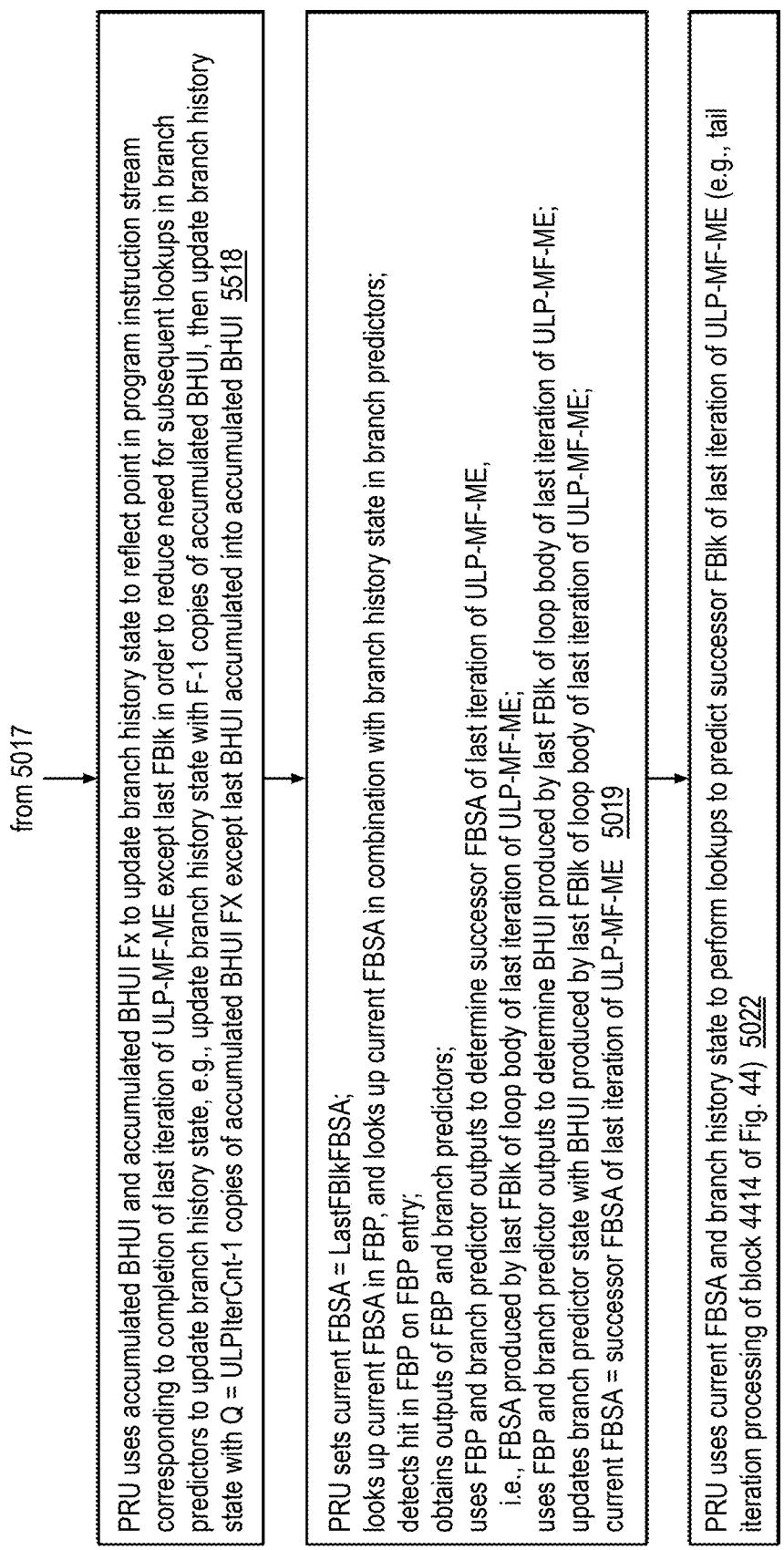

FIG. 55B from 5017

PRU uses accumulated BHUI and accumulated BHUI Fx to update branch history state to reflect point in program instruction stream corresponding to completion of last iteration of ULP-MF-ME except last FBlk in order to reduce need for subsequent lookups in branch predictors to update branch history state, e.g., update branch history state with F-1 copies of accumulated BHUI, then update branch history state with Q = ULPIterCnt-1 copies of accumulated BHUI FX except last BHUI accumulated into accumulated BHUI  5518

PRU sets current FBSA = LastFBlkFBSA;
looks up current FBSA in FBP, and looks up current FBSA in combination with branch history state in branch predictors;
detects hit in FBP on FBP entry;
obtains outputs of FBP and branch predictors;
uses FBP and branch predictor outputs to determine successor FBSA of last iteration of ULP-MF-ME,
i.e., FBSA produced by last FBlk of loop body of last iteration of ULP-MF-ME;
uses FBP and branch predictor outputs to determine BHUI produced by last FBlk of loop body of last iteration of ULP-MF-ME;
updates branch predictor state with BHUI produced by last FBlk of loop body of last iteration of ULP-MF-ME;
current FBSA = successor FBSA of last iteration of ULP-MF-ME   5019

PRU uses current FBSA and branch history state to perform lookups to predict successor FBlk of last iteration of ULP-MF-ME (e.g., tail iteration processing of block 4414 of Fig. 44)  5022

PREDICTION UNIT THAT PREDICTS SUCCESSOR FETCH BLOCK START ADDRESS OF MULTI-FETCH BLOCK MACRO-OP CACHE ENTRY

CROSS REFERENCE TO RELATED APPLICATION(S)

This application is a continuation-in-part (CIP) of U.S. Non-Provisional applications, Ser. Nos. 18/645,239, 18/645,249, 18/645,260, 18/645,269, 18/645,272, 18/645,274, 18/645,281 (VENT.0207-1, VENT.0208-1, VENT.0209-1, VENT.0213-1, VENT.0219-1, VENT.0220-1, VENT.0221-1), each filed Apr. 24, 2024; each of Ser. Nos. 18/645,239, 18/645,249, 18/645,260, 18/645,269, 18/645,272, 18/645,274, 18/645,281 (VENT.0207-1, VENT.0208-1, VENT.0209-1, VENT.0213-1, VENT.0219-1, VENT.0220-1, VENT.0221-1) is a continuation-in-part (CIP) of U.S. Non-Provisional applications, Ser. No. 18/380,150 (VENT.0203) and Ser. No. 18/380,152 (VENT.0214), each filed Oct. 13, 2023; each of Serial No. 18/380,150 (VENT.0203) and Ser. No. 18/380,152 (VENT.0214) is a CIP of U.S. Non-Provisional application Ser. No. 18/240,249 (VENT.0202-1) filed Aug. 30, 2023; each of Ser. Nos. 18/645,239, 18/645,249, 18/645,260, 18/645,269, 18/645,272, 18/645,274, 18/645,281 (VENT.0207-1, VENT.0208-1, VENT.0209-1, VENT.0213-1, VENT.0219-1, VENT.0220-1, VENT.0221-1) claims priority to U.S. Provisional application Ser. No. 63/547,230 (VENT.0170PROV), filed Nov. 3, 2023; this application claims priority to U.S. Provisional application Ser. No. 63/547,230 (VENT.0170PROV); and all of the above-referenced applications are hereby incorporated by reference in their entirety.

This application is related to U.S. Non-Provisional applications, Ser. No. 18/737,532, filed concurrently herewith, and which is hereby incorporated by reference in its entirety.

BACKGROUND

Microprocessors process data by fetching instructions from memory, typically referred to as system memory, and executing the fetched instructions. In conventional systems, the time required to fetch a block of instructions from system memory is on the order of one hundred clock cycles of the microprocessor. For this reason, high-performance microprocessors include one or more cache memories, or simply caches, into which the fetched instructions are stored. The cache is many orders of magnitude smaller than the system memory and, unlike the system memory, is typically included within the same integrated circuit that includes the one or more processing cores of the microprocessor. As a result, the time required to fetch an instruction from the cache, assuming it is found there, is typically an order of shorter than a fetch from system memory. The performance of the microprocessor may be significantly improved in accordance with the percentage of time instructions are found in the cache when needed, which is commonly referred to as the cache hit rate.

The cache hit rate may be affected by different characteristics of the cache. One of the characteristics is the size of the cache, i.e., the number of instructions the cache can hold. Generally, the larger the cache the higher the hit rate. Another characteristic that may affect the hit rate is the cache line size, which is the number of sequential bytes of instructions that are held together in an entry of the cache, e.g., 64 bytes.

Yet, another characteristic that may affect the hit rate is the replacement policy of the cache. When a new cache line of instructions is to be put into the cache, the replacement policy determines which entry of the cache will be replaced with the new cache line of instructions. Caches are commonly arranged as set associative caches having many sets each having multiple ways and each way having an entry for holding a cache line of instructions. A given memory address selects a set among the many sets. Each set includes replacement information used to implement the replacement policy. That is, the replacement information is used to decide which way of the selected set will be replaced. The replacement information indicates the usage history of the entries in the set relative to one another. When an entry of a given set is used because the entry is hit upon by the memory address that specifies the next one or more of the instructions to be fetched, the replacement information of the set is updated to reflect the use, such as the frequency of use or recency of use. For example, a popular replacement scheme is least-recently-used (LRU), or variations thereof, for which the replacement information may generally be characterized as maintaining a relative age of each entry with respect to its use. Each time the set is accessed, the replacement information for the set is updated to reflect the usage of the used entry and the non-usage of the other entries in the set. In an LRU replacement scheme, when the need arises to allocate an entry for a new cache line of instructions, the cache selects the least recently used way in the set for replacement as indicated by the replacement information.

Micro-Ops and Micro-Op Caches

Modern microprocessors are typically separated essentially into a front-end whose job is to fetch instructions and provide a stream of instructions to a back-end that executes the fetched instruction stream. The back-end includes execution units that are the functional units of the microprocessor that perform arithmetic, logical, memory or other operations to accomplish the semantics of the instructions of the program. The instructions fetched from system memory and cached in the cache of a microprocessor may be referred to as architectural instructions. Architectural instructions conform to the instruction set architecture (ISA) of the microprocessor, popular examples of which are x86, ARM, SPARC, MIPS, RISC—V, among others.

Modern microprocessors typically decode, or translate, architectural instructions into micro-operations, or simply micro-ops. The execution units in fact execute micro-ops rather than architectural instructions. For example, an execution unit performs the operations specified by a micro-op on source operands from source registers specified by the micro-op to produce a result operand that is written to a destination register specified by the micro-op and that may be used by other micro-ops as a source operand. Analogously to the fact that architectural instructions conform to the ISA of the microprocessor, micro-ops conform to a microarchitectural "micro-instruction set architecture" of the micro-architecture of the microprocessor. Unlike the ISA which is visible to programmers and/or compilers that write/generate programs using architectural instructions, the micro-instruction set architecture is not visible to programmers and compilers. Rather, the micro-architecture is defined by the designers of the microprocessor, and two microprocessors that conform to the same ISA but that are designed by different designers will almost certainly have different microarchitectural instruction sets.

The differences between architectural instructions and micro-ops may vary widely depending upon the ISA and the microarchitecture. For example, in the x86 ISA, the architectural instructions may be very complex, as evidenced by the fact that the length of an instruction may be in the tens of bytes. As a result, a complex x86 instruction may be decoded into several micro-ops. This was particularly true after the emergence of reduced instruction set computers (RISC) in the 1980's, after which the trend was often toward keeping the back-end as RISC-like as possible and the micro-ops relatively simple.

The complexity and power consumption required by the decode logic that decodes the architectural instructions into micro-ops may also vary widely depending upon the ISA. Using the x86 ISA again as an example, instructions can be variable length, ranging from a single byte to tens of bytes. Consequently, the decode logic for an x86 processor can be very complex and power consuming. This is especially true for a high-performance superscalar out-of-order back-end design that requires a high rate of micro-ops per clock cycle to consume. In such processors the decode is typically performed by multiple pipeline stages over multiple clock cycles. The longer the decode pipeline, the greater the decode latency, which may increase power consumption as well as the penalty associated with branch mispredictions, for example. Furthermore, there are often multiple decode pipelines that operate in parallel to provide micro-ops at the rate needed by the high-performance back-end, which may increase the power consumption even further.

Micro-op caches have been included in some high-performance microprocessors to supply micro-ops to the back-end at a high rate, to reduce decode latency, and to reduce power consumption. As the decode logic decodes architectural instructions into micro-ops, the micro-ops are allocated into the micro-op cache so that if the program instruction stream again includes the same architectural instructions, the associated micro-ops can be fetched from the micro-op cache. Fetching the micro-ops from the micro-op cache eliminates the need to decode the corresponding architectural instructions and eliminates the need to fetch the corresponding architectural instructions from the instruction cache, which may result in both a reduction in power consumption and decode latency, which may translate into higher performance. Fetching the micro-ops from the micro-op cache may also facilitate the ability to supply micro-ops to the back-end at a higher rate than when fetching architectural instructions from the instruction cache and decoding them into micro-ops.

Just as it is desirable to have a high hit rate in an architectural instruction cache, so also it is desirable to have a high hit rate in a micro-op cache so that the benefits of lower power consumption and higher performance may be experienced more often. Thus, as described above with respect to architectural instruction caches, micro-op caches have conventionally been designed to include replacement information to implement a replacement policy to decide which entry in the implicated set of the micro-op cache to replace. In an LRU replacement scheme, for example, when the decode logic decodes architectural instructions into a new group of micro-ops, the least recently used entry is selected for replacement, i.e., the new group of micro-ops is allocated into the least recently used entry.

Typically, there is no question about whether or not to allocate an entry in the micro-op cache for the new group of micro-ops. The only question is which entry in the selected set will be replaced to perform the allocation. However, it has been observed that generally speaking programs tend to have a relatively small percentage of instructions that are frequently executed and a relatively large percentage of instructions that are infrequently executed. Indeed, some instructions may only be executed once. Thus, a consequence of an "always allocate" policy is that in some instances—perhaps a significant percentage of instances—the new group of micro-ops might only have been executed the one time or may be executed relatively infrequently and in that case may unfortunately replace a group of micro-ops that is more frequently used than the new group of micro-ops, resulting in inefficient use of the micro-op cache. In a more sophisticated scheme, the micro-op cache may examine the replacement information and if none of the entries in the set is sufficiently old, e.g., the usage history indicates all the entries currently in the set have been used sufficiently recently, then the micro-op cache decides not to replace any of the current entries in the set, i.e., not to allocate an entry in the micro-op cache for the new group of micro-ops and to instead retain all the groups of micro-ops currently in the set.

Fetch Source Switching

As described above, significant performance and power efficiency may be achieved if the micro-op cache hit rate is high. However, sometimes the micro-ops associated with the current program instruction stream are not present in the micro-op cache. In this case the needed architectural instructions are fetched from the instruction cache and decoded into micro-ops. Eventually, the needed micro-ops will be present again in the micro-op cache such that they may be fetched from the micro-op cache again. Thus, there is a switching back and forth between the two fetch sources. Essentially, the processor predicts that the next fetch source will be the same as the current fetch source until it realizes it predicted incorrectly, i.e., the processor assumed the next fetch source will be the micro-op cache since the current fetch source is the micro-op cache but there is a miss in the micro-op cache, or the processor assumed the instruction cache will be the next fetch source since the instruction cache is the current fetch source but there was a hit in the micro-op cache. Because of the pipelined nature of the processor, conventionally there may be a penalty associated with such a misprediction/wrong assumption, i.e., the delay when switching from one fetch source to the other.

One solution to this problem is to fetch from both sources in parallel. That is, micro-ops are fetched from the micro-op cache while architectural instructions are fetched concurrently from the instruction cache. If there is a hit in the micro-op cache, the fetched architectural instructions are discarded, whereas if there is a miss in the micro-op cache, the fetched micro-ops are discarded. However, a drawback of this approach is that power is consumed by both fetch sources even though the power consumption by one fetch source is an unnecessary waste thus increasing power consumption.

U.S. Pat. No. 8,103,831 (the '831 Patent) issued to Rappoport et al. describes an efficient method for employing a micro-op cache in a processor. The '831 Patent's Abstract states:

A tag match for an instruction pointer retrieves a set of micro-op cache line access tuples having matching tags. The set is stored in a match queue. Line access tuples from the match queue are used to access cache lines in a micro-op cache data array to supply a micro-op queue. On a micro-op cache miss, a macro-instruction translation engine (MITE) decodes macro-instructions to supply the micro-op queue. Instruction pointers are stored in a miss queue for fetching macroinstructions from the MITE. The MITE may be disabled to conserve power when the miss queue is empty likewise for the micro-op cache data array when the match queue is empty. Synchronization flags in the last micro-op from the micro-op cache on a subsequent micro-op cache miss indicate where micro-ops from the MITE merge with micro-ops from the micro-op cache.

The '831 Patent further describes that "when the number of micro-op cache line access tuples stored in the match queue 222 at the time of a micro-op cache 202 miss is sufficiently large to oversupply line access tuples to micro-op cache data array 223, then the latency for switching to MITE 214 may be covered by a continued supply of micro-ops from the cache data array 223 to micro-op queue 216." However, the implication is that there will be instances when the switching latency is not covered up but instead incurred by the '831 Patent's processor. Furthermore, the loosely-coupled and loosely-synchronized dual path approach taken by the '831 Patent may involve a significant amount of cost and complexity, for example in terms of design verification due to the large space of possibilities to verify. As further observed by the '831 Patent, "the range of effective techniques for employing saved or cached micro-ops to improve processing of instructions and reduce costs in terms of circuit complexity and power consumption in a processor have not been fully explored."

Variable Length Micro-Op Cache Entries

Typically, micro-op caches are set-associative to improve hit rates in exchange for the increased delay and area required by additional comparators and muxes. Given the same cache size, higher associativity—i.e., a greater number of ways—generally yields a higher hit rate. The higher associativity reduces the likelihood that enough different memory addresses—i.e., more than the number of ways—will map to the same set to cause eviction of an entry that is needed soon after the eviction, often referred to as a conflict miss.

Furthermore, the number of micro-ops held in an entry of a micro-op cache may vary depending on various factors including the type of the architectural instructions (e.g., load/stores, arithmetic, integer, floating point) from which the micro-ops were decoded, the instruction set architecture (e.g., x86, ARM, RISC-V), and the microarchitectural instruction set supported by the execution units. Because the number of micro-ops held in the entry varies, a problem arises. One solution is to design a data field large enough to hold the maximum number of micro-ops. However, the larger the data field, the lower the efficiency of the cache due to wastage of space in the data field for entries that have fewer than the maximum number of micro-ops, which may be referred to as fragmentation.

U.S. Pat. No. 10,579,535 (the '535 Patent) issued to Rappoport et al. describes a defragmented and efficient micro-op cache. The micro-op cache of the '535 Patent is set-associative, and to each entry is allocated one or more ways of a tag array each of which includes multiple index pointers to a single micro-op in a data array. When the number of micro-ops exceeds the number of index pointers in a way, another way of the tag array must be allocated. Column 10, lines 8-14 of the '535 Patent states:

The method 400 may continue with the processing logic allocating indexing metadata of the first entry to the micro-op tag array according to set-associative cache allocation, which may mean allocation of two entries crossing two separate ways as illustrated in FIG. 3 (420). FIG. 3 is only an example, as the processing logic may need to allocate more than two ways in order to cache all the uops that come from a given fetch line.

Thus, according to the '535 Patent, two or more ways of the micro-op cache may be needed to cache all the micro-ops that come from a given fetch line. Allocating multiple ways effectively reduces the associativity of the micro-op cache which may harm its performance in the form of increased conflict misses. Furthermore, as the '535 Patent recognizes, "a certain level of fragmentation . . . in the micro-op tag array" may occur, and that fragmentation increases as the number of index pointers increases. Finally, the maximum number of micro-ops that may be included in an entry of the micro-op cache of the '535 Patent is limited by the number of ways and the number of index pointers in a way.

Multi-Block Traces

U.S. Pat. No. 7,987,342 (the '342 Patent) issued to Thaik et al. describes a processor with a trace unit that includes a basic block cache circuit that holds basic block traces generated by a basic block builder circuit and a multi-block cache circuit that holds multi-block traces generated by a multi-block builder circuit. The multi-block builder circuit receives basic block traces and multi-block traces for building a multi-block trace. The trace unit of the '342 Patent may provide for efficient and improved trace sequencing and improved power consumption. Further improvements may be needed.

BRIEF DESCRIPTION OF THE DRAWINGS

FIG. 2 is an example block diagram of an entry of the fetch block predictor (FBP) of FIG. 1, in accordance with embodiments of the present disclosure.

FIG. 3A is an example block diagram of a fetch block descriptor (FBD), in accordance with embodiments of the present disclosure.

FIG. 3B is an example block diagram of a macro-op cache (MOC) tag RAM entry in accordance with embodiments of the present disclosure.

FIG. 3C is an example block diagram of an MOC data RAM entry in accordance with embodiments of the present disclosure.

FIG. 3D is an example block diagram of a MOC entry in accordance with embodiments of the present disclosure.

FIG. 3E is an example block diagram of a fetch block (FBlk) first-in-first-out (FIFO) structure entry in accordance with embodiments of the present disclosure.

FIG. 9 is example block diagram of a single-cycle predictor (SCP) entry in accordance with embodiments of the present disclosure.

FIG. 10A is an example block diagram of an SCP in accordance with embodiments of the present disclosure.

FIG. 10B is an example block diagram of an SCP in accordance with alternate embodiments of the present disclosure.

FIG. 12 is an example block diagram illustrating stages of the pipeline of the PRU of FIG. 11 in accordance with embodiments of the present disclosure.

FIG. 19 is a block diagram illustrating registers of the PRU of FIG. 1 in accordance with embodiments of the present disclosure.

FIG. 20 is a block diagram illustrating training fields of an MOC Tag RAM (MTR) entry of an ME in accordance with embodiments of the present disclosure.

FIG. 21 is a block diagram illustrating an MOC Build Request FIFO (MBRF) entry (MBRFE) in the MBRF of FIG. 1 in accordance with embodiments of the present disclosure.

FIG. 35A is a block diagram illustrating an example of same-FBSA co-residency in the MTR of FIG. 1 of a ULP-MF-ME and a loop body SF-ME (LB-SF-ME) used to build the ULP-MF-ME in accordance with embodiments of the present disclosure.

FIG. 35B is a block diagram illustrating an example of same-FBSA co-residency in the MTR of FIG. 1 of a ULP-MF-ME, a loop body MF-ME (LB-MF-ME) used to build the ULP-MF-ME, and a first constituent SF-ME used to build the LB-MF-ME (which is a SEQ-MF-ME) in accordance with embodiments of the present disclosure.

FIG. 41 is a block diagram illustrating an example of the building of a MLIC ULP-MF-ME in accordance with embodiments of the present disclosure.

FIGS. 52A and 52B, referred to collectively as FIG. 52, is a flowchart illustrating operation of the PRU to predict a successor FBSA to a ULP-MF-ME and to predict the branch history state generated by the ULP-MF-ME in an optimized manner in accordance with embodiments of the present disclosure.

FIGS. 55A and 55B, referred to collectively as FIG. 55, is a flowchart illustrating operation of the PRU to predict a successor FBSA to a ULP-MF-ME and to predict the branch history state generated by the ULP-MF-ME in an optimized manner in accordance with embodiments of the present disclosure.

DETAILED DESCRIPTION

Figure 1:
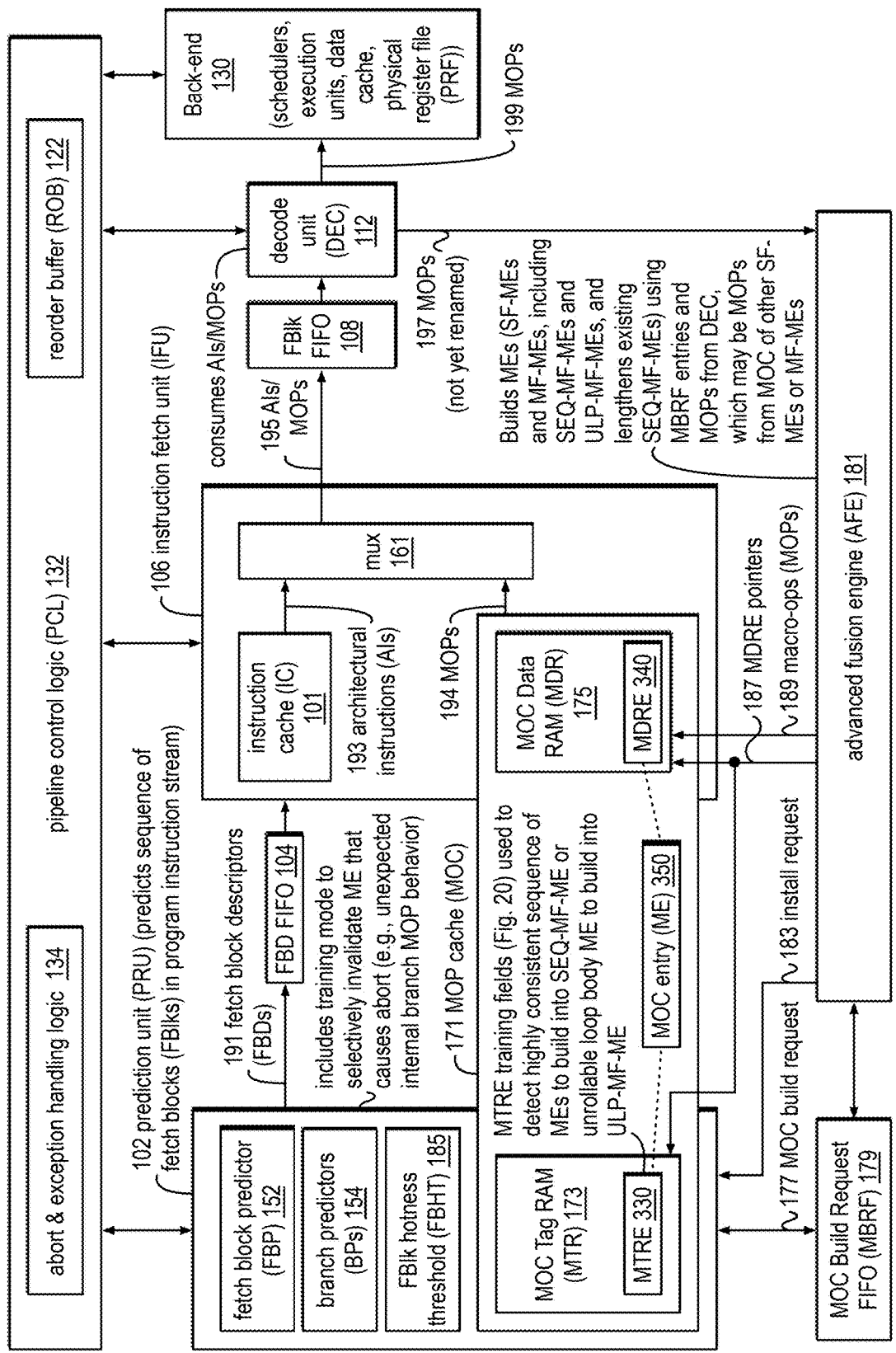
FIG. 1 is an example block diagram of a microprocessor core in accordance with embodiments of the present disclosure.

In the present disclosure, the program instruction stream is the stream of program instructions in their dynamic execution order, in contrast to the static order in which the program instructions appear in system memory from which the program instructions are fetched by the microprocessor. Similarly, the program order is the order in which instructions appear in the program instruction stream, i.e., the dynamic execution order rather than the static order of appearance in system memory.

The prediction unit of the microprocessor predicts the program instruction stream, i.e., predicts the dynamic order in which the instructions of the program will be executed. More specifically, the prediction unit predicts the program instruction stream as a sequence of fetch block start addresses that specify a corresponding sequence of sequential runs of instructions, which are referred to as fetch blocks.

The fetch block start addresses of the sequence are looked up in a macro-op cache. Macro-ops, in contrast to architectural instructions, are the instructions, or operations, that are executable by the execution units of the microprocessor. In other words, the architectural instructions conform to the architectural instruction set of the microprocessor, whereas the macro-ops conform to the instruction set of the execution units of the microprocessor. If a fetch block start address hits on an entry of the macro-op cache, the prediction unit instructs the fetch unit to fetch the macro-ops from the hit macro-op cache entry rather than to fetch the architectural instructions of the fetch block from the instruction cache. The fetched macro-ops are dispatched to the execution units for execution, without the need to be decoded like architectural instructions.

Within the single macro-op cache of the microprocessor, two types of entries are present: single-fetch block macro-op cache entries and multi-fetch block macro-op cache entries. A single-fetch block macro-op cache entry holds macro-ops into which the architectural instructions of a single fetch block have been decoded by a decode unit and that may be more highly optimized by a fusion engine that fuses the decoded macro-ops when possible, depending upon the number, operation type, original order, operands specified, and so forth of the decoded macro-ops. A multi-fetch block macro-op cache entry holds macro-ops into which the macro-ops of multiple single-fetch block macro-op cache entries and/or other multi-fetch block macro-op cache entries are collected and potentially more highly optimized by the fusion engine when possible. Thus, a multi-fetch block macro-op cache entry effectively holds the decoded and potentially fused architectural instructions of multiple fetch blocks.

In a two-stage process, the microprocessor first builds single-fetch block macro-op cache entries into the macro-op cache and second uses the macro-ops of a series of fetched macro-op cache entries to build a multi-fetch block macro-op cache entry. A multi-fetch block macro-op cache entry may be one of two types: a sequential multi-fetch block macro-op cache entry and a loop unrolled multi-fetch block macro-op cache entry.

A sequential multi-fetch block macro-op cache entry is built from the macro-ops of a series of different macro-op cache entries that the prediction unit recognizes as a highly consistent sequence within the program instruction stream. Each macro-op cache entry includes an identifier of the next macro-op cache entry expected to succeed the current macro-op cache entry in the program instruction stream. Each time the expected macro-op cache entry does succeed the current macro-op cache entry in the program instruction stream, a consistency counter is incremented in the current macro-op cache entry, and otherwise the consistency counter is reset. When the current (first) macro-op cache entry's counter reaches a threshold, this indicates a highly consistent sequence of the first and the expected (second) macro-op cache entries. If when the first entry's counter has reached the threshold second entry's counter has also reached a threshold (perhaps different from (e.g., smaller than) the first threshold since the build is being continued rather than started), then a third entry (identified by the expected next identifier of the second entry) may also be included in the build of the sequential multi-fetch block macro-op cache entry. The same is true for a fourth entry, fifth entry, etc.

Once a sequential multi-fetch block macro-op cache entry is built into the macro-op cache, it may later be extended, or lengthened, with one or more additional macro-op cache entries that the prediction unit later observes to be in a highly consistent sequence with the sequential multi-fetch block macro-op cache entry using the expected next identifier and confidence counter of the sequential multi-fetch block macro-op cache entry, which—when installed into the macro-op cache—may have been updated with the respective expected next identifier and confidence counter of the last entry of the sequence. Different thresholds for starting the build may be used to compare with the consistency counter of the first entry in a sequence depending upon whether the first entry is a sequential multi-fetch block macro-op cache entry, or a single-fetch block macro-op cache entry.

A loop unrolled multi-fetch block macro-op cache entry, is built from the macro-ops of a series of the same macro-op cache entry, referred to as a loop body macro-op cache entry. That is, the prediction unit recognizes that the program instruction stream has, in multiple instances, looped on the loop body macro-op cache entry, and the prediction unit accordingly unrolls the loop by a loop unroll factor. That is, a number of copies of the loop body macro-op entry fetched from the macro-op cache equal to the loop unroll factor is used to build the loop unrolled multi-fetch block macro-op cache entry. The loop body macro-op cache entry may be a single-fetch block macro-op cache entry or a sequential multi-fetch block macro-op cache entry.

In a first embodiment, the prediction unit observes a consistent loop iteration count of the observed instances of the loop on the loop body macro-op cache entry. The prediction unit computes a quotient of the consistent loop iteration count and the loop unroll factor and saves the quotient to an unrolled loop iteration count field in the loop unrolled multi-fetch block macro-op cache entry. When the current fetch block start address hits on the loop unrolled multi-fetch block macro-op cache entry, the prediction unit predicts a number of loop unrolled multi-fetch block macro-op cache entries equal to the unrolled loop iteration count, i.e., instructs the fetch unit to fetch a number of loop unrolled multi-fetch block macro-op cache entries equal to the unrolled loop iteration count. The prediction unit may select a loop unroll factor that is an integer submultiple of the consistent loop iteration count. In such case, it is unlikely necessary for the loop body macro-op cache entry to remain co-resident with the loop unrolled multi-fetch block macro-op cache entry in the macro-op cache to process any tail iterations that might be predicted beyond the unrolled loop iteration count of the loop unrolled multi-fetch block macro-op cache entry, so the loop body macro-op cache entry is replaced within the macro-op cache with the loop unrolled multi-fetch block macro-op cache entry. In such an embodiment, it may not be possible to build the loop unrolled multi-fetch block macro-op cache entry if there are no value of the loop unroll factor that is an integer submultiple of the consistent loop iteration count. Alternatively, the prediction unit is free to select a loop unroll factor that is not necessarily an integer submultiple of the consistent loop iteration count. In such case, tail iterations are likely to occur such performance may be improved by allowing the loop body macro-op cache entry to remain co-resident with the loop unrolled multi-fetch block macro-op cache entry in the macro-op cache so that the loop body macro-op cache entry may be fetched after the fetches of the number of the loop unrolled multi-fetch block macro-op cache entry equal to the unrolled loop iteration count. This may result in a multi-hit of the current fetch block start address in the macro-op cache, and the prediction unit instructs the fetch unit to fetch the loop body macro-op cache entry rather than the loop unrolled multi-fetch block macro-op cache entry until the program instruction stream falls out of the loop.

In a second embodiment, the prediction unit observes a minimum loop iteration count among the observed instances of the loop on the loop body macro-op cache entry. In other words, the loop iteration count may be inconsistent, but the prediction unit reaches a confidence in a minimum loop iteration count. For each instance of a loop on the loop body macro-op cache entry, if the loop iteration count of the instance is not less than the maintained minimum loop iteration count, the consistency counter is incremented, and otherwise it is reset. Once the counter reaches a threshold, the prediction unit reaches a confidence in the minimum loop iteration count and builds a loop unrolled multi-fetch block macro-op cache entry using it. Because the loop iteration count is inconsistent, the loop body macro-op cache entry is allowed to remain co-resident with the loop unrolled multi-fetch block macro-op cache entry in the macro-op cache to process tail iterations via the multi-hit processing.

In a third embodiment, which also accommodates an inconsistent loop iteration count, the prediction unit records a histogram of frequencies of a range of loop iteration counts of the observed instances of the loop on the loop body macro-op cache entry and analyzes the histogram to select a loop iteration count used to calculate the unrolled loop iteration count and to select a value of the loop unroll factor. As with the second embodiment, the loop iteration count may be inconsistent, but the prediction unit reaches a confidence in the histogram and therefore the selected loop iteration count. For each instance of a loop on the loop body macro-op cache entry, the consistency counter is incremented, and once the counter reaches a threshold, the prediction unit reaches a confidence in the histogram and builds a loop unrolled multi-fetch block macro-op cache entry using the selected loop iteration count. In each of the embodiments, the unroll loop iteration count may be populated with a floor function or a ceiling function of the quotient of the loop iteration count and the loop unroll factor depending upon a remainder of the quotient or analysis of the histogram, for example.

Because there are expectations built into the multi-fetch block macro-op cache entries, e.g., internal branch macro-ops, at execution of the macro-ops of a multi-fetch block macro-op cache entry, the execution units may detect that the built-in expectations were not met, e.g., that one of the internal branch macro-ops was not taken even though the built-in expectation is that the internal branch macro-op was taken. In such case the execution unit will signal the need for an abort, which is conveyed to the prediction unit. In response, the prediction unit transitions the multi-fetch block macro-op cache entry to a special state that prevents the multi-fetch block macro-op cache entry from being built into a multi-fetch block macro-op cache entry, e.g., sequential, or unrolled loop. The prediction unit increments the counter in the multi-fetch block macro-op cache entry each time it is predicted in the program instruction stream. If the counter reaches a threshold before the multi-fetch block macro-op cache entry causes a need for another abort, the prediction unit transitions the multi-fetch block macro-op cache entry back to its previous state such that it becomes eligible to be used in a build of a multi-fetch block macro-op cache entry; otherwise (i.e., if the multi-fetch block macro-op cache entry causes a need for another abort), the prediction unit invalidates the multi-fetch block macro-op cache entry in the macro-op cache.

FIG. 1 is an example block diagram of a microprocessor core 100 in accordance with embodiments of the present disclosure. In the present disclosure, the term macro-op (MOP), rather than micro-op, is used to refer to the micro-architectural operations that are executed by the execution units of the microprocessor. This is because in an embodiment the microprocessor 100 includes an advanced fusion engine (AFE) 181 of FIG. 1 that is configured to perform higher levels of fusion than conventional processors to generate more complex (i.e., macro) microarchitectural operations, thus the term MOPs. Accordingly, the term macro-op cache (MOC), rather than micro-op cache, is used to refer to the cache memory that caches MOPs. However, some embodiments described are not limited to embodiments that employ an AFE or MOPs or a MOC, but instead may also be employed in embodiments that do not include an AFE and in which architectural instructions are decoded into micro-ops and allocated into a micro-op cache.

A MOP, like a micro-op, is an instruction that is executable by an execution unit of the microprocessor, as distinct from an architectural instruction which is not executable directly by an execution unit. Stated alternatively, a MOP, like a micro-op, specifies operations and operands within the set of operations and operands defined by the microarchitectural "micro-instruction set architecture" of the execution units of the microprocessor. In other words, MOPs, like micro-ops, are the internal instructions that are actually executed by the execution units, in contrast to architectural instructions that are decoded into MOPs, or micro-ops. Furthermore, a MOP, like a micro-op, may be a fusion of a pair of adjacent architectural instructions decoded into a single MOP/micro-op. In an embodiment, the decode unit (DEC) 112 of the microprocessor 100 of FIG. 1 is configured to fuse a pair of adjacent architectural instructions and decode them into a single MOP.

However, for some sequences of instructions of the program instruction stream, the AFE 181 may be capable of performing more complex fusing of the MOPs generated by the DEC 112 when decoding architectural instructions into MOPs. For example, the AFE 181 may be configured to fuse non-adjacent MOPs. For another example, the AFE 181 may be configured to fuse more than two MOPs. For example, the AFE 181 may be configured to examine a window of an entire FBlk worth of MOPs to look for fusion opportunities among more than two and/or non-adjacent MOPs.

For another example, the MOPs may be more complex than conventional micro-ops, yet still have a single-cycle execution latency. For example, the MOPs may be more complex in that they perform compound operations, e.g., two arithmetic/logical operations on three source operands, including input conditioning (e.g., shift or rotate) on some of the source operands and output conditioning (e.g., zero-extend or sign-extend) on the result, i.e., the destination operand.

The core 100 includes an instruction pipeline that includes a predict unit (PRU) 102, a fetch block descriptor (FBD) FIFO 104, an instruction fetch unit (IFU) 106, a FBlk FIFO 108, a decode unit (DEC) 112, and a back-end 130. In an embodiment, each of the PRU 102, IFU 106, DEC 112, and back-end 130 are also pipelines. The PRU 102 and IFU 106 may be referred to generally as the front-end of the core 100, and the DEC 112 may be referred to as the mid-end. The core 100 also includes pipeline control logic (PCL) 132 that controls various aspects of the microprocessor 100 pipeline as described herein.

The back-end 130, in an embodiment, includes the following functional blocks which are not shown: a physical register file (PRF), a data cache, a plurality of execution units (EUs), and schedulers to which MOPs are dispatched by the DEC 112 and which schedule issuance of the MOPs to the EUs for execution. In an embodiment, the PRF includes separate integer, floating-point and vector PRFs. The DEC 112 may rename architectural registers specified by architectural instructions to physical registers of the PRF. In an embodiment, the EUs include integer execution units (IXUs), floating point units (FXUs), and load-store unit (LSUs). The core 100 may also include a memory management unit (MMU) that includes a data translation lookaside buffer (DTLB), an instruction translation lookaside buffer (ITLB), and a table walk engine (TWE). The ITLB translates a virtual fetch block start address (FBSA) into a physical fetch block start address that is used to fetch a block of architectural instructions from the instruction cache 101 or from system memory.

The core 100 may also include other blocks not shown, such as a load/store queue, a load buffer, a bus interface unit, and various levels of cache memory above the instruction cache 101 and data cache, some of which may be shared by other cores of the microprocessor. Furthermore, the core 100 may be multi-threaded in the sense that it includes the ability to hold architectural state (e.g., program counter, architectural registers) for multiple threads that share the back-end 130, and in some embodiments the mid-end and front-end, to perform simultaneous multithreading (SMT).

The PRU 102 maintains the program counter (PC) and includes predictors that predict program flow that may be altered by control flow instructions, such as branch instructions. In an embodiment, the PRU 102 includes a fetch block predictor (FBP) 152, branch predictors (BPs) 154, a FBlk hotness threshold (FBHT) 185, and a MOC Tag RAM (MTR) 173 portion of a macro-op cache (MOC) 171. The term RAM may be used in the present disclosure to refer to random access memory, such as a static RAM or dynamic RAM, and/or to other types of arrays of addressable storage, such as an array of registers or flip-flops. In an embodiment, the FBHT 185 is configurable by software executing on the microprocessor 100, e.g., via a write to a control register (not shown) of the microprocessor 100. In an embodiment, the BPs 154 include a main conditional branch predictor, a secondary conditional branch predictor, an indirect branch predictor, and a return address predictor. As a result of predictions made by the predictors, the core 100 may speculatively execute instructions in the instruction stream of the predicted path.

The FBP 152 caches information about previously fetched and decoded and executed FBlks in the program instruction stream such as the length and termination type of the FBlk. Each entry of the FBP 152 (described more with respect to FIG. 2) is associated with a FBlk. Each entry of the FBP 152 specifies the location within the instruction cache 101 of the FBlk, i.e., a prediction of the set and way (e.g., predicted set index 204 and predicted way number 206 of FIG. 2) of the instruction cache 101 that holds the architectural instructions of the FBlk such that the FBlk may be immediately fetched from the instruction cache 101 by the IFU 106 upon reception of the predicted set and way, as described in more detail below. Each entry of the FBP 152 also includes a FBlk hotness counter (FBHC)—storage element FBHC 217 of FIG. 2 output by the FBP 152 as FBHC 417 of FIG. 4A—that reflects the hotness of the FBlk associated with the FBP entry. More specifically, the FBHC 217 is incremented each time the FBP entry is hit upon and used as a prediction that the associated FBlk is present again in the program instruction stream. The FBHC is used in a filtering manner to decide whether to allocate an entry in the MOC 171 for MOPs into which architectural instructions of the FBlk are decoded. In an embodiment, an entry in the MOC 171 is not allocated unless the value of the FBHC 217 has incremented beyond the FBHT 185.

The PRU 102 generates fetch block descriptors (FBD) 191, described in more detail with respect to FIG. 3A, that are provided to the FBD FIFO 104 in program order. Each FBD describes a FBlk. If the AIs of the FBlk have been decoded into MOPs and cached in a MOC entry 350 (of FIG. 3D) of the MOC 171, then the FBD 191 also describes some characteristics of the MOC entry 350. FBDs are described in detail with respect to FIG. 3A. Each FBD includes the predicted set index and predicted way number provided by the FBP 152. Each FBD also includes a fetch source indicator (e.g., FSI 314 of FIG. 3A) that specifies whether the IFU 106 should fetch the FBlk from the instruction cache 101 or from a data RAM portion of the MOC 171, described in more detail below, within the IFU 106 and that is separate from the MTR 173. The FSI is generated based on whether the FBSA of the FBlk hits in the MTR 173 and in the FBP 152 of the PRU 102 earlier in the front-end pipeline than the IFU 106. Advantageously, the FSI both enables the IFU 106 to save power by disabling the other fetch source when not being fetched from and enables the IFU 106 not to incur a penalty that would otherwise be incurred if the IFU 106 had to predict which source to fetch from—which the IFU 106 does not have to do because the IFU 106 is told the fetch source by the PRU 102—and had to switch to the other source whenever the IFU 106 mis-predicted.

As described above, a FBlk is a sequential run of architectural instructions in a program instruction stream. A FBlk has a length and a termination type. A FBlk may terminate with an unconditional branch instruction or a conditional branch instruction that has been taken, or the FBlk may terminate because the run of instructions reached a maximum sequential FBlk length, i.e., the FBlk continues sequentially into the next FBlk. In an embodiment, a FBlk may be up to ninety-six bytes long and may contain as many as forty-eight architectural instructions. In an embodiment, a FBlk may include zero, one or more embedded conditional branch instructions that have not yet been taken. Typically, an embedded conditional branch instruction is not the last instruction of the FBlk, i.e., typically embedded conditional branch instructions are internal to the FBlk, and the FBlk is terminated for a reason other than an embedded conditional branch instruction. Unlike a terminating conditional branch instruction, an embedded conditional branch instruction is not actively predicted by the branch predictor (e.g., the conditional branch predictor of the BPs 154 of FIG. 4A), but is instead implicitly predicted not taken, e.g., because thus far it has never been taken. Although a FBlk typically refers to a sequential run of architectural instructions, a FBlk may also refer to MOPs into which the corresponding sequential run of architectural instructions are decoded and fused. The decoded and fused MOPs may be generated by the AFE, i.e., the MOPs may be more highly fused than the simpler MOPs decoded by the DEC 112. Generally, the context will make clear whether a FBlk of architectural instructions or a FBlk of MOPs is being described. A FBlk of MOPs is more typically referred to as a MOC entry (ME) of MOPs. In an embodiment, an ME may contain as many as forty-eight MOPs. A multi-FBlk ME (MF-ME) holds the MOPs associated with multiple FBlks, i.e., with multiple sequential runs of instructions.

The IFU 106 includes an instruction cache 101, a MOC Data RAM (MDR) 175 portion of the MOC 171, and a mux 161. The instruction cache 101 caches architectural instructions previously fetched from system memory. The MOC 171 caches MOPs previously generated by the DEC 112 and/or by the AFE 181. A FBD is essentially a request, also referred to as a fetch request, to fetch architectural instructions (AIs) 193 from the instruction cache 101 or to fetch MOPs 194 from the MDR 175. The IFU 106 uses the FBDs to fetch FBlks worth of AIs 193 or MOPs 194 via the mux 161 in program order into the FBlk FIFO 108, which feeds fetched AIs/MOPs 195 in program order to the DEC 112. In an embodiment, the mux 161 is effectively controlled by a fetch source indicator 514 (see FIG. 5) from a FBD that describes the FBlk whose AIs/MOPs are being fetched from the instruction cache 101/MDR 175. That is, the mux 161 selects MOPs 194 fetched from the MDR 175 if the fetch source indicator (FSI) 514 indicates the MOC 171, and the mux 161 selects AIs 193 fetched from the instruction cache 101 if the FSI 514 indicates the instruction cache 101. In an embodiment, the MOC 171 and the instruction cache 101 are hardware cache coherent. That is, if instructions are modified in system memory, then the processor 100 invalidates the entries of the MOC 171 and the instruction cache 101 that hold a copy of the modified instructions.

The FBD FIFO 104 enables the PRU 102 to continue predicting FBDs to reduce the likelihood of starvation of the IFU 106. Likewise, the FBlk FIFO 108 enables the IFU 106 to continue fetching FBlks worth of AIs/MOPs to reduce the likelihood of starvation of the DEC 112. Architectural instructions may travel through the processor 100 pipeline from the instruction cache 101 of the IFU 106 to the DEC 112 as FBlks where they are decoded, register-renamed and dispatched in parallel, and MOPs may travel through the processor 100 pipeline from the MOC 171 of the IFU 106 to the DEC 112 where they are register-renamed and dispatched in parallel. Advantageously, the IFU 106 is simplified by the fact that it can simply consume FBDs in program order, as received from the FBD FIFO 104, to fetch both architectural instructions from the instruction cache 101 or to fetch MOPs from the MOC 171 as indicated by the FSI 514, and by the fact that the IFU 106 can simply provide both the fetched architectural instructions and MOPs in program order the FB FIFO 108.

Many structures within the core 100 address, buffer, or store information for an instruction or MOP by reference to a FBlk identifier. In an embodiment, checkpoints for abort recovery are generated for and allocated to FBlks. In some instances, the abort recovery process may begin at the first instruction of the FBlk containing the abort-causing instruction. In other instances, the abort recovery process may begin at the first instruction of the next FBlk after the FBlk containing the abort-causing instruction. In other instances, the abort recovery process may begin at an instruction in the middle of the FBlk containing the abort-causing instruction.

The DEC 112 may decode AIs of the FBlks into MOPs. Early stages of the DEC 112 identify instruction boundaries within the FBlk FIFO 108 that contains the next group of architectural instruction bytes to be decoded and executed and extracts the architectural instructions at the identified boundaries. For example, for RISC-V instructions, the early DEC 112 stages mux out from the FBlk FIFO 108 the one or two halfwords of instruction bytes that correspond to each architectural instruction starting at an identified instruction boundary. Then, other early stages of the DEC 112 may identify consecutive pairs of architectural instructions that can be fused together. Then early DEC 112 stages may also decode each identified instruction or instruction pair into a corresponding MOP representation. In an embodiment, the DEC 112 includes a pre-decode stage, an extract stage, a rename stage, and a dispatch stage.

In an embodiment, the DEC 112 converts each FBlk into a series of MOPGroups. Each MOPGroup consists of either N sequential MOPs or, if there are fewer than N MOPs in the FBlk after all possible N-MOP MOPGroups for a FBlk have been formed, the remaining MOPs of the FBlk. In an embodiment, N is five for MOPs decoded from AIs fetched from the instruction cache 101, and N is six for MOPs fetched from the MOC 171. Because some MOPs can be fused by DEC 112 from two instructions, a MOPGroup may correspond to up to 2N instructions. The MOPs of the MOPGroup may be processed in simultaneous clock cycles through later DEC 112 pipe stages, including rename and dispatch to the EU pipelines. Instructions of a MOPGroup are also allocated into the ROB 122 in simultaneous clock cycles and in program order. The MOPs of a MOPGroup are not, however, necessarily scheduled for execution together.

The DEC 112 dispatches MOPs to the schedulers which schedule and issue the MOPs for execution to the EUs. The EUs receive operands for the MOPs from multiple sources including operands from the PRF and results produced by the EUs that are directly forwarded on bypass busses back to the EUs. In an embodiment, the EUs perform superscalar out-of-order speculative execution of multiple MOPs in parallel. The architectural instructions and MOPs are received by the DEC 112 from the FBlk FIFO 108 in program order, and entries in the ROB 122 are allocated for the associated MOPs of the instructions in program order. However, once dispatched by the DEC 112 to the EUs, the schedulers may issue the MOPs to the individual EU pipelines for execution out of program order.

The PCL 132 includes a ReOrder Buffer (ROB) 122 and exception-handling logic 134. The pipeline units may signal a need for an abort, e.g., in response to detection of a mis-prediction (e.g., by a branch predictor of a direction or target address of a branch instruction, or of a mis-prediction that store data should be forwarded to a load MOP in response to a store dependence prediction) or other micro-architectural exception, architectural exception, or interrupt. In response, the PCL 132 may assert flush signals to selectively flush instructions/MOPs from the various units of the pipeline.

The PCL 132 tracks instructions and the MOPs into which they are decoded throughout their lifetime. The ROB 122 supports out-of-order instruction execution by tracking MOPs from the time they are dispatched from DEC 112 to the time they retire. In one embodiment, the ROB 122 has entries managed as a FIFO, and the ROB 122 may allocate up to six new entries per cycle at the dispatch stage of the DEC 112 and may deallocate up to six oldest entries per cycle at MOP retire. In one embodiment, each ROB entry includes an indicator that indicates whether the MOP has completed its execution and another indicator that indicates whether the result of the MOP has been committed to architectural state. More specifically, load and store MOPs may be committed subsequent to completion of their execution. Still further, a MOP may be committed before it is retired.

The AFE 181 receives MOC build requests 177 from the PRU 102 and generates install requests 183 to the PRU 102, receives MOPs 197 from the DEC 112, and provides MOPs 189 and MDR pointers 187, described below, to the MOC 171. Generally, when the PRU 102 predicts the presence of a FBlk in the program instruction stream that the PRU 102 deems to be a hot FBlk, the PRU 102 generates a true indicator (HFB indicator 318 of FIG. 3A) within the FBD 191 associated with the hot FBlk, and the true indicator proceeds through the microprocessor 100 pipeline (e.g., FBD FIFO 104, IFU 106, FBlk FIFO 108) to the DEC 112. Additionally, when the PRU 102 predicts the hot FBlk, the PRU 102 sends a MOC build request 177 to the AFE 181 for the hot FBlk. A MOC build request 177 (also referred to as simply a build request) is a request by the PRU 102 to the AFE 181 to build, or create, a new entry in the MOC 171. The MOC build request 177 specifies the fetch block start address (FBSA) of the hot FBlk for which the PRU 102 is requesting the AFE 181 to build an entry in the MOC 171 for the MOPs of the FBlk. When the DEC 112 fetches the hot FBlk from the FBlk FIFO 108 and decodes the fetched architectural instructions into MOPs, the DEC 112 sees from the true indicator that the FBlk is a hot FBlk and provides the decoded MOPs to the AFE 181. In response, the AFE 181 further fuses, where possible, the received MOPs into more highly fused MOPs. Then the AFE 181 communicates with the MOC 171 to build an entry in the MOC 171 for the possibly more highly fused MOPs using the FBSA received in the MOC build request 177.

Generally, building a new entry in the MOC 171 (e.g., MOC entry 350 of FIG. 3D) includes writing the MOPs of the FBlk to entries of the MDR 175 (e.g., MDR entries 340 of FIG. 3C) and writing a new tag entry (e.g., MTR entry 330 of FIG. 3B) in the MTR 173 that points to the entries of the MDR 175 to which the MOPs of the FBlk were written. In an embodiment, the new tag entry in the MTR 173 points to only the initial entries of the MDR 175, and the entries in the MDR 175 themselves point to subsequent entries of the MDR 175. Significantly, what triggers an allocation into the MOC 171 is the detection of a hot FBlk, not the mere decoding of architectural instructions into MOPs according to conventional methods. Indeed, in the embodiments described, a FBlk may appear in the program instruction stream and be decoded into MOPs many times (i.e., up to the threshold value) before a MOC allocation is performed. In this sense, the FBHC 217 serves as a filter for MOC allocations.

In an embodiment, the MOPs 199 dispatched by the DEC 112 to the back-end 130 are register-renamed, i.e., the MOPs 199 specify PRF registers as the source and destination operands. However, the MOPs 197 provided by the DEC 112 to the AFE 181 are not register-renamed, i.e., the MOPs 197 specify architectural registers as the source and destination operands. Similarly, the MOPs 189 provided by the AFE 181 to the MOC 171 are not register-renamed. Thus, the MOPs 194 fetched from the MOC 171 are not register-renamed as provided to the DEC 112, and the DEC 112 renames them before dispatching them as register-renamed MOPs 199 to the back-end 130.

In an embodiment, the processor 100 includes a MOC Build Request FIFO (BRF) 179 that is configured to receive the MOC build requests 177 such that multiple MOC build requests 177 from the PRU 102 may be outstanding to the AFE 181 at any time. Entries of the MBRF 179 are described according to an embodiment with respect to FIG. 21. In an embodiment, the AFE 181 includes a MOP buffer that is configured to receive from the DEC 112 the MOPs 197 associated with one or more FBlks. When the AFE 181 detects that the MOP buffer is not empty, the AFE 181 may begin to use the MOPs 197 in the MOP buffer to build an entry in the MOC 171 for the FBlk.

As shown in the embodiment of FIG. 1, the MOC 171 includes the MTR 173 in the PRU 102 and the MDR 175 in the IFU 106. In an embodiment, an entry in the MOC 171 comprises one or more entries in the MDR 175 that hold MOPs of the FBlk and an entry in the MTR 173 that points to the entries in the MDR 175 as will now be described. Thus, in the embodiment, allocation of a MOC entry includes both allocating the MDR entries and the MTR entry and populating them accordingly.

In an embodiment, the MDR 175 is organized as a one-dimensional array of entries each configured to store up to predetermined number of MOPs that are managed as a pool of entries. In an embodiment, the predetermined number of MOPs per entry is three, referred to as a triplet, although other embodiments are contemplated in which the number of MOPs per entry is different than three. In an embodiment, the pool of MDR entries is managed by control logic in the MTR 173. In an embodiment, each entry of the MDR 175 has an associated array index, referred to herein as an MDR pointer. An MDR entry is either available for allocation in which case it is included in a free list maintained by the MDR 175, or the MDR entry is already allocated for a FBlk in which case the MDR entry is pointed to by an entry of the MTR 173, as described in more detail below. When an MDR entry is deallocated, it is put back on the free list.

In an embodiment, the MTR 173 is arranged as a set associative structure having S sets and W ways (e.g., S may be 128 and W may be eight). Each valid entry in the MTR 173 includes a tag that corresponds to tag bits of the FBSA of the FBlk associated with the MOC entry. During allocation of a MOC 171 entry for a hot FBlk, the AFE 181 provides to the MOC 171 the FBSA of the hot FBlk (which the AFE 181 received earlier in the MOC build request 177), and the MTR 173 selects an entry to be replaced (e.g., using replacement information described below) and writes the tag bits of the FBSA to the tag of the MTR entry chosen for replacement. During PRU 102 prediction of the current FBlk, the MTR 173 looks up the current FBSA 412 of FIG. 4A to determine whether the current FBSA 412 hits in the MTR 173 (indicated by MOC hit 414 of FIG. 4A). Each entry of the MTR 173 also includes the MDR pointers (e.g., initial MDR pointers 336 of FIG. 3B) that point to the entries in the MDR 175 that hold the MOPs of the FBlk, as will now be described.

When the AFE 181 has generated the possibly more highly fused MOPs for a hot FBlk, the AFE 181 requests MDR pointers for the MOPs from the MDR 175. The MDR 175 grabs entries from its free list and provides MDR pointers to the grabbed entries back to the AFE 181. The AFE 181 then writes the MOPs to entries of the MDR 175 at the provided MDR pointers. After the AFE 181 has written all the MOPs to the MDR entries, the AFE 181 sends to the MTR 173 and to the MDR 175 the MDR pointers 187 the AFE 181 just used so that the MTR 173 can allocate an MTR entry for the FBlk. In the case of a subsequent hit of the FBSA 412 in the MTR 173, the MTR 173 outputs the MDR pointers of the hit entry (initial MDR pointers 336 of FIG. 3B as initial MDR pointers 436 of FIG. 4A) which are included in the FBD 191 (initial MDR pointers 316 of FBD 300 of FIG. 3A) that the PRU 102 outputs and which the IFU 106 uses to fetch the MOPs of the FBlk from the MDR 175 for provision to the DEC 112.

Advantageously, when the DEC 112 receives the MOPs (rather than architectural instructions) of the FBlk, the DEC 112 does not need to decode the MOPs but instead may register-rename them and dispatch them to the back-end 130. In an embodiment, the MDR 175 is configured to output two entries of three MOPs per clock cycle for storage of up to six MOPs into an entry of the FBlk FIFO 108 per clock cycle, and the DEC 112 is configured to receive up to six MOPs per clock cycle from the FBlk FIFO 108, to register-rename up to six MOPs per clock cycle, and to dispatch to the back-end 130 up to six MOPs per clock cycle.

In an embodiment, the MDR entries associated with a FBlk are effectively allocated as a linked list, or as multiple linked lists, depending upon the number of initial MDR pointers in an MTR entry, as discussed in more detail below. That is, each MDR entry, in addition to holding the up to three MOPs, also includes a next MDR pointer (e.g., next MDR pointer 344 of FIG. 3C) that points to the next MDR entry in the linked list. In an embodiment, each MTR entry holds the initial MDR pointer which is used to fetch the first MDR entries in the linked list, and the next MDR pointer in the first fetched MDR entry is used to fetch the next MDR entry in the linked list, and so forth until the last MDR entry in the linked list is fetched. In this manner, the MDR pointers are distributed between the MTR 173 and the MDR 175 which may provide advantages described herein. The AFE 181 requests MDR pointers from the MTR 173 as needed to build the linked lists of the MOC entry. In an embodiment, the maximum length of a FBlk is forty-eight MOPs, which may be stored in sixteen MDR entries of MOP triplets.

Each set of the MTR 173 includes replacement information that indicates usage history of the FBlk associated with the entry in each way. The replacement information is used to decide which way to replace in the set selected by the set index bits of the FBSA of the hot FBlk for which an entry in the MOC 171 is being allocated by the AFE 181. During prediction time by the PRU 102, the current FBSA (FBSA 412 of FIG. 4A) is looked up in the MTR 173 to detect a hit.

In addition to receiving the MOPs decoded from the architectural instructions of a single FBlk and building a MOC entry 350, referred to as a single-FBlk ME (SF-ME), the AFE 181 is also capable of receiving from the DEC 112 the MOPs of multiple MEs and building a MOC entry 350, referred to as a multi-FBlk ME (MF-ME). MF-MEs may be a sequential MF-ME (SEQ-MF-ME) or an unrolled loop MF-ME (ULP-MF-ME). Each ME includes training fields 331 (of FIG. 20) used by the PRU 102 to determine when to build an MF-ME. The training fields 331 are also used to extend a SEQ-MF-ME. The training fields 331 are also used to selectively invalidate a MF-ME that causes an abort, e.g., due to an internal branch MOP of an MF-ME not performing at execution time a built-in expectation, e.g., the direction of the internal branch MOP at execution time was taken whereas the built-in expectation was not taken, or vice versa.

Although a single core 100 is shown, the embodiments described herein are not limited to a particular number of cores. Generally, the embodiments may be employed in a microprocessor conforming to various instruction set architectures (ISA), including but not limited to, x86, ARM, PowerPC, SPARC, MIPS. Nevertheless, some aspects of embodiments are described with respect to the microprocessor 100 conforming to the RISC-V ISA, as described in specifications set forth in Volumes I and II of "The RISC-V Instruction Set Manual," Document Version 20191213, promulgated by the RISC-V Foundation. These two volumes are herein incorporated by reference for all purposes. However, the embodiments are not limited to the RISC-V ISA.

As described below, each entry of a fetch block predictor (FBP) stores a small additional amount of information to facilitate shortening the instruction fetch pipeline of the processor. More specifically, the small amount of information cached in the FBP is the set index and way number that specify the entry of the instruction cache from which the desired instruction block was recently fetched. The FBP-predicted set index and way number are used to independently access the instruction cache data random access memory (RAM) to obtain the desired instruction block without needing to wait for the address translation and instruction cache way determination steps to be performed first. That is, in parallel with initiation of the instruction cache data RAM access using the FBP-predicted set index and way number, the instruction fetch pipeline initiates access to the instruction TLB (ITLB) and initiates access to the instruction cache tag RAM using the FBP-predicted set index. Thus, the physical fetch address, which includes the correct set index, and the correct way number are obtained in parallel with the fetch of the instruction block and used to check correctness of the predicted set index and way number. In this manner, the instruction fetch pipeline is effectively shortened, or folded as described more below, to the number of stages required to access the data RAM to obtain the instruction block.

The short instruction fetch pipeline operates in the parallel manner described above while the FBP continues to provide set index and way number predictions but dynamically lengthens/unfolds in response to a FBP miss such that the ITLB, tag RAM, and data RAM accesses are performed serially. In one embodiment, the instruction fetch pipeline dynamically folds back up when the FBP hits again. In the case of a FBP miss, a new entry in the FBP may be created after the correct set index and way number are determined. Other events that cause the instruction fetch pipeline to unfold may include a set index misprediction by the FBP or a miss in the ITLB or instruction cache.

Each FBP entry stores only translated address bits of the instruction cache set index, and untranslated bits of the fetch block start address are used to provide the remainder of the set index. Advantageously, by storing a relatively small number of additional bits per FBP entry (e.g., in one embodiment, 5 bits of set index and 2 bits of way number), the instruction fetch pipeline may be folded, i.e., shortened (e.g., from 6 stages to 2 stages), for a significant percentage of time, i.e., approximately the FBP hit rate. The shortening of the instruction fetch pipeline may improve processor performance by reducing the latency and penalty associated with branch mispredictions or other causes of restart of the instruction fetch pipeline. Further advantageously, the instruction fetch pipeline may be shortened/folded while also obtaining the power saving benefit of reading out only a single way of the instruction cache data RAM per instruction block fetch. The power savings may be particularly significant in embodiments in which the number of bytes per data RAM entry is large.

FIG. 2 is an example block diagram of a FBP entry 200, i.e., an entry of the FBP 152 of FIG. 1, in accordance with embodiments of the present disclosure. The FBP entry 200 includes a FBP tag 202, a predicted set index 204, a predicted way number 206, a fetch block length 208, a PC-relative target address 212, a termination type 214, and a FBlk hotness counter (FBHC) 217. As described below with respect to FIG. 4A, a value of the program counter (PC) is used as a current fetch block start address (FBSA), e.g., FBSA 412 of FIG. 4A. The FBSA is a virtual address that is translated into a physical address by the ITLB that is looked up in the instruction cache 101 to fetch a FBlk of instructions from the instruction cache 101. Additionally, the virtual FBSA may be looked up in the MOC 171 to fetch a FBlk of MOPs from the MOC 171, as described below.

Prior to the fetch of the FBlk, the FBSA is used to access the FBP 152 (and BPs 154), as described below with respect to FIG. 4A, FIG. 4B and FIG. 5. If the FBSA misses in the FBP 152, a new FBP entry 200 will be created for the associated FBlk and allocated into the FBP 152 based on the FBSA and on other information determined from decode and execution of the FBlk, such as the length and termination type of the FBlk and possibly the PC-relative target address of a PC-relative terminating branch instruction. In an embodiment, the FBP 152 may operate similarly to the manner described in U.S. patent application Ser. No. 18/093,643 (VENT.0130), filed Jan. 5, 2023, which is hereby incorporated by reference in its entirety for all purposes.

The FBP tag 202 of the new FBP entry 200 is based on the FBSA of the FBlk.

Figure 5:
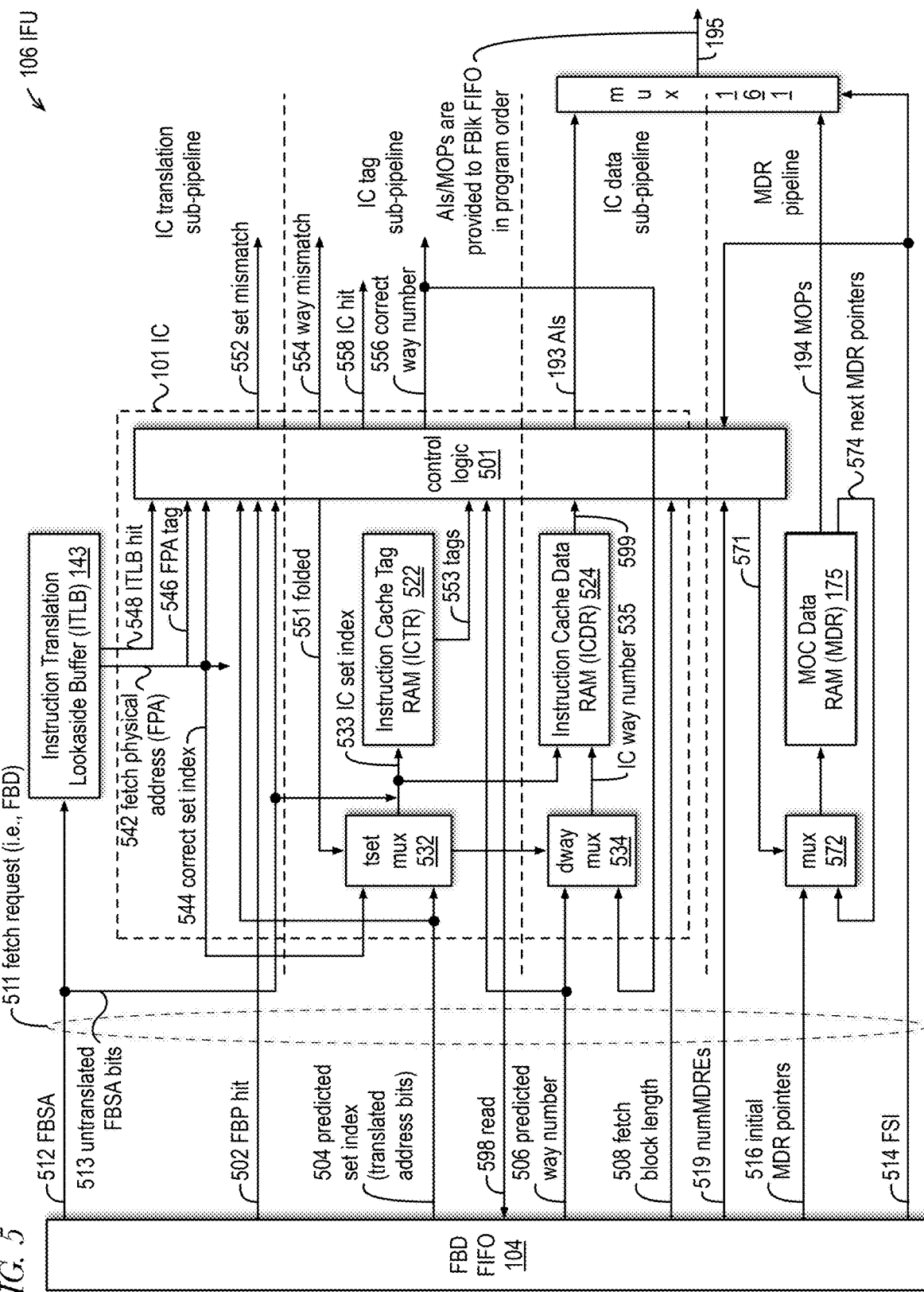
FIG. 5 is example block diagram of the instruction fetch unit (IFU) of FIG. 1 in accordance with embodiments of the present disclosure.

The predicted set index 204 is the value of the set index (e.g., correct set index 544 of FIG. 5) that was previously used to fetch a FBlk of architectural instructions from the instruction cache 101 at a fetch physical address (FPA) into which the FBSA was translated (e.g., FPA 542 of FIG. 5). That is, during a first instance of a fetch request (e.g., fetch request 511 of FIG. 5) that specifies the FBSA value, the FBlk is fetched from the instruction cache 101 and the correct set index 544 is written to the predicted set index 204 of the newly created FBP entry 200 to be used as a prediction of the set index during a subsequent instance of a fetch request that specifies the same FBSA value. In one embodiment, to save storage space, only translated address bits of the set index are stored in the predicted set index 204 field of the FBP entry 200, whereas the untranslated address bits of the set index are provided from the FBSA itself when accessing the instruction cache 101, e.g., as untranslated address bits 513 of FIG. 5.

The predicted way number 206 is the value of the way number (e.g., correct way number 556 of FIG. 5) that was previously used to fetch a FBlk of architectural instructions from the instruction cache 101 at a FPA into which the FBSA was translated. That is, during the first instance of a fetch request that specifies the FBSA value, the FBlk is fetched from the instruction cache 101 and the correct way number 556 is written to the predicted way number 206 of the newly created FBP entry 200 to be used as a prediction of the way number during a subsequent instance of a fetch request that specifies the same FBSA value.

The fetch block length 208 specifies the length in architectural instructions of a FBlk that starts at the FBSA. As described above with respect to FIG. 1, the FBlk may be up to the maximum length (e.g., 96 bytes in one embodiment), but may be shorter if a terminating instruction, e.g., a branch instruction, appears before the maximum FBlk length is reached. The PC-relative target address 212 specifies a target address of a PC-relative branch instruction that may be calculated, e.g., by the decode unit 112, by adding the FBSA and the immediate offset specified in the PC-relative branch instruction.

The termination type 214 specifies the reason for termination of the FBlk that starts at the FBSA. In one embodiment, the reasons may include: an unconditional branch instruction is present, a conditional branch instruction that is predicted taken is present, or the FBlk may terminate because the run of instructions reached a maximum sequential FBlk length, i.e., the FBlk continues sequentially into the next FBlk. In one embodiment, the type of the branch instruction may be more specifically indicated, e.g., conditional branch, direct branch, indirect branch, call, return.

The FBHC 217 is an indication of the worthiness of the MOPs of the FBlk to be allocated into the MOC based on a history of the FBlk being present in the program instruction stream. When a new FBP entry 200 is allocated into the FBP 152, the FBHC 217 is initialized to a default value. In an embodiment, the default value is one. Each time the FBP entry 200 is hit on when a FBSA is looked up in the FBP 152 and the hit entry 200 is used as a prediction that the FBlk is present again in the program instruction stream, the FBHC 217 is incremented to indicate an increased worthiness of the FBlk to have its MOPs allocated into the MOC 171. Preferably, incrementation of the FBHC 217 saturates at its maximum value. In an embodiment, if a MOC build request 177 fails for a subset of reasons, the AFE 181 informs the PRU 102, and the PRU 102 clears the FBHC 217 to zero, which is a special value that indicates a failed build request, which instructs the PRU 102 not to increment the FBHC 217 and not to ever attempt again to build a MOC entry for the FBlk, or at least not until the FBP entry 200 is replaced, which resets the FBHC 217 to the default value.

FIG. 3A is an example block diagram of a fetch block descriptor (FBD) 300, i.e., an entry of the FBD FIFO 104 of FIG. 1, in accordance with embodiments of the present disclosure. The FBD 300 describes a FBlk and may also describe some characteristics of a MOC entry 350 (of FIG. 3D) allocated for the MOPs into which the AIs of the FBlk have been decoded. The FBD 300 includes a FBP hit indicator 302, a predicted set index 304, a predicted way number 306, a fetch block length 308, a FBSA 312, a fetch source indicator (FSI) 314, initial MDR pointers 316, a hot FBlk (HFB) indicator 318, and a numMDREs indicator 319. As described below with respect to FIG. 4A, when the PRU 102 generates an FBD, e.g., FBD 191 of FIG. 4A, the FBD is written to the FBD FIFO 104 of FIG. 1 and later fetched from the FBD FIFO 104 for use by the IFU 106 to fetch a FBlk of architectural instructions from the instruction cache 101 or of MOPs from the MOC 171. The FBP hit indicator 302 indicates whether the lookup of the FBSA hit in the FBP 152.

The predicted set index 304 and predicted way number 306 are written with the corresponding predicted set index 204 and predicted way number 206 of the instruction cache 101 provided by the FBP 152 in the case of a hit of the FBSA in the FBP 152. As described herein, the predicted set index 304 and predicted way number 306 may be used to advantageously reduce the time required to fetch a block of instructions from the instruction cache 101 and facilitate operation of an instruction fetch pipeline in a folded manner.

The fetch block length 308 is written with the corresponding fetch block length 208 provided by the FBP 152 in the case of a hit of the FBSA in the FBP 152. The FBSA 312 is the current FBSA 412 of FIG. 4A that was used to access the FBP 152, the BPs 154, and the MTR 173.

Figure 4A:
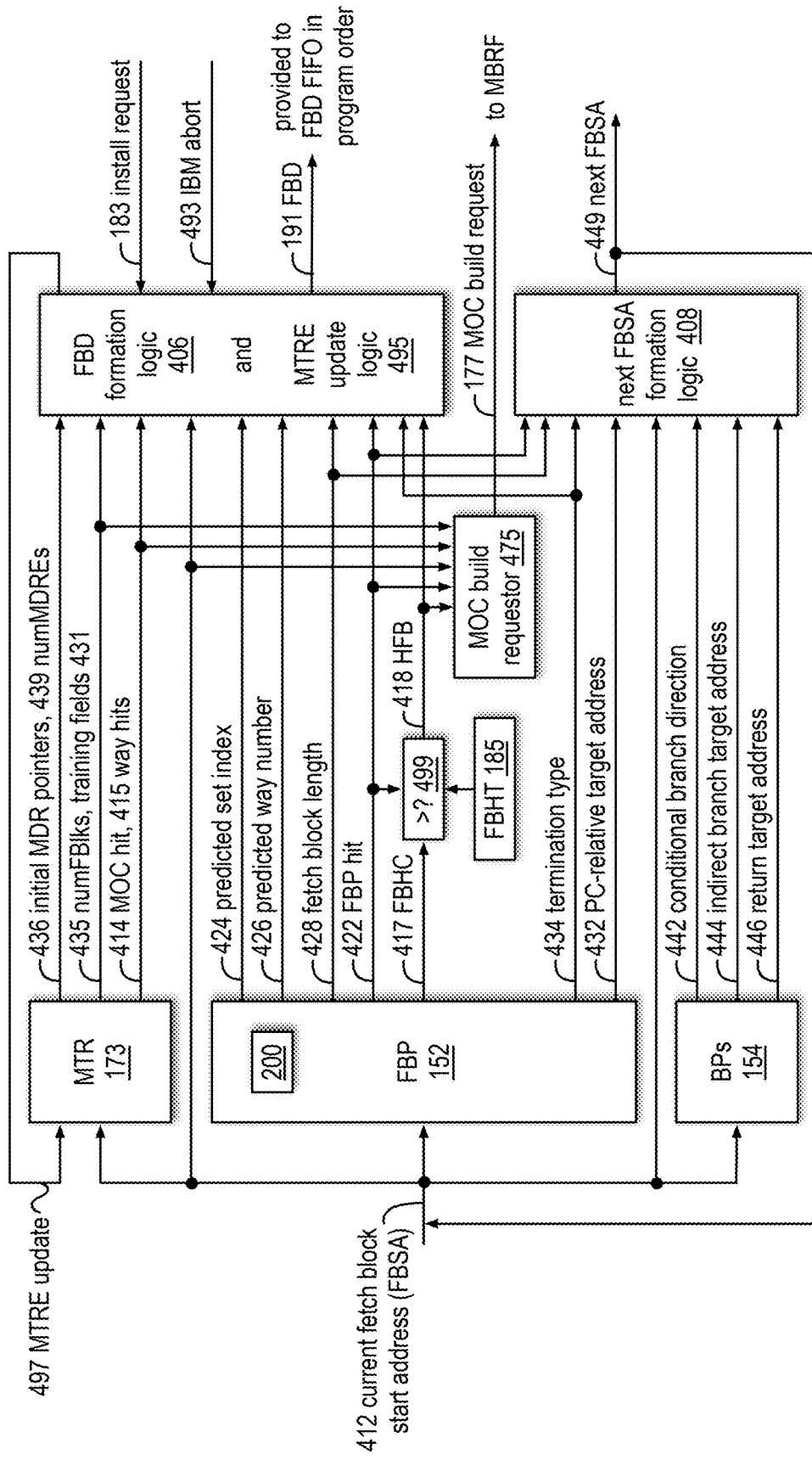
FIG. 4A is an example block diagram of the prediction unit (PRU) of FIG. 1 in accordance with embodiments of the present disclosure.
Figure 4B:
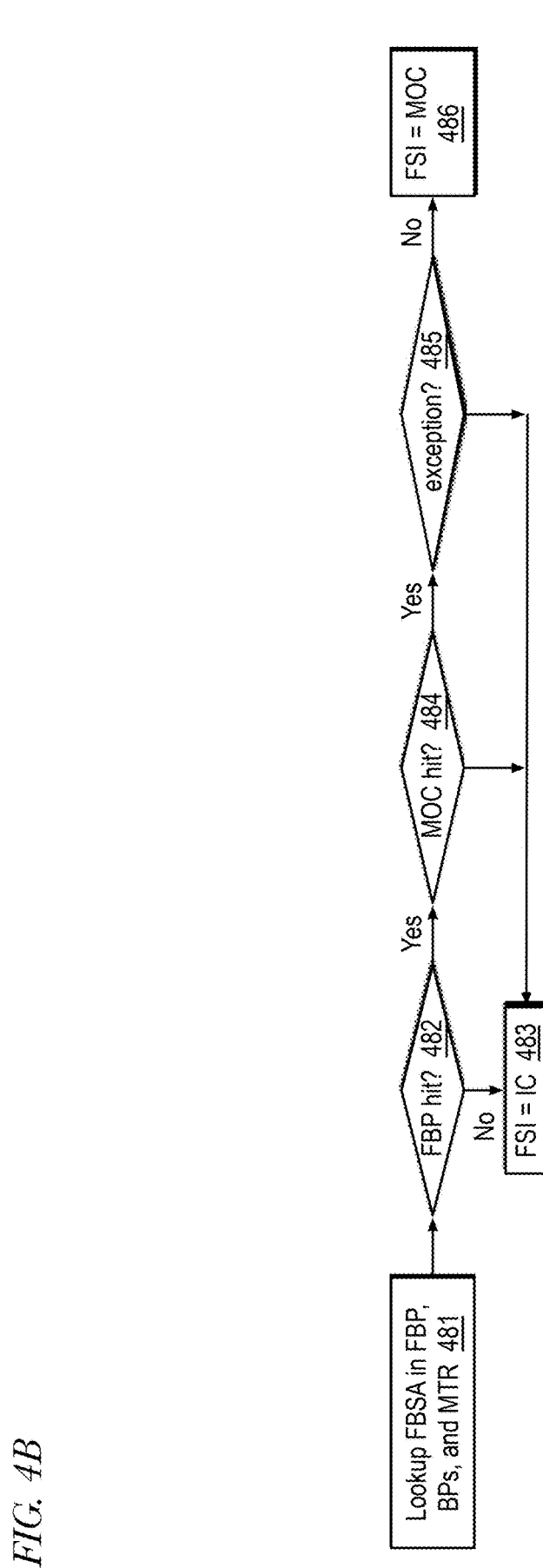
FIG. 4B is example flowchart illustrating operation of the PRU of FIG. 4A to populate the fetch source indicator (FSI) of a FBD in accordance with embodiments of the present disclosure.

The FSI 314 is populated (by the FBD formation logic 406 of FIG. 4A) as described with respect to FIG. 4B. Briefly, if the FBSA 412 misses in the FBP 152 or in the MTR 173, the FSI 314 is set to indicate to fetch from the instruction cache 101, or if a current attempted execution of the FBlk (more specifically, MOPs of a MOC entry 350) caused an exception, on re-fetch the FSI 314 is set to indicate to fetch from the instruction cache 101; otherwise, the FSI 314 is set to indicate to fetch from the MOC 171.

Generally, the FSI 314 is generated based on the MOC hit indicator 414 of FIG. 4A that is output by the MTR 173 of FIG. 1 during a lookup of the FBSA 412 in the MTR 173 and based on the FBP hit indicator 422 that is output by the FBP 152 during the lookup of the FBSA 412 in the FBP 152. As described above with respect to FIG. 1 and below with respect to FIG. 4A, the MOC hit indicator 414 indicates whether the current FBSA 412 hit in the MTR 173. Typically, if the MOC hit indicator 414 and the FBP hit indicator 422 are both true, then the FSI 314 is populated to instruct the IFU 106 to fetch from the MDR 175; otherwise, the FSI 314 is populated to instruct the IFU 106 to fetch from the instruction cache 101. However, in some cases the PRU 102 populates the FSI 314 to instruct the IFU 106 to fetch from the instruction cache 101 even if both the MOC hit indicator 414 and the FBP hit indicator 422 are true. For example, assume the execution of the MOPs of a FBlk causes an architectural exception or a microarchitectural exception that causes an abort process to be performed in which the front-end and mid-end are flushed and the MOPs of the FBlk in the back-end 130 are flushed and the PRU is signaled to restart prediction at the FBlk. In such case, depending upon the cause of the exception, the PRU may be signaled to instruct the IFU 106 to fetch the AIs of the FBlk from the instruction cache 101 even though the MOPs of the FBlk are present in the MOC 171. When the FBlk described by the FBD 191 is being fetched either from the instruction cache 101 or from the MOC 171, the FSI 514 (of FIG. 5) controls the mux 161, i.e., the mux 161 selects MOPs 194 fetched from the MDR 175 if the FSI 514 indicates the MDR 175, and the mux 161 selects AIs 193 fetched from the instruction cache 101 if the FSI 514 indicates the instruction cache 101.

The initial MDR pointers 316 are populated (by the FBD formation logic 406 of FIG. 4A) with the initial MDR pointers 436 of FIG. 4A that are output by a hit MTR entry 330 (of FIG. 3B) of the MTR 173 (i.e., initial MDR pointers 336 of FIG. 3B) during a lookup of the current FBSA 412 in the MTR 173. As described above with respect to FIG. 1 and below with respect to FIG. 4A, the initial MDR pointers 316 point to entries in the MDR 175 that hold MOPs of the FBlk and that are used by the IFU 106 to fetch MOPs of the FBlk from the MDR 175.

The hot FBlk (HFB) indicator 318 is populated (by the FBD formation logic 406 of FIG. 4A) with the HFB indicator 418 of FIG. 4A that is output by the comparator 499 of FIG. 4A during a lookup of the FBSA 412 in the FBP 152. As described above with respect to FIG. 1 and below with respect to FIG. 4A, a true value on the HFB indicator 318 indicates the PRU 102 has identified the FBlk as a hot FBlk because the FBHC 217 of the FBlk has exceeded the FBHT 185.

The numMDREs indicator 319 is populated (by the FBD formation logic 406 of FIG. 4A) with the numMDREs indicator 439 of FIG. 4A that is output by the MTR 173 (i.e., numMDREs indicator 339 of FIG. 3B) during a lookup of the current FBSA 412 in the MTR 173. The NumMDREs indicator 319 indicates the number of entries in the MDR 175 that hold MOPs of the FBlk.

The FBlkID 317 holds an FBlk identifier (FBlkID) that uniquely identifies the FBlk associated with the FBD 191. Each time an FBSA hits in the FBP 152, the PRU 102 (e.g., the FBD formation logic 406) generates a new FBlkID for the FBlk associated with the hit FBP entry 200 and populates the FBlkID 317 of the FBD 191 associated with the FBlk. The PRU 102 generates the FBlkID with a value that is unique with respect to any other FBlk that is currently active within the processor 100 pipeline. In the case of a FBD 191 that indicates to the IFU 106 to fetch an ME from the MOC 171, the FBlkID may be used by various blocks of the processor 100 to identify the ME. In the case of a SEQ-MF-ME (see FIG. 18), the FBlkID of the FBlk corresponding to the first SF-ME of the SEQ-MF-ME identifies the SEQ-MF-ME, and in the case of a ULP-MF-ME (see FIG. 18), the FBlkID of the FBlk corresponding to the first (and possibly only) SF-ME of the loop body ME of the ULP-MF-ME identifies the ULP-MF-ME. The FBlkID 317 is passed down the processor pipeline through the IFU 106 and FBlk FIFO 108 to the DEC 112 along with the AIs/MOPs 195 of the associated with the FBlk/ME. As described below, the AFE 181 may snoop a bus of the DEC 112 that carries the passed-down FBlkID 317 and compares it with an FBlkID 2117 in an MBRFE 2100 (see FIG. 21) of the MBRF 179 to determine whether to grab not yet renamed MOPs of the matching ME.

FIG. 3B is an example block diagram of an MTR entry (MTRE) 330, i.e., an entry of the MTR 173 of FIG. 1, in accordance with embodiments of the present disclosure. The MTRE 330 includes an MTR tag 332, a NumFBlks field 335, one or more initial MDR pointers 336, a numMDREs indicator 339, and training fields (TFs) 331. The training fields 331 are described in detail below with respect to FIG. 20. When an MTRE 330 is allocated in the MTR 173 (e.g., in response to an install request 183 as described below), the MTR tag 332 is populated with tag bits of the FBSA 412 that missed in the MTR 173 and for which a MOC entry 350 is being allocated, the NumFBlks field 335 is populated with the number of FBlks whose corresponding MOPs are used to build the ME 350, and the numMDREs 339 is populated with the number of MDREs 340 of FIG. 3C that hold the MOPs of the MOC entry 350. In an embodiment, the MTR tag 332 also includes an address space identifier (ASID), virtual machine identifier (VMID), and/or translation regime (TR) of the process associated with the FBSA 412. The numFBlks 335 of a SF-ME is populated with a value of one. The numFBlks 335 of a SEQ-MF-ME is populated with the sum of the numFBlks 335 of the constituent MEs used to build the SEQ-MF-ME. The numFBlks 335 of a ULP-MF-ME is populated with the product of the loop unroll factor (F) used to build the ULP-MF-ME and the numFBlks 335 of the loop body ME.

Each of the initial MDR pointers 336 points to an entry (MDRE 340 of FIG. 3C) in the MDR 175 that holds MOPs, as described in more detail below with respect to FIG. 3C and FIG. 3D. As described above, the initial MDR pointers 336 are used to access the MDR 175 to fetch MOPs. As also described above, a goal of the IFU 106 is to keep the back-end 130 supplied with MOPs to execute. The number of MOPs that is desirable to fetch from the MDR 175 each clock cycle is largely dependent upon the width of the DEC 112 and the back-end 130, and the number of MOPs fetched from the MDR 175 each clock cycle is effectively determined by the number of MOPs held in an MDR entry 340 and the number of MDR entries that may be concurrently fetched. Thus, the initial MDR pointers 336 are grouped together such that one or more initial MDR pointer 336 is used to access the MDR 175 concurrently. In an embodiment, a single MDR entry 340 may be fetched per clock cycle such that a single initial MDR pointer 336 is used to access the MDR 175 per clock cycle, i.e., the group size (G) is one. However, in other embodiments, multiple MDR entries 340 may be fetched per clock cycle such that multiple initial MDR pointer 336 is used to access the MDR 175 per clock cycle, hence G is greater than one. For example, in an embodiment in which it is desirable to fetch up to six MOPs per clock cycle from the MDR 175 and the number of MOPs held in each MDR entry 340 is three, the initial MDR pointers 336 may be grouped into pairs (i.e., G is two) so that a group of two initial MDR pointers 336 are used to access the MDR 175 concurrently. Other embodiments are contemplated in which G is larger than two. Thus, the group size affects the number of initial MDR pointers 336.

In addition to group size, the number of groups (N) affects the number of initial MDR pointers 336. The number of groups may be selected based on the length of the MDR 175 pipeline to avoid pipeline bubbles. In an embodiment in which the MDR 175 pipeline has a single cycle fetch latency, the number of groups of initial MDR pointers 336 may be one, i.e., a single group such that N is 1. However, in embodiments in which the MDR 175 pipeline latency is multiple clock cycles, i.e., N clock cycles, to avoid pipeline bubbles there may be N groups of initial MDR pointers 336. That is, N may be chosen such that the N groups of initial MDR pointers 336 are used for N clock cycles to access the MDR 175 until the first group of next MDR pointers 344 of FIG. 3C can be fetched from the MDR 175 and forwarded back through mux 572 as next MDR pointers 574 of FIG. 5 to the input of the MDR 175 as described below. In an embodiment, such as described in the example of FIG. 15, the number of groups G is one, the MDR 175 pipeline latency N is two clocks, and the number of initial MDR pointers 336 is two to avoid pipeline bubbles. In another embodiment, such as described in the example of FIG. 17, G is two, N is two, and number of initial MDR pointers 336 is four. Other embodiments are also contemplated in which the number and grouping of initial MDR pointers 336 is different than two or four. Each initial MDR pointer 336 may point to the head of a linked list of MDREs as described below.

Figure 15:
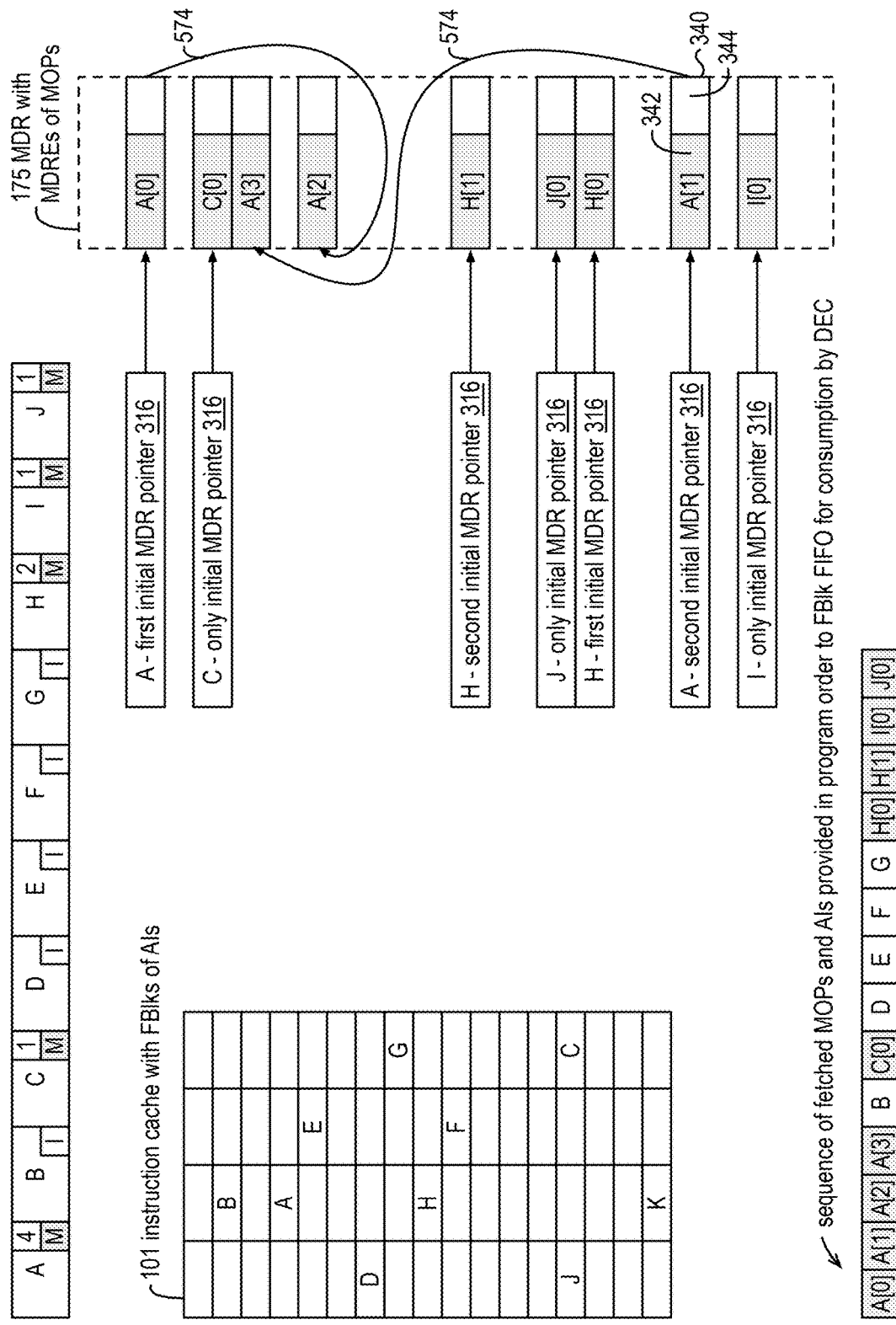
FIG. 15 is an example block diagram illustrating operation of the processor of FIG. 1 in accordance with embodiments of the present disclosure.

FIG. 3C is example block diagram of an MDR entry (MDRE) 340, i.e., an entry of the MDR 175 of FIG. 1, in accordance with embodiments of the present disclosure. The MDR entry 340 includes MOPs 342. In an embodiment, the number of MOPs held in an MDR entry 340 is three, referred to as a triplet. The MDR entry 340 also includes a next MDR pointer 344. The next MDR pointer 344 points to an MDR entry 340 that also holds MOPs of the MOC entry 350. As described above, during allocation of a MOC entry 350, the next MDR pointers 344 may be populated (along with the initial MDR pointers 336) to form linked lists of MDR entries 340 that hold MOPs based on the program order of instructions in the program instruction stream. The number of linked lists may be the number of initial MDR pointers 336. That is, each initial MDR pointer 336 points to an MDRE 340 that is the head of a linked list. In the example of FIG. 15 two linked lists are formed since there are two initial MDR pointers 336, whereas in the example of FIG. 17 four linked lists are formed since there are four initial MDR pointers 336. In an embodiment, the MDR entry 340 includes valid information that indicates which MOPs within the MDR entry 340 are valid. Although embodiments are described in which the number of MOPs held in an MDR entry 340 is three, other embodiments are contemplated in which the number of MOPs is different than three.

FIG. 3D is an example block diagram of a MOC entry (ME) 350, i.e., an entry of the MOC 171 of FIG. 1, in accordance with embodiments of the present disclosure. An ME 350 includes one MTRE 330 and one or more MDREs 340. The MDREs 340 are arranged as linked lists, as described above. The first MDRE 340 that holds the first MOPs in program order is pointed to by the initial MDR pointer 336 of the MTRE 330 of the ME 350, the next MDR pointer 344 of first MDRE 340 points to the second MDRE 340 of the linked list, and the next MDR pointer 344 of the second MDRE 340 points to the third MDRE 340 of the linked list, and so forth until the last MDRE 340 of the linked list. Assuming L multiple linked lists (i.e., L initial MDR pointers 336), each linked list includes every Nth MDRE 340. For example, if L is four, the MDREs are allocated and the MDR pointers are populated such that the first linked list includes MDREs 0, 4, 8, etc.; the second linked list includes MDREs 1, 5, 9, etc.; the third linked list includes MDREs 2, 6, 10, etc.; and the fourth linked list includes MDREs 3, 7, 11, etc. As described above, the multiple linked lists of MDREs facilitate concurrent fetching of multiple MDREs (e.g., in a dual-ported MDR 175 embodiment) and/or multi-stage MDR 175 pipelined fetching of MDREs.

As described in more detail below, e.g., with respect to FIG. 18, an ME 350 may be one of two types: a single-FBlk ME (SF-ME) or a multi-FBlk ME (MF-ME). An SF-ME includes MOPs fused by the AFE 181 from a single FBlk worth of MOPs. In an embodiment, an ME may include up to 48 MOPs. Additionally, the PRU 102 may detect a highly consistent sequence (HCS) of MEs in the program instruction stream and instruct the AFE 181 to build an MF-ME from the MOPs of the MEs of the HCS. Such an MF-ME is referred to herein as a sequential MF-ME (SEQ-MF-ME). Thus, since a FBlk is a sequential run of instructions, a SEQ-MF-ME is an ME 350 that holds the MOPs associated with multiple sequential runs of instructions. A HCS of MEs means each ME in the HCS was consistently succeeded by the next ME in the HCS with respect to the most recent history of the flow of the program. For example, assume the AFE 181 built an MF-ME that consists of FBlk A succeeded by FBlk B succeeded by FBlk C. In this example, the PRU 102 detected that FBlk A is consistently succeeded by FBlk B, and FBlk B is consistently succeeded by FBlk C in the program instruction stream. In an embodiment, to be considered a highly consistent sequence, the number of consecutive times that FBlk A succeeded FBlk B must exceed a threshold, and the number of consecutive times that FBlk B succeeded FBlk C must exceed a threshold. In an embodiment, different thresholds may exist for different locations within the sequence of the HCS. For example, the threshold for B to follow A may be higher than the threshold for C to follow B. In an embodiment, the thresholds are programmable and/or dynamically variable by hardware. Additionally, the PRU 102 may detect an ME that is the body of a loop (loop body ME) that has exhibited a consistent loop iteration count. In response, the PRU 102 may instruct the AFE 181 to build an MF-ME from the MOPs of multiple copies of the loop body ME. Such an MF-ME is referred to herein as an unrolled loop MF-ME (ULP-MF-ME), as described in more detail below.

Advantageously, when the AFE 181 builds an MF-ME, because the AFE 181 is given the opportunity to fuse the MOPs of more than one FBlk, the AFE 181 may be able to fuse the MOPs more highly than it was able to do when building an SF-ME. That is, the AFE 181 has a larger window of MOPs to choose from and may therefore be able to make more optimizations than it could when building an SF-ME. Furthermore, the distributed MDRE pointer embodiments described herein may be particularly advantageous with respect to MF-MEs since MF-MEs will be longer on average than SF-MEs.

FIG. 3E is an example block diagram of an entry 360 of the FBlk FIFO 108 of FIG. 1 in accordance with embodiments of the present disclosure. Each entry 360 includes a Valid bit 362, a Type bit 364, and a Data field 366. The Valid bit 362 indicates whether or not the entry 360 contains valid AIs/MOPs written by the IFU 106. The Type bit 364 indicates whether the Data field 366 holds AIs or MOPs, which enables the DEC 112 to know whether the entry 360 holds AIs or MOPs. In an embodiment, the IFU 106 populates the Type bit 364 with the FSI 514 of FIG. 5 of the corresponding FBD 511 that was used to fetch the AIs 193 or MOPs 194 from the instruction cache 101 or the MDR 175, respectively. If the IFU 106 reads AIs 193 from the instruction cache 101, the IFU 106 writes the AIs 193 to the Data field 366 of an entry 360; or if the IFU 106 reads MOPs from the MDR 175, the IFU 106 writes the MOPs 194 to the Data field 366 of the entry 360. In the case of AIs, preferably the IFU 106 reads an entire FBlk of AIs and writes it to the Data field 366 of an entry 360. In the case of MOPs, preferably the IFU 106 reads a group of MDREs 340 and writes the corresponding MOPs to the Data field 366 of an entry 360. Thus, in the case of a MOC entry 350 that includes multiple (J) groups of MDREs 340, the IFU 106 writes the J groups of MOPs corresponding to the J groups of MDREs 340 to J successive entries 360 of the FBlk FIFO 108. For example, in the embodiment of FIG. 17, the MOC entry 350 contains ten MDREs, and the group size G is two in the example embodiment; hence, the IFU 106 fetches five groups of MDRE pairs, and writes the MOPs of the five groups of MDRE pairs to five FBlk FIFO entries 360.

FIG. 4A is an example block diagram of the PRU 102 of the microprocessor core 100 of FIG. 1 in accordance with embodiments of the present disclosure. The PRU 102 includes the FBP 152, BPs 154, MTR 173, and FBHT 185 of FIG. 1, as well as FBD formation logic 406 and MTRE update logic 495 (shown together in a single block of FIG. 4A and FIG. 11 for efficiency of illustration; however, physically the FBD formation logic 406 and MTRE update logic 495 may constitute separate blocks of hardware logic), next FBSA formation logic 408, a MOC build requestor 475, and a comparator 499. The PRU 102 receives a current FBSA 412, which is a virtual address that is the start address of the current FBlk whose presence, length, termination type and other characteristics are being predicted by the PRU 102. In response to the current FBSA 412, the PRU 102 provides a FBD 191 and a next FBSA 449, which is the predicted virtual start address of the next FBlk following the current FBlk. The FBD 191 is pushed into the FBD FIFO 104 and includes signals corresponding to the fields of the FBD 300 of FIG. 3A. The next FBSA 449 is fed back to become the current FBSA 412 of a subsequent clock cycle.

In the embodiment of FIG. 4A, the current FBSA 412 is looked up in the FBP 152, the BPs 154, and the MTR 173. In response, the FBP 152 generates a FBP hit indicator 422 that indicates whether the current FBSA 412 hits in the FBP 152, e.g., whether a tag portion of the current FBSA 412 matches the FBP tag 202 of a valid FBP entry 200 in the set of the FBP 152 selected by a set index portion of the current FBSA 412. If so, the FBP 152 outputs the contents of the hit FBP entry 200 as a corresponding predicted set index 424, predicted way number 426, fetch block length 428, PC-relative target address 432, termination type 434, and FBHC 417. Concurrently, the BPs 154 output a conditional branch direction 442, an indirect target address 444, and a return target address 446. Concurrently, the MTR 173 outputs a MOC hit indicator 414 that indicates whether the current FBSA 412 hits in the MTR 173 and, if so, the initial MDR pointers 336 and the numMDREs indicator 339 of the hit entry of the MTR 173 are output as initial MDR pointers 436 and numMDREs indicator 439, respectively, associated with the FBlk specified by the current FBSA 412.

Additionally, the MTR 173 outputs a way hits indicator 415 in response to the lookup of the current FBSA 412. In an embodiment, the MTR 173 is arranged as a set associative cache having 128 sets and eight ways, although other embodiments are contemplated. For each way of the MTR 173, if the current FBSA 412 hits in the way, the corresponding hit indicator of the way hits indicator 415 is true and otherwise is false. In embodiments, as described below, the FBSA 412 may hit in multiple MTREs 330 in the same set of the MTR 173, referred to as a multiple-hit in the MOC 171. That is, multiple MEs 350 built into the MOC 171 may have the same FBSA such that they index into the same set of the MTR 173 and have the same MTR tag 332 in their respective MTR entry 330. In an embodiment, a SEQ-MF-ME and the first constituent SF-ME used to build the SEQ-MF-ME may be co-resident in different ways of the MOC 171 (more specifically, in different ways of the MTR 173) such that a multiple-hit (dual-hit) may occur. The multiple-hit may occur because the first constituent SF-ME of the SEQ-MF-ME has the same FBSA as the SEQ-MF-ME such that the SEQ-MF-ME and the first constituent SF-ME index into the same set of the MTR 173 and have the same tag value (i.e., MTR tag 332). In an embodiment, a ULP-MF-ME and the loop body ME used to build the ULP-MF-ME may be co-resident in different ways of the MOC 171 such that a multiple-hit may occur because the loop body ME and the ULP-MF-ME have the same FBSA. In an embodiment, the loop body ME is only allowed to be co-resident if it is an SF-ME, in which case a dual-hit may occur. In other embodiments, the loop body ME is allowed to be co-resident even if it is an MF-ME (i.e., a SEQ-MF-ME), in which case a double-hit may occur. Furthermore, a triple-hit may occur if the first constituent SF-ME of the loop body SEQ-MF-ME is still also co-resident along with both the ULP-MF-ME and the loop body SEQ-MF-ME used to build the ULP-MF-ME because the first constituent SF-ME, the loop body SEQ-MF-ME, and the ULP-MF-ME all have the same FBSA.

If the way hits indicator 415 indicates a multiple-hit (i.e., the hit indicator for multiple ways is true), the PRU 102 selects one of the MEs of the multiple-hit to fetch and execute. The selected ME is referred to as the primary ME. The PRU 102 uses the MTR entry 330 of the primary ME (along with the hit FBP entry 200) to generate an FBD 191 to send to the IFU 106 (e.g., as described in the embodiment of FIG. 28B), the IFU 106 uses the FBD 191 to fetch the MOPs of the primary ME from the MDR 175 to send to the DEC 112, and the DEC 112 dispatches the MOPs of the primary ME to the back-end 130 for execution. As described in more detail below, the PRU 102 may use various inputs to decide which ME to select as the primary ME, depending upon the embodiment and context, such as the numFBlks 335 (of FIG. 3B) of the multiple-hit MTREs, a ULP indicator 2018 (of FIG. 20) of the multiple-hit MTREs, a ULPIterCnt 2016 (of FIG. 20) of the multiple-hit MTREs, a ULPIterNum 1916 (of FIG. 19) of the PRU registers 1900, a ULPFBSA 1932 (of FIG. 19) of the PRU registers 1900, and a ULPState 1934 (of FIG. 19) of the PRU registers 1900.

Additionally, if the way hits indicator 415 indicates a multiple-hit, the PRU 102 may also select one of the MEs of the multiple-hit other than the primary ME as a secondary ME. The MEId of the secondary ME may also be employed to accomplish a performance optimization, as described below with respect to arc (18) of FIG. 22, for example. In an embodiment, the way value of a hit MTRE 330 is concatenated with the set index bits of the current FBSA 412 to form the MEId of the respective MTRE 330, e.g., of the primary ME and the secondary ME. Output selection logic (not shown) of the MTR 173 examines the relevant inputs to select the primary ME and outputs the numFBlks 335, initial MDR pointers 336, numMDREs 339, and training fields 331 of the primary MTRE 330 on the corresponding numFBlks 435, initial MDR pointers 436, numMDREs 439, and training fields 431 outputs. For example, in the embodiments of FIG. 28B and FIG. 43, the output selection logic examines the numFBlks 335 of the MTREs 330 of the multiple-hit ways to determine which hit MTRE 330 is the SF-ME (numFBlks 335 is one) and which hit MTRE 330 is the MF-ME (numFBlks 335 is greater than one) in order to select the MF-ME (e.g., the SEQ-MF-ME of FIG. 28A or the ULP-MF-ME of FIG. 35A, respectively) as the primary ME. For another example, in the embodiment of FIG. 44, the output selection logic examines the numFBlks 335 of the MTREs 330 of the multiple-hit ways to determine which hit MTRE 330 is an SF-ME (numFBlks 335 is one) and which one or more hit MTRE 330 is an MF-ME (numFBlks 335 is greater than one), and among multiple hit MF-MEs, the output selection logic further examines the ULP bit 2018 of each hit MF-ME and the ULPState 1934 in order determine which ME to select as the primary ME (e.g., the ULP-MF-ME, the LB-MF-ME, or the first SF-ME of FIG. 35B), as described in more detail with respect to FIG. 44. In an embodiment, the MOC hit indicator 414 is true of any hit indicators of the way hits indicator 415 is true.

The comparator 499 compares the FBHC 417 to see if it is greater than the FBHT 185 and, if so and the FBP hit indicator 422 is true, then the comparator 499 generates a true value on a hot FBlk (HFB) indicator 418, which is also provided to the FBD formation logic 406, the MTRE update logic 495, and the MOC build requestor 475, and otherwise generates a false value.

The FBD formation logic 406 receives the FBP hit indicator 422, the predicted set index 424, the predicted way number 426, the fetch block length 428, the termination type 434, the current FBSA 412, the initial MDR pointers 436, the numMDREs indicator 439, and the HFB indicator 418 from the comparator 499 and writes them into the respective fields of FIG. 3A to form a FBD 191 to push into an entry 300 of the FBD FIFO 104. The FBD formation logic 406 also receives the MOC hit indicator 414 and writes the FSI 314 with a true value if the MOC hit indicator 414 and the FBP hit indicator 422 are both true (possibly inverted as described above based on whether an abort was needed for the FBlk and the exception cause) and otherwise writes the FSI 314 with a false value.

The MTRE update logic 495 receives the install request 183, the HFB 418, the current FBSA 412, the FBP hit indicator 422 and the MOC hit indicator 414. The MTRE update logic 495 also receives the numFBlks 435, initial MDR pointers 436, the termination type 434, numMDREs 439, and training fields 431 from corresponding fields (numFBlks 335, initial MDR pointers 336, numMDREs 339, and training fields 331) of an MTRE 330 upon which the current FBSA 412 hits. The MTRE update logic 495 generates an MTRE update output 497 that is provided to the MTR 173 for updating an MTRE 330 as described in more detail below. The MTRE update logic 495 also receives an internal branch MOP (IBM) abort indicator 493. In an embodiment, when the back-end 130 executes an MF-ME and detects that an internal branch MOP (described in more detail below) did not exhibit the expected behavior built into an MF-ME, the back-end 130 generates an abort request to the PCL 132, and in response the PCL 132 generates an IBM abort 493. In response to an IBM abort 493, the MTRE update logic 495 may perform various operations, such as updating the training fields 331 of the offending MF-ME to transition the MF-ME to an Abort Invalidation state or to invalidate the MF-ME, as described in more detail below, e.g., with respect to FIG. 18, FIG. 22, and FIG. 30.

The MOC build requestor 475 receives the current FBSA 412, HFB indicator 418, MOC hit indicator 414, and FBP hit indicator 422. The MOC build requestor 475 also receives the numFBlks 435, numMDREs 439, and training fields 431 from the MTRE 330 upon which the current FBSA 412 hits. The MOC build requestor 475 generates the MOC build request 177 to the MBRF 179, as describe in detail herein.

The next FBSA formation logic 408 receives the FBP hit indicator 422, the fetch block length 428, the PC-relative target address 432, the termination type 434, the conditional branch direction 442, the indirect target address 444, the return target address 446, and the current FBSA 412 and uses them to generate the next FBSA 449. If FBP hit 422 is false, the next FBSA formation logic 408 predicts a maximum length sequential termination type FBlk. That is, the next FBSA formation logic 408 generates a value of the next FBSA 449 that is the sum of the FBSA 412 and the maximum fetch block length. If FBP hit 422 is true, the next FBSA formation logic 408 generates the next FBSA 449 based on the termination type 434 and the remaining inputs. For example, if the termination type 434 indicates a PC-relative branch, then if the conditional branch direction 442 indicates "taken," the next FBSA formation logic 408 outputs the sum of the current FBSA 412 and the PC-relative target address 432 as the next FBSA 449 and otherwise outputs the sum of the FBSA 412 and the fetch block length 428. If the termination type 434 indicates an indirect branch, the next FBSA formation logic 408 outputs the indirect branch target address 444 as the next FBSA 449. If the termination type 434 indicates a return instruction, the next FBSA formation logic 408 outputs the return target address 446 as the next FBSA 449.

If the HFB 418 is true indicating the current FBlk is a hot FBlk, i.e., that its FBHC 217 is greater than the FBHT 185, then the MOC build requestor 475 sends a MOC build request 177 to the AFE 181. As described above with respect to FIG. 1, the MOC build request 177 includes the FBSA of the hot FBlk. In an embodiment, the MOC build request 177 also includes the number of architectural instructions in the FBlk. In an embodiment, each entry in the MBRF 179 may also include status bits that are used by the PRU 102 and the AFE 181 to communicate with one another regarding the status of a MOC build request 177.

The PRU 102 uses the FBHC 217 of the entries 200 of the FBP 152 to filter allocations into the MOC 171 as follows. First, the FBSA 412 is looked up in the FBP 152, the BPs 154, and the MTR 173. If a miss occurs in the FBP 152, the PRU 102 generates a FBD 191 based on a default prediction that the FBlk is a maximum length sequential FBlk. Specifically, the FSI 314 is populated to instruct the IFU 106 to fetch the FBlk from the instruction cache 101 rather than from the MOC 171 and the HFB indicator 318 is also set to false.

However, if a hit occurs in the FBP 152 and the hit entry is used to predict that the FBlk corresponding to the hit entry 200 of the FBP 152 is present again in the program instruction stream, the FBHC 217 of the hit FBP entry 200 is incremented. In an alternate embodiment, the FBHC 217 is incremented non-speculatively, i.e., only if the architectural instructions of the FBlk are executed and committed by the back-end 130. In an alternate embodiment, the FBHC 217 is incremented after the comparison at block 512 is performed.

If the value of the FBHC 217 of the hit entry 200 is less than or equal to the FBHT 185, a false value is generated on the HFB indicator 418 to indicate the FBlk is not a hot FBlk, and the PRU 102 generates a FBD 191 using the hit FBP entry 200. Specifically, the FSI 314 is populated to instruct the IFU 106 to fetch the FBlk from the instruction cache 101 rather than from the MOC 171 and the HFB indicator 318 is also set to false.

If the value of the FBHC 217 of the hit entry 200 is greater than the FBHT 185, a true value is generated on the HFB indicator 418 to indicate the FBlk is a hot FBlk.

If a hit occurs in the MOC 171, since the MOPs of the FBlk are already in the MOC 171, the PRU 102 generates a FBD 191 using the hit FBP entry 200 and the hit MTR 173 entry. Specifically, the FSI 314 is populated to instruct the IFU 106 to fetch the FBlk from the MOC 171 rather than from the instruction cache 101 and the initial MDR pointers 316 are populated with the initial MDR pointers 436 output by the MTR 173 from the hit MTR 173 entry.

If a miss occurs in the MOC 171, since the HFB indicator 418 indicates the FBlk is a hot FBlk, the PRU 102 generates a MOC build request 177 for the FBlk and sends it to the AFE 181. The PRU 102 also generates a FBD 191 using the hit FBP entry 200. Specifically, the FSI 314 is populated to instruct the IFU 106 to fetch the FBlk from the instruction cache 101 rather than from the MOC 171.

The microprocessor 100 of FIG. 1 operates to filter the allocation of MOC 171 entries using the FBHC 217 of the entries 200 of the FBP 152 as follows. The DEC 112 receives a FBlk from the FBlk FIFO 108 for which the HFB indicator 318 is true. In response, the DEC 112 decodes the architectural instructions of the FBlk into MOPs. In an embodiment, the DEC 112 performs simple fusion of the architectural instructions where possible, e.g., by fusing two adjacent architectural instructions into a single MOP. The DEC 112, before register renaming the decoded MOPs, sends the not yet renamed MOPs to the AFE 181. The AFE 181 receives from the DEC 112 the MOPs of the FBlk. The AFE 181 previously received from the PRU 102 the MOC build request 177 for the FBlk. The AFE 181 more highly fuses the received MOPs where possible and sends the possibly more highly fused MOPs to the MOC 171 for allocation into an entry of the MOC 171 as described in detail above, e.g., with respect to FIG. 1. The MOC 171 allocates an entry for the FBlk of possibly more highly fused MOPs received from the AFE 181. The MOC 171 selects the entry to replace based on the replacement information in the set of the MOC 171 selected by the set index portion of the FBSA 412. In particular, the FBlk was determined to be a hot FBlk because its corresponding FBHC 217 had exceeded the FBHT 185, i.e., the FBlk was determined to be worthy for allocation into the MOC 171. As a result, the MOC 171 allocates an entry for the MOPs of the FBlk independent of the worthiness or unworthiness of any of the entries of the selected set of the MOC 171 based on the replacement information, including the entry selected for replacement. In other words, the allocation decision is driven by the PRU 102 based on the usage history held in the FBP 152 for the FBlk being allocated into the MOC 171 rather than being driven by the MOC 171 itself based on the usage history of its current entries.

In an alternate embodiment, the microprocessor 100 is absent the AFE 181 of FIG. 1. That is, the DEC 112 provides the MOPs 197 directly to the MOC 171 if the HFB 418 indicates the FBlk of the MOPs 197 is a hot FBlk. In the embodiment, the MOC 171 includes control logic that receives the MOPs 197 and allocates them into the MDR 175 and MTR 173 without further fusing of the MOPs 197.

As described above, many conventional approaches always allocate into the micro-op cache new micro-ops as they are decoded from fetched architectural instructions of the program instruction stream. Always allocating into the micro-op cache may result in replacing more useful micro-ops already in the micro-op cache, since it is not known how soon nor how frequently the new micro-ops will appear again in the program instruction stream—indeed it is not known if they will even appear again at all. Similarly, a policy of allocating based on the unworthiness of micro-ops already in the micro-op cache does not consider how soon/frequently the new micro-ops will appear again, if at all, in the program instruction stream.

Embodiments are described that filter allocations into the micro-op cache based on a fetch block's usage history before the fetch block is allocated into the micro-op cache. That is, the embodiments allocate into the micro-op cache based on the worthiness of the new fetch block of micro-ops, in contrast to a conventional method that always attempts to allocate each time the micro-ops are decoded and in contrast to a conventional method that filters based on the unworthiness of micro-ops already in the micro-op cache. The worthiness of a fetch block to be allocated into the micro-op cache based on its history of appearance in the program instruction stream is typically referred to herein as the "hotness" of the fetch block. Stated alternatively, in each instance that the fetch block is predicted to be present in the program instruction stream, the appearance history of the fetch block itself, rather than the appearance history of other fetch blocks already in the micro-op cache, is considered when making the decision whether or not to allocate the fetch block into the micro-op cache.

In an embodiment, the usage history of fetch blocks is held in corresponding entries of a fetch block predictor in a prediction unit at the beginning of the microprocessor pipeline. The usage history is in the form of a hotness counter that is incremented when an entry in the fetch block predictor is hit upon and used as a prediction that the corresponding fetch block is present again in the program instruction stream. The new micro-ops of the fetch block are not allocated into the micro-op cache unless the hotness counter has exceeded a hotness threshold, indicating the fetch block is sufficiently worthy, based on its prior usage history, to be allocated into the micro-op cache. This contrasts with conventional designs that simply always allocate or that decide whether to allocate based on unworthiness (e.g., infrequently, or un-recently used) of all the micro-ops already in the implicated set of the micro-op cache. Essentially, the prediction unit drives the allocation decision rather than an "always allocate" policy or rather than a replacement policy of the micro-op cache. The embodiments may result in a higher micro-op cache hit rate, e.g., by avoiding replacing proven useful fetch blocks with unproven useful fetch blacks. Therefore, the embodiments may have the advantage of improving performance of the microprocessor and reducing its power consumption. The hotness threshold may be configurable by software running on the microprocessor, which may enable the software (e.g., operating system) to tailor the "hotness" required of a fetch block before it is considered worthy for allocation into the micro-op cache based on characteristics of application software running on the microprocessor and/or other system parameters.

Embodiments are described that benefit from the power savings associated with disabling the source not being fetched from and that avoid the switch penalty incurred by a conventional design that can mis-predict that the current fetch source will be the next fetch source. The processor pipeline includes a prediction unit followed by an instruction fetch unit. The embodiments separate the micro-op cache into a tag array in the prediction unit and a data array in the instruction fetch unit. The data array is accessed using pointers provided by the tag array (and using pointers provided by entries fetched from the data array if the fetch block is sufficiently long). The prediction unit provides a sequence of fetch block descriptors in program order that describe a corresponding sequence of fetch blocks in a program instruction stream. A fetch block predictor in the prediction unit looks up a corresponding sequence of fetch block start addresses to generate a first hit indicator for each fetch block that indicates whether the fetch block is present in the program instruction stream. In parallel, the micro-op cache tag array looks up the fetch block start address to generate a second hit indicator that indicates a hit on a micro-op cache entry. A micro-op cache entry includes one tag array entry and one or more data array entries that hold the micro-ops. The instruction fetch unit, which includes an instruction cache and the micro-op cache data array, consumes the sequence of fetch block descriptors in program order to fetch architectural instructions from the instruction cache and micro-ops from the micro-op cache data array in program order and provide them in program order for consumption by a decode unit. Each fetch block descriptor includes a fetch source indicator that indicates the instruction cache if either of the hit indicators is false. In this manner the prediction unit already knows the correct fetch source and tells the instruction fetch unit before it starts to fetch such that the instruction fetch unit only fetches from the correct source and does so without having to incur a mis-prediction penalty. In other words, by concurrently looking up the fetch block start address in the fetch block predictor and micro-op cache tag array, the prediction unit concurrently determines what is the next fetch block and which fetch source to fetch from.

In addition to the tag array providing pointers to the entries in the data array that hold the micro-ops of the hit micro-op cache entry, the fetch block predictor provides the set and the way of the instruction cache in the case of a fetch block predictor hit, such that in either case only the data array of the instruction cache or the data array of the micro-op cache need be accessed within the instruction fetch unit, resulting in a short fetch pipeline for both micro-ops and architectural instructions. In an embodiment, the instruction cache is physically-tagged, and the fact that the fetch block predictor provides the data array set and way enables the data array access to be performed immediately performed and the fetch block start address translation and the instruction cache tag lookup to be performed in parallel for hit, set and way verification. In an embodiment, the micro-op cache is virtually-tagged, and the fact that the fetch block descriptor provides the pointers because the tag lookup is performed in the prediction unit enables the fetch of the micro-ops from the micro-op cache data array to be immediately performed. In an embodiment, the fetch latency of both pipelines is only two clock cycles, and their equal fetch latencies results in no penalty when switching between the two fetch pipelines in either direction.

Embodiments are also described in which each data array entry includes a next pointer to another entry whose micro-ops are younger in program order thus facilitating the building of a linked list of data array entries. The data array entry at the head of the linked list is pointed to by an initial pointer of the single tag array entry of the micro-op cache entry. Thus, a distributed pointer mechanism is provided—i.e., pointers are distributed between the micro-op cache tag and data arrays—in which only a single way of the set-associative micro-op cache need be allocated for each micro-op cache entry, thus advantageously preserving the full associativity of the micro-op cache. The linked list capability advantageously accommodates micro-op cache entries with a large number of micro-ops since the number of micro-ops is not limited to the number of pointers in the tag array entry, which further advantageously accommodates micro-op cache entries decoded from a large number of architectural instructions. In an embodiment, a micro-op cache entry may hold micro-ops decoded from multiple fetch blocks, i.e., from multiple sequential runs of instructions. Furthermore, the accommodation of large numbers of micro-ops per micro-op cache entry also advantageously accommodates data array entries that efficiently hold a small number of micro-ops. Embodiments may include tag array entries with multiple initial data array entry pointers for multiple linked lists to facilitate concurrent fetching of multiple data array entries per clock cycle and/or to avoid pipeline bubbles in the case of a pipelined micro-op cache data array.

In the present disclosure, a fetch block (FBlk) is a sequential run of architectural instructions in a program instruction stream and/or the micro-ops into which the architectural instructions are decoded.

In the present disclosure, program order refers to the architectural order in which architectural instructions appear in a program instruction stream as the program is being processed. Generally, the program order is sequential, i.e., the next instruction in program order after the current instruction is the instruction that is adjacent in memory to the current instruction. However, when a control transfer instruction is encountered (e.g., a taken conditional branch instruction or an unconditional branch instruction such as a call instruction or a return instruction or an unconditional jump), the next instruction in program order is the instruction at the target address of the control transfer instruction rather than the next sequential instruction. The architectural state of the processor reflects the program order. That is, although embodiments may speculatively execute instructions out of the program order or may (sometimes incorrectly) predict the program order (e.g., via branch direction and target prediction), the program order dictates the order in which the processor commits instruction execution results to its architectural state. In some contexts, program order is used with respect to fetch blocks and fetch block descriptors. For a sequence of fetch blocks to be provided/consumed/received in program order means, for each fetch block in the sequence, the first instruction of the fetch block follows in program order the last instruction of the previous fetch block in the sequence (the instructions within each fetch block are in program order, although the AFE 181 may optimize MOPs within an ME such that, within the ME, they may be out of program order). Accordingly, for a sequence of fetch block descriptors to be provided/consumed/received in program order means the order of the sequence of fetch block descriptors describes a corresponding sequence of fetch blocks in program order.

FIG. 4B is an example flowchart illustrating operation of the PRU 102 of FIG. 4A to populate the FSI 314 of a FBD 191 in accordance with embodiments of the present disclosure. Operation begins at block 481.

At block 481, the FBSA 412 is looked up in the FBP 152, the BPs 154, and the MTR 173. Operation proceeds to decision block 482.

At decision block 482, if a hit occurs in the FBP 152 operation, proceeds to decision block 484; otherwise, operation proceeds to block 483.

At block 483, the FSI 314 is populated to indicate the instruction cache 101.

At decision block 484, if a hit occurs in the MTR 173, operation proceeds to decision block 485; otherwise, operation proceeds to block 483.

At decision block 485, if execution of the FBlk caused an exception within a predetermined subset of exceptions, operation proceeds to block 483; otherwise, operation proceeds to block 486. In an embodiment, the subset of exceptions includes but is not limited to a need to raise an architectural exception on a MOP within a MOC entry 350.

At block 486, the FSI 314 is populated to indicate the MOC 171.

FIG. 5 is an example block diagram of the IFU 106 of FIG. 1 in accordance with embodiments of the present disclosure. The IFU 106 includes the FBD FIFO 104, the MDR 175, the instruction cache 101, and the mux 161 of FIG. 1. The IFU 106 also includes an instruction translation lookaside buffer (ITLB) 143 and a mux 572. The instruction cache 101 includes an instruction cache tag RAM (ICTR) 522, an instruction cache data RAM (ICDR) 524, a tset mux 532, a dway mux 534, and control logic 501. The FBD FIFO 104 outputs the FBD 300 at its head to provide a FBP hit indicator 502, predicted set index 504, predicted way number 506, fetch block length 508, FBSA 512, FSI 514, initial MDR pointers 516, HFB (not shown), and numMDREs indicator 519, which are referred to collectively as a fetch request 511. In an embodiment, the control logic 501 asserts a read signal 598 to the FBD FIFO 104 to read the FBD 511, which results in the FBD 511 being popped from the FBD FIFO 104.

The instruction cache 101 is a set-associative cache. In one embodiment, the instruction cache 101 is configured as having four ways, and the predicted way number 206 is two bits, although other embodiments are contemplated in which the instruction cache 101 is configured with other numbers of ways. In contrast to the MTR 173 which is arranged as a set-associative cache, the MDR 175 is managed as a pool of MDR entries 340. A variable number of MDR entries 340 may be allocated to a MOC entry 350 from the pool, and MDR entries 340 for a MOC entry 350 may be allocated from anywhere in the pool as long as the MDR entry 340 is free, i.e., is not currently allocated to another MOC entry 350. In an embodiment, the MDR 175 includes 1,024 MDR entries 340 each capable of holding three MOPs such that the initial MDR pointers 336 and the next MDR pointers 344 are each 10 bits and have values zero through 1,023. In an embodiment, the MDR 175 may be dual-ported such that two MDREs 340 may be fetched concurrently from the MDR 175 each clock cycle.

The FSI 514 is provided to the control logic 501 to indicate the fetch source. The configuration of the IFU 106 to fetch architectural instructions from the instruction cache 101 in response to the FSI 514 of a fetch request 511 (i.e., of an FBD 511) that indicates the instruction cache 101 will first be described followed by a description of the IFU 106 to fetch MOPs from the MDR 175 in response to the FSI 514 of the fetch request 511 that indicates the MOC 171.

The ITLB 143 translates the FBSA 512 into a fetch physical address (FPA) 542, assuming the FBSA 512 hits in the ITLB 143, that is used to fetch a line of instructions from the instruction cache 101. An ITLB hit indicator 548 indicates whether the FBSA 512 hit in the ITLB 143 and is provided to the control logic 501. The FPA 542 includes a correct set index 544 portion and a FPA tag 546 portion, each of which is provided to the control logic 501. The control logic 501 also receives the predicted set index 504. In one embodiment, the ITLB 143 is a single-ported RAM structure. The correct set index 544, like the predicted set index 504, includes only translated address bits. The control logic 501 compares the correct set index 544 and the predicted set index 504 and generates a true value on a set mismatch indicator 552 if they do not match and otherwise generates a false value. The ITLB 143 and the portion of the control logic 501 that generates the set mismatch indicator 552 are shown in FIG. 5 as an IC translation sub-pipeline portion of the IC pipeline.

The control logic 501 generates a folded 551 control signal that controls the tset mux 532 and the dway mux 534. The folded 551 signal determines whether the IC pipeline operates in a folded mode or in an unfolded mode. Generally, the control logic 501 generates a true value on the folded 551 signal if FBP hit 502 is true and otherwise generates a false value, although other circumstances are described below in which the control logic 501 may generate a true value on the folded 551 signal.

The tset mux 532 receives the correct set index 544 and the predicted set index 504 and selects the predicted set index 504 if the folded 551 signal is true and selects the correct set index 544 otherwise. The output of the tset mux 532 is combined with untranslated FBSA bits 513 to form an IC set index 533 used to select a set of tags 522 of the ICTR 522 that are provided to the control logic 501. In one embodiment, the ICTR 522 is a single-ported RAM structure. The control logic 501 compares each of the tags 522 with the FPA tag 546 and generates a true value on an IC hit indicator 558 if a valid match is found and otherwise generates a false value. If the IC hit indicator 558 is true, the control logic 501 also generates a correct way number 556 that indicates the way of the instruction cache 101 that was hit. Additionally, the control logic 501 compares the correct way number 556 with the predicted way number 506 and generates a true value on a way mismatch indicator 554 if they do not match and otherwise generates a false value. The ICTR 522, tset mux 532 and the portion of the control logic 501 that generates the way mismatch indicator 554, the correct way number 556, and the IC hit indicator 558 are shown in FIG. 5 as an IC tag sub-pipeline portion of the IC pipeline.

The dway mux 534 receives the correct way number 556 and the predicted way number 506 and selects the predicted way number 506 if the folded 551 signal is true and selects the correct way number 556 otherwise. The selected input is provided as an IC way number 535 that is used, along with the IC set index 533, to select an entry of the ICDR 524 that provides a cache line of data 599. The control logic 501 receives the cache line of data and uses the untranslated BFSA bits 513 and the fetch block length 508 to select from the fetched cache line the architectural instructions 193 of the FBlk that are provided, via mux 161 as controlled by the FSI 514, to the FBlk FIFO 108 of FIG. 1. More specifically, even though the ICDR 524 is arranged in a set-associative fashion (i.e., having multiple ways), only a single way (i.e., only a single cache entry) of the selected set is read out. Advantageously, by reading out only a single way of the ICDR 524, significant power savings may be enjoyed over a conventional design that reads out all N ways, i.e., the cache lines of all the N entries, of a selected set of a data structure and then selects one of the cache lines after the correct way number has been determined from the lookup in the tag structure.

As described herein, the power saving advantage just described is also enjoyed along with the low latency advantage of a folded pipeline since the described embodiments do not have to wait for the correct way number to be determined but instead immediately access the ICDR 524 using the predicted way number 506 predicted by the FBP 152. Additionally, in one embodiment the ICDR 524 comprises multiple adjacent RAM macros, e.g., each of four RAM macros is 16 bytes wide to provide instruction 64-bytes, and the fetch block length 508 may be used to save additional power by reading out from only the necessary one or more RAM macros. For example, assume the offset into the cache line indicated by the untranslated lower bits of the FBSA 512 are at byte 3 and the fetch block length 508 is 11 bytes, then only a single RAM macro (i.e., the first RAM macro) is read out and the other three RAM macros are not read out, which may save power relative to an embodiment that reads out all four of the RAM macros without regard for the fetch block length 508. In one embodiment, the ICDR 524 is a single-ported RAM structure. The ICDR 524 and the dway mux 534 are shown in FIG. 5 as an IC data sub-pipeline portion of the IC pipeline.

As described herein, when the FBP hit indicator 502 indicates that the FBP 152 has provided a predicted set index and a predicted way number, the IC pipeline may operate in a folded pipeline mode such that the translation sub-pipeline, the tag sub-pipeline, and the data sub-pipeline operate in parallel to significantly reduce the latency of the IC pipeline. More specifically, in the data sub-pipeline the architectural instructions 193 are advantageously immediately fetched from the ICDR 524 using the predicted set index 504 and the predicted way number 506, while in parallel in the translation sub-pipeline the ITLB 143 translates the FBSA 512 into the FPA 542 and the control logic 501 generates the set mismatch 552 signal, and in parallel in the tag sub-pipeline the ICTR 522 determines the correct way number 556 and generates the way mismatch 554 signal. However, in other circumstances, e.g., a miss in the FBP 152, the IC pipeline may briefly operate in an unfolded pipeline mode as needed such that the translation sub-pipeline, the tag sub-pipeline, and the data sub-pipeline operate sequentially. The IC pipeline may also include staging registers (not shown) that stage various signals as needed. For example, when operating in unfolded mode, the correct set index 544 may be staged down from the translation sub-pipeline to the tag sub-pipeline, and the IC set index 533 may be staged down from the tag sub-pipeline to the data sub-pipeline.

A description of the IFU 106 to fetch MOPs from the MDR 175 in response to an FSI 514 of the fetch request 511 that indicates the MOC 171 is now provided. The MDR 175 and the mux 572 are shown in FIG. 5 as an MDR pipeline portion of the IFU 106, which is activated in response to the FSI 514 of the fetch request 511 indicating the MOC 171. The control logic 501 controls the mux 572 via control signal 571 each clock cycle to select either the initial MDR pointers 516 of the fetch request 511 or the next MDR pointers 574 from the MDR 175 output. The next MDR pointers 574 are the next MDR pointers 344 of fetched MDR entries 340. In an embodiment, although the MDR 175 employs a single-cycle RAM, the latency through the MDR 175 is two clock cycles because an extra clock cycle is needed for the feedback path from the RAM output through the mux 572 to the RAM input. In particular, the RAM setup and clock to data out times may be sufficiently long to require the extra clock cycle. In an embodiment, the group size G is two such that the initial MDR pointers 516 comprise two pairs of initial MDR pointers, i.e., four linked lists. The control logic 501 controls the mux 572 based on the number of groups N of initial MDR pointers 336 described above and based on the numMDREs 519 of the MOC entry 350.

The MDR pipeline may also include a buffer (not shown) that buffers the initial MDR pointers 516 in embodiments in which the number of groups N of initial MDR pointers 336 (i.e., MDR pipeline latency) is greater than one. The first group of initial MDR pointers 516 may be provided immediately to the mux 572 upon the read of the FBD 511, and the buffer may receive the remaining groups of initial MDR pointers 516 for provision to the mux 572 in program order upon the next N−1 clock cycles. For example, in an embodiment in which the MDR 175 latency N is two and the group size G is two (i.e., there are four initial MDR pointers 516 arranged as two groups of two), during a first clock cycle the first pair of initial MDR pointers 516 is provided directly to the mux 572 to access the MDR 175, and the second pair of initial MDR pointers 516 is received by the buffer which provides the second pair of initial MDR pointers 516 to the mux 572 to access the MDR 175 on the next clock cycle.

The MDR pointers 336/34 are populated when the MOC entry 350 is allocated such that the MOPs of the MDREs are fetched and provided to the FBlk FIFO 108 in program order. That is, the groups of MDREs fetched in a clock cycle are immediately older in program order than the groups of MDREs fetch in the next clock cycle. Additionally, in embodiments in which the group size G is greater than one, the MDREs within a group are in program order according to the order of the MDR pointers 336/344 that point to them. For example, assuming the group size G is two, the first MDR pointer 336/344 in a group points to the oldest MDRE in the group, and the second MDR pointer 336/344 in a group points to the next oldest MDRE in the group.

With respect to each linked list of a MOC entry 350, on the first fetch from the MDR 175, the control logic 501 controls the mux 572 to select the initial MDR pointers 516 to access the MDR 175 to fetch the MOPs 194 of the youngest in program order MDRE of the linked list for provision to the FBlk FIFO 108 via mux 161. Then, on subsequent fetches from the MDR 175 for the linked list, the control logic 501 controls the mux 572 to select the next MDR pointers 574 to access the MDR 175 to fetch the MOPs 194 of subsequently older in program order MDREs of the linked list for provision to the FBlk FIFO 108 via mux 161. Again, assuming an embodiment in which N is two and G is two, the first pair of initial MDR pointers 516 is provided to the MDR 175 on a clock cycle to fetch the first two MDR entries of the linked list, and the second pair of MDR pointers 516 is provided to the MDR 175 on the next clock cycle to fetch the next two MDR entries of the linked list. In this manner, the MOPs of the MOC entry 350 are pushed into the FBlk FIFO 108 in program order. Furthermore, the MOPs of the MOC entry 350 are pulled from the FBlk FIFO 108 in program order by the DEC 112.

In an embodiment, the IFU 106 also writes the corresponding FSI 514 into each entry of the FBlk FIFO 108 (e.g., into the Type bit 364 of FIG. 3E), which enables the DEC 112 to know whether the entry holds AIs or MOPs. In an embodiment, the ICDR 524 and the MDR 175 have read enable inputs (not shown, e.g., generated by the control logic 501) that must be asserted to read from them. If the read enable input is not asserted, then the RAM may be said to be in a lower power mode because it is drawing very little power. Advantageously, when architectural instructions are not being fetched from the ICDR 524 (e.g., when MOPs are being read from the MDR 175) the read enable input to the ICDR 524 is not asserted to save power and conversely when MOPs are not being fetched from the MDR 175 (e.g., when architectural instructions are being read from the ICDR 524) the read enable input to the MDR 175 is not asserted to save power.

Advantageously, according to embodiments described herein, the penalty for switching between fetching via the MDR pipeline to fetching via the folded IC pipeline and vice versa may be reduced and even eliminated in some embodiments by the generation of the FSI 314 by the PRU 102 and the inclusion of the FSI 314 in the FBDs 191 that are provided in program order to the IFU 106. Further advantageously, the inclusion of the FSI 314 in the FBDs 191 may simplify the design of the IFU 106 relative to more complex conventional designs that employ a micro-op cache. Still further, the fetching of MOPs via distributed MDRE pointers may improve performance and efficiency of the MOC 171.

Figure 6A:
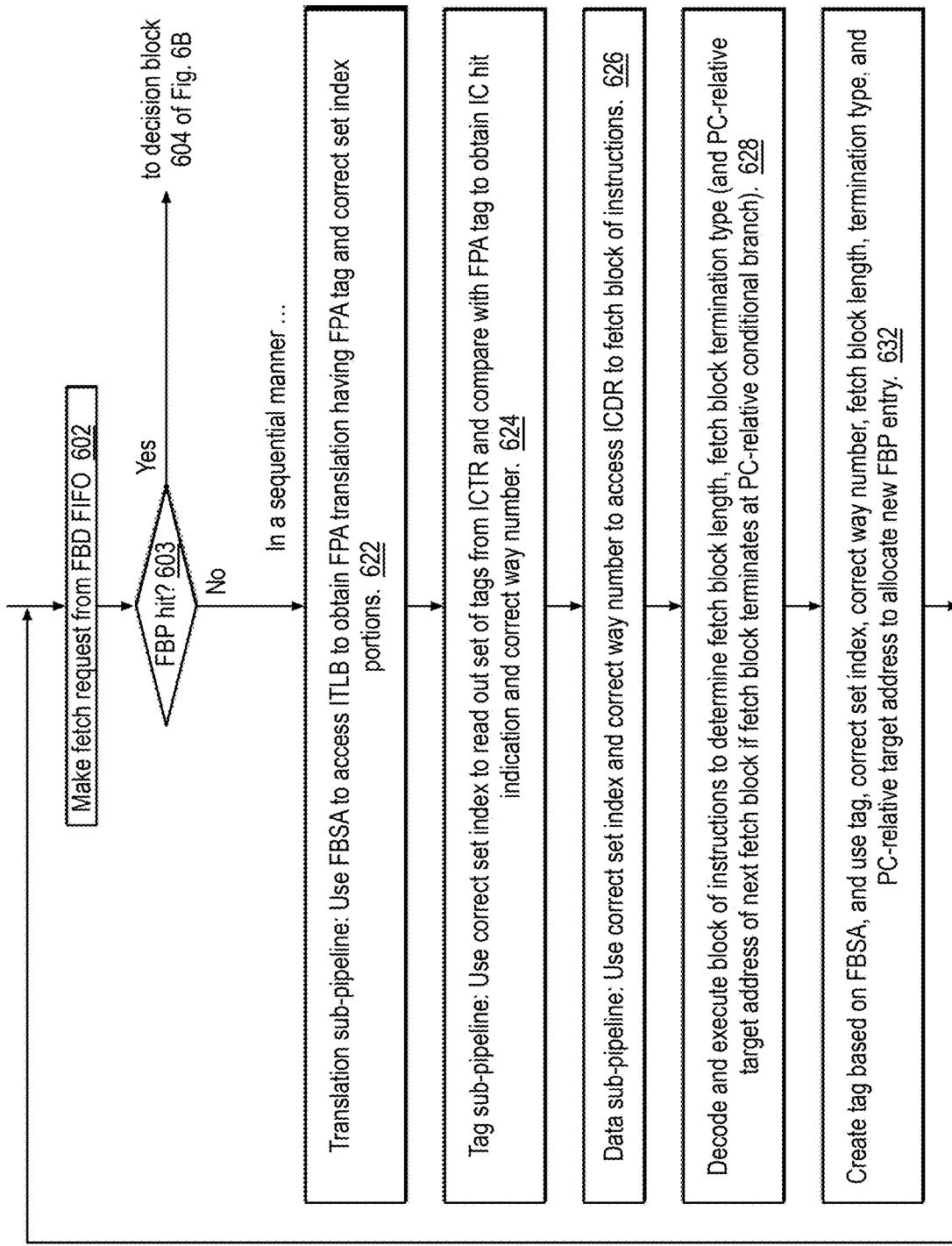
FIGS. 6A and 6B, referred to collectively as FIG. 6, is an example flowchart illustrating operation of the PRU of FIG. 4A and the IFU of FIG. 5 in accordance with embodiments of the present disclosure.
Figure 6B:
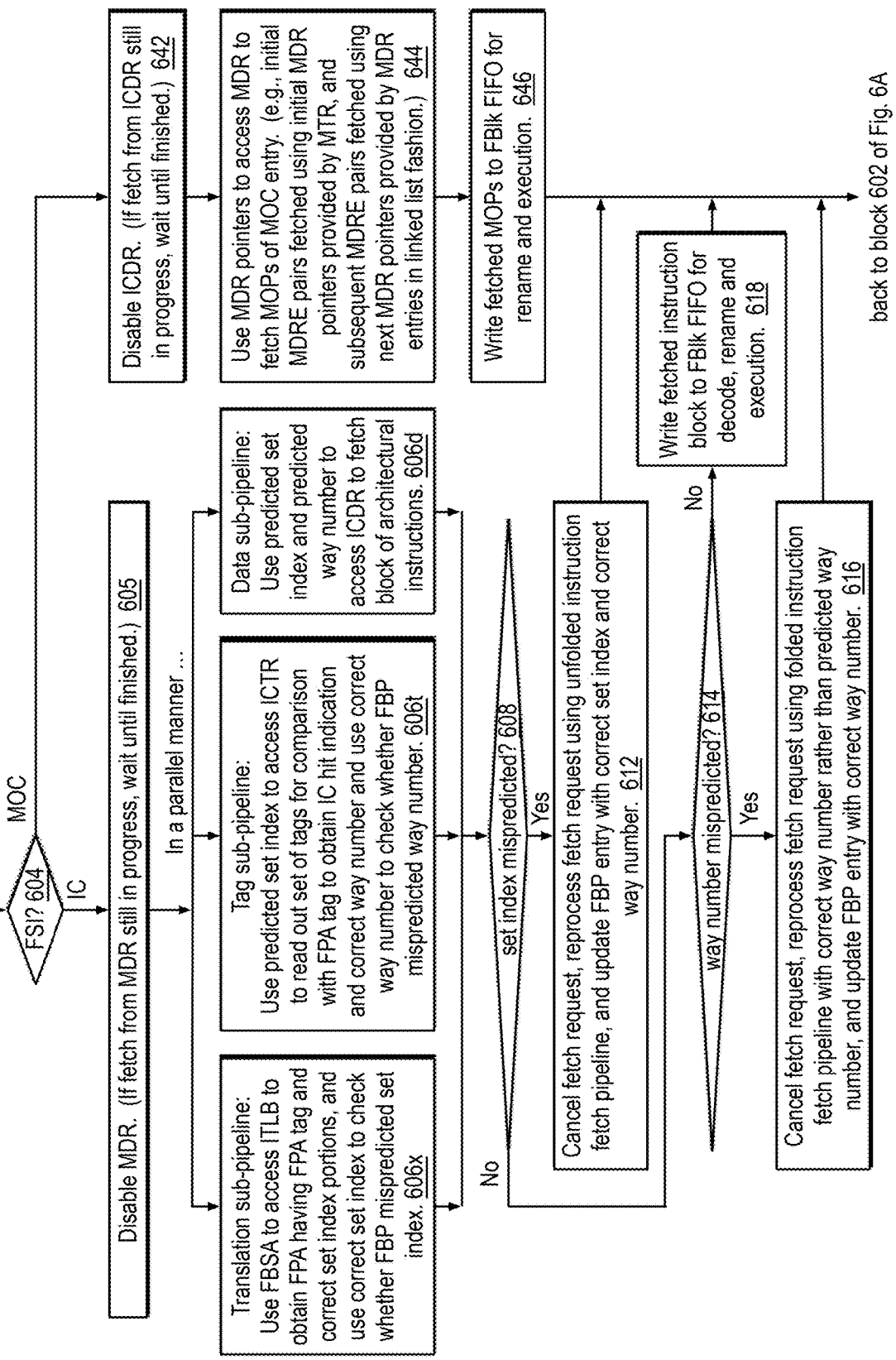

FIGS. 6A and 6B, referred to collectively as FIG. 6, is an example flowchart illustrating operation of the PRU 102 of FIG. 4A and the IFU 106 of FIG. 5 in accordance with embodiments of the present disclosure. Operation begins at block 602.

At block 602, a fetch request 511 of FIG. 5 is made from the FBD FIFO 104. Operation proceeds to decision block 603.

At decision block 603, if the FBP hit indicator 502 is true, operation proceeds to decision block 604; otherwise, operation proceeds to block 622, and blocks 622, 624, and 626 are performed in a sequential manner, e.g., the control logic 501 generates a false value on the folded signal 551.

At decision block 604, if the FSI indicator 514 indicates the MOC 171, operation proceeds to block 642 of FIG. 6B; whereas, if the FSI indicator 514 indicates the instruction cache 101, operation proceeds to block 605.

At block 605, once all pending fetch requests to the MDR 175 are completed, the IFU 106 ceases to assert the enable input to the MDR 175 which may result in a power saving. Operation proceeds from block 605 to blocks 606x, 606t, and 606d, which are performed in a parallel manner, e.g., the control logic 501 generates a true value on the folded signal 551.

At block 606x, in the IC translation sub-pipeline, the FBSA 512 is used to access the ITLB 143 to obtain the translation of the FBSA 512, i.e., FPA 542, which includes the FPA tag 546 and the correct set index 544. In one embodiment, the IC set index 533 is a hash of lower bits of the FPA 542 (e.g., FPA[16:7]) with higher bits of the FPA 542. Additionally, the correct set index 544 is used by the control logic 501 to check whether the FBP 152 mispredicted the set index, i.e., whether the predicted set index 504 does not match the correct set index 544. Operation proceeds from block 606x to decision block 608.

At block 606t, in the IC tag sub-pipeline, the predicted set index 504 is used to access the ICTR 522 to read out a set of tags 553 for comparison with the FPA tag 546 to obtain the IC hit indicator 558 and correct way number 556. Additionally, the correct way number 556 is used by the control logic 501 to check whether the FBP 152 mis-predicted the way number, i.e., whether the predicted way number 506 does not match the correct way number 556. Operation proceeds from block 606t to decision block 608.

At block 606d, in the IC data sub-pipeline, the predicted set index 504 and the predicted way number 506 are used to access the ICDR 524 to fetch a FBlk of architectural instructions 193. Operation proceeds from block 606d to decision block 608.

At decision block 608, if the set mismatch 553 indicator is true, operation proceeds to block 612; otherwise, operation proceeds to decision block 614.

At block 612, because the set index was mis-predicted by the FBP 152, the current fetch request 511 is canceled, i.e., none of the bytes of the fetched architectural instructions 193 are written into the FBlk FIFO 108. Furthermore, the IC pipeline reprocesses the fetch request 511 in the unfolded mode, i.e., in a sequential manner, similar to the manner described with respect to blocks 622, 624 and 626. In an alternate embodiment, the IC pipeline reprocesses the fetch request 511 in a partially folded manner. That is, the control logic 501 controls the tag sub-pipeline to use the correct set index 544 obtained from the first/canceled processing instance of the fetch request 511 to, during the second processing instance of the fetch request 511, initiate access of the ICTR 522 in parallel with the initiation of the lookup of the FBSA 512 in the ITLB 143, and the control logic 501 controls the data sub-pipeline to, in a sequential manner, wait and use the correct set index 544 obtained from the translation sub-pipeline and the correct way number 556 obtained from the tag sub-pipeline to access the ICDR 524 to fetch the architectural instructions 193. In both embodiments, because the FBP 152 mis-predicted the set index in the first/canceled processing instance, the IC pipeline was not able to determine the correct way number during the first/canceled processing instance, so it is assumed that the FBP 152 also mis-predicted the way number. Finally, after the second processing instance, the FBP entry 200 that mis-predicted is updated with the correct set index 544 and correct way number 556. Operation returns to block 602 to process the next fetch request 511.

At decision block 614, if the way mismatch 554 indicator is true, operation proceeds to block 616; otherwise, operation proceeds to block 618.

At block 616, because the way number was mis-predicted by the FBP 152, the current fetch request 511 is canceled. Furthermore, the IC pipeline reprocesses the fetch request 511 in the folded mode, i.e., in a parallel manner, similar to the manner described with respect to blocks 606x, 606t and 606d but using the correct set index 544 and correct way number 556 obtained during the first/canceled processing instance of the fetch request 511. Finally, after the second processing instance, the FBP entry 200 that mis-predicted is updated with the correct way number 556. Operation returns to block 602 to process the next fetch request 511.

At block 618, because the set index and way number were correctly predicted by the FBP 152, the fetched FBlk is written to the FBlk FIFO 108 for subsequent decode by the decode unit 112 and execution by the execution units 114. Operation returns to block 602 to process the next fetch request 511.

At block 622, in the translation sub-pipeline, the FBSA 512 is used to access the ITLB 143 to obtain the translation of the FBSA 512, i.e., FPA 542, which includes the FPA tag 546 and the correct set index 544. Additionally, the correct set index 544 is used by the control logic 501 to check whether the FBP 152 mis-predicted the set index. Operation proceeds to block 624.

At block 624, in the tag sub-pipeline, the correct set index 544 provided by the translation sub-pipeline at block 622 is used to access the ICTR 522 to read out a set of tags 553 for comparison with the FPA tag 546 to obtain the IC hit indicator 558 and correct way number 556. Additionally, the correct way number 556 is used by the control logic 501 to check whether the FBP 152 mis-predicted the way number. Operation proceeds to block 626.

At block 626, in the data sub-pipeline, the correct set index 544 provided by the translation sub-pipeline at block 622 and the correct way number 556 provided by the tag sub-pipeline at block 624 are used to access the ICDR 524 to fetch a FBlk that is written to the FBlk FIFO 108. That is, blocks 622, 624, and 626 are performed in a sequential manner according to an unfolded mode of the IC pipeline. Operation proceeds to block 628.

At block 628, the FBlk written to the FBlk FIFO 108 at block 626 is subsequently fetched from the FBlk FIFO 108 and decoded by the decode unit 112, and the decoded instructions are dispatched to the execution units 114 for execution. During the decode and execution of the instructions, the fetch block length, the termination type, and the PC-relative target address of the next fetch block (in the case the fetch block terminates in a PC-relative conditional branch instruction) may be determined. Operation proceeds to block 632.

At block 632, a FBP tag is generated based on the FBSA 512, e.g., a hash as described above with respect to FIG. 2. The generated FBP tag, the correct set index 544 determined at block 622, the correct way number 556 determined at block 624, and the fetch block length, the termination type, and the PC-relative target address determined at block 628, are used to create and allocate a new FBP entry 200 into the FBP 152. Operation returns to block 602 to process the next fetch request 511.

At block 642, once all pending fetch requests to the ICDR 524 are completed, the IFU 106 ceases to assert the enable input to the ICDR 524 which may result in a power saving. Operation proceeds to block 644.

At block 644, the IFU 106 uses the MDR pointers to access the MDR 175 to fetch the MOPs of the MOC entry (ME). In an embodiment, a first pair of initial MDR pointers 516 provided by the MTR 173 that point to a first pair of MDR entries 340 is used to access the MDR 175 to fetch a first pair of MDREs and first pair of next MDR pointers 574, then a second pair of initial MDR pointers 516 provided by the MTR 173 that point to a second pair of MDR entries 340 is used to access the MDR 175 to fetch a second pair of MDREs and a second pair of next MDR pointers 574, then the first pair of next MDR pointers 574 that point to a third pair of MDR entries 340 is used to access the MDR 175 to fetch a third pair of MDREs and a third pair of next MDR pointers 574, then the second pair of next MDR pointers 574 that point to a fourth pair of MDR entries 340 is used to access the MDR 175 to fetch a fourth pair of MDREs and a fourth pair of next MDR pointers 574, and so forth until all the MDREs indicated by the numMDREs indicator 519 have been fetched. Such an example is described below with respect to FIG. 17. Operation proceeds to block 646.

At block 646, the IFU 106 writes the fetched MOPs of the ME to the FBlk FIFO 108 from which they are fetched by the DEC 112 to be renamed and dispatched for execution. In an embodiment, the IFU 106 also writes the corresponding FSI 514 into each entry of the FBlk FIFO 108, which enables the DEC 112 to know whether the entry holds AIs or MOPs.

As described above, advantageously the instruction fetch pipeline may be shortened/folded while also obtaining the power saving benefit of reading out only a single way of the instruction cache data RAM per instruction block fetch. The power savings may be particularly significant in embodiments in which the number of bytes per data RAM entry is large, e.g., 64 bytes per entry as in one embodiment and 128 bytes per entry as in another embodiment. Further advantageously, the described embodiments may enable the processor 100 to have a single first-level instruction cache 101 that is large relative to a conventional design that has multiple levels of instruction cache and in which the first-level instruction cache is relatively small in order to facilitate single-clock cycle accesses since the conventional instruction fetch pipeline does not operate in a folded manner. In one embodiment, the instruction cache 101 is arranged as 2048 sets and 4 ways for a total of 8192 entries each holding a 64-byte cache line of instructions, and the ICDR 524 is a 512 KB RAM such that the instruction cache 101 (i.e., the IC data sub-pipeline) has a latency of two clock cycles when operating in folded mode, whereas in contrast a first-level instruction cache of a conventional multi-level instruction cache hierarchy design in a similar semiconductor technology may be a 32 KB or 64 KB cache, which may result in a lower hit rate than the larger first-level instruction cache 101 of the described embodiments. Further advantageously, the described embodiments may enable the processor 100 to have an ITLB 143 that is large relative to a conventional design in which the instruction TLB is/are relatively small in order to facilitate single-clock cycle accesses since the conventional instruction fetch pipeline does not operate in a folded manner. In one embodiment, the ITLB 143 comprises three TLBs that respectively support three different page sizes (e.g., 4 KB, 2 MB, and 1 GB pages) and collectively comprise more than three thousand entries such that the IC translation sub-pipeline has a two-clock cycle access latency.

Still further advantageously, as described herein, the penalty for switching between fetching via the MDR pipeline to fetching via the folded IC pipeline and vice versa may be reduced and even eliminated in some embodiments, and the design of the IFU 106 may be simplified relative to more complex conventional designs that employ a micro-op cache.

Figure 7A:
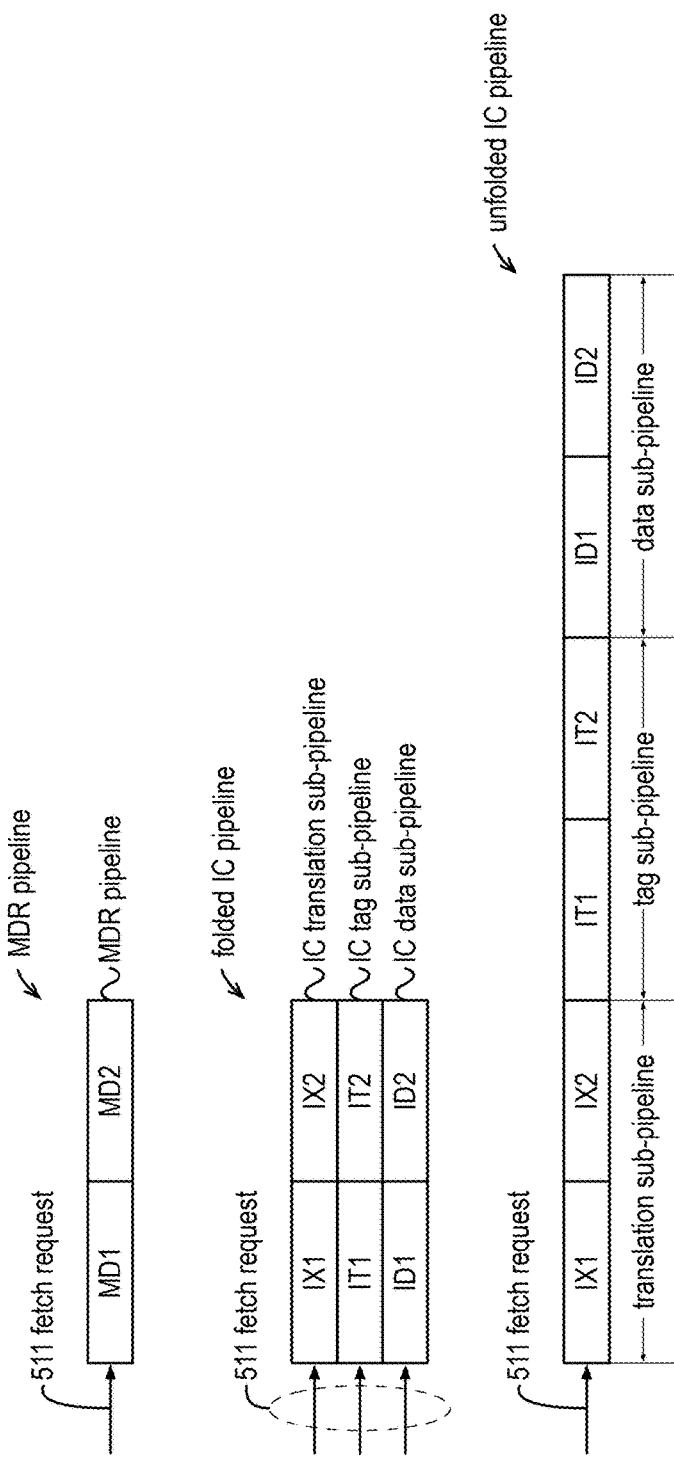
FIG. 7A is three example pipeline diagrams illustrating the MDR pipeline and dynamic operation of the IC pipeline of the IFU of FIG. 5 in both a folded mode and in an unfolded mode in accordance with embodiments of the present disclosure.

FIG. 7A is three example pipeline diagrams illustrating the MDR pipeline and dynamic operation of the IC pipeline of the IFU 106 of FIG. 5 in both a folded mode and in an unfolded mode in accordance with embodiments of the present disclosure. In the example embodiment of FIG. 7A, the MDR 175 is fully pipelined and the MDR pipeline effectively comprises two pipeline stages. The two MDR pipeline stages are designated MD1 and MD2, as shown in the top pipeline diagram of FIG. 7A. The MD1 stage processes a portion of the fetch request 511 during a first clock cycle, and the MD2 stage processes a portion of the fetch request 511 during a next clock cycle. In an embodiment, the MD1 stage reads the MDR 175, and the MD2 stage writes the MOPs fetched from the MDR 175 into the FBlk FIFO 108. Also, the MD2 stage feeds back the fetched next MDR pointer 574 through the mux 572 to the input of the MDR 175 to setup the MDR 175. In an embodiment, in an MDS stage (of FIG. 7B), which precedes the MD1 stage, sets up the MDR pointer 516/574 in the MDR 175 to select the desired MDRE 340. The MDS overlaps with the last stage PR5 of the PRU 102 in the case of an initial MDR pointer 516 access and overlaps with the MD2 stage in the case of a next MDR pointer 574 access. That is, in the case of an initial MDR pointer 516 access, the MDR 175 setup overlaps with the read of the initial MDR pointer 516 of the FBD 511 from the FBD FIFO 104, and in the case of a next MDR pointer 574 access, the MDR 175 setup overlaps with the feedback of the next MDR pointer 574. In this manner, the effective fetch latency of the MDR pipeline is only two clock cycles.

In the example embodiment of FIG. 7A, each of the IC translation, tag, and data sub-pipelines comprises two pipeline stages. The two translation sub-pipeline stages are designated IX1 and IX2; the two tag sub-pipeline stages are designated IT1 and IT2; and the two data sub-pipeline stages are designated ID1 and ID2. Similar to the MDR pipeline, an IDS setup stage of the IC data sub-pipeline overlaps with the PR5 stage.

The folded mode of operation of the IC pipeline is shown in the middle pipeline diagram of FIG. 7A in which each of the three sub-pipelines operate in parallel. More specifically, the IX1, IT1 and ID1 stages each process a portion of the fetch request 511 during a first clock cycle, and the IX2, IT2 and ID2 stages each process a portion of the fetch request 511 during a next clock cycle. The ID2 stage writes the AIs fetched from the ICDR 524 into the FBlk FIFO 108. In this manner, the effective latency of the IC pipeline incurred by the three sub-pipelines during folded mode operation is only two clock cycles, in contrast to the six clock cycles incurred by the three sub-pipelines in the unfolded mode, as will now be described.

The unfolded mode of operation of the IC pipeline is shown in the bottom pipeline diagram of FIG. 7A in which each of the three sub-pipelines operate sequentially. More specifically, the IX1 stage processes the fetch request 511 during a first clock cycle, then the IX2 stage processes the fetch request 511 during a second clock cycle, then the IT1 stage processes the fetch request 511 during a third clock cycle, then the IT2 stage processes the fetch request 511 during a fourth clock cycle, then the ID1 stage processes the fetch request 511 during a fifth clock cycle, then the ID2 stage processes the fetch request 511 during a sixth clock cycle. In this manner, the effective latency of the IC pipeline during unfolded mode operation incurred by the three sub-pipelines is six clock cycles.

In one embodiment, as described above, the MDR 175, the ITLB 143, the ICTR 522, and the ICDR 524 are all single-ported RAM structures. As described herein, the IC pipeline may dynamically switch back and forth between the folded and unfolded modes, an embodiment of which is described below with respect to FIG. 8. For example, the IC pipeline may switch to unfolded mode if the fetch request 511 indicates a miss in the FBP 152, e.g., via FBP hit indicator 502, or there is a miss in the ITLB 143 or instruction cache 101, as described below with respect to FIG. 8. In one embodiment, the switch back to the folded pipeline operation occurs right after processing of the current fetch request that requires unfolded pipeline operation. That is, the pipeline unfolds only for one fetch request and then refolds unless the next fetch request requires processing via an unfolded pipeline, e.g., FBP miss. In this manner, sub-pipeline conflicts, e.g., between the data sub-pipeline stages of the unfolded pipeline and the data sub-pipeline stages of the folded pipeline, are avoided. As a result, the start of processing of the next fetch request is delayed until the current fetch request is in the ID1 sub-pipeline stage. Thus, in the embodiment of FIG. 7A, there is a four-cycle delay for switching from an unfolded pipeline back to a folded pipeline if the next fetch request is immediately ready behind the current fetch request, whereas the delay is reduced if there is a gap between current and next fetch requests. In an alternate embodiment, the pipeline refolds for the next fetch request independent of the FBP hit indicator 502 (although as described above, depending upon when the next fetch request is ready behind the current fetch request, a delay may be incurred for switching from an unfolded pipeline back to a folded pipeline in order to avoid sub-pipeline conflicts). In yet another embodiment, the pipeline may remain unfolded and continue to operate in an unfolded manner for subsequent fetch requests until one or more events occur, e.g., the FBD FIFO 104 is empty, a branch misprediction is detected that causes the front-end 110 to be flushed, etc. In such an embodiment, the pipeline may continue to operate in a fully pipelined manner as long as the FBD FIFO 104 is not empty.

Since the MDR pipeline is also two stages in the embodiment of FIG. 7A, there is a four-cycle delay for switching from an unfolded IC pipeline back to the MDR pipeline if the next fetch request is immediately ready behind the current fetch request. However, if the next fetch request is immediately ready behind the current fetch request, advantageously there is no delay when switching from a folded IC pipeline back to the MDR pipeline nor is there delay when switching from the MDR pipeline back to a folded IC pipeline. The lack of switch penalty is enabled by the FSI 314/514 which is enabled by the separation of the MOC 171 into the MTR 173 in the PRU 102 and the MDR 175 in the IFU 106 as described in more detail herein.

Figure 7B:
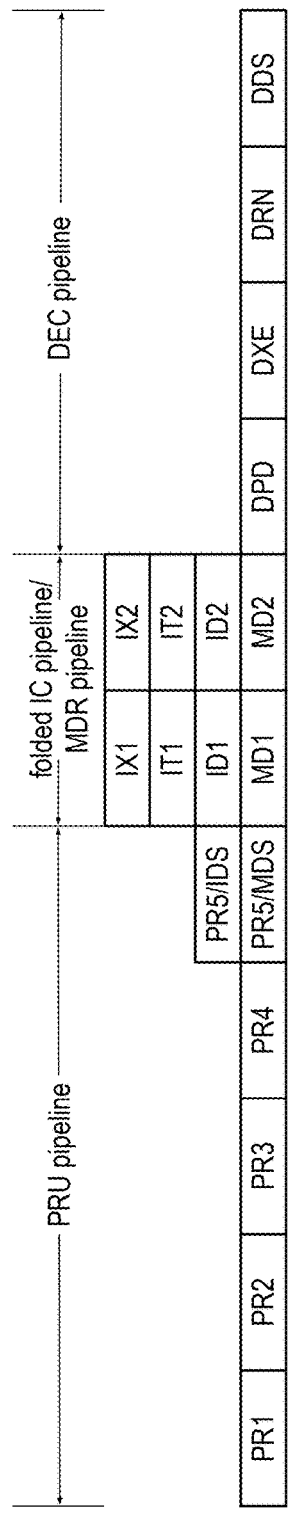
FIG. 7B is an example pipeline diagram illustrating the front-end and mid-end pipeline of the processor 100 of FIG. 1 in accordance with embodiments of the present disclosure.

FIG. 7B is an example pipeline diagram illustrating the front-end and mid-end pipeline of the processor 100 of FIG. 1 in accordance with embodiments of the present disclosure. More specifically, FIG. 7B illustrates the pipeline stages of the PRU 102, IFU 106, and DEC 112.

The PRU pipeline includes successive pipeline stages PR1, PR2, PR3, PR4, and PR5. The PRU pipeline stages of an embodiment are described in more detail below with respect to FIG. 12 and correspond to the pipeline stages of the embodiment of the PRU 102 of FIG. 11. The PR4 stage produces the FBD 191 that describes the FBlk that will be fetched by the IFU 106 either from the ICDR 524 or from the MDR 175 as indicated by the FSI 514 (i.e., if the fetch is from the MDR 175, it is a fetch of one or more MDREs 340). The PR5 stage is also referred to as the IDS stage or the MDS stage because, although it operates to check for mis-predictions made by the PRU 102, it also operates as the RAM setup stage for the ICDR 524 and the MDR 175, respectively, of the IFU 106, as described above. The IDS/MDS stage is followed by the IFU pipeline.

In the embodiment of FIG. 7B, the IFU pipeline includes two parallel 2-stage fetch pipelines: the folded IC pipeline and the MDR pipeline of FIG. 7A. When the FSI 514 specifies the MDR 175, MOPs 194 are fetched via the MD1 and MD2 stages of the MDR pipeline. When the FSI 514 specifies the instruction cache 101 and the IFU 106 is operating in folded mode, architectural instructions 193 are fetched via the ID1 and ID2 stages of the IC folded pipeline. As shown, the IX1 and IX2 stages and the IT1 and IT2 stages also operate in parallel with the ID1 and ID2 stages per the folded IC pipeline. Although not shown in FIG. 7B, when necessary, the IFU pipeline may also operate as the unfolded IC pipeline of FIG. 7A as described herein.

The DEC pipeline includes successive pipeline stages DPD, DXE, DRN, and DDS. The DPD stage is a pre-decode stage that identifies instruction boundaries within the FBlk FIFO 108 that contains the next group of architectural instruction bytes to be decoded and executed. The DPD may also identify consecutive pairs of architectural instructions that can be fused together. The DXE stage is an extract stage that extracts the architectural instructions at the identified boundaries. The DXE also decodes each identified instruction or instruction pair into a corresponding MOP representation. The DRN stage is a rename stage that takes the MOPs produced by the DXE stage or fetched from the MOC 171 and renames the architectural registers specified by the MOPs to physical registers of the PRF of the back-end 130. The DDS stage is a dispatch stage that dispatches register-renamed MOPs to the back-end 130.

Since the MOPs, unlike architectural instructions, do not need to be decoded but instead have already been decoded during a previous fetch instance of the corresponding architectural instructions and cached in the MOC 171, when the MOPs are fetched from the FBlk FIFO 108 rather than architectural instructions, the DPD and DXE stages may operate at largely reduced power consumption as the MOPs pass through since the MOPs do not need to be decoded.

Figure 8:
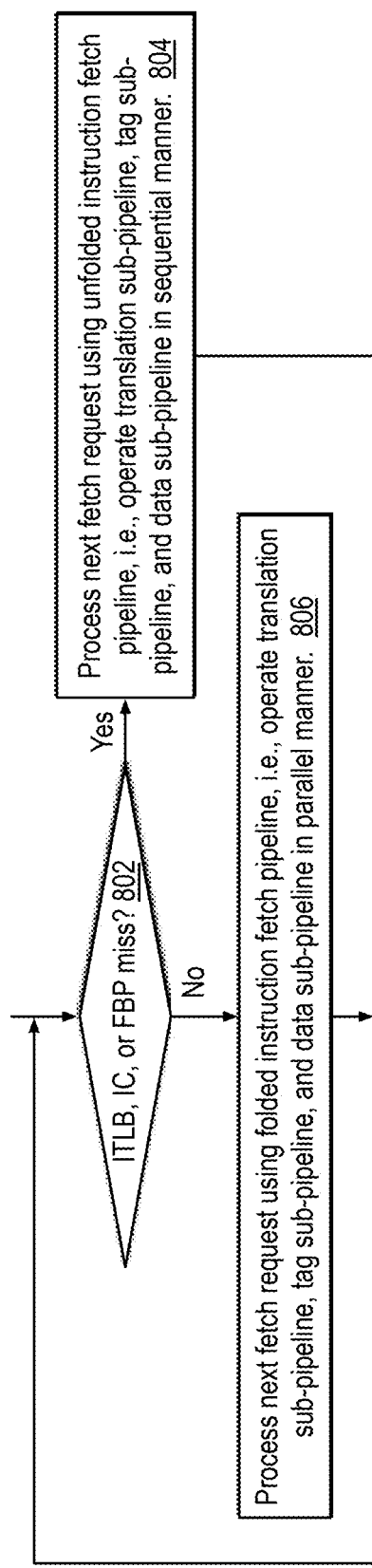
FIG. 8 is example flowchart illustrating operation of the IFU of FIG. 5 in accordance with embodiments of the present disclosure.

FIG. 8 is an example flowchart illustrating operation of the IFU 106 of FIG. 5 in accordance with embodiments of the present disclosure. Operation begins at decision block 802.

At block 802, if there is a miss in the ITLB 143, instruction cache 101, or FBP 152 (e.g., as determined at decision block 603 of FIG. 6), operation proceeds to block 804; otherwise, operation proceeds to block 806.

At block 804, the IFU 106 processes the next fetch request 511 in an unfolded manner, i.e., the translation, tag, and data sub-pipelines operate in a sequential manner, e.g., as described above with respect to block 622, 624, and 626 of FIG. 6. Operation returns to decision block 802 to process the next fetch request 511.

At block 806, the IFU 106 processes the next fetch request 511 in a folded manner, i.e., the translation, tag, and data sub-pipelines operation in a parallel manner, e.g., as described above with respect to block 606x, 606t, and 606d of FIG. 6. Operation returns to decision block 802 to process the next fetch request 511.

As described above, a goal of the front-end 110 is to avoid starvation of the DEC 112. Stated alternatively, a goal of the front-end 110 is to keep the mid-end 120 as fully supplied as possible with MOPs and with architectural instructions to decode into MOPs to dispatch to the back-end 130 in order to keep the back-end 130 as fully supplied as possible—given instruction-level parallelization limitations the program may impose—with MOPs to execute in order to optimize performance of the processor 100. Because the back-end 130 may execute MOPs out-of-order and in a superscalar fashion, the back-end 130 may require a significant number of MOPs per clock cycle to be highly utilized and achieve high performance. Although the FBD FIFO 104 and FBlk FIFO 108 may dampen the effect of instruction stream peaks and troughs for a relatively short number of clock cycles, for workloads in which the mid-end 120 and the back-end 130 can sustain a high instruction per clock rate for a significant number of clock cycles, the front-end 110 will also need to sustain the high instruction per clock rate.

As also described above, in one embodiment a cache line fetched from the instruction cache 101 may be up to 64 bytes, for example. For an embodiment in which the size of an instruction is four bytes, for example, up to sixteen instructions may be fetched in a clock cycle. However, as also described above, groups of instructions are written to the FBlk FIFO 108 at the granularity of a FBlk. As also described above, a FBlk may be anywhere from one instruction to the maximum number of instructions in a cache line, depending upon where in the FBlk the terminating instruction, if any, appears in the FBlk. Assume for example that, for a given lengthy instruction stream, the typical number of instructions per FBlk is four and the typical number of instructions the mid-end 120 can dispatch per clock and the back-end 130 can execute per clock is four. In such an example, the front-end 110 is likely to be able to provide the needed instruction rate to the mid/back-ends 120/130 if the PRU 102 provides FBDs 191 to the IFU 106 (via the FBD FIFO 104) at a rate of one FBD per clock so that the IFU 106 can fetch from the instruction cache 101 at a rate of one FBlk per clock. However, if the PRU 102 provides FBDs at a rate of less than one per clock, the instruction cache 101 will not be able to fetch at a rate of one FBlk per clock, and the back-end 130 may experience starvation.

Given the demands of high-performance processors for a short clock cycle and high fetch prediction accuracy, it may be difficult to design a PRU 102 that is configured to produce at a rate of one FBD per clock and achieve a high clock rate. More specifically, as may be illustrated by the example embodiment of FIG. 4A, the PRU 102 uses the fetch address (e.g., current FBSA 412) of the current FBlk (first FBlk) to produce a FBD 191 for the current FBlk and to produce a fetch address (e.g., next FBSA 449) of the next FBlk (second FBlk) which is fed back for use by the PRU 102 to produce a FBD 191 for the second FBlk and a fetch address for a third FBlk, and so forth. Thus, a fetch address loop around the PRU 102 exists in which FBDs are produced at the rate that next fetch addresses are produced by the PRU 102. In order to produce at the desired rate of one FBD per clock as discussed above, the PRU 102 must produce at a rate of one next fetch address per clock.

One solution is to design a PRU 102 that takes no more than a single clock cycle to generate the next FBSA 449 using the current FBSA 412 and feed the next FBSA 449 back around the loop as the current FBSA 412 for use in generating the next FBSA 449 for the next FBlk. However, this may be difficult to achieve given the desired short clock cycles of high-performance microprocessors and the complex and/or large predictors (FBP 152 and BPs 154) required to achieve high fetch prediction accuracy and that may require large lookup times as well as the time required by the next FBSA formation logic 408 to take in the predictor outputs and form the next FBSA 449 (as well as muxing, not shown, to select the current FBSA 412 from among the next FBSA 499 and other fetch addresses, e.g., correction fetch address for misprediction correction) as well as hashing logic (not shown) used to generate an index and tag used to access the FBP 152, for example. Given the fetch address loop, if the PRU 102 takes N clock cycles to receive the current FBSA 412 and feed the next FBSA 449 back, then a rate of 1/N FBD's per clock may be produced, which for some instruction streams may result in starvation of the back-end 130.

Advantageously, embodiments are described in which the fetch address loop is effectively broken into two pieces by the employment of a single-cycle predictor (SCP) at the front end of the PRU 102 and checking logic at the end of the PRU 102 that checks the SCP prediction against a more accurate prediction, generally speaking, made by the other predictors (e.g., the FBP 152 and the branch predictors (BPs) 154) that trains the SCP if necessary. The SCP is a simple predictor, relative to the other predictors, that is incapable of providing a FBD 191 (e.g., incapable of providing a full fetch address), but is capable of outputting the information needed by the other predictors to enable them to initiate their lookups. And, the SCP is fast enough to receive its input, output the needed information selected by the input, and feedback the output through a mux to its input in a single clock cycle. That is, the SCP uses information associated with a previous FBlk to predict a small amount of information, relative to the other predictors, associated with a current FBlk each clock cycle that is used by the other predictors to initiate their lookups in order to make a full prediction associated with a next FBlk that is hopefully more accurate, and in some embodiments made over multiple clock cycles. That is, the input used to access the SCP in a given clock cycle is at least a portion of the output of the SCP associated with the previous FBlk (i.e., the FBlk immediately preceding the current FBlk in program execution order) from the previous clock cycle that is fed back around to form a single-clock cycle loop around the SCP.

Viewed from another perspective, the multi-clock cycle fetch address loop around the PRU 102 of FIG. 4A is replaced with the single-cycle SCP loop followed by a fetch stream prediction unit (FSPU), e.g., the FBP 152, the BPs 154, the MTR 173, the next FBSA formation logic 408, and the fetch block descriptor formation logic 406. That is, the FSPU is preceded by the single-cycle loop around the SCP that, every clock cycle, provides another output of information to the FSPU that the uses to produce FBDs 191 and next FBSAs 449 at the rate of one per clock cycle, as described below in more detail. More specifically, each clock cycle, the FSPU produces a FBD 191 that describes the current FBlk and a prediction of the next fetch address, branch direction, and indirect branch indicator produced by the current FBlk. In one embodiment, the FSPU is a fully pipelined multi-cycle prediction unit.

The small amount of information output by the SCP that is needed by the other predictors to initiate their lookups may include a hashed index (e.g., 13 bits), a hashed tag (e.g., 9 bits), a branch direction (1 bit), and an indirect branch indicator (1 bit). The SCP output is a prediction of information that will be produced by a previous FBlk when subsequently fetched—either from the instruction cache and decoded or from the MOC 171—and executed. The hashed index and hashed tag comprise respective first and second hashes of a prediction of a next fetch address produced by the previous FBlk. A different combination of bits of the next fetch address is hashed to generate the hashed index than the combination of bits of the next fetch address hashed to generate the hashed tag. The hashed index and hashed tag may also be hashed with a virtual machine identifier and may also be hashed with a privilege level. The hashed index may be used to initiate lookups in random access memories (RAMs) of the predictor structures of the FSPU, and the hashed tag may be used to perform comparisons with tags of some of the FSPU predictor structures. The branch direction indicator predicts whether the previous FBlk is terminated by a Taken branch instruction. The indirect branch indicator predicts whether the previous FBlk is terminated by an indirect branch instruction. The branch direction and indirect branch indicator, along with one or more bits of the hashed index, are used to create an updated branch history based on a current branch history. The hashed index and hashed tag provided by the SCP may be hashed with the various lengths of the updated branch history to generate indexes and tags used to access some of the FSPU predictor structures.

As described above, a portion of the SCP output associated with a previous FBlk of the previous clock cycle is fed back and used as the input to the SCP on the current clock cycle to obtain information associated with the current FBlk. In one embodiment, a portion of the hashed index that is output by the SCP is fed back as the input to the SCP. Hence, when training the SCP, the fetch address of the previous FBlk is hashed and the hash result (i.e., the portion corresponding to the SCP input) is used to select the entry of the SCP to be trained. The trained SCP entry is written with a first hash of the next fetch address produced by the previous FBlk (hashed index), a second hash of the next fetch address produced by the previous FBlk (hashed tag), the direction bit produced by the previous FBlk, and the indirect branch indicator produced by the previous FBlk.

The training of an SCP entry may be performed in response to detection of a misprediction. For example, after the FSPU makes its prediction using the SCP prediction (i.e., the SCP output), the SCP and FSPU predictions may be compared, and if the predictions mismatch, then the mispredicting SCP entry may be trained using the FSPU prediction. For another example, after the instruction fetch unit fetches a FBlk predicted by the FSPU and the DEC 112 and execution units 114 decode and execute the FBlk, the prediction made by the FSPU may be compared with the execution results, and if they mismatch, then the FSPU, as well as the SCP, may be trained using the execution results.

Advantageously, the SCP, by breaking the fetch address loop and providing a new output each cycle that is usable by the FSPU to initiate its lookups each cycle, facilitates a higher clock rate and/or larger predictors—e.g., fetch block predictor, conditional branch predictor, indirect branch predictor, return address predictor—that may take a long time (multiple clock cycles in some embodiments) to make very accurate branch predictions relative to smaller single-cycle branch predictors. For example, in one embodiment the FBP 152 has 12K entries (2K sets of 6 ways each), the CBP 1142 of FIG. 11 has 16K entries (one 8K-entry bimodal table and four 2K-entry tagged tables), and the IBP 1144 of FIG. 11 has 2K entries (four 512-entry tagged tables).

FIG. 9 is an example block diagram of a SCP entry 900 in accordance with embodiments of the present disclosure. SCP entries 900 are held in the SCP 1001 of FIG. 10A and FIG. 10B that provides an SCP entry 900 each clock cycle to the FSPU 1102 of FIG. 11, as described in more detail below. Each SCP entry 900 is associated with a FBlk, and each FBlk has an associated fetch address. Each SCP entry 900 is populated using training information generated either based on execution of the FBlk (e.g., by the DEC 112 and/or the execution units 114) or based on a prediction of the FBlk by the FSPU 1102 that takes more clock cycles and tends to be more accurate in its predictions than the SCP 1001, depending upon the workload of the program being executed. In one embodiment, the prediction accuracy of the SCP 1001 for some workloads tends to be approximately seventy percent or better, whereas the prediction accuracy of the FSPU 1102 for the workloads tends to be approximately ninety five percent or better, although the accuracy percentages may vary with workload. Thus, the SCP entry 900 may be viewed as a primitive prediction that enables the FSPU 1102 to begin its process of making a full and more accurate prediction each clock cycle. Even though the FSPU 1102, unlike the SCP 1001, may (or may not) require multiple clock cycles to provide its prediction, the FSPU 1102 is able to make a prediction each clock cycle because the SCP 1001 breaks the fetch address loop (and is fully pipelined in embodiments in which it has multiple stages), as described above, and provides each clock cycle the information the FSPU 1102 needs to initiate its lookups. The SCP entry 900 includes a hashed next fetch address index (HNFAI) 902, a hashed next fetch address tag (HNFAT) 904, a branch direction SCP (BrDir-S) indicator 906, an indirect branch SCP (IndBr-S) indicator 908, and a useful indicator 912. The BrDir-S indicator 906 and the IndBr-S indicator 908, along with one or more bits of the HNFAI 902, are collectively referred to as branch history update information (BHUI) 919.

The HNFAI 902 is a value that is the result of a hash of a fetch address of a current FBlk, which is a prediction of the hash of the next fetch address to be produced by the previous FBlk, i.e., the FBlk that immediately precedes in program execution order the current FBlk with which the SCP entry 900 is associated. Thus, the HNFAI 902 functions as a proxy for the fetch address of the current FBlk. The previous FBlk is the FBlk whose hashed fetch address is used to select the entry 900. The current FBlk is the FBlk for which the FSPU 1102 will make a prediction using the entry 900. In one embodiment, the hash comprises a Boolean exclusive-OR (XOR) of different sets of bits of the fetch address. For example, in one embodiment the HNFAI 902 is 13 bits wide, and different sets of 13 bits of the fetch address are hashed with one another to generate the 13-bit HNFAI 902. In another embodiment, bits of the VMID are also hashed along with the fetch address to generate the HNFAI 902. In another embodiment, the privilege mode is also hashed along with the fetch address and the VMID to generate the HNFAI 902. The HNFAI 902 is used to index into the FBP 152 and therefore may also be referred to as a "FBP set index." This is one sense in which the HNFAI 902 functions as a proxy for the fetch address of a FBlk. The HNFAI 902 is subsequently hashed with one or more branch histories (e.g., global branch history (GHist), conditional path history (CPHist), indirect path history (IPHist)) to generate indexes (1131, 1133 of FIG. 11) used to index some of the branch predictors 154, e.g., CBP 1142, IBP 1144, as described below with respect to FIG. 11. This is another sense in which the HNFAI 902 functions as a proxy for the fetch address of a FBlk. Advantageously, by providing the HNFAI 902 each clock cycle, the SCP 1001 enables initiation of lookups in the FBP 152 and the branch predictors 154 each clock cycle, as described in more detail below. One or more bits of the HNFAI 902 are combined with the current CPHist to provide an updated CPHist that is subsequently hashed with the HNFAI 902 and HNFAT 904 used to access the CBP 1142 and IBP 1144, as described below. Additionally, the one or more bits of the HNFAI 902 are shifted into the current CPHist, as described below.

The HNFAT 904, similar to the HNFAI 902, is a value that is the result of a hash of the fetch address of the current FBlk. However, the sets of bits of the fetch address used in the hash to generate the HNFAT 904 are at least partially different than the sets of bits of the fetch address that are used in the hash to generate the HNFAI 902. For example, in one embodiment the HNFAT 904 is 9 bits wide, and different sets of 9 bits of the fetch address are hashed with one another to generate the 9-bit HNFAT 904. In another embodiment, bits of the VMID are also hashed along with the fetch address to generate the HNFAT 904. In another embodiment, the privilege mode is also hashed along with the fetch address and the VMID to generate the HNFAT 904. The HNFAT 904 is used in tag comparisons with the FBP 152 to select a FBP entry 200. The HNFAT 904 is subsequently hashed with the one or more branch histories to generate tags (1132, 1134 of FIG. 11) used in tag comparisons with tags of the CBP 1142 and IBP 1144, as described below with respect to FIG. 11.

The BrDir-S indicator 906 indicates a prediction of the branch direction, i.e., Taken or Not Taken, to be produced by execution of the previous FBlk. In one embodiment, if the previous FBlk is a sequential FBlk (e.g., included no branch instructions), the BrDir-S indicator 906 value indicates a Not Taken branch direction. The BrDir-S indicator 906 prediction is combined with the current GHist to provide an updated GHist that is subsequently hashed with the HNFAI 902 and HNFAT 904 used to access the CBP 1142 and IBP 1144, as described below. Additionally, the BrDir-S 906 is shifted into the current GHist, as described below.

The IndBr-S indicator 908 indicates whether the previous FBlk is terminated by an indirect branch instruction. The IndBr-S indicator 908 is used to selectively generate an updated IPHist. More specifically, if the IndBr-S indicator 908 indicates the previous FBlk is terminated by an indirect branch instruction, one or more bits of the HNFAI 902 are combined with the current IPHist to provide the updated IPHist that is subsequently hashed with the HNFAI 902 and HNFAT 904 used to access the CBP 1142 and IBP 1144, as described below.

The useful bit 912 is a replacement control bit that provides hysteresis to avoid needless training of the SCP entry 900, e.g., in a program execution pattern in which the FBlk is continually Taken, then changes to Not Taken for one execution instance, then returns back to being continually Taken. In one embodiment, if the SCP entry 900 made a misprediction, the SCP entry 900 is trained only if the useful bit 912 is false, whereas if the useful bit 912 is true, then the useful bit 912 is set to false such that the SCP entry 900 may be trained if it makes another misprediction.

In the set-associative embodiment of FIG. 10B, the SCP entry 900 also includes a tag field 914. The tag 914 may be a hash of the fetch address of the previous FBlk, i.e., the FBlk whose fetch address is hashed and used as the index 1093 into the SCP 1001 to select an entry 900 to be written or read, as described in more detail below. The tag 914 may be a hash of at least partially different bits of the fetch address of the previous FBlk than the bits of the fetch address of the previous FBlk hashed to generate the index 1093 into the SCP 1001.

Advantageously, each SCP entry 900 holds a relatively small number of bits (e.g., 25 in one embodiment) such that the SCP 1001 is small and fast enough to provide a SCP entry 900 each clock cycle, as described below. More specifically, the HNFAI 902, being a hash of the fetch address of the FBlk and not the full fetch address of the FBlk, is not sufficient for the IFU 106 to fetch the FBlk from the instruction cache 101 nor from the MOC 171. In other words, the nature of a hash function is such that the full fetch address cannot be regenerated from the hash of the fetch address. Rather, only the full fetch address of the FBlk, which is generated by the FSPU 1102 (i.e., current FBSA 412 that is included in the FBD 191 of the FBlk, which is the next FBSA 449 generated on the previous clock cycle), is sufficient to fetch the FBlk from the instruction cache 101 or from the MOC 171. However, advantageously, the HNFAI 902 is sufficient to initiate the accesses to the FBP 152 and BPs 154 and the MTR 173, and the information output by the SCP 1001 is small enough such that the SCP 1001 may generate a new output each clock cycle, as described below.

FIG. 10A is an example block diagram of an SCP 1001 in accordance with embodiments of the present disclosure. In one embodiment, the SCP 1001 comprises a random-access memory (RAM) whose locations hold SCP entries 900. The SCP 1001 receives an input 1003 and provides an output 1005 that is the entry 900 selected by the input 1003. Thus, the embodiment of FIG. 10A is arranged similar to a tag-less direct-mapped cache memory. As shown, and as described below in more detail with respect to FIG. 11, at least a portion of the output 1005 is fed back to the input 1003 (e.g., through a multiplexer 1171 of FIG. 11) to use for performing the next access during the next clock cycle. The SCP 1001 is designed to include only as many entries as possible to remain a single-cycle predictor, i.e., to support a total round-trip time that is less than a clock cycle. In one embodiment, the SCP 1001 comprises a RAM with 2048 entries 900. However, other embodiments are contemplated with a different number of SCP 1001 entries. In one embodiment, the HNFAI 902 of the output 1005 (shown as HNFAI [J−1] in FIG. 11) is thirteen bits, and the input 1003 comprises the lower eleven bits of the HNFAI 902. However, other embodiments are contemplated in which the portion of the HNFAI 902 used as the input 1003 is different.

As shown, the output 1005 includes the HNFAT, HNFAI, BrDir-S, IndBr-S, and useful bit of the SCP entry 900 of FIG. 9. The input 1003 includes at least a portion of the HNFAI, which is shown in FIG. 10A as a hashed current fetch address index (HCFAI) because the HNFAI, the hash of the next fetch address produced by the previous FBlk, on the next clock cycle becomes the fetch address of the current FBlk, which is the FBlk that immediately succeeds the previous FBlk.

FIG. 10B is an example block diagram of an SCP 1001 in accordance with alternate embodiments of the present disclosure. The SCP 1001 of FIG. 10B is similar in some respects to the SCP 1001 of FIG. 10A, but also includes tag compare logic 1097 and a mux 1099. Additionally, the input 1003 to the SCP 1001 of FIG. 10B comprises an index 1093 and a tag 1095. The SCP 1001 of FIG. 10B is arranged similar to a set-associative cache memory that includes multiple ways. The embodiment of FIG. 10B includes two ways such that the input 1003 selects a set of two entries 900. However, other embodiments are contemplated that include more than two ways. As described above, in the set-associative embodiment of FIG. 10B, each SCP entry 900 also includes a tag field 914. The tag 914 of each of the two selected entries 900 is provided to the tag compare logic 1097 which compares each of them with the input tag 1095. Based on the comparison, the tag compare logic 1097 controls the mux 1099 to select the entry 900 with a matching tag 914 for provision on the output 1005. In one embodiment, if neither tag 914 matches the input tag 1095, then one of the entries 900 of the selected set if provided on the output 1005, e.g., way 0 as a default.

The set-associative embodiment of FIG. 10B may reduce, relative to a direct-mapped embodiment such as FIG. 10A, the detrimental effect on prediction accuracy caused by aliasing of the hashed index of multiple FBlks to the same entry 900 of the SCP 1001. That is, a set-associative embodiment having N ways may result in less conflict misses since predictions associated with N different FBlks can concurrently reside in the same set of the set-associative SCP 1001 without one FBlk pushing the other FBlk out of the SCP 1001, and the used entry 900 is based on a tag match. The set-associative embodiment may result in less conflict misses but may require fewer entries 900 relative to a direct-mapped embodiment in order to accommodate the additional latency associated with tag comparisons and muxing and still remain a single-cycle predictor. That is, as in the embodiment of FIG. 10A, the SCP 1001 of FIG. 10B is designed to include only as many entries as possible to remain a single-cycle predictor, i.e., to support a total round-trip time that is less than a clock cycle. With respect to the overall prediction accuracy of the SCP 1001, the improvement attributed to the reduced aliasing effects of set-associative embodiments may or may not be offset by the fewer entries 900 of the set-associative embodiment relative to the direct-mapped embodiments.

Figure 11:
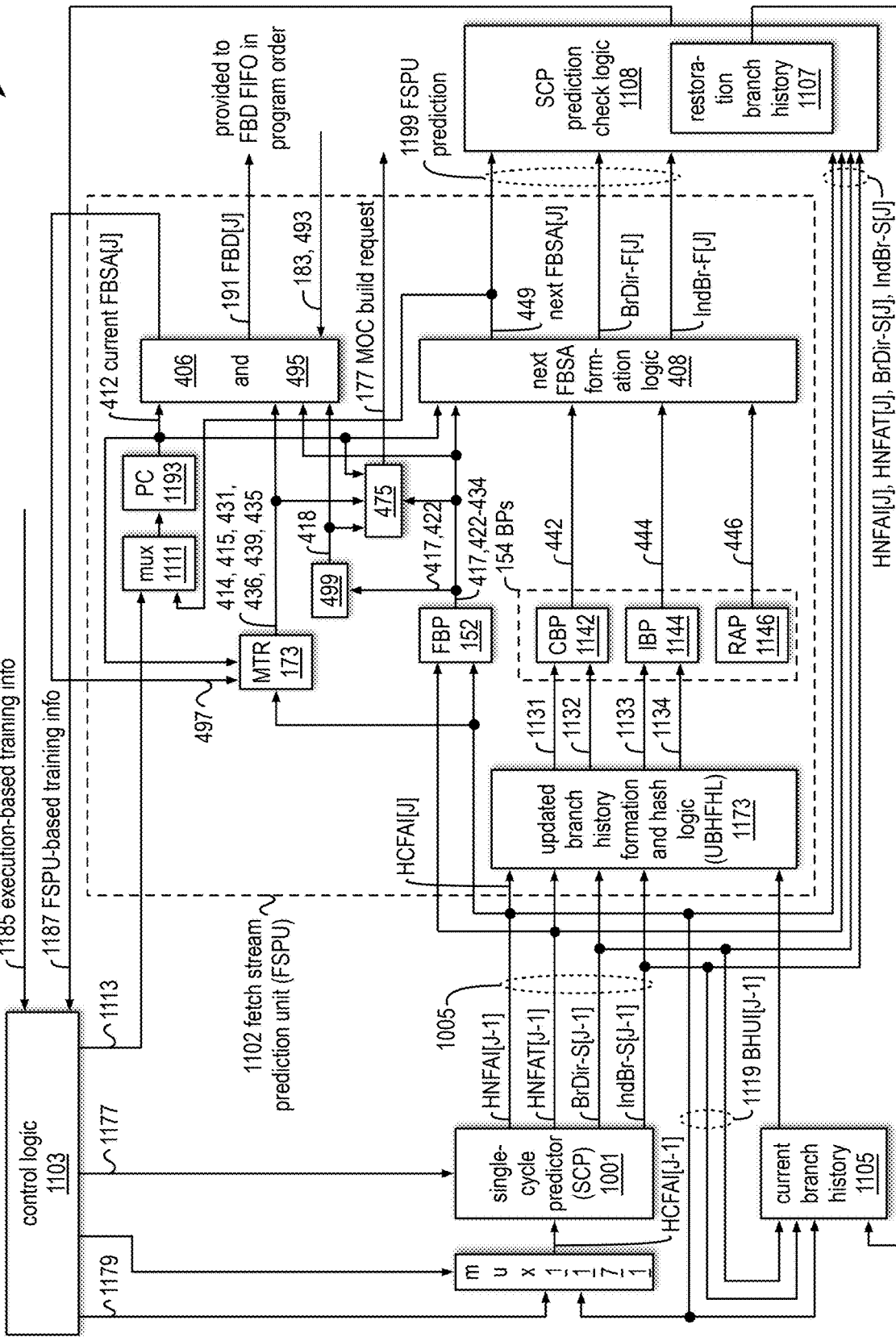
FIG. 11 is an example block diagram of the PRU of FIG. 1 in accordance with embodiments of the present disclosure.

FIG. 11 is an example block diagram of the PRU 102 of FIG. 1 in accordance with embodiments of the present disclosure. The PRU 102 includes the SCP 1001, the FSPU 1102, a mux 1171 that provides the input 1003 to the SCP 1001, control logic 1103, current branch history 1105, and SCP prediction check logic 1108. The SCP prediction check logic 1108 includes a restoration branch history 1107. In the embodiment of FIG. 11, the SCP 1001 is a direct-mapped type described with respect to FIG. 10A. The FSPU 1102 includes updated branch history formation and hash logic (UBHFHL) 1173, the MTR 173, the FBP 152, the FBHT 185, the comparator 499 and the MOC build requestor 475 of FIG. 4A, a return address predictor (RAP) 1146 that predicts the target address of return instructions (return target address 446), a conditional branch predictor (CBP) 1142 that predicts the direction (Taken or Not Taken) of conditional branch instructions (conditional branch direction 442), an indirect branch predictor (IBP) 1144 that predicts the target address of indirect branch instructions (indirect branch target address 444), the PC register 1193 of FIG. 1, a mux 1111 whose output is coupled to the input of a PC register 1193, and the next FBSA formation logic 408, the FBD formation logic 406 and the MTRE update logic 495 of FIG. 4A.

As described above, the SCP 1001 holds SCP entries 900, e.g., of FIG. 9. In response to its input 1003 (i.e., the output of the mux 1171), the SCP 1001 selects one of its SCP entries 900 and provides the selected SCP entry 900 on its output 1005, shown in FIG. 11 as HNFAI[J−1], HNFAT[J−1], BrDir-S[J−1], and IndBr-S[J−1], which respectively refer to a first hash (used as an index) of the next fetch address produced by a FBlk denoted [J−1], a second hash (used as a tag) of the next fetch address produced by FBlk[J−1], the branch direction produced by FBlk[J−1], and the indicator of whether FBlk[J−1] is terminated by an indirect branch instruction. The BrDir-S[J−1], IndBr-S[J−1], and one or more bits of the HNFAI[J−1] are shown collectively as BHUI 1119. The mux 1171 receives as one input at least a portion of the HNFAI[J−1] fed back from the output 1005 of the SCP 1001. The mux 1171 receives as another input a training and restart index 1179 provided by the control logic 1103. In one embodiment, for example, the HNFAI[J−1] is a thirteen-bit value, and eleven bits of the HNFAI[J−1] are used as the input to the mux 1171.

During normal operation, the mux 1171 selects the HNFAI[J−1] output by the SCP 1001 on the current clock cycle, which becomes the HCFAI[J−1], shown as the output of mux 1171, on the next clock cycle. However, when the SCP 1001 is being trained (i.e., updated), the control logic 1103 may control the mux 1171 to select the training and restart index 1179 so that the control logic 1103 may write the selected SCP entry 900 with training information 1177. Additionally, after training of the SCP 1001 and/or correction of the PC 1193, the control logic 1103 may control the mux 1171 to select the training and restart index 1179 to re-start the SCP 1001 at a different SCP entry 900 than would have been selected by the fed-back HNFAI[J−1].

The training information 1177 is generated by the control logic 1103 using either execution-based training information 1185 or FSPU-based training information 1187. The execution-based training information 1185 may be received from the DEC 112, the execution units 114, and/or the PCL 132, whereas the FSPU-based training information 1187 may be received from the SCP prediction check logic 1108. The training information 1185/1187 may include the next fetch address produced by the previous FBlk, the branch direction produced by the previous FBlk, and an indication of whether the previous FBlk is terminated by an indirect branch instruction. The training information 1185/1187 may also include the fetch address of the previous FBlk, which the control logic 1103 hashes to generate the training index 1179 that selects the SCP entry 900 is to be written, i.e., the entry 900 that made the misprediction. The control logic 1103 hashes the next fetch address produced by the previous FBlk for writing into the HNFAI 902 and hashes the next fetch address produced by the previous FBlk, in at least a partially different manner, for writing into the HNFAT 904. The control logic 1103 writes the branch direction produced by the previous FBlk into the BrDir-S 906 and writes the indirect branch instruction indication to the IndBr-S 908.

The current branch history 1105 and the restoration branch history 1107 each hold three different branch histories related to prior executions of FBlks: a global branch history (GHist), a path history (CPHist), and an indirect branch path history (IPHist). In one embodiment, the different branch histories are held in respective shift registers. For example, in one embodiment the current GHist and the restoration GHist are held in respective 128-bit shift registers, the current CPHist and the restoration CPHist are held in respective 15-bit shift registers, and the current IPHist and the restoration IPHist are held in respective 24-bit shift registers.

In one embodiment, each time the SCP 1001 makes a prediction, the BrDir-S[J−1] is shifted into the current GHist, a bit of the HNFAT[J−1] (which reflects the fetch address of the current FBlk, e.g., bit 1) is shifted into the current CPHist, and three bits of the HNFAI[J−1] (which also reflects the fetch address of the current FBlk, e.g., bits 3:1) are shifted into the current IPHist if the IndBr-S [J−1] indicates the previous FBlk is terminated by an indirect branch instruction. Additionally, each time the FSPU 1102 makes a prediction, the BrDir-F[J] (described in more detail below) output by the next FBSA formation logic 408 is shifted into the restoration GHist, a bit of a hash of the next FBSA 449 (e.g., bit 1) is shifted into the restoration CPHist, and three bits of a hash of the next FBSA 449 (e.g., bits 3:1) are shifted into the restoration IPHist if the IndBr-F[J] (described in more detail below) output by the next FBSA formation logic 408 indicates the previous FBlk is terminated by an indirect branch instruction. When a misprediction by the SCP 1001 is detected, the current branch history 1105 may be updated from the restoration branch history 1107.

The UBHFHL 1173 receives the current branch history 1105: GHist, CPHist, and IPHist. The UBHFHL 1173 forms the updated branch history using the current branch history 1105 and the BHUI 1119. More specifically, the UBHFHL 1173 strips off the oldest bit of the received current GHist and appends in the BrDir-S[J−1]; the UBHFHL 1173 strips off the oldest bit of the received current CPHist and appends in a bit of the HNFAI[J−1] (e.g., bit 1); and the UBHFHL 1173 strips off the three oldest bits of the received current IPHist and appends in three bits of the HNFAI[J−1] (e.g., bits 3:1) if the IndBr-S[J−1] indicates the previous FBlk is terminated by an indirect branch instruction. The results are referred to collectively as the updated branch history (not shown) and are referred to individually as the updated GHist, updated CPHist, and updated IPHist. In one embodiment, in a given clock cycle, the updated branch history is formed by the UBHFHL 1173 with the state of the current branch history 1105 early in the clock cycle before being updated using the output 1005 provided by the SCP 1001 later in the clock cycle.

The UBHFHL 1173 hashes the HNFAI[J−1] with varying lengths of combined updated GHist and CPHist (e.g., 0, 5, 15, 43, 128 bits) to generate indexes 1131 that are provided to the CBP 1142. The UBHFHL 1173 hashes the HNFAT [J−1] with varying lengths of combined updated GHist and CPHist (e.g., 5, 15, 43, 128 bits) to generate tags 1132 that are provided to the CBP 1142. In one embodiment, the CBP 1142 comprises a bimodal table and four tagged tables that are respectively indexed by the indexes 1131, and tags of the four tagged tables are compared with the tags 1132. In one embodiment, the CBP 1142 may be a predictor that employs any of various well-known tagged table-based history length branch prediction methods. When accessed, the CBP 1142 provides a conditional branch direction 442 that is provided to the next FBSA formation logic 408. Advantageously, because the SCP 1001 provides a HNFAI[J−1] each clock cycle which the UBHFHL 1173 hashes into the index 1131, an access to the CBP 1142 may be initiated each clock cycle, which enables the CBP 1142 to provide a conditional branch direction 442 each clock cycle, which may be used by the FBD formation logic 406 to provide a FBD 191 each clock cycle.

The UBHFHL 1173 hashes the HNFAI[J−1] with varying lengths of combined updated GHist and IPHist (e.g., 5, 15, 43 bits) to generate indexes 1133 that are provided to the IBP 1144. The UBHFHL 1173 hashes the HNFAT[J−1] with varying lengths of combined updated GHist and IPHist (e.g., 5, 15, 43 bits) to generate tags 1134 that are provided to the IBP 1144. In one embodiment, the IBP 1144 comprises three tagged tables that are respectively indexed by the indexes 1133, and tags of the three tagged tables are compared with the tags 1134. In one embodiment, the IBP 1144 may also employ tagged table-based history length branch prediction methods. In one embodiment, the IBP 1144 only handles demonstrated polymorphic branches, whereas monomorphic branches are handled by the FBP 152 that effectively serves as a bimodal table. When accessed, the IBP 1144 provides an indirect branch target address 444 that is provided to the next FBSA formation logic 408. Advantageously, because the SCP 1001 provides a HNFAI[J−1] each clock cycle which the UBHFHL 1173 hashes into the index 1133, an access to the IBP 1144 may be initiated each clock cycle, which enables the IBP 1144 to provide an indirect branch target address 444 each clock cycle, which may be used by the FBD formation logic 406 to provide a FBD 191 each clock cycle.

The FBP 152 is indexed by the HNFAI[J−1], and tags of the set selected by the HNFAI[J−1] are compared with the HNFAT[J−1] to determine whether the lookup results in a hit in the FBP 152 and, if so, the hit FBP entry 200 is provided as outputs 422-434 of FIG. 4A. The outputs 422-434 of the FBP 152 are also provided to the FBD formation logic 406 and to the next FBSA formation logic 408. Advantageously, because the SCP 1001 provides a HNFAI[J−1] each clock cycle, an access to the FBP 152 may be initiated each clock cycle, which enables the FBP 152 to provide a FBP entry 200 each clock cycle, which may be used by the FBD formation logic 406 to provide a FBD 191 each clock cycle.

The MTR 173 is indexed by bits of the HNFAI[J−1], which is the HCFAI[J]. In an embodiment, the MTR tags 332 of the set of MTR entries 330 selected by the HCFAI[J] are compared with the tag bits of the current FBSA[J] to determine whether the lookup results in a hit in the MTR 173 and, if so, the MOC hit indicator 414 is true and the hit MOC entry 330 is provided as outputs initial MDR pointers 436, numMDREs 439, numFBlks 435, and training fields 431 of FIG. 4A. Advantageously, because the SCP 1001 provides a HNFAI[J−1] each clock cycle, an access to the MTR 173 may be initiated each clock cycle, which enables the MTR 173 to provide an instance of the MOC hit 414, initial MDR pointers 436, numMDREs 439, numFBlks 435, and training fields 431 each clock cycle, which may be used by the FBD formation logic 406 to provide a FBD 191 each clock cycle and by the MTRE update logic 495 to generate the MTRE update output 497 to update an MTRE 330 in the MTR 173 and by the MOC build requestor 475 to generate a MOC build request 177 to the MBRF 179.

The RAP 1146 provides a return target address 446 that is provided to the next FBSA formation logic 408. If the termination type 434 predicted by the FBP 152 indicates the current FBlk is terminated by a return instruction, the RAP 1146 provides the top entry of its stack as the return target address 446 to the next FBSA formation logic 408. Conversely, if the termination type 434 predicted by the FBP 152 indicates the current FBlk is terminated by a call instruction, the current FBSA 412 is used to compute the return address, which is the address of next instruction after the call instruction, and the computed return address is pushed onto the stack of the RAP 1146. An access to the RAP 1146 may be initiated each clock cycle, which enables the RAP 1146 to provide a return target address 446 each clock cycle, which may be used by the FBD formation logic 406 to provide a FBD 191 each clock cycle.

The PC register 1193 holds the current FBSA 412 that is provided as an input to the FBD formation logic 406, the MTRE update logic 495, and the next FBSA formation logic 408. In one embodiment, the instruction set architecture (ISA) of the processor 100 supports instructions that are either two bytes long or four bytes long, and the ISA requires instructions to be aligned on two-byte address boundaries. Thus, the size of the PC 1193, as well as the size of fetch addresses (e.g., the current FBSA 412 and next FBSA 449), are N−1 bits, where N is the size of a virtual address. In the case of an event that requires the PC 1193 to be corrected, e.g., the DEC 112 or execution units 114 detect a misprediction by the FSPU 1102 (which may result in a micro-architectural abort process) or the SCP prediction check logic 1108 detects a misprediction by the SCP 1001, the control logic 1103 provides a correction PC 1113 to the mux 1111, which selects the correction PC 1113 for writing into the PC 1193. In this case, the execution-based training information 1185 or the FSPU-based training information 1187 may be provided to the control logic 1103 to train the SCP 1001. Additionally, in the case that the DEC 112 or execution units 114 detect a misprediction by the FSPU 1102, the FBP 152, RAP 1146, CBP 1142, and/or IBP 1144 may also be trained using the execution-based training information 1185. The FSPU 1102 may be stalled until the SCP 1001 is trained and the PRU 102 is restarted.

However, during normal operation the mux 1111 selects the next FBSA 449 that is provided by the next FBSA formation logic 408 for writing into the PC register 1193. In this manner, a single-cycle fetch address loop advantageously exists around the next FBSA formation logic 408 within the FSPU 1102, rather than a multi-cycle fetch address loop around the PRU 102 as in the embodiment of FIG. 4A as described above. The single-cycle hashed fetch address loop around the SCP 1001 and the single-cycle full fetch address loop around the next FBSA formation logic 408 operate in a pipelined fashion to facilitate the production of an FBD 191 each clock cycle, which facilitates the fetching by the pipelined IFU 106 each clock cycle of a FBlk of architectural instructions or a group of MDREs of MOPs (e.g., a pair of MOP triplets), as described above, to increase the likelihood that the back-end 130 is not starved.

As described above, the FBD formation logic 406 receives the current FBSA 412, the FBP hit indicator 422, the predicted set index 424, the predicted way number 426, the fetch block length 428, and the termination type 434, and gathers them to form a FBD 191 to push into an entry 300 of the FBD FIFO 104. During normal operation, e.g., as long as the FBD FIFO 104 is not full and no misprediction is detected that requires update of the PC 1193 (which may also involve training of the SCP 1001 and/or FSPU 1102), the FBD formation logic 406 provides a FBD 191 to the FBD FIFO 104 each clock cycle.

As described above, the next FBSA formation logic 408 receives the FBP hit indicator 422, the fetch block length 428, the PC-relative target address 432, the termination type 434, the conditional branch direction 442, the indirect target address 444, the return target address 446, and the current FBSA 412 and uses them to generate the next FBSA 449. During normal operation, e.g., as long as the FBD FIFO 104 is not full and no misprediction is detected that requires update of the PC 1193 (which may also involve training of the SCP 1001 and/or FSPU 1102), the next FBSA formation logic 408 provides a next FBSA 449 each clock cycle. If FBP hit 422 is false, the next FBSA formation logic 408 predicts a maximum length sequential termination type instruction fetch block. That is, the next FBSA formation logic 408 generates a value of the next FBSA 449 that is the sum of the FBSA 412 and the maximum fetch block length (e.g., 64 bytes). If FBP hit 422 is true, the next FBSA formation logic 408 generates the next FBSA 449 based on the termination type 434 and the remaining inputs. For example, if the termination type 434 indicates a PC-relative branch, then if the conditional branch direction 442 indicates "Taken," the next FBSA formation logic 408 outputs the PC-relative target address 432 as the next FBSA 449 and otherwise outputs the sum of the FBSA 412 and the fetch block length 428. If the termination type 434 indicates an indirect branch, the next FBSA formation logic 408 outputs the indirect branch target address 444 as the next FBSA 449. If the termination type 434 indicates a return instruction, the next FBSA formation logic 408 outputs the return target address 446 as the next FBSA 449. If the termination type 434 indicates a stop type instruction, the next FBSA formation logic 408 outputs the sum of the FBSA 412 and the fetch block length 428 as the next FBSA 449.

Additionally, the next FBSA formation logic 408 generates the BrDir-F indicator and the IndBr-F indicator each clock cycle. In one embodiment, the next FBSA formation logic 408 generates a value on the BrDir-F indicator that indicates Taken if the termination type 434 indicates a stop instruction, an unconditional branch instruction (e.g., call, return, indirect branch, unconditional jump), or a conditional branch instruction and the conditional branch direction 442 indicates Taken. Otherwise, the next FBSA formation logic 408 generates a value on the BrDir-F indicator that indicates Not Taken. In one embodiment, the next FBSA formation logic 408 generates a true value on the IndBr-F indicator if the termination type 434 indicates an indirect branch instruction, and otherwise generates a false value on the IndBr-F indicator. The next FBSA 449, the BrDir-F indicator, and the IndBr-F indicators are provided to the SCP prediction check logic 1108 each clock cycle and are used to update the restoration branch history 1107, as described above. Collectively, the next FBSA 449, the BrDir-F indicator, and the IndBr-F indicator are referred to as the FSPU prediction 1199, as shown in FIG. 11. In one embodiment, the next FBSA 449, the BrDir-F[J], the IndBr-F[J], and the termination type 434 are also provided to the mid-end 120 and the back-end 130 to enable them to detect a misprediction by the FSPU 1102.

The SCP prediction check logic 1108 also receives a HNFAI[J], a HNFAT[J], a BrDir-S[J], and a IndBr-S[J] from the SCP 1001 each clock cycle. Each clock cycle, the SCP prediction check logic 1108 compares the BrDir-F[J] and the IndBr-F[J] generated by the next FBSA formation logic 408 for a FBlk[J] against the BrDir-S[J] and the IndBr-S[J], respectively, that were output by the SCP 1001 earlier in the PRU 102 pipeline, e.g., 3 clock cycles earlier, as predictions of what will be produced by FBlk[J], as described in more detail below with respect to FIG. 12 and FIG. 13. If the comparison indicates a mismatch, the SCP prediction check logic 1108 provides FSPU-based training information 1187 to the control logic 1103 for training of the SCP 1001 as described above. Additionally, the SCP prediction check logic 1108 hashes the next FBSA 449 produced by FBlk[J] to generate a hashed index and a hashed tag which it compares against the HNFAI[J] and the HNFAT[J], respectively, that were output by the SCP 1001 as a prediction of a hash of the next fetch address produced by FBlk[J] earlier in the PRU 102 pipeline. If the comparison indicates a mismatch, the SCP prediction check logic 1108 provides FSPU-based training information 1187 to the control logic 1103 for training of the SCP 1001 as described above. In one embodiment, the HNFAT[J] need not be checked because a check of the HNFAI[J] suffices as a check of the HNFAT[J].

As described, the SCP 1001 is designed to provide a new prediction 1005 (e.g., HNFAI[J–1], HNFAT[J–1], BrDir-S [J–1], and IndBr-S[J–1]) associated with a new FBlk each clock cycle. The total round-trip time associated with the loop around the SCP 1001 is less than a clock cycle, e.g., setup time for the SCP 1001 input, the latency of the SCP 1001 from input to output of the entry 900 specified by the input (including tag comparison and muxing time in a set-associative embodiment), and the latency associated with the travel time around and through the mux 1171 back to the input of the SCP 1001.

FIG. 12 is an example block diagram illustrating stages of the pipeline of the PRU 102 of FIG. 11 in accordance with embodiments of the present disclosure. In the embodiment of FIG. 12, there are five stages of the PRU 102 pipeline, denoted PR1 1201, PR2 1202, PR3 1203, PR4 1204, and PR5 1205. However, other embodiments are contemplated in which the number of stages is different than five. Regardless of the number of stages, the SCP 1001 is a single-cycle predictor, although the FSPU 1102 may be a single-cycle or a multi-cycle predictor. That is, one or more clock cycles may be required from the time that the FSPU 1102 receives the SCP 1001 output 1005 until the next FBSA 449, BrDir-F[J], and IndBr-F[J] are generated and the next FBSA 449 is written to the PC 1193 and available as the current FBSA 412 to the next FBSA formation logic 408 and a FBD 191 is produced for writing into the FBD FIFO 104. Thus, the PRU 102 includes at least two stages, one for operation of the SCP 1001 and one or more for operation of the FSPU 1102.

In the PR1 1201 stage, an access is made to the SCP 1001 to obtain the HNFAI, HNFAT, BrDir-S, and IndBr-S produced by a previous FBlk, e.g., FBlk[J−1] as shown in FIG. 11. The SCP 1001 is accessed using at least a portion of the output 1005 generated by the SCP 1001 in the immediately previous clock cycle (e.g., eleven bits of the HNFAI[J−1]) that is fed back to the input 1003 of the SCP 1001. As described above, HNFAI and HNFAT are hashes of the next fetch address produced by the previous FBlk that are written into the SCP entry 900 during its training, and the BrDir-S and IndBr-S indicate values produced by the previous FBlk that are written into the SCP entry 900 during its training. The training of the SCP 1001 is also described below with respect to FIG. 14. During training, the next fetch address, the branch direction, and indirect branch indicator produced by the previous FBlk may be provided by the FSPU 1102, e.g., next FBSA 449, BrDir-F, and IndBr-F. Or the next fetch address, branch direction, and indirect branch indicator produced by the previous FBlk may be provided by the DEC 112, execution units 114, or PCL 132. The fetch address of the previous FBlk may also be provided and hashed in order to generate the input 1003 to the SCP 1001 for selecting the SCP entry 900 to be written, e.g., indicated on training index 1179.

In the PR2 1202 stage, the BrDir-S, IndBr-S, bits of the HNFAI, and the current branch history 1105 are used by the UBHFHL 1173 to produce an updated branch history, as described above with respect to FIG. 11. The UBHFHL 1173 then hashes the updated branch history with the HNFAI and the HNFAT to generate indexes 1131 and 1133 and tags 1132 and 1134 used to access the CBP 1142 and the IBP 1144, as described above with respect to FIG. 11. PR2 1202 is also used as setup time for accesses to the FSPU 1102 structures, e.g., RAMs of the MTR 173, the FBP 152, CBP 1142, and IBP 1144. In one embodiment, the RAP 1146 is a flip-flop-based structure, and PR2 1202 is also used as setup time for the flip-flops. Additionally, the current branch history 1105 is updated using the BrDir-S, IndBr-S, and bits of the HNFAI, as described above, e.g., the BrDir-S is shifted into the current GHist, a bit of the HNFAI is shifted into the current CPHist, and three bits of the HNFAI are shifted into the current IPHist if the IndBr-S indicates the previous FBlk was terminated by an indirect branch instruction.

In the PR3 1203 stage, the access to the MTR 173 and to the FBP 152 is initiated using the HNFAI, the access to the CBP 1142 is initiated using the index 1131, the access to the IBP 1144 is initiated using the index 1133, and the access to the top entry of the RAP 1146 stack is initiated. The accesses are initiated in order to obtain, in PR4 1204, the MOC hit indicator 414, the initial MDR pointers 436, the numMDREs 439, the FBP hit indicator 422, the predicted set index 424, the predicted way number 426, the fetch block length 428, the PC-relative target address 432, the termination type 434, the conditional branch direction 442, the indirect target address 444, and the return target address 446. In one embodiment, FBP tag comparisons may be started using the HNFAT obtained in PR1 1201 to select a FBP entry 200 to obtain the FBP hit indicator 422, the predicted set index 424, the predicted way number 426, the fetch block length 428, the PC-relative target address 432, and the termination type 434 for provision to the FBD formation logic 406 and the next FBSA formation logic 408. Additionally, the tags 1132 and 1134 generated in PR2 1202 may be used to start tag comparisons and table selections in the CBP 1142 and IBP 1144, respectively, to obtain the respective conditional branch direction 442 and the indirect target address 444 for provision to the next FBSA formation logic 408.

In the PR4 1204 stage, the tag comparisons and table selections started in PR3 1203 are completed to obtain the FBP 152, CBP 1142 and IBP 1144 outputs, and the return target address 446 is obtained from the RAP 1146 all for provision to the next FBSA formation logic 408. Furthermore, the tag comparison of the tag portion of the current FBSA 412 with the MTR tags 332 is made to obtain the MOC hit indicator 414, the initial MDR pointers 436 and the numMDREs 439 for provision to the FBD formation logic 406. Also, the current FBSA 412—i.e., the full fetch address of the current FBlk, which is the next FBSA 449 generated by PR4 1204 in the previous clock cycle and fed back to PR4 in this clock cycle—is read from the PC 1193 by the FBD formation logic 406 and next FBSA formation logic 408. The next FBSA formation logic 408 uses its received inputs to predict the next FBSA 449, BrDir-F, and IndBr-F produced by the current FBlk, i.e., the FBlk whose fetch address was hashed for use as an index (HCFAI) to initiate accesses to the FSPU 1102 in PR3 1203 and whose fetch address was hashed for use as a tag (HCFAT) to perform tag compares completed in PR4 1204. Additionally, the FBD formation logic 406 uses its received inputs to form a FBD 191 that describes the current FBlk (which may be a ME 350 into which the architectural instructions of one or more FBlks have been decoded and fused into MOPs), including the FSI 314, and pushes the formed FBD 191 into the FBD FIFO 104. Still further, the restoration branch history 1107 is updated using the next FBSA 449, BrDir-F, and IndBr-F as described above. Finally, the RAP 1146 is updated as needed, i.e., if the instruction terminating the current FBlk is a return instruction then the top entry of the RAP 1146 is popped, and if the instruction terminating the current FBlk is a call instruction then a return address is computed and pushed onto the top entry of the RAP 1146.

In the PR5 1205 stage, the SCP prediction check logic 1108 checks for a misprediction by the SCP 1001. More specifically, the SCP prediction check logic 1108 compares the "correct" BrDir-F and IndBr-F that in the previous clock cycle in PR4 1204 the FSPU 1102 predicted will be produced by the current FBlk against the BrDir-S and IndBr-S, respectively, that 3 clock cycles earlier in PR1 1201 the SCP 1001 predicted will be produced by the current FBlk and that were fed forward to PR5 1205 to be checked this clock cycle. Additionally, the SCP prediction check logic 1108 hashes (in one embodiment the VMID and privilege mode are also hashed, as described above) the next FBSA 449 that in the previous clock cycle in PR4 1204 the FSPU 1102 predicted will be produced by the current FBlk to generate a "correct" HNFAI and HNFAT. The SCP prediction check logic 1108 then compares the "correct" HNFAI and HNFAT against the HNFAI and HNFAT, respectively, that 3 clock cycles earlier in PR1 1201 the SCP 1001 predicted will be produced by the current FBlk and that were fed forward to PR5 1205 to be checked this clock cycle. If the SCP prediction check logic 1108 determines that the SCP 1001 mis-predicted: the PRU 102 pipeline is flushed, the SCP 1001 is trained, the current branch history 1105 is restored from the restoration branch history 1107, and the PRU 102 is restarted using the "correct" next FBlk information, as described in more detail below with respect to FIG. 14. In one embodiment, the PR5 1205 stage overlaps with the first stage of the IFU 106 of FIG. 5 such that the first stage of the IFU 106 may start its process of fetching the current FBlk based on the FBD 191 that describes the current FBlk and that was generated the previous clock cycle. Additionally, in an embodiment, in the PR5 1205 stage, the MOC build requestor 475 may generate a MOC build request 177, e.g., a MBRFE 2100 of FIG. 21, and push the MBRFE into the MBRF 179 to instruct the AFE 181 to build an ME 350 (i.e., SF-ME or MF-ME) as needed, which is described in more detail below.

Figure 13:
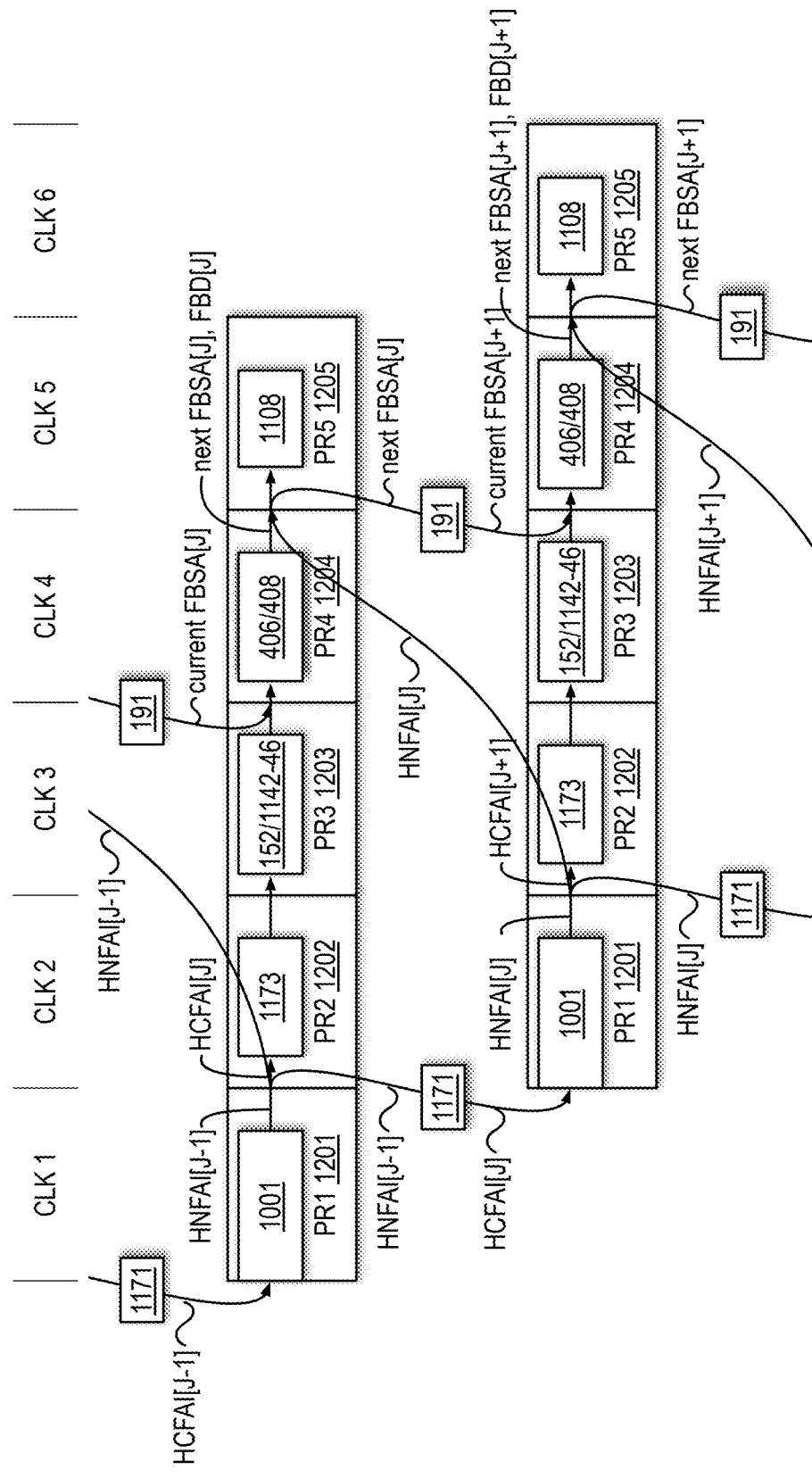
FIG. 13 is example pipeline timing diagram illustrating operation of the PRU of FIG. 11 and its pipeline of FIG. 12 in accordance with embodiments of the present disclosure.

As may be understood from FIG. 12 and FIG. 13, although not shown, the PRU 102 may include pipeline stage registers or other sequential logic circuits that form the PRU 102 pipeline stages. For example, in one embodiment, the mux 1171 may be a muxed-register. Alternatively, the SCP 1001 RAM may include sequential logic circuits that receive the HCFAI during the setup time and latch in the value at the rising edge of the clock cycle. For another example, staging registers may be included at the input to the UBHFHL 1173, the FBD formation logic 406, the next FBSA formation logic 408, and the SCP prediction check logic 1108. For another example, a series of staging registers may feed forward the HNFAI, HNFAT, BrDir-S, and IndBr-S to the SCP prediction check logic 1108. Finally, the PC 1193 may operate as a staging register.

As may be observed from the description of FIG. 11, as well as from the description of the remaining Figures, for a first series of clock cycles the SCP 1001 provides to the FSPU 1102 a first series of predictions (e.g., HNFAI, HNFAT, BrDir-S, and IndBr-S) associated with a series of FBlks. The first series of predictions includes the information needed by the FSPU 1102 to initiate its lookups during a second series of clock cycles that follows the first series of clock cycles (e.g., by two clock cycles between the PR1 and PR3 stages in the example of FIG. 12) and to provide a second series of predictions and a series of FBDs 191 during a third series of clock cycles that follows the first series of clock cycles by a latency of the FSPU 1102, e.g., 3 clock cycles in the embodiment of FIG. 12, to facilitate a fetch of a FBlk each clock cycle from the instruction cache 101 to reduce the likelihood that the back-end 130 is starved.

In one embodiment, depending upon the contents of the FBlk, the branch history update information may be determined by the DEC 112 at instruction decode time, rather than by the EUs 114 at instruction execution time. For example, in the case of an FBlk having no branch instructions, the DEC 112 may be able to determine, without the need to execute the instructions in the FBlk, the length of the FBlk, that the termination type is sequential, that the branch direction is not taken, and that there is no indirect branch instruction present in the FBlk. Thus, in the context of SCP embodiments, the terms execution or executing should be understood to include decode or decoding and/or execution or executing.

FIG. 13 is an example pipeline timing diagram illustrating operation of the PRU 102 of FIG. 11 and its pipeline of FIG. 12 in accordance with embodiments of the present disclosure. Operation of the PRU 102 pipeline is illustrated in FIG. 13 by describing the processing of a series of predictions associated with a series of successive FBlks in program execution order during a series of six successive clock cycles to provide a series of successive FBDs 191. The series of successive FBlks are referred to as FBlk[J−1], FBlk[J], and FBlk[J+1]. The series of six successive clock cycles are denoted CLK1 through CLK6. The series of successive FBDs 191 are referred to as FBD[J] and FBD[J+1]. More specifically, during a first series of successive clock cycles CLK1 and CLK2 that continues on until a terminating event (e.g., a misprediction is detected, or an abort occurs), the SCP 1001 provides a series of outputs associated with the series of FBlks. Each of the outputs includes a HNFAI, as well as a HNFAT, a BrDir-S, and a IndBr-S which are not shown in FIG. 13. The FSPU 1102 uses the series of SCP 1001 outputs to provide the series of FBDs on a second series of successive clock cycles CLK4 and CLK5 that continues on until a terminating event.

The series of FBDs are used by the IFU 106 to fetch successive FBlks from the instruction cache 101 or from the MDR 175. In one embodiment, as described above with respect to FIG. 12, the first stage of the IFU 106 overlaps with the PR5 1205 stage of the PRU 102 pipeline, i.e., the prediction check stage. Therefore, advantageously the first stage of the IFU 106 may start its process of fetching previous FBlk[J] described by FBD[J] during CLK5 and may start its process of fetching current FBlk[J+1] described by FBD[J+1] during CLK6.

The operation of each pipeline stage is described with respect to FIG. 12. Therefore, the description of FIG. 13 is focused on the interactions between pipeline stages with respect to the predicting of different FBlks in the series of FBlks rather than describing the operation of each pipeline stage in detail.

In FIG. 13, various signals/outputs/values of FIG. 11 are referred to with a suffix in square brackets. For example, HCFAI[J−1] refers to the hashed current fetch address index of FBlk[J−1], which is also the prediction made by the SCP 1001 of the HNFAI produced by FBlk[J−2]; HNFAI[J−1] refers to the prediction made by the SCP 1001 of the hashed next fetch address index produced by FBlk[J−1], which is also the HCFAI of FBlk[J], denoted HCFAI[J]; HNFAI[J] refers to the prediction made by the SCP 1001 of the hashed next fetch address index produced by FBlk[J], which is also the HCFAI of FBlk[J+1], denoted HCFAI[J+1]; HNFAI[J+1] refers to the prediction made by the SCP 1001 of the hashed next fetch address index produced by FBlk[J+1], which is also the HCFAI of FBlk[J+2], denoted HCFAI[J+2] (not shown); current FBSA[J] refers to the current FBSA 412 of FBlk[J] provided by PC 1193; next FBSA[J] refers to the prediction made by the FSPU 1102 of the next FBSA 449 produced by FBlk[J], which is also the current FBSA 412 of FBlk[J+1], denoted current FBSA[J+1], after being piped through PC 1193, as shown.

As illustrated by the example, the second series of successive clock cycles CLK4 through CLK5 in which the series of FBD[J] and FBD[J+1] are provided follows the first series of successive clock cycles CLK1 through CLK2 in which the series of SCP 1001 outputs 1005 are provided by a three-clock pipeline latency of the FSPU 1102. Although the PRU 102 pipeline embodiment of FIG. 12 includes a three-clock pipeline latency of the FSPU 1102, other embodiments are contemplated in which the pipeline latency of the FSPU 1102 is different than three clocks, although the pipeline latency is at least one clock. For example, as described above, the access to the SCP 1001 in PR1 1201 in CLK1 provides the information for (1) setting up and starting the lookups in the FBP 152, CBP 1142, and IBP 1144 for FBlk[J] and for (2) setting up the next SCP 1001 access in PR1 1201 in CLK2 for FBlk[J]. The latter is a single-cycle loop timing path from the SCP 1001 output 1005 back around to the SCP 1001 input 1003 after passing through the input mux 1171. Whereas the former, in the embodiment of FIGS. 12 and 13, requires an extra clock cycle of timing from SCP 1001 output 1005 to the inputs of the RAMs of the FBP 152, CBP 1142, and IBP 1144, which is provided by PR2 1202. However, other embodiments are contemplated in which the timing is such that the PR2 1202 stage may be omitted, e.g., the SCP 1001 output 1005 occurs soon enough in the PR1 1201 cycle and/or the setup time of the RAMs is small enough and/or the propagation delay through the UBHFHL 1173 is small enough and/or the lookup time in the RAMs is fast enough such that the lookups in the FBP 152, CBP 1142, and IBP 1144 could be started in the immediately next clock cycle in the immediately next stage after PR1 1201, i.e., the PR2 1202 stage is not needed, such that the pipeline latency is only two clocks. Finally, other embodiments are contemplated in which the pipeline latency is only one clock.

During CLK1, PR1 1201 uses HCFAI[J−1] to access the SCP 1001 to obtain HNFAI[J−1] produced by FBlk[J−1] (as well as HNFAT[J−1], BrDir[J−1], and IndBr[J−1], not shown). HCFAI[J−1] is the HNFAI[J−2] (not shown) produced by FBlk[J−2] that was output by the SCP 1001 on the clock cycle previous to CLK1 and fed back through mux 1171 to the input of the SCP 1001 for use by PR1 1201 in CLK1. HNFAI[J−1] is fed back through mux 1171 as HCFAI[J] to the input of the SCP 1001 for use by PR1 1201 during CLK 2. HNFAI[J−1] is also fed forward through pipeline staging registers (not shown) for use by PR5 1205 during CLK 4 (not shown). HNFAI[J−1] is also fed forward for use by PR2 1202 during CLK 2, in which HNFAI[J−1] is denoted HCFAI[J] having passed through a pipeline staging register (not shown).

During CLK2, PR1 1201 uses HCFAI[J] to access the SCP 1001 to obtain HNFAI[J] produced by FBlk[J] (as well as HNFAT[J], BrDir[J], and IndBr[J], not shown). HNFAI[J] is fed back through mux 1171 as HCFAI[J+1] (not shown) to the input of the SCP 1001 for use by PR1 1201 during CLK 3. HNFAI[J−1] is also fed forward through pipeline staging registers (not shown) for use by PR5 1205 during CLK 5. HNFAI[J−1] is also fed forward for use by PR2 1202 during CLK 3, in which HNFAI[J] is denoted HCFAT[J+1] having passed through a pipeline staging register (not shown). Additionally, in CLK2, PR2 1202 uses HCFAI[J] (as well as HCFAT[J], BrDir-S[J−1], IndBr-F[J−1], and current branch history 1105, not shown) to generate the updated branch history with which to hash the HCFAI[J] and HCFAT[J] to generate indexes 1131 and 1133 and tags 1132 and 1134 of FIG. 11 that are piped forward for use by PR3 1203 in CLK3.

In CLK3, PR2 1202 uses HCFAI[J+1] (as well as HCFAT [J+1], BrDir-S[J], IndBr-F[J], and current branch history 1105, not shown) to generate the updated branch history with which to hash the HCFAI[J+1] and HCFATT[J+1] to generate indexes 1131 and 1133 and tags 1132 and 1134 of FIG. 11 that are piped forward for use by PR3 1203 in CLK4. Additionally, in CLK3, PR3 1203 uses indexes 1131 and 1133 generated in CLK 2 by PR2 1202 to initiate lookups in the FBP 152, CBP 1142 and IBP 1144, and uses the tags 1132 and 1134 generated in CLK 2 by PR2 1202 to start tag comparisons.

In CLK4, PR3 1203 uses indexes 1131 and 1133 generated in CLK 2 by PR2 1202 to initiate lookups in the FBP 152, CBP 1142 and IBP 1144, and uses the tags 1132 and 1134 generated in CLK 2 by PR2 1202 to start tag comparisons. Additionally, in CLK4, PR4 1204 uses the current FBSA[J] received from PC 1193 (which the PC 1193 received as next FBSA[J−1] predicted by the FSPU 1102 in CLK3, not shown) along with the outputs of the FBP 152, CBP 1142, IBP 1144, and RAP 1146 to form the next FBSA[J] (and the BrDir-F[J] and the IndBr-F[J], not shown) and to form the FBD[J]. The next FBSA[J] predicted in CLK4 by PR4 1204 is forwarded through PC 1193 and received as current FBSA[J+1] by PR4 1204 for use in CLK5.

In CLK5, PR4 1204 uses the current FBSA[J+1] received from PC 1193 along with the outputs of the FBP 152, CBP 1142, IBP 1144, and RAP 1146 to form the next FBSA[J+1] (and the BrDir-F[J+1] and the IndBr-F[J+1], not shown) and to form the FBD[J+1]. The next FBSA[J+1] predicted in CLK5 by PR4 1204 is forwarded through PC 1193 and received as current FBSA[J+2](not shown) by PR4 1204 for use in CLK6 (not shown). Additionally, in CLK5, PR5 1205 uses the next FBSA[J] predicted by the FSPU 1102 in CLK4 to check the HNFAI[J] predicted by the SCP 1001 in PR1 1201 during CLK2 and fed forward (via pipeline staging registers, not shown) to PR5 1205 for use during CLK5. Additionally, although not shown, in CLK5, PR5 1205 uses the BrDir-F[J] and IndBr-F[J] predicted by the FSPU 1102 in CLK4 to check the BrDir-S[J] and IndBr-S[J] predicted by the SCP 1001 in PR1 1201 during CLK2 and fed forward to PR5 1205 for use during CLK5.

In CLK6, PR5 1205 uses the next FBSA[J+1] predicted by the FSPU 1102 in CLK5 to check the HNFAI[J+1] predicted by the SCP 1001 in PR1 1201 during CLK3 and fed forward (via pipeline staging registers, not shown) to PR5 1205 for use during CLK6. Additionally, although not shown, in CLK6, PR5 1205 uses the BrDir-F[J+1] and IndBr-F[J+1] predicted by the FSPU 1102 in CLK5 to check the BrDir-S[J+1] and IndBr-S[J+1] predicted by the SCP 1001 in PR1 1201 during CLK3 and fed forward to PR5 1205 for use during CLK6.

As shown in FIG. 11, the next FBSA[J]449 output by the next FBSA formation logic 408 is fed back to its input through the PC 1193 register as current FBSA[J]412. This is illustrated in FIG. 13. For example, next FBSA[J] predicted by PR4 1204 in CLK4 is fed back as an input current FBSA[J+1] to PR4 1204 in CLK5, for example, to be used to form next FBSA[J+1]. Thus, rather than a multi-cycle fetch address loop as exists in the embodiment of FIG. 4A, there effectively exists a single-cycle fetch address loop within the FSPU 1102, which is made possible by the presence of the SCP 1001 single-cycle hashed index loop, as described above.

Figure 14:
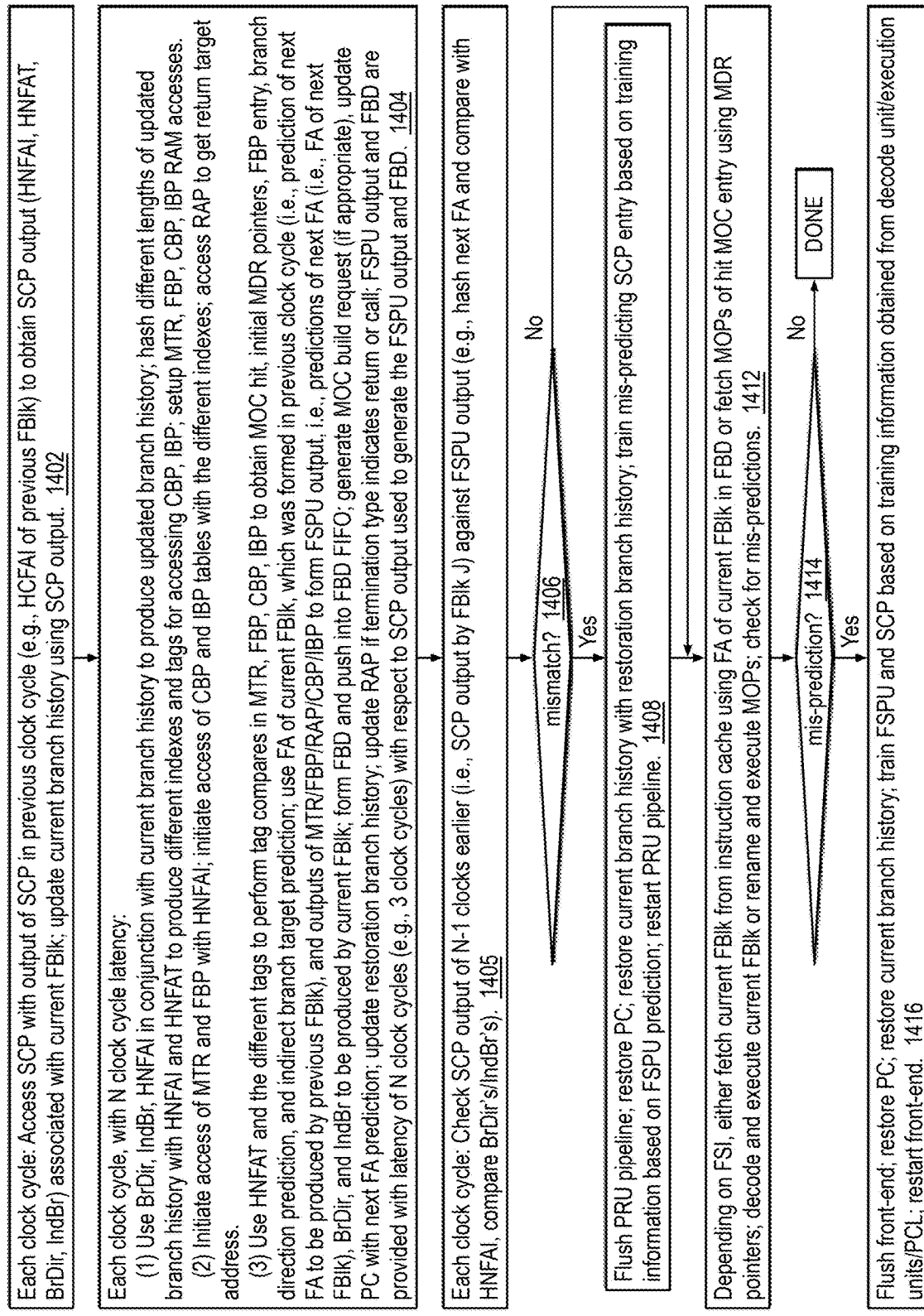
FIG. 14 is an example flow diagram illustrating operation of the PRU of FIG. 11 and its pipeline of FIG. 12 in accordance with embodiments of the present disclosure.

FIG. 14 is an example flow diagram illustrating operation of the PRU 102 of FIG. 11 and its pipeline of FIG. 12 in accordance with embodiments of the present disclosure. Operation begins at block 1402.

At block 1402, each clock cycle the SCP 1001 is accessed with the output 1005 of the SCP 1001, or at least a portion thereof, in the previous clock cycle, to obtain the output 1005 associated with a current FBlk, i.e., produced by the previous FBlk that immediately precedes the current FBlk in program execution order. The obtained output is referred to in FIG. 11 as HNFAI[J−1], HNFAT[J−1], BrDir-S[J−1], and IndBr-S[J−1]. In one embodiment, eleven bits of thirteen bits of the HNFAI are fed back to mux 1171. That is, the SCP 1001 is accessed with a hash of the fetch address of the previous FBlk. Additionally, each clock cycle, the current branch history 1105 is updated using the SCP 1001 output 1005, as described above. Operation proceeds to block 1404.

At block 1404, each clock cycle, the FSPU 1102 performs the following operations with a latency of N clock cycles, where N is at least one. First, the FSPU 1102 uses the HNFAI[J−1], BrDir-S[J−1], and IndBr-S[J−1], in conjunction with the current branch history 1105, to generate an updated branch history, as described above. Additionally, different lengths of the updated branch history are hashed with the HNFAI[J−1] and HNFAT[J−1] to produce different indexes (e.g., 1131 and 1133 of FIG. 11) and tags (e.g., 1132 and 1134 of FIG. 11) for accessing the CBP 1142 and IBP 1144. Still further, the MTR 173 and FBP 152 RAMs are setup using the HNFAI[J−1], and the CBP 1142 and IBP 1144 RAMs are setup using the different indexes. Second, the accesses to the MTR 173, FBP 152, CBP 1142, and IBP 1144 setup earlier are initiated. Additionally, the RAP 1146 is accessed to obtain the prediction of the return target address 446. Third, the HNFAT[J−1] and the different tags are used to perform tag comparisons in the FBP 152, CBP 1142, and IBP 1144 to obtain the FBP entry 422-434, the branch direction prediction 442, and the indirect branch target address prediction 444. Furthermore, the MTR 173 tag comparisons are made to generate the MOC hit indicator 414, the initial MDR pointers 436 and the numMDREs 439 for provision to the FBD formation logic 406. Additionally, the fetch address of the current FBlk (e.g., current FBSA 412 of FIG. 11) formed in the previous clock cycle (e.g., as next FBSA 449 of FIG. 11, which is a prediction of the next fetch address produced by the previous FBlk) and the predictions made by the FBP 152, CBP 1142, IBP 1144, and RAP 1146 are used to form the FSPU 1102 output (e.g., 1199 of FIG. 11). The FSPU 1102 output includes predictions of a next fetch address (e.g., next FBSA[J] 449), branch direction (e.g., BrDir-F[J]), and indirect branch indicator (e.g., IndBr-F[J]) to be produced by the current FBlk when subsequently fetched and executed. Still further, a FBD (e.g., FBD 191 of FIG. 11) that includes the FSI 314 is formed (e.g., by FBD formation logic 406 of FIG. 11) and pushed into the FBD FIFO 104. If the HFB indicator 318 is true, the MOC build requestor 475 generates a MOC build request 177 as described above, e.g., associated with an SF-ME as described with respect to FIG. 23. Furthermore, if the training fields 331 indicate the need to build an MF-ME, the MOC build requestor 475 may generate a MOC build request 177 as described, e.g., with respect to FIG. 25, FIG. 33, FIG. 39, and FIG. 40. Additionally, the program counter (e.g., PC 1193 of FIG. 11) is updated with the predicted next fetch address, the restoration branch history 1107 is updated as described above, and the RAP 1146 is updated if the current FBlk is terminated by a return or call instruction. The FSPU 1102 output 1199 and the FBD 191 are provided with a latency of N clock cycles relative to the SCP 1001 output 1005 that was used to generate the FSPU 1102 output 1199 and the FBD 191. Operation proceeds to block 1405.

At block 1405, each clock cycle, the FSPU 1102 prediction 1199 generated in a given clock cycle is used to check the SCP 1001 prediction 1005 generated N−1 clock cycles earlier. More specifically, the prediction of the next FBSA 449 produced by a FBlk is hashed (in the same manner that a fetch address is hashed for writing into the HNFAI 902 of an SCP entry 900) and the result is compared against prediction made by the SCP 1001 N−1 clock cycles earlier of the HNFAI produced by the FBlk; the prediction of the BrDir-F produced by the FBlk is compared against the prediction made by the SCP 1001 N−1 clock cycles earlier of the BrDir-S produced by the FBlk; and the prediction of the IndBr-F produced by the FBlk is compared against the prediction made by the SCP 1001 N−1 clock cycles earlier of the IndBr-S produced by the FBlk. Operation proceeds to decision block 1406.

At decision block 1406, if a mismatch was detected in block 1405, operation proceeds to block 1408; otherwise, operation proceeds to block 1412.

At block 1408, the PRU 102 pipeline is flushed in response to the detection of the misprediction by the SCP 1001 at block 1406. That is, results flowing down the pipeline are invalidated, and the pipeline is stalled until its restart, which is described below. The PC 1193 is restored (e.g., by the control logic 1103 of FIG. 11) with the correction PC 1113 of FIG. 11. In one embodiment, previous values of the PC 1193 are saved by the SCP prediction check logic 1108 to facilitate restoration of the PC 1193. The current branch history 1105 is restored with the restoration branch history 1107. The SCP entry 900 that made the misprediction is trained—assuming the useful bit 912 is false, as described above—with training information based on the FSPU 1102 prediction 1199 (e.g., FSPU-based training information 1187 of FIG. 11), which is assumed to be more accurate than the SCP 1001 prediction 1005. The FSPU-based training information 1187 includes the BrDir-F and IndBr-F predicted by the FSPU 1102 used to check the SCP 1001 prediction at block 1405, and the next FBSA 449 predicted by the FSPU 1102 that may be hashed (i.e., a HNFAI and a HNFAT) by the control logic 1103 and written into the mis-predicting SCP entry 900. The FSPU-based training information 1187 also includes the current FBSA 412, which is the current FBlk fetch address that may be hashed to generate the HCFAI that may be used as the input 1003 to the SCP 1001 (e.g., provided on training index 1179 of FIG. 11) to select the mis-predicting SCP entry 900. In an alternate embodiment, the hashes themselves of the next FBSA 449 and current FBSA 412 are included in the FSPU-based training information. In an alternate embodiment, the SCP prediction check logic 1108 receives a piped-down version of the HCFAI that was used to perform the lookup in the SCP 1001 and includes the HCFAI in the FSPU-based training information 1187 for use by the control logic 1103 to output on the training index 1179 to train the mis-predicting entry 900 of the SCP 1001. Finally, the PRU 102 pipeline is restarted as follows. In one embodiment, the PRU 102 also includes a mux (not shown in FIG. 11) whose output is coupled to the input of the FSPU 1102. The mux receives the output 1005 of the SCP 1001 and also receives a restart output (not shown in FIG. 11) from the control logic 1103. The restart output includes the HNFAI, HNFAT, BrDir-F and IndBr-F included in the FSPU-based training information 1187. The control logic 1103 provides the restart output to the mux (not shown) and causes the mux to select the restart output for provision to the FSPU 1102 (rather than the output 1005 of the SCP 1001). In one embodiment, the SCP 1001 is effectively skipped on the first clock cycle when restarting the PRU 102 pipeline, and the restart HNFAI provided to the mux as part of the restart output in the first restart clock cycle is fed back through mux 1171 as the SCP 1001 input 1003 for the second restart clock cycle.

At block 1412, the FBlk described by the FBSA 312 of the FBD pushed into the FBD FIFO in block 1404 is fetched from the MDR 175 if the FSI 514 indicates the MOC 171 or is fetched from the instruction cache 101 if the FSI 514 indicates the instruction cache 101. More specifically, if the FSI 514 indicates the MOC 171, MDREs 340 pointed to by the initial MDR pointers 436 of the hit MTR 173 entry 330 are fetched from the MDR 175, and MDREs 340 pointed to by the next MDR pointers 344 of entries fetched from the MDR 175 are fetched from the MDR 175 until all the MDREs 340 specified by the numMDREs 439 have been fetched; and if the FSI 514 indicates the instruction cache 101, the architectural instructions of the FBlk are fetched from the instruction cache 101. Subsequently, the MOPs fetched from the MDR 175 or the MOPs into which the fetched architectural instructions are decoded are executed (e.g., by DEC 112 and execution units 114). Finally, the results of the execution of the MOPs of the FBlk are used to check whether the FSPU 1102 predictions made in block 1404 were incorrect. Operation proceeds to decision block 1414.

At decision block 1414, if a misprediction at block 1412 was detected, operation proceeds to block 1416.

At block 1416, the front-end 110 is flushed. Additionally, the PC 1193 and the current branch history 1105 are restored using values provided by the DEC 112, execution units 114, or PCL 132 (e.g., execution-based training information 1185 of FIG. 11). Still further, the SCP entry 900 implicated by the mis-predicted FBlk is trained using the execution-based training information 1185, and relevant predictors of the FSPU 1102 implicated by the mis-predicted FBlk (e.g., FBP 152, CBP 1142, IBP 1144, RAP 1146) are trained using the execution-based training information 1185. Finally, the front-end 110 is restarted, which includes restarting the PRU 102 similar to the manner described above with respect to block 1408.

In one embodiment, the FSPU misprediction penalty (e.g., 25 clock cycles) is much larger than the SCP misprediction penalty (e.g., 4 clocks). So, even though the SCP misprediction rate may be higher than the FSPU misprediction rate, as long as the SCP misprediction rate is not too much higher than the FSPU misprediction rate, the embodiments that include the SCP may achieve higher instructions per clock (IPC) than conventional solutions that have a high prediction accuracy but only generate fetch block descriptors at a rate of 1/N per clock cycle where N is greater than one, or that generate fetch block descriptors at a rate of 1 per clock cycle but as a result have a relatively low prediction accuracy.

FIG. 15 is an example block diagram illustrating operation of the processor 100 of FIG. 1 in accordance with embodiments of the present disclosure. As described above, in the example of FIG. 15, the initial MDR pointer 336 group size (G) is one, and the MDR 175 pipeline latency is two such that the number of initial MDR pointers 336 is two, which are designated first initial MDR pointer and second initial MDR pointer in FIG. 15 according to program order, i.e., the first initial MDR pointer points to the first MDRE in program order of the ME 350, and the second initial MDR pointer points to the second MDRE in program order of the ME 350.

FIG. 15 shows at the top a sequence of FBDs 191 provided by the PRU 102 in program order to the FBD FIFO 104 and which are consumed from the FBD FIFO 104 in program order by the IFU 106. In the example of FIG. 15, ten FBDs 191 are shown in the sequence and are referred to as A through J. In the example of FIG. 15, the value of the FSI 314 of each of the ten FBDs is shown either by an "M" that indicates the MOC 171 or by an "I" that indicates the instruction cache 101. More specifically, the FSI 314 indicates the MOC 171 in FBDs A, C, H, I, and J, whereas the FSI 314 indicates the instruction cache 101 in FBDs B, D, E, F, and G. In the example of FIG. 15, the value of numMDREs 319 in each of FBDs A, C, H, I, and J is also shown.

FIG. 15 also shows at the left side the instruction cache 101 of FIG. 1 as a 4-way set associative cache with entries holding the architectural instructions of FBlks A through J, i.e., the FBlks described by FBDs A through J. Each of FBlks A through J is described by its corresponding FBD 191 A through J. Additionally, because the FSI 314 indicates the MOC 171 in FBDs A, C, H, I, and J, the corresponding FBDs 191 A, C, H, I, and J also describe some characteristics of a MOC entry 350 associated with the corresponding FBlks A, C, H, I, and J such as the initial MDR pointers 316 and the number of MDREs 340 of the MOC entry 350 (indicated by the numMDREs 319). As shown, the number of MDREs of MOC entry A is 4, the number of MDREs of MOC entry C is 1, the number of MDREs of MOC entry H is 2, the number of MDREs of ME I is 1, the number of MDREs of MOC entry J is 1. The MDREs may be associated with an SF-ME or with an MF-ME.

FIG. 15 also shows at the right side the MDR 175 of FIG. 1 with MDREs 340 holding the MOPs of the MEs 350 that are described by FBDs A, C, H, I, and J. In the example of FIG. 15, the four MDREs of the ME 350 associated with FBlk A are denoted A[0], A[1], A[2], and A[3] in program order in FIG. 15. The two MDREs of the ME 350 associated with FBlk H are denoted H[0] and H[1] in program order in FIG. 15. The one MDRE of the ME 350 associated with each of FBlks C, I, and J are denoted respectively C[0], I[0], and J[0]. As shown, the first initial MDR pointer 316 of the FBD 191 associated with FBlk A points to MDRE A[0], the second initial MDR pointer 316 of the FBD 191 associated with FBlk A points to MDRE A[1], the next MDR pointer 344 of A[0] points to A[2], and the next MDR pointer 344 of A[1] points to A[3] such that the MOPs of the ME 350 associated with FBlk A are fetched in program order for provision to the FBlk FIFO 108 in program order. More specifically, during a first clock cycle MDRE A[0] is fetched using the first initial MDR pointer of FBlk A, during a second clock cycle MDRE A[1] is fetched using the second initial MDR pointer of FBlk A, during a third clock cycle MDRE A[2] is fetched using the next MDR pointer of MDRE A[0], and during a fourth clock cycle MDRE A[3] is fetched using the next MDR pointer of MDRE A[1], as described in more detail below with respect to FIG. 16. Furthermore, the first initial MDR pointer 316 of the FBD 191 associated with FBlk H points to MDRE H[0], and the second initial MDR pointer 316 of the FBD 191 associated with FBlk H points to MDRE H[1] such that the MOPs of the ME 350 associated with FBlk H are fetched in program order for provision to the FBlk FIFO 108 in program order. The only initial MDR pointer 316 of the FBD 191 associated with each of FBlks C, I, and J points respectively to MDRE C[0], I[0], and J[0]. As shown in the example of FIG. 15, the MDREs 340 are managed as a pool, and any MDRE 340 of the pool may be pointed to by the initial MDR pointer 336 of any MTRE 330 or by the next MDR pointer 344 of any MDRE 340.

FIG. 15 also shows at the bottom a sequence of fetched FBlks A through J, more specifically either the fetched MDREs 340 of MOPs of the respective FBlk or the fetched AIs of the FBlk. As shown, fetched in program order for provision to the FBlk FIFO 108 for consumption by the DEC 112 are the MOPs of MDREs A[0], A[1], A[2], A[3] followed by the AIs of FBlk B, followed by the MOPs of MDRE C[0], followed by the AIs of FBlks D through G, followed by the MOPs of MDREs H[0], H[1], I[0], J[0].

In an embodiment in which the AFE 181 builds MF-MEs, when the PRU 102 detects the presence of an MF-ME in the program instruction stream, because the MF-ME holds the MOPs associated with multiple (M) FBlks, the PRU 102 produces only one FBD 191 for the MF-ME. Thus, for the next M-1 clock cycles, the PRU 102 does not produce an FBD 191. In an embodiment, the PRU 102 nevertheless performs the other operations described during the M-1 clock cycles, e.g.: the SCP 1001 continues to provide single-cycle predictions 1005; the current branch history 1105 continues to be updated; the FBP 152, the MTR 173, and the BPs 154 continue to be accessed and provide predictions; and the FSPU predictions 1199 continue to be generated and checked. Thus, unlike in the example of FIG. 15, there is not a one-to-one correspondence between FBDs and MOC entries 350 when the MOC entry 350 is an MF-ME since an MF-ME corresponds to multiple FBlks, i.e., the AIs of multiple FBlks are decoded and fused into the MOPs of the MF-ME.

Figure 16:
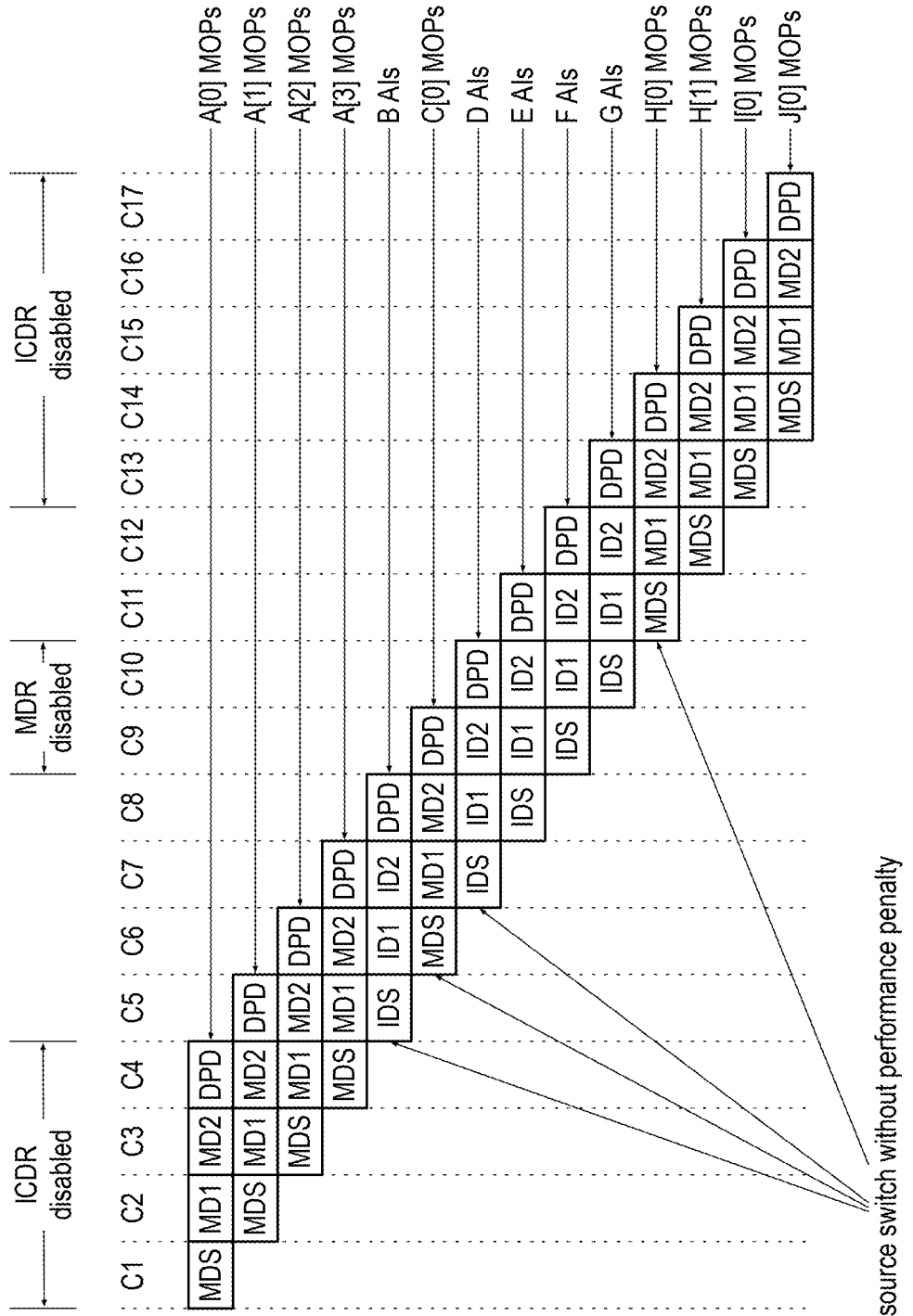
FIG. 16 is an example pipeline diagram illustrating operation of the processor of FIG. 1 in accordance with embodiments of the present disclosure.

FIG. 16 is an example pipeline diagram illustrating operation of the processor 100 of FIG. 1 in accordance with embodiments of the present disclosure. FIG. 16 is described with reference to the example processor state of FIG. 15. Seventeen clock cycles are shown denoted C1 through C16. During the seventeen clock cycles, different IFU 106 stages and other stages of the processor pipeline of FIG. 7B are shown that perform their functions to accomplish the fetching in program order of the MOPs and AIs of FIG. 15 by the IFU 106 from the MDR 175 and the ICDR 524. Reference is made below using A-J to refer to the corresponding FBDs, FBlks, MEs, and MDREs of FIG. 15.

During each of clocks C1-C14, except for clock cycles C2-C4 and C12, an FBD 511 of FIG. 5 corresponding to FBDs A through J is read from the FBD FIFO 104, e.g., in response to the assertion of read signal 598 by the control logic 501. The FBD 511 is used by the IFU 106 to fetch FBlks of AIs or MEs of MOPs during clock cycles shown in FIG. 16. Prior to the clock cycle in which an FBD 511 is read from the FBD FIFO 104, the PR4 stage produced the FBD 191. For example, prior to clock cycle C1, the PR4 stage produced FBD A which is subsequently used by the IFU 106 to fetch MDREs A[0], A[1], A[2], and A[3] during clock cycles C1 through C6, and prior to clock cycle C5, the PR4 stage produced FBD B which is subsequently used by the IFU 106 to fetch FBlk B during clock cycles C5 through C7.

During clocks C2-C4 no FBD 511 is read from the FBD FIFO 104 because the ME 350 associated with FBlk A has four MDREs, and during clock C12 no FBD 511 is read from the FBD FIFO 104 because the ME 350 associated with FBlk H has two MDREs. More specifically, during clocks C2-C4 there is no need to read another FBD 511 because during clock C2 the MDR pointer is the second initial MDR pointer 316 obtained from the FBD 511, and during clocks C3 and C4 the MDR pointers are the next MDR pointers 344 fetched from the MDR 175. Similarly, during clock C12 there is no need to read another FBD 511 because during clock C12 the MDR pointer is the second initial MDR pointer 316 obtained from the FBD 511.

During clock C1, the MDS stage sets up the first initial MDR pointer 516 of FBD A to the MDR 175 to select MDRE A[0]. During clock C2, the MD1 stage reads the MOPs of MDRE A[0], and the MDS stage sets up the second initial MDR pointer 516 of FBD A to the MDR 175 to select MDRE A[1]. During clock C3: the MD2 stage writes the fetched MOPs of MDRE A[0] to the FBlk FIFO 108; the MD1 stage reads the MOPs of MDRE A[1]; and the MDR pipeline forwards the next MDR pointer 344 of MDRE A[0] as next MDR pointer 574 back through mux 572 to the MDR 175 input, and the MDS stage sets up the A[0] next MDR pointer 574 to select MDRE A[2]. During clock C4: the DPD stage reads the MOPs of MDRE A[0] from the FBlk FIFO 108; the MD2 stage writes the MOPs of MDRE A[1] to the FBlk FIFO 108; the MD1 stage reads the MOPs of MDRE A[2]; and the MDS stage sets up the A[1] next MDR pointer 574 to select MDRE A[3].

During clock C5: the DPD stage reads the MOPs of MDRE A[1] from the FBlk FIFO 108; the MD2 stage writes the MOPs of MDRE A[2] to the FBlk FIFO 108; the MD1 stage reads the MOPs of MDRE A[3]; and the IDS stage sets up the predicted set index 504 and the predicted way number 506 to the ICDR 524 to select FBlk B. During clock C6: the DPD stage reads the MOPs of MDRE A[2] from the FBlk FIFO 108; the MD2 stage writes the MOPs of MDRE A[3] to the FBlk FIFO 108; the ID1 stage reads the AIs of FBlk B; and the MDS stage sets up the only initial MDR pointer 516 of FBD C to the MDR 175 to select MDRE C[0]. During clock C7: the DPD stage reads the MOPs of MDRE A[3] from the FBlk FIFO 108; the ID2 stage writes the fetched AIs of FBlk B to the FBlk FIFO 108; the MD1 stage reads the MOPs of MDRE C[0]; and the IDS stage sets up the predicted set index 504 and the predicted way number 506 to the ICDR 524 to select FBlk D. During clock C8: the DPD stage reads the AIs of FBlk B from the FBlk FIFO 108; the MD2 stage writes the MOPs of MDRE C[0] to the FBlk FIFO 108; the ID1 stage reads the AIs of FBlk D; and the IDS stage sets up the predicted set index 504 and the predicted way number 506 to the ICDR 524 to select FBlk E.

During clock C9: the DPD stage reads the MOPs of MDRE C[0] from the FBlk FIFO 108; the ID2 stage writes the AIs of FBlk D to the FBlk FIFO 108; the ID1 stage reads the AIs of FBlk E; and the IDS stage sets up the predicted set index 504 and the predicted way number 506 to the ICDR 524 to select FBlk F. During clock C10: the DPD stage reads the AIs of FBlk D from the FBlk FIFO 108; the ID2 stage writes the AIs of FBlk E to the FBlk FIFO 108; the ID1 stage reads the AIs of FBlk F; and the IDS stage sets up the predicted set index 504 and the predicted way number 506 to the ICDR 524 to select FBlk G. During clock C11: the DPD stage reads the AIs of FBlk E from the FBlk FIFO 108; the ID2 stage writes the AIs of FBlk F to the FBlk FIFO 108; the ID1 stage reads the AIs of FBlk G; and the MDS stage sets up the first initial MDR pointer 516 of FBD H to the MDR 175 to select MDRE H[0].

During clock C12: the DPD stage reads the AIs of FBlk F from the FBlk FIFO 108; the ID2 stage writes the AIs of FBlk G to the FBlk FIFO 108; the MD1 stage reads the MOPs of MDRE H[0]; and the MDS stage sets up the second initial MDR pointer 516 of FBD H to the MDR 175 to select MDRE H[1]. During clock C13: the DPD stage reads the AIs of FBlk G from the FBlk FIFO 108; the MD2 stage writes the MOPs of MDRE H[0] to the FBlk FIFO 108; the MD1 stage reads the MOPs of MDRE H[1]; and the MDS stage sets up the only initial MDR pointer 516 of FBD I to the MDR 175 to select MDRE I[0]. During clock C14: the DPD stage reads the MOPs of MDRE H[0] from the FBlk FIFO 108; the MD2 stage writes the MOPs of MDRE H[1] to the FBlk FIFO 108; the MD1 stage reads the MOPs of MDRE I[0]; and the MDS stage sets up the only initial MDR pointer 516 of FBD J to the MDR 175 to select MDRE J[0].

During clock C15: the DPD stage reads the MOPs of MDRE H[1] from the FBlk FIFO 108; the MD2 stage writes the MOPs of MDRE I[0] to the FBlk FIFO 108; and the MD1 stage reads the MOPs of MDRE J[0]. During clock C16: the DPD stage reads the MOPs of MDRE I[0] from the FBlk FIFO 108; and the MD2 stage writes the MOPs of MDRE J[0] to the FBlk FIFO 108. During clock C17: the DPD stage reads the MOPs of MDRE J[0] from the FBlk FIFO 108.

In the example of FIG. 16, it is assumed that the program stream instruction mix is such that the back-end 130 and the DEC 112 can consume the MOPs and AIs immediately as they are produced by the IFU 106, which is why the DPD stage is shown immediately following the MD2/ID2 stage for each FBlk/MDRE of written AIs/MOPs. However, as described above, in some instances this assumption will not be true such that the MOPs and AIs will need to be buffered in the FBlk FIFO 108 until the DPD stage of the DEC 112 can consume them.

As shown in FIG. 16, advantageously the IFU 106 is configured to switch from fetching MOPs from the MDR 175 to fetching AIs from the ICDR 524 and vice versa without incurring a performance penalty. That is, the IFU 106 can continue providing MOPs/AIs (to the FBlk FIFO 108) each clock cycle even when switching between fetch sources. This is possible because the FSI 514 enables the IFU 106 to know prior to fetching which of the two fetch sources (i.e., the MDR 175 or the ICDR 524) to fetch from rather than the IFU 106 needing to predict a fetch source as in some conventional designs. Furthermore, the FSI 514 may enable the IFU 106 to advantageously consume less power. As shown in FIG. 16, the MDR 175 (e.g., during C9-C10) or the ICDR 524 (e.g., during C1-C4 and C13-C17) may be disabled when not being accessed, which may advantageously reduce power consumption relative to a conventional design that does not know ahead of time which fetch source to fetch from and therefore fetches from both concurrently.

Figure 17:
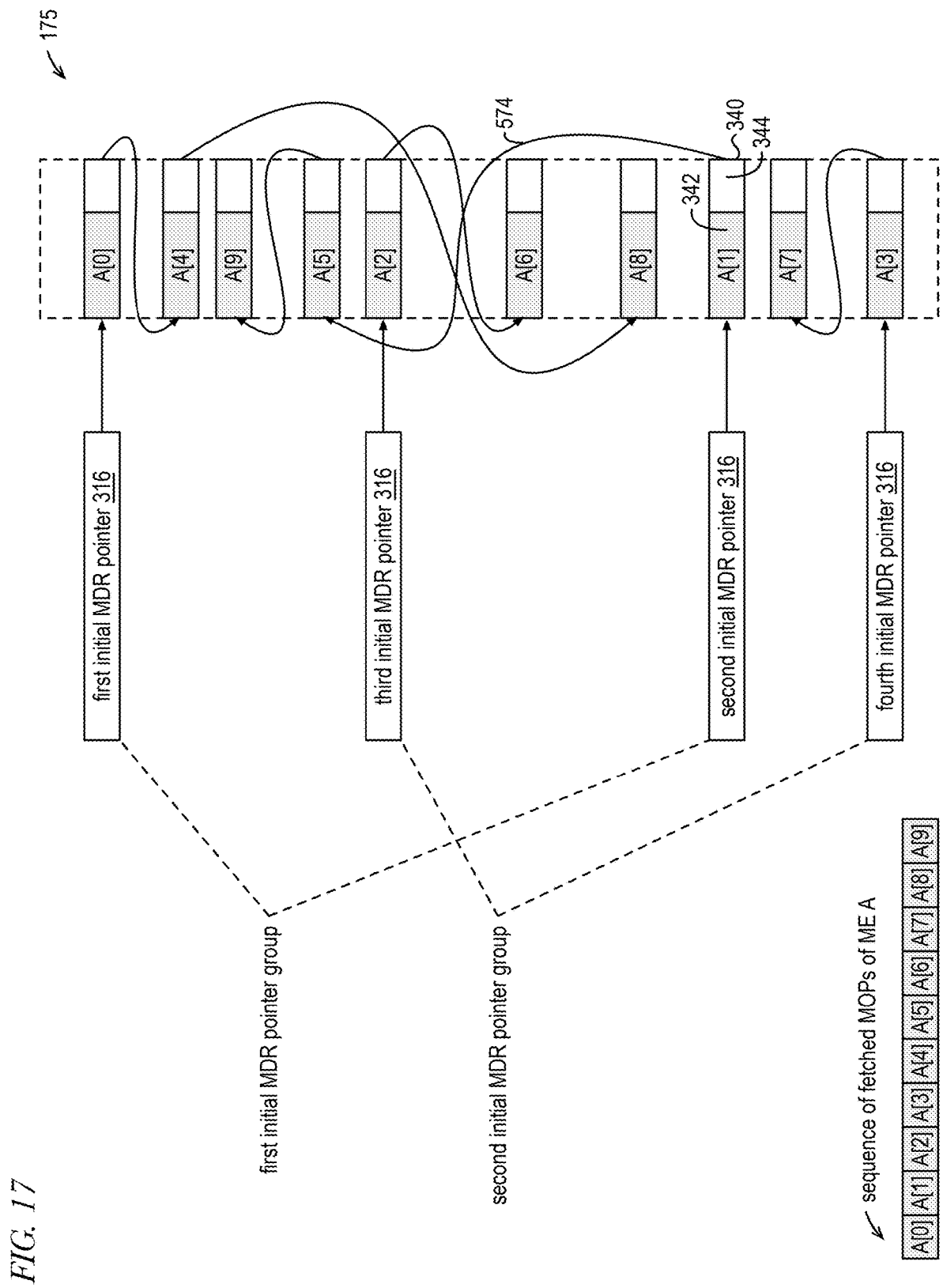
FIG. 17 is an example block diagram illustrating operation of the processor of FIG. 1 in accordance with embodiments of the present disclosure.

FIG. 17 is an example block diagram illustrating operation of the processor 100 of FIG. 1 in accordance with embodiments of the present disclosure. As described above, in the example of FIG. 17, the initial MDR pointer 336 group size (G) is two, and the MDR 175 pipeline latency is two such that the number of initial MDR pointers 336 is four, which are designated first initial MDR pointer, second initial MDR pointer, third initial MDR pointer, and fourth initial MDR pointer in FIG. 17 according to program order, i.e., the first initial MDR pointer points to the first MDRE in program order of the ME 350, the second initial MDR pointer points to the second MDRE in program order of the ME 350, the third initial MDR pointer points to the third MDRE in program order of the ME 350, and the fourth initial MDR pointer points to the fourth MDRE in program order of the ME 350. As shown, the first initial MDR pointer and the second initial MDR pointer form a first initial MDR pointer group that concurrently access the MDR 175, and the third initial MDR pointer and the fourth initial MDR pointer form a second initial MDR pointer group that concurrently access the MDR 175.

FIG. 17 shows the MDR 175 of FIG. 1 with MDREs 340 holding the MOPs of a single ME 350, denoted A, whose number of MDREs is ten, denoted A[0] through A[9] in program order. As shown, the first initial MDR pointer 316 points to MDRE A[0], the second initial MDR pointer 316 points to MDRE A[1], the third initial MDR pointer 316 points to MDRE A[0], and the fourth initial MDR pointer 316 points to MDRE A[3], the next MDR pointer 344 of A[0] points to A[4], the next MDR pointer 344 of A[1] points to A[5], the next MDR pointer 344 of A[2] points to A[6], the next MDR pointer 344 of A[3] points to A[7], the next MDR pointer 344 of A[4] points to A[8], and the next MDR pointer 344 of A[5] points to A[9] such that the MOPs of the ME 350 associated with FBlk A are fetched in program order for provision to the FBlk FIFO 108 in program order. More specifically, during a first clock cycle MDREs A[0] and A[1] are fetched using the first and second initial MDR pointers, during a second clock cycle MDREs A[2] and A[3] are fetched using the third and fourth initial MDR pointers, during a third clock cycle MDREs A[4] and A[5] are fetched using the next MDR pointers of MDREs A[0] and A[1], during a fourth clock cycle MDREs A[6] and A[7] are fetched using the next MDR pointers of MDREs A[2] and A[3], and during a fifth clock cycle MDREs A[8] and A[9] are fetched using the next MDR pointers of MDREs A[4] and A[5] in a pipelined manner similar to that described in FIG. 16, except that two MDREs are fetched per clock cycle, and no switching between fetch sources is described. Also shown at the bottom left of FIG. 17 is the sequence of fetched MOPs of ME A, namely the MOPs of MDREs A[0] through A[9] in program order.

As may be observed from the foregoing, the distributed MDRE pointer mechanism in which the MDRE pointers are distributed between the MTR 173 and the MDR 175 may advantageously improve performance of the MOC 171 by preserving the associativity of the MOC 171 thereby potentially reducing conflict misses relative to some conventional approaches (e.g., the '535 Patent), may advantageously reduce fragmentation and increase efficiency of the MOC 171, and may advantageously facilitate the building of MOC 171 entries having a large number of MOPs.

Multi-Fetch Block MOC Entry (MF-ME) Building

Embodiments are described above in which the processor decodes the program instruction stream into FBlks, which are sequential runs of architectural instructions that have a length and termination type (e.g., conditional branch, unconditional branch, indirect branch, call, return, maximum length sequential). The FBlk history is cached in a fetch block predictor that predicts a sequence of FBlks based on the history. A prediction unit, which includes the fetch block predictor and other branch predictors that make branch predictions, predicts a sequence of fetch block start addresses based on the predicted sequence of FBlk termination types and lengths and the branch predictions. Counters in the entries of the fetch block predictor are used to detect hot FBlks, i.e., FBlks that frequently appear in the program instruction stream. The architectural instructions of the hot FBlks are decoded (and possibly fused at a remedial level, e.g., fusing of two adjacent architectural instructions) into simple macro-ops (MOPs), then more highly fused by an advanced fusion engine, and then cached in a macro-op cache (MOC) as MOC entries (MEs). A tag array of the MOC is included in the prediction unit, and each fetch block start address is looked up not only in the fetch block predictor but also in the MOC tag array to determine whether there is an ME in the MOC that holds the MOPs corresponding to the architectural instructions of the FBlk predicted by the fetch block predictor (i.e., a hit in both the fetch block predictor and in the MOC tag array).

The prediction unit also produces a sequence of fetch block descriptors that are provided in program order to an instruction fetch unit that includes an instruction cache and the MOC. Each fetch block descriptor includes an indicator of whether the MOC holds the MOPs corresponding to the FBlk. If so, the instruction fetch unit fetches the MOPs and provides them to a decode unit that renames them and issues them to the back-end for execution; if not, the instruction fetch unit fetches the architectural instructions and provides them to the decode unit which decodes them into simple MOPs and issues them to the back-end for execution. In the former case, power may be saved because the MOPs do not need to be decoded, and performance may be increased because the MOPs do not need to be decoded and because the MOPs may have been more highly fused by the advanced fusion engine than the simple MOPs.

As may be observed, the decoder typically receives a sequence of a mixture of architectural instructions and MOPs. FIG. 15 and FIG. 16 illustrate an example of a sequence of a mixture of architectural instructions and MOPs. In the example, MOPs of ME A are succeeded by architectural instructions of FBlk B, which are succeeded by MOPs of ME C, which are succeeded by architectural instructions of FBlks D, E, F, and G, which are succeeded by MOPs of MEs H, I and J.

Embodiments are now described in which each ME includes counters and other training fields that are used to detect highly consistent sequences of MEs in the program instruction stream and then use the MOPs of the MEs of the highly consistent sequence to build a more complex ME that is possibly more highly fused and may therefore provide even larger power saving and performance increase. The more complex ME is referred to as a multi-fetch block ME (MF-ME) since it is the fusion of the MOPs associated with multiple FBlks. Because the fusion engine is given a larger number of MOPs to fuse, i.e., the MOPs associated with multiple FBlks, the fusion engine may be able to take advantage of the opportunity to fuse the resultant MF-ME MOPs more highly than it could if given a smaller number of MOPs to fuse, i.e., the simple MOPs of a single FBlk. That is, the highly consistent sequences of MEs are not interspersed by simple FBlks, i.e., not interspersed by misses in the MOC 171, but instead correspond to a consistent sequence of hits in the MOC 171 on the MEs of the consistent sequence. An ME that holds the MOPs corresponding to a single FBlk is referred to as a single fetch block ME (SF-ME). Referring to the example of FIG. 15 and FIG. 16, as the program continues to execute, if the counters of SF-MEs H, I, and J eventually indicate that these three SF-MEs appear in the program instruction stream highly consistently in this sequence, e.g., their counters have reached a threshold, then the MOPs of these three constituent SF-MEs will be given to the fusion engine to build into an MF-ME in the MOC. Such an MF-ME is referred to herein as a sequential MF-ME (SEQ-MF-ME). The next time the fetch block start address is encountered by the prediction unit (i.e., hits in both the fetch block predictor and the MOC tag array), the prediction unit will generate a fetch block descriptor that tells the instruction fetch unit to fetch the more highly fused MOPs of the SEQ-MF-ME from the MOC rather than generating three fetch block descriptors that would tell the instruction fetch unit to individually fetch the MOPs of each of the three constituent SF-MEs from the MOC. In an embodiment, the fusion engine may also fuse the MOPs of not only multiple SF-MEs into an SEQ-MF-ME, but may also fuse the MOPs of SEQ-MF-MEs and/or SF-MEs into a SEQ-MF-ME.

Embodiments are also described in which the prediction unit uses the counter and other training fields to detect an ME that is a loop body having a highly consistent loop iteration count. When such a loop body ME is detected, the fusion engine is given the MOPs of multiple copies of the loop body ME to build into an unrolled loop MF-ME (ULP-MF-ME). Again, the fusion engine may be able to take advantage of the opportunity to fuse the resultant ULP-MF-ME MOPs more highly than it could if given a smaller number of MOPs to fuse, e.g., the MOPs of a single loop body FBlk. The number of copies of the loop body ME is referred to as the loop unroll factor (F). The next time the fetch block start address is encountered by the prediction unit, the prediction unit will generate a fetch block descriptor that tells the instruction fetch unit to fetch the more highly fused MOPs of the ULP-MF-ME from the MOC rather than generating F fetch block descriptors that would tell the instruction fetch unit to individually fetch the MOPs of each of the F constituent loop body MEs from the MOC. In an embodiment, the fusion engine may also fuse the MOPs of not only a loop body SF-ME into an ULP-MF-ME, but may also fuse the MOPs of a loop body SEQ-MF-MEs into a ULP-MF-ME. The prediction unit may also be optimized to remember the highly consistent loop iteration count of the ULP-MF-ME and generate N fetch block descriptors that tell the instruction fetch unit to fetch the MOPs of the ULP-MF-ME from the MOC N times, where N is the quotient of the highly consistent loop iteration count and F.

Embodiments are also described in which the fusion engine builds a ULP-MF-ME using F copies of a loop body ME that does not necessarily have a loop iteration count that is consistent. In an embodiment, the prediction unit uses the counter and other training fields to detect a minimum loop iteration count of the loop body ME. In another embodiment, the prediction unit maintains a histogram of frequencies of a range of loop iteration counts of the loop body ME and uses the histogram to select a loop iteration count to select F and to compute N. Although in some embodiments, the ULP-MF-ME replaces the loop body ME if the loop body ME is an MF-ME, in some embodiments the loop body MF-ME is allowed to remain co-resident in the MOC with the ULP-MF-ME, even though they have the same fetch block start address, which will result in a multi-hit in the MOC, and which may make the processing of tail iterations of the loop more efficient.

Embodiments are also described in which the counter and other training fields of an ME are used to decide whether to selectively invalidate the ME when its MOPs execute and one of them causes a need for an abort. In an embodiment, the selective ME invalidation is performed for a subset of abort causes.

As may be observed from the present disclosure, the building of MF-MEs may result in various benefits and advantages mainly in terms of improved performance (e.g., reduced clocks per instruction (CPI) and increased instructions per clock (IPC)) and reduced power consumption. First, the fact that an MF-ME may have fewer MOPs than the total number of MOPs of the J constituent MEs used to build the MF-ME (e.g., J MEs of the sequence used to build a SEQ-MF-ME or J copies of the loop body ME used to build a ULP-MF-ME) may result in less space being consumed within the MDR 175, which may result in lower power consumption in fetching the MF-ME than fetching the J constituent MEs used to build the MF-ME and which may result in higher performance due to more efficient use of the MOC 171. Second, the fact that the PRU 102 may predict a single MF-ME rather than the J constituent MEs may also reduce power consumption. Third, power may be saved by the DEC 112 because it does not have to decode architectural instructions into MOPs. Fourth, because the number of MOPs of the MF-ME may be fewer than the total number of MOPs of the J constituent MEs (or the total number of simple MOPs that would be decoded from the J corresponding FBlks), power may be saved and performance gained because fewer entries in the ROB 122 may be consumed, fewer dispatch slots of the DEC 112 may be consumed, fewer entries in the scheduler 121 may be consumed, and fewer MOPs are executed by the execution units of the back-end 130.

Figure 18:
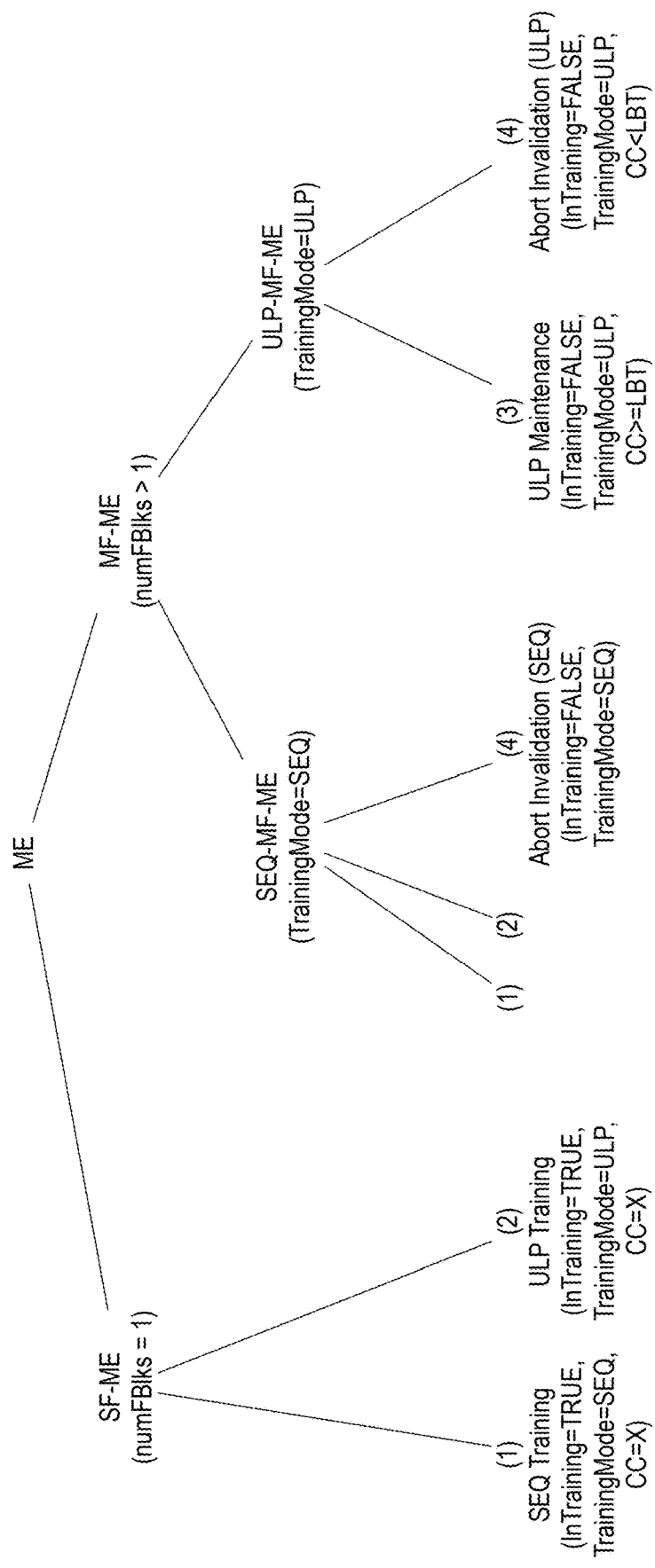
FIG. 18 is a diagram illustrating different species of MOC entries (MEs) and ME states in accordance with embodiments of the present disclosure.

FIG. 18 is a diagram illustrating different species of MEs and ME states in accordance with embodiments of the present disclosure. As shown, the ME genus includes two species: an SF-ME and an MF-ME. An SF-ME includes MOPs fused by the AFE 181 from a single FBlk worth of MOPs as indicated in FIG. 18 by "numFBlks=1", where numFBlks refers to the value of the numFBlks field 335 of the MTRE 330 of FIG. 3A of the ME. An MF-ME includes MOPs fused by the AFE 181 from multiple FBlks worth of MOPs as indicated in FIG. 18 by "numFBlks>1". That is, an MF-ME is a ME that holds the MOPs associated with multiple sequential runs of instructions, i.e., multiple FBlks, but the FBlks themselves may not be, and often will not be, sequential with one another.

The MF-ME species includes two sub-species: a sequential MF-ME (SEQ-MF-ME) and an unrolled loop MF-ME (ULP-MF-ME). An SEQ-MF-ME refers to an MF-ME that is built from a highly consistent sequence of MEs, which may include SF-MEs, other SEQ-MF-MEs, or a combination thereof. An ULP-MF-ME refers to an MF-ME built from multiple copies of a loop body ME, which may be an SF-ME or a SEQ-MF-ME. The number of copies of the loop body ME from which the ULP-MF-ME is built is referred to herein as the loop unroll factor, F (see loopUnrollFactor 1912 of FIG. 19). In an embodiment, an SEQ-MF-ME may not include a ULP-MF-ME.

As shown in FIG. 18, an ME can be in one of four different states, or modes: (1) SEQ Training state, (2) ULP Training state, (3) ULP Maintenance state, and (4) Abort Invalidation state. The Abort Invalidation state is separated into the (4) Abort Invalidation (SEQ) state and the (4) Abort Invalidation (ULP) state. As described in more detail with respect to FIG. 22, an ME in the (1) SEQ Training state that causes an abort is transitioned to the (4) Abort Invalidation (SEQ) state, and an ME in the (2) ULP Training state or the (3) ULP Maintenance state that causes an abort is transitioned to the (4) Abort Invalidation (ULP) state. The (SEQ) and (ULP) distinction within the (4) Abort Invalidation state is used by the PRU 102 to decide which state to return to if the ME is subsequently validated.

When an ME (an SF-ME or a SEQ-MF-ME) is in the SEQ Training state, the PRU 102 looks to detect whether the ME is one ME of a highly consistent sequence of two or more constituent MEs within the program instruction stream. If so, the two or more constituent MEs may be built into a new SEQ-MF-ME. That is, the AFE 181 may use the MOPs of the two or more constituent MEs to build a SEQ-MF-ME. The AFE 181 "uses" MOPs of the constituent MEs to build an SEQ-MF-ME by: (1) receiving the MOPs of the constituent MEs (in an embodiment, from the DEC 112 after they are fetched from the MOC 171 and provided to the DEC 112); (2) fusing the received MOPs, where possible, into fewer and more capable MOPs than received (in the worst case, i.e., where no optimization is possible, merely passing the received MOPs through as is); and (3) writing the fused MOPs to free MDREs 340 obtained from the MOC 171. Depending upon the context, using MOPs of MEs to build an MF-ME may also include requesting the PRU 102 to install the new SEQ-MF-ME into the MOC 171, e.g., to allocate and populate an associated MTR entry 330. If one of the constituent MEs in the SEQ Training state is itself a SEQ-MF-ME, the new SEQ-MF-ME will be built using MOPs associated with a larger number of FBlks than the number of FBlks whose associated MOPs were used to build the constituent SEQ-MF-ME.

When an ME (an SF-ME or a SEQ-MF-ME) is in the ULP Training state, the PRU 102 looks to detect whether the ME is a loop body ME (e.g., having a highly consistent iteration count, or a minimum loop iteration count, or a loop iteration count that may be selected based on a histogram of frequencies of a range of loop iteration counts) within the program instruction stream. If so, multiple copies of the loop body ME may be built into a ULP-MF-ME, which is referred to as unrolling the loop body ME.

When an ME is in the ULP Maintenance state, the ME is a ULP-MF-ME that was built by the AFE 181 by unrolling a loop body ME. When a ULP-MF-ME is in the ULP Maintenance state, the PRU 102 will not use the ULP-MF-ME as a constituent ME to build a SEQ-MF-ME, nor will the PRU 102 use the ULP-MF-ME as a loop body ME from which to build another ULP-MF-ME.

When an ME is in the Abort Invalidation state, the ME has caused an abort, and the PRU 102 looks to detect whether the ME should be invalidated in the MOC 171 (e.g., because the ME has caused another abort) or instead should be taken out of Abort Invalidation state and remain in the MOC 171 because it has appeared in the program instruction stream, subsequent to causing the abort, a sufficient number of times without causing another abort to restore confidence in the ME.

The PRU 102 assigns different values to state variables for each of the different ME states. The state variables may be included in training fields 331 in the MTRE 330 which are described in more detail with respect to FIG. 20. The training field state variables according to one embodiment shown in FIG. 18 are: the InTraining bit 2002, the TrainingMode bit 2004, and the consistency counter (CC) 2008. In the (1) SEQ Training state, InTraining is true (e.g., binary 1), TrainingMode is SEQ (e.g., binary 0), and the CC value does not matter. In the (2) ULP Training state, InTraining is true, TrainingMode is ULP (e.g., binary 1), and the CC value does not matter. In the (3) ULP Maintenance state, InTraining is false (e.g., binary 0), TrainingMode is ULP, and the value of CC is greater than the loop build threshold (LBT) 1926 of FIG. 19. In the (4) Abort Invalidation (SEQ) state, InTraining is false and TrainingMode is SEQ. In the (4) Abort Invalidation (ULP) state, InTraining is false, TrainingMode is ULP, and the CC value is less than the LBT 1926.

An SF-ME may be in the (1) SEQ Training state or in the (2) ULP Training state (i.e., an SF-ME may become a constituent ME of an SEQ-MF-ME, or an SF-ME may become the loop body ME of a ULP-MF-ME). An SEQ-MF-ME may be in the (1) SEQ Training state (i.e., a SEQ-MF-ME may become a constituent ME of another SEQ-MF-ME, including a SEQ-MF-ME may be lengthened, or extended), or in the (2) ULP Training state (i.e., an SEQ-MF-ME may be a loop body ME), or in the (4) Abort Invalidation (SEQ) state. A ULP-MF-ME may be in the (3) ULP Maintenance state or the (4) Abort Invalidation (ULP) state (i.e., a ULP-MF-ME cannot become a constituent ME of an SEQ-MF-ME, nor can a ULP-MF-ME become a loop body ME of another ULP-MF-ME).

Briefly, when an ME is in the SEQ Training state, the PRU 102 is updating and examining its training fields 331 to determine whether the ME is part of a highly consistent sequence of MEs that may be built into a SEQ-MF-ME, which may provide the AFE 181 opportunities to fuse MOPs in a performance and space improving manner. When an ME is in the ULP Training state, the PRU 102 is updating and examining its training fields 331 to determine whether the ME is a loop body ME that may be built into a ULP-MF-ME, which may provide the AFE 181 opportunities to fuse MOPs in a performance and space improving manner. Once a ULP-MF-ME is formed, it is moved to the ULP Maintenance state, which makes it ineligible to be used as a constituent ME of a SEQ-MF-ME build or used as a loop body ME of a ULP-MF-ME build.

With respect to Abort Invalidation state, units of the processor 100 (e.g., the DEC 112 or back-end 130) may signal a need for an abort, e.g., in response to detection of a mis-prediction (e.g., by a branch predictor of a direction or target address of a branch instruction, or of a mis-prediction that store data should be forwarded to a load MOP in response to a store dependence prediction) or other microarchitectural exception, architectural exception, or interrupt when executing instructions or MOPs. In response, the PCL 132 may assert flush signals to selectively flush instructions/MOPs from the various units of the pipeline, and the PRU 102 may be signaled to restart predicting the FBlks of the program instruction stream. Thus, a performance penalty is incurred for each execution instance of an ME that causes a need for an abort, i.e., that causes a need for the processor 100 to engage in processing an abort request. Generally speaking, when an ME is allocated into the MOC 171, it is not invalidated but instead remains there until it is replaced by a new ME. However, as will be described shortly, generally the larger an MF-ME gets (e.g., the larger the number of constituent MEs used to build a SEQ-MF-ME or the larger the unroll factor used to build a ULP-MF-ME) the greater likelihood the MF-ME will cause a need for an abort, and the larger becomes the performance penalty associated with processing an abort request caused by a MOP within an MF-ME. In some cases, the performance penalty may be large enough to outweigh the performance benefits. Advantageously, embodiments are described that provide a mechanism for reducing the likelihood of repeatedly incurring of the potentially large mis-prediction penalty associated with an MF-ME abort by selectively invalidating an MF-ME that causes a need for an abort multiple times in sufficiently close occurrence proximity within the program instruction stream, while still enjoying the performance benefits of MF-MEs generally. Briefly, the mechanism includes transitioning the MF-ME to the Abort Invalidation state (which also prevents it from being used in another MF-ME build) upon the initial abort and invalidating the MF-ME if it is not abort-free a sufficient number of times within the program instruction stream before causing a need for another abort.

A FBlk is a sequential run of architectural instructions. The FBlk has a length (i.e., the number of architectural instructions in the sequential run) and a termination type. In some cases, a FBlk is a maximum length sequential FBlk, meaning the last instruction of the FBlk is not a branch instruction such that the next instruction in the program instruction stream after the last instruction of the FBlk is the next sequential instruction, i.e., is at the next sequential memory location after the last instruction. However, in many cases, a FBlk is terminated by a branch instruction that, when executed, was observed to transfer control (i.e., branched) to a non-sequential location within the program instruction stream rather than to the next sequential instruction. Therefore, an SF-ME associated with the FBlk will be terminated by a corresponding branch MOP. A terminating branch MOP of an ME is the last branch MOP of the ME. However, in an embodiment, because the AFE 181 may reorder MOPs relative to the program order of architectural instructions in the program instruction stream, the terminating branch MOP may not be the last MOP of the ME, but is the last branch MOP of the ME. Furthermore, the AFE 181 may also fuse the terminating branch MOP of an ME with other MOPs. When a branch MOP-terminated SF-ME is used to build an MF-ME, the terminating branch MOP will become a non-terminating branch MOP—referred to as an internal branch MOP—of the MF-ME, assuming the SF-ME was the first or a middle constituent ME of the MF-ME build.

The behavior of an internal branch MOP within an MF-ME is not actively predicted in the case of a hit in the MOC 171 on the MF-ME; rather, the behavior of an internal branch MOP within an MF-ME is implicitly predicted when the MF-ME is built. As described above, the control flow of the predicted program instruction stream is determined by the FBDs sent to the IFU 106 that determine which MOPs are fetched from the MOC 171 (or which architectural instructions are fetched from the instruction cache 101 in the case of a FBlk, e.g., in the case of a miss in the MOC 171). The PRU 102 only generates a single FBD for the MF-ME, not an FBD for each of the multiple FBlks associated with the MF-ME. Thus, the PRU 102, by sending a single FBD for the MF-ME, does not give the internal branch MOPs of the MF-ME a chance to control the flow of the program instruction stream. That is, the PRU 102 does not instruct the IFU 106 to fetch MOPs along different paths with regard to whether it might have otherwise predicted an internal branch MOP. Rather, the PRU 102 instructs the IFU 106 to fetch all the MOPs of the MF-ME—including all internal branch MOPs of the MF-ME—and send them downstream for execution without regard for the direction of any of the internal branch MOPs. That is, as described in more detail below, there is a built-in expectation of the direction for each of the internal branch MOPs of the MF-ME. In contrast, the PRU 102 actively predicts the next FBSA 449 produced by the last FBlk associated with the MF-ME, which becomes the next FBSA 449 produced by the MF-ME (which may be terminated with a branch MOP that was decoded from a terminating branch instruction). The next FBSA 449 produced by the MF-ME subsequently becomes the current FBSA 412 and is used to generate the next FBD sent to the IFU 106 after the FBD of the MF-ME. The next FBD sent to the IFU 106 after the FBD of the MF-ME may describe an ME or it may describe a FBlk. The single FBD sent to the IFU 106 for the MF-ME instructs the IFU 106 to fetch from the MOC 171 all the MOPs of the entire MF-ME so that they may all be executed by the back-end.

As may be observed from the above description, there is effectively a built-in expectation within the MF-ME about the execution behavior of an internal branch MOP. Inherently, there is a danger that the branch MOP will not behave according to the built-in expectation, e.g., a conditional branch is not taken in contrast to the built-in expectation that the conditional branch will be taken. Assume, for example, that ten SF-MEs are used to build a SEQ-MF-ME and nine internal branch MOPs are included in the SEQ-MF-ME, then the potential that an abort will be requested for the SEQ-MF-ME because one of the internal branch MOPs did not behave as expected may be increased relative to an ME with fewer or no internal branch MOPs.

The AFE 181 may advantageously fuse MOPs such that the resulting MOPs of an ME may be out of program order, which may provide the opportunity for significant performance benefits. Therefore, in an embodiment, when an MF-ME causes an abort (e.g., when an internal branch MOP of the MF-ME does not behave according to the built-in expectation), the processor flushes all the MOPs of the MF-ME—which may involve wasting a relatively large amount of work and power, particularly if the offending MOP is near the end of the MF-ME—and restarts fetching at the fetch block start address of the MF-ME. However, to restart fetching, this time the PRU 102 generates a FBD 191 that instructs the IFU 106 to fetch architectural instructions at the fetch block start address from the instruction cache 101 rather than fetching the MF-ME from the MOC 171. This is referred to as a "fallback" abort. In this sense, the processor 100 processes the MF-ME in an atomic manner. In an embodiment, the PRU 102 determines N—the number of FBlks associated with the MF-ME (e.g., via the numFBlks field 335 of FIG. 3B)—and for the next N FBDs 191, corresponding to the next N FBlks, instructs the IFU 106 to fetch only from the instruction cache 101 even if there is a corresponding ME in the MOC 171. The fallback abort provides the PRU 102 the opportunity to precisely identify the architectural instruction whose corresponding MOP caused the need for the abort, e.g., the architectural branch instruction whose corresponding internal branch MOP did not behave according to the built-in expectation. In an alternate embodiment, a "partial" fallback abort is performed in which the next N FBDs 191 are allowed to fetch an SF-ME if it is present in the MOC 171 (and otherwise to fetch architectural instructions from the instruction cache 101), but the next N FBDs 191 are not allowed to fetch an MF-ME if it is present in the MOC 171. If one of the SF-MEs causes a need for an abort, a full fallback abort is performed.

Advantageously, embodiments described herein take the risk of creating built-in expectations within an MF-ME only when highly consistent behavior has been observed by the constituent MOPs used to build the MF-ME, thereby reducing the likelihood that an MF-ME will cause an abort. However, if the MF-ME fails to behave as expected more than an insignificant amount, embodiments are described that selectively invalidate the MF-ME in the MOC, thereby advantageously ameliorating the potentially large mis-prediction penalty associated with an MF-ME abort, while still enjoying the MF-ME performance benefits.

In an embodiment, when building an MF-ME, the AFE 181 may receive the following types of branch MOPs that terminate a first or middle constituent ME (described below) and treat them as described. First, the AFE 181 may take a conditional branch MOP and make it an internal branch MOP of an MF-ME. Second, the AFE 181 may take a direct unconditional branch MOP, calculate its target address, use the target address to build the MF-ME, and finally discard the direct unconditional branch MOP. Third, the AFE 181 may take a direct call MOP and treat it similarly to a direct unconditional branch MOP except the AFE 181 may generate a MOP to write the return address to a link register. Fourth, the AFE 181 may not permit an indirect branch MOP or a return MOP to be an internal branch MOP but may instead shorten the SEQ-MF-ME build such that the indirect branch MOP or the return MOP terminates the SEQ-MF-ME, which may be a form of build constraint.

FIG. 19 is a block diagram illustrating registers 1900 of the PRU 102 of FIG. 1 in accordance with embodiments of the present disclosure. The PRU registers 1900 include registers to hold a prevMETd 1902, a currMETd 1904, a nextMETd 1906, a nextMETd-secondary 1908, a loopUnrollFactor (F) 1912, an unrollCnt 1913, a CurrIterCnt 1914, a ULPIterNum 1916, a SequenceState 1918, a start build threshold (SBT) 1922, an MF-ME start build threshold (MSBT) 1923, a continue build threshold (CBT) 1924, a loop build threshold (LBT) 1926, an abort validation threshold (AVT) 1928, a ULPFBSA register 1932, a ULPState register 1934, and a FBlksSeenThisIteration register 1936. The PRU registers 1900 are employed by the PRU 102, e.g., by the MTRE update logic 495 and MOC build requestor 475, to perform various operations including the training and building of MEs, including the building of SF-MEs and the building from SF-MEs of MF-MEs, including SEQ-MF-MEs and ULP-MF-MEs; the incremental growing of MEs; the facilitation of same-FBSA co-residency of a ULP-MF-ME and its loop body ME (including a loop body MF-ME) via the processing of a multi-hit in the MOC; and the selective invalidation of an ME after causing an abort.

An MEId, or ME identifier, is a value that uniquely identifies an ME 350 of the MOC 171. In an embodiment, an MEId comprises a combination (e.g., concatenation) of the set and way within the MTR 173 of the MTR entry 330 of the ME 350. The PRU 102 predicts a sequence of FBSAs (e.g., current FBSA 412) associated with a sequence of FBlks of the program instruction stream. At any given time, three immediately adjacent FBSAs in the sequence of FBSAs may be referred to as the previous FBSA, the current FBSA, and the next FBSA. The next FBSA immediately follows the current FBSA in the sequence of FBSAs. The previous FBSA immediately precedes the current FBSA in the sequence of FBSAs. For each FBSA in the sequence of FBSAs, the PRU 102 looks up the FBSA in the FBP 152 to see if there is a FBP hit 422 and in the MOC 171 (specifically in the MTR 173) to see if there is a MOC hit 414. If the current FBSA hits both in the FBP 152 and in the MOC 171, then the hit MOC entry 350 is referred to as the current ME, and the currMEId 1904 is valid and holds the MEId of the current ME. If the previous FBSA hits both in the FBP 152 and in the MOC 171, then the hit MOC entry 350 is referred to as the previous ME, and the prevMEId 1902 is valid and holds the MEId of the previous ME, which is the ME immediately previous in the program instruction stream to the current ME. If the next FBSA hits both in the FBP 152 and in the MOC 171, then the hit MOC entry 350 is referred to as the next ME, and the nextMEId 1906 is valid and holds the MEId of the next ME, which is the ME immediately following in the program instruction stream after the current ME. If the next FBSA results in a multiple-hit in the MOC 171, e.g., hits on both an SF-ME and an MF-ME, the MF-ME is referred to as the primary, is given priority (i.e., is used to generate the FBD 191 and is therefore fetched by the IFU 106), and the nextMEId 1906 holds the MEId of the hit MF-ME; whereas, the SF-ME is referred to as the secondary, is not given priority (i.e., is not used to generate the FBD 191 and is therefore not fetched by the IFU 106), and the nextMETd-secondary 1908 holds the MEId of the hit SF-ME. The prevMEId 1902, currMEId 1904, nextMEId 1906, and nextMEId-secondary 1908 are used by the PRU 102, among other things, to decide which state an ME should be in (i.e., remain in its current state or transition to another state) and what the value of the other training fields 331 should be (e.g., as described in more detail with respect to the state diagram of FIG. 22), and whether to build an MF-ME (e.g., as described in more detail with respect to FIG. 25 and FIG. 33). Because the PRU 102 is pipelined, different stages of the PRU 102 pipeline may contain pipelined versions of some of the PRU registers 1900, e.g., prevMIEd 1902, currMIEd 1904, nextMIEd 1906, and nextMIEd-secondary 1908.

Figure 32:
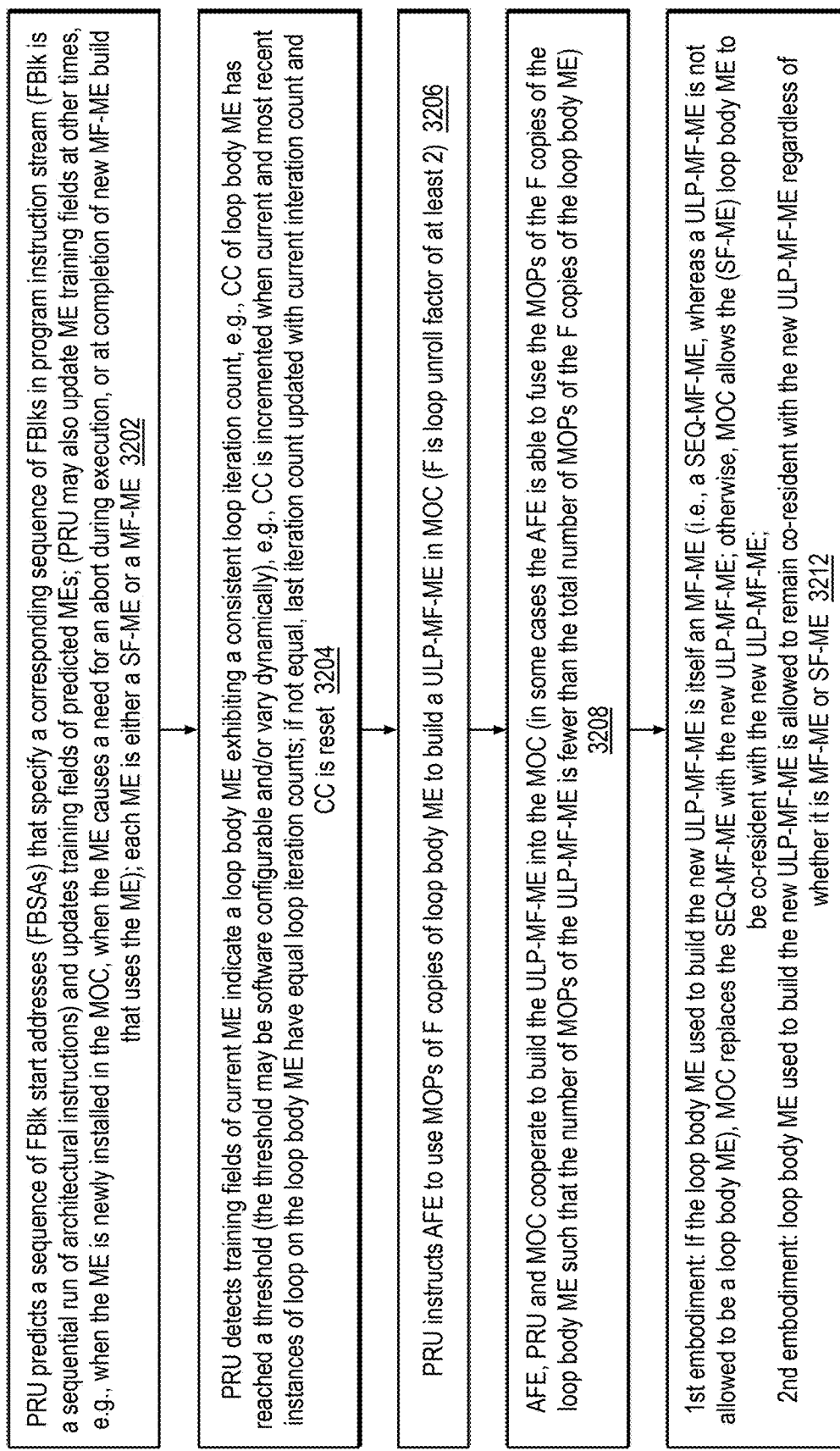
FIG. 32 is a flowchart illustrating operation of the processor of FIG. 1 to build a ULP-MF-ME in accordance with embodiments of the present disclosure.
Figure 33:
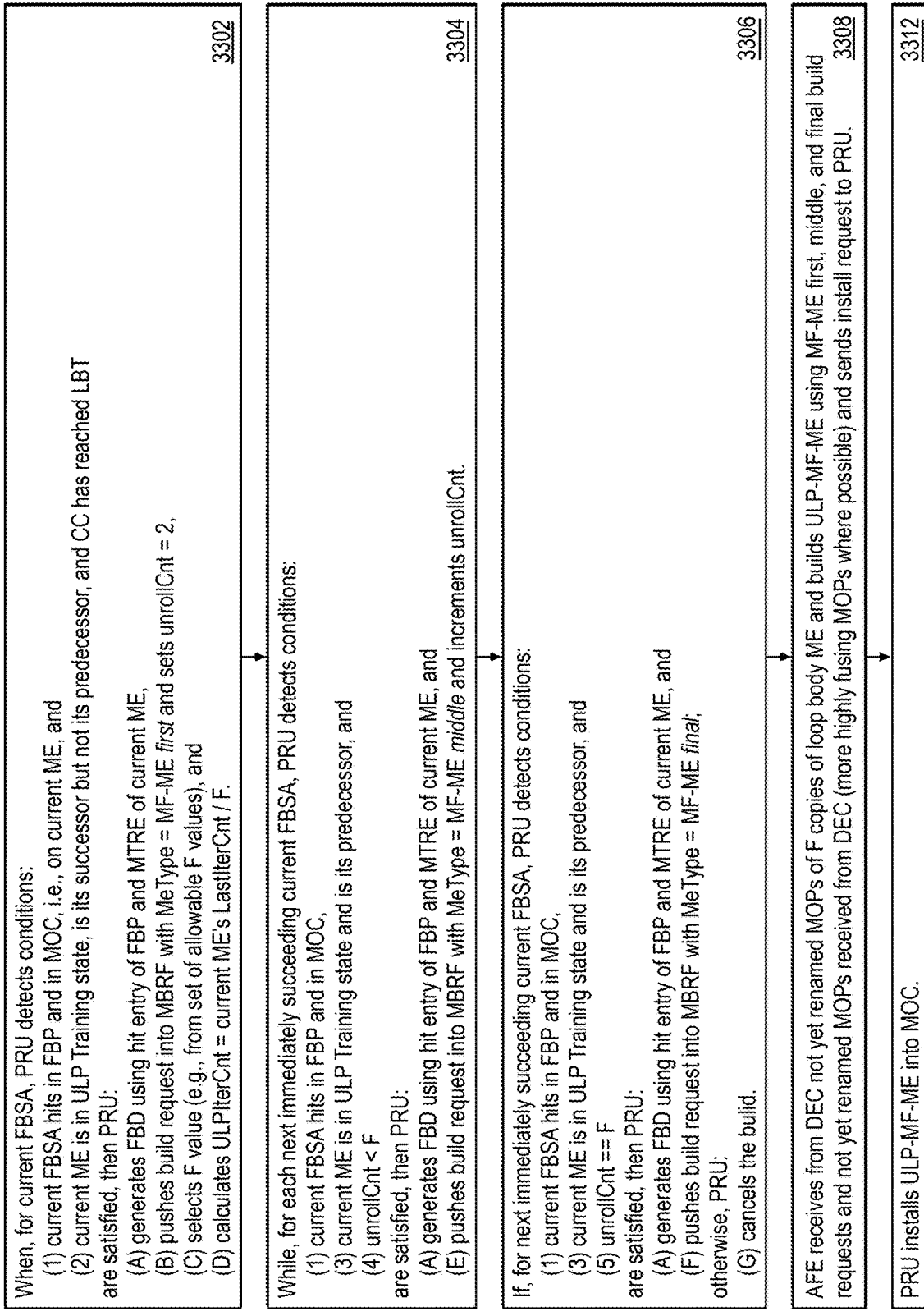
FIG. 33 is flowchart illustrating operation of the processor of FIG. 1 to build a ULP-MF-ME in accordance with consistent loop iteration count (CLIC) embodiments of the present disclosure.

The loopUnrollFactor (F) 1912 indicates the number of copies of a loop body ME that the AFE 181 uses to build a ULP-MF-ME, as described in more detail with respect to FIG. 32 and FIG. 33, for example.

The unrollCnt 1913 is used by the PRU 102 to keep track of the number of copies of the loop body ME for which the PRU 102 has pushed a MBRFE 2100 into the MBRF 179 and sent an FBD 191 to the IFU 106, as described in more detail with respect to FIG. 33, for example.

Figure 22:
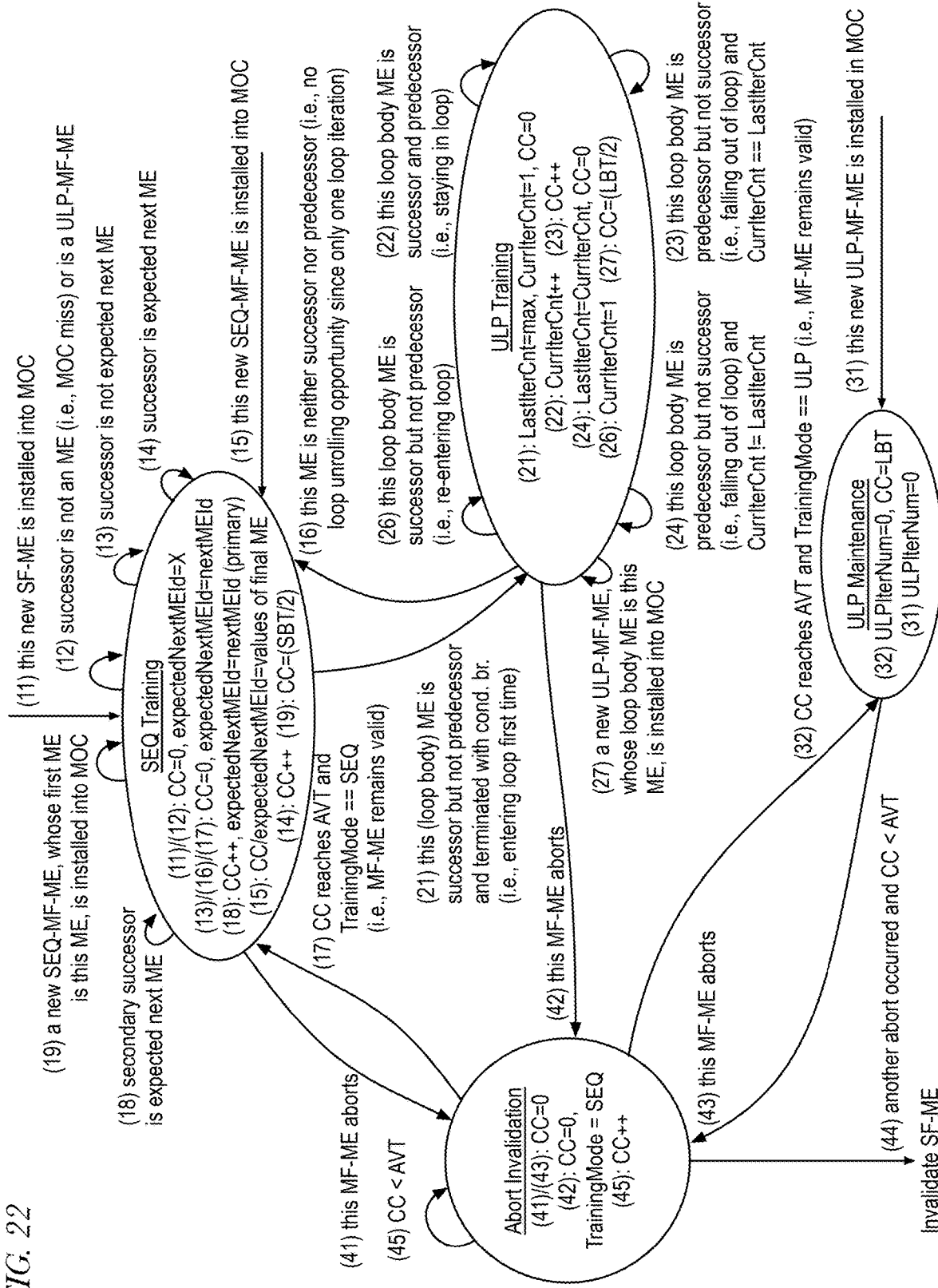
FIG. 22 is a state diagram illustrating operation of the PRU of FIG. 1 in accordance with embodiments of the present disclosure.

The CurrIterCnt 1914 indicates the number of iterations predicted by the PRU 102 for the current instance of a loop body ME, as described with respect to FIG. 22, for example.

Figure 43:
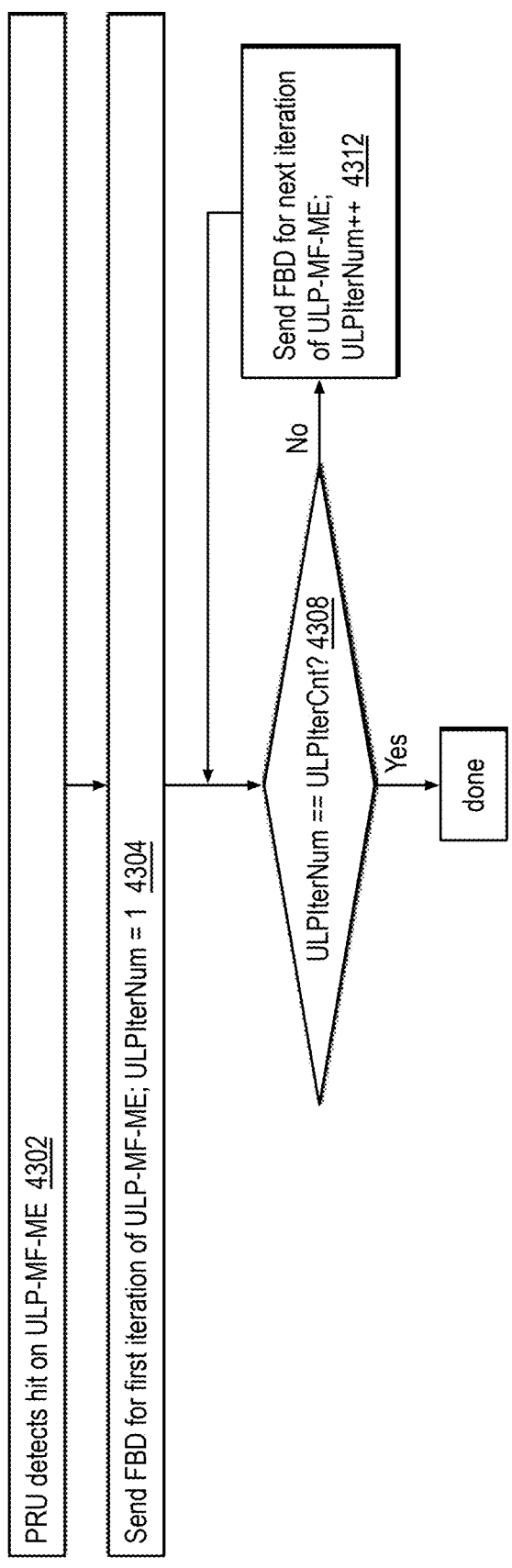
FIG. 43 is a flowchart illustrating operation of the PRU in the case of a hit in the MOC 171 of FIG. 1 on a ULP-MF-ME in accordance with embodiments of the present disclosure.

The ULPIterNum 1916 indicates the number of iterations on a ULP-MF-ME predicted by the PRU 102 for the current instance of the ULP-MF-ME, as described with respect to FIG. 22 and FIG. 43, among others. To be clear, the ULPIterNum 1916 does not indicate the number of iterations on the loop body ME that was used to build the ULP-MF-ME. This is because the ULP-MF-ME is in essence the loop body ME unrolled F times such that one iteration on the ULP-MF-ME corresponds to F iterations on the loop body ME.

Figure 25:
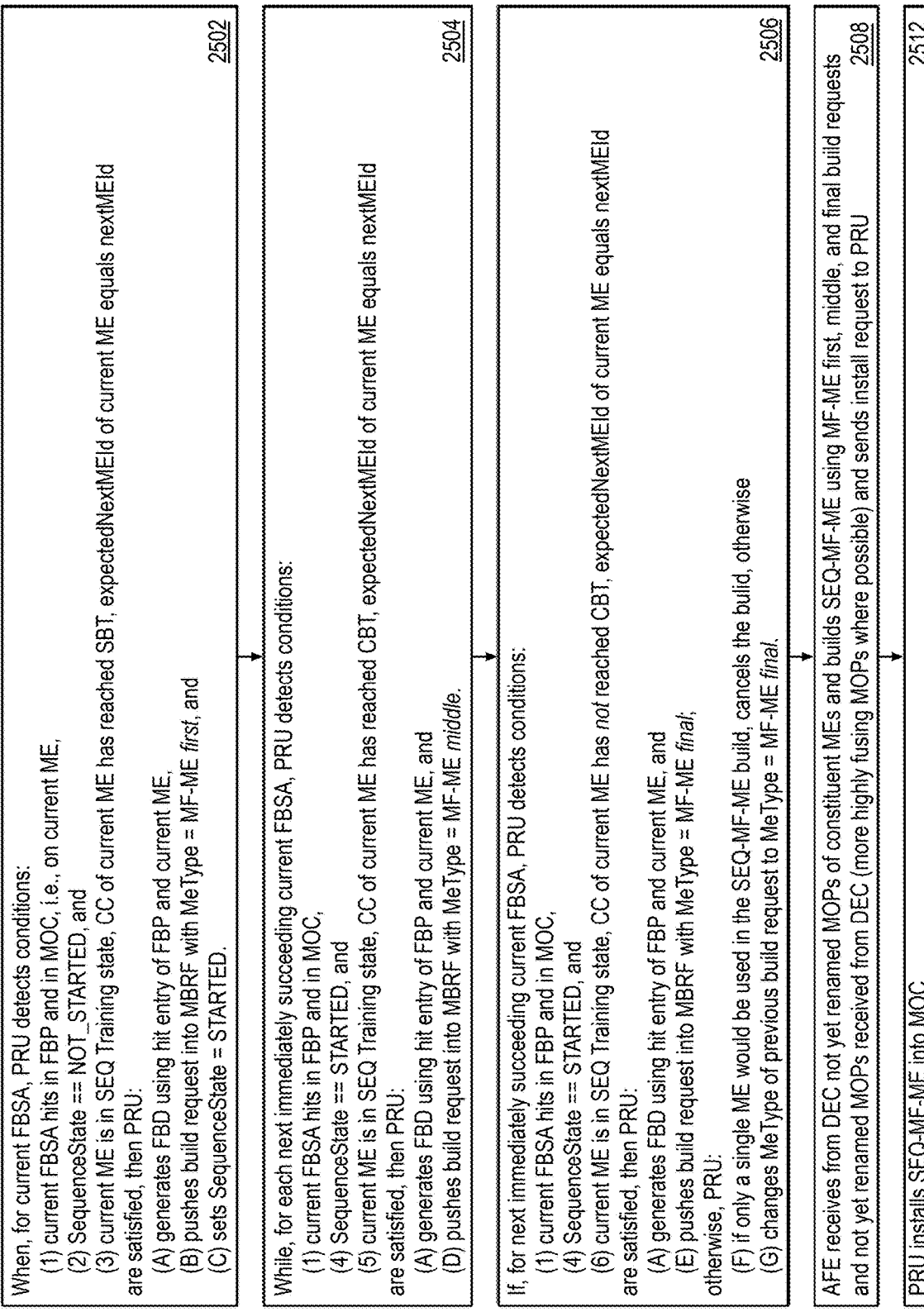
FIG. 25 is a flowchart illustrating operation of the processor of FIG. 1 to build a SEQ-MF-ME in accordance with embodiments of the present disclosure.

The SequenceState 1918 is a state variable used by a state machine of the PRU 102 when building a SEQ-MF-ME, as described with respect to FIG. 25, for example.

The start build threshold (SBT) 1922 is a value against which the PRU 102 compares a consistency counter (CC) 2008 (of FIG. 20) of the current ME to determine whether the PRU 102 should start a SEQ-MF-ME build using the current ME as the first constituent ME of the SEQ-MF-ME (and the successor to the current ME as a middle or final constituent ME of the SEQ-MF-ME).

The MSBT 1923 is similar to the SBT 1922, but holds a second start build threshold used by the PRU 102 to decide whether to start a build of a new SEQ-MF-ME when the first constituent ME in the sequence is an MF-ME rather than an SF-ME. That is, in an embodiment, when the PRU 102 is considering whether to start a build of a new SEQ-MF-ME, the PRU 102 compares the CC 2008 of the current ME (which is the first constituent ME of the sequence) against the SBT 1922 if the current ME is an SF-ME and compares the CC 2008 of the current ME against the MSBT 1923 if the current ME is an MF-ME. As with the SBT 1922, the MSBT 1923 may be software configurable or may be dynamically variable by hardware based on recent characteristics of the program instruction stream. In an embodiment, the value of the MSBT 1923 may be inclusively between the value of the SBT 1922 and the CBT 1924. This may advantageously facilitate the extending/lengthening of a SEQ-MF-ME more quickly than would otherwise be achievable, as described with respect to FIG. 22 and FIG. 30. In an alternate embodiment, the MSBT 1923 may be a function of the number of FBlks that will be associated with the new SEQ-MF-ME once extended, which is indicative of the number of internal branch MOPs and therefore indicative of the likelihood of not behaving according to the built-in expectations and causing a need for an abort request, similar to the manner described with respect to the CBT 1924.

The continue build threshold (CBT) 1924 is a value against which the PRU 102 compares the CC 2008 of the current ME to determine whether the PRU 102 should continue a SEQ-MF-ME build. If the CC 2008 of the current ME has reached the CBT 1924, the current ME will be a middle constituent ME of the SEQ-MF-ME (and the successor of the current ME will be a middle or final constituent ME of the SEQ-MF-ME); otherwise, the current ME will be the final constituent ME of the SEQ-MF-ME.

The loop build threshold (LBT) 1926 is a value against which the PRU 102 compares the CC 2008 of the current ME (loop body ME) when it is in ULP Training state to determine whether the loop body ME has a consistent loop iteration count, has a minimum loop iteration count, or has been observed a sufficient number of times to have confidence in the obtained histogram. If so, the PRU 102 uses multiple copies (i.e., the loop unroll factor 1912) of the MOPs of the loop body ME to build a ULP-MF-ME.

The abort validation threshold (AVT) 1928 is a value against which the PRU 102 compares the CC 2008 of the current ME when the current ME is in the Abort Invalidation state. The PRU 102 invalidates the current ME in the MOC if a predetermined number of subsequent instances (which is one in an embodiment, but which may be software configurable in another embodiment) in which execution of the current ME caused a need for an abort before the CC 2008 reaches the AVT 1928. Whereas the PRU 102 retains the current ME in the MOC if the CC 2008 reaches the AVT 1928 before the predetermined number of instances.

In an embodiment, the thresholds (e.g., the SBT 1922, CBT 1924, LBT 1926, and AVT 1928) may be software configurable. That is, a program (software) running on the processor 100 executes an instruction that writes the value of the threshold to a register (e.g., the SBT 1922, CBT 1924, LBT 1926, and AVT 1928) that holds the threshold so that the PRU 102 may compare the threshold to another value (e.g., the CC 2008 of the current ME) when needed, e.g., to decide when to build an MF-ME using the current ME or to transition the current ME to a different state (e.g., out of Abort Invalidation state of FIG. 22). Typically, the instruction that writes the threshold registers will be executed at an appropriate initialization time, e.g., by power-on boot firmware that configures the processor 100 before it is released out of reset, by system firmware that runs when the system that includes the processor 100 powers on or is reset, during initialization of the operating system, or when a particular software application is about to be run that may gain a performance and/or power benefit from the thresholds written to the threshold registers. The instruction may be a special instruction of the instruction set architecture that writes to configuration registers of the processor 100 and/or that the processor 100 will only execute when the processor 100 is at a predetermined privilege level (e.g., supervisor level). The processor 100 may impose a range of values (e.g., minimum value and maximum value) that may be written to the threshold registers.

In an embodiment, each threshold register has an associated default value of the threshold to which the processor 100 sets the threshold register upon reset of the processor 100. The default values may be determined through performance analysis. For example, a set of common workloads (e.g., popular operating systems and applications) may be run on the processor 100 with a spectrum of threshold values, and the performance may be measured, and the default threshold values may be picked based on various criteria. For example, the highest-performing threshold values may be chosen. For another example, the threshold values that exhibit the least variability in performance may be chosen. Similar techniques may be employed to select the threshold values that software may configure (i.e., write) into the threshold registers. For example, if the processor 100 is to be used in a particular application (e.g., the processor 100 is an embedded processor in a network router, or the processor 100 is a general-purpose processor in a personal computer running a specific application such as photo processing, or the processor 100 is in a computer primarily functioning as a database server), the user may employ similar performance analysis techniques to obtain the threshold values to be configured into the threshold registers. Some of the thresholds (e.g., the SBT 1922, CBT 1924, LBT 1926) may affect how frequently MF-ME aborts occur, which have an associated cost that must be balanced against the benefit of larger MF-MEs or MF-MEs at all. Other thresholds (e.g., the AVT 1928) may affect how quickly the processor 100 invalidates an MF-ME that is causing aborts.

With respect to SEQ-MF-MEs, the thresholds may affect the size of the SEQ-MF-MEs. In an embodiment, various heuristics are employed using multiple thresholds. In an embodiment, the SBT 1922 is a larger value than the CBT 1924. Depending upon the program instruction stream, this may facilitate the building of longer SEQ-MF-MEs on a first attempt since the confidence (e.g., CC 2008) in the successors of middle MEs of the sequence need not be as high as the confidence in the successor of the first ME of the sequence. In an alternate embodiment, the SBT 1922 and the CBT 1924 are the same value. As the number of internal branch MOPs of the MF-ME increases (which tracks closely with the number of FBlks associated with the MF-ME), so does the likelihood that the MF-ME may cause an abort. Thus, in an alternate embodiment, beyond a predetermined number of initial MEs in the sequence, the threshold (e.g., CBT 1924) for continuing the SEQ-MF-ME build is increased for subsequent constituent MEs of the sequence. In such an embodiment, the continue build threshold may be increased for subsequent constituent MEs of the sequence as a function of the number of FBlks associated with the SEQ-MF-ME. Furthermore, embodiments are described (e.g., with respect to FIG. 30) in which an existing SEQ-MF-ME may be subsequently lengthened as the confidence in a longer sequence is gained. In such an embodiment, an additional software configurable or hardware dynamically varying threshold register may be included in the PRU 102 that holds an alternate start build threshold (e.g., MSBT 1923 of FIG. 30) that is used by the PRU 102 when the first ME of the sequence is an MF-ME, and the PRU 102 uses the main start build threshold (held in the SBT 1922) when the first ME of the sequence is an SF-ME. In such embodiment, an additional software configurable or hardware dynamically varying threshold register may be included in the PRU 102 that holds an alternate start build threshold that is used by the PRU 102 when the successor ME to the first ME of the sequence is an MF-ME, and the PRU 102 uses the main start build threshold (held in the SBT 1922) when the successor ME to the first ME of the sequence is an SF-ME. In an embodiment, the value of the main start build threshold is greater than the continue build threshold. In an embodiment, the value of the alternate start build threshold is inclusively between the main start build threshold and the continue build threshold.

In an embodiment, the thresholds may be dynamically varied by hardware (e.g., control logic) within the processor 100. In an embodiment, the thresholds are dynamically varied based on recent characteristics of the program instruction stream. In an embodiment, a recent characteristic of the program instruction stream is a recent hit rate in the MOC 171. In an embodiment, the MOC hit rate is monitored, and the thresholds are adjusted to maximize the MOC hit rate.

The ULPFBSA register 1932 holds the FBSA of the current ULP-MF-ME, i.e., the FBSA that hit in the FBP 152 and in the MOC 171 and is being processed by the PRU 102. The ULPState register 1934 indicates the current state of a state machine within the PRU 102 used to process a ULP-MF-ME. The uses of the ULPFBSA register 1932, the ULPState register 1934 and the FBlksSeenThisIteration register 1936 will be described in more detail, e.g., with respect to FIG. 45.

FIG. 20 is a block diagram illustrating training fields 331 of an MTR entry 330 of an ME 350 in accordance with embodiments of the present disclosure. The training fields 331 include an InTraining indicator 2002, a TrainingMode indicator 2004, a DoNotTrain indicator 2006, the CC 2008, an expectedNextMEId field 2012, a LastIterCnt/MinIterCnt/ HistIterCnt field 2014, a ULPIterCnt field 2016, a ULP indicator 2018, a numFBlksLoopBody field 2019, and a histogram 2022 of frequencies of a range of loop iteration counts. The LastIterCnt/MinIterCnt/HistIterCnt field 2014 is a single field that functions either as a LastIterCnt 2014, MinIterCnt 2014, or HistIterCnt 2014 depending upon which of three respective different ULP-MF-ME embodiments is being described. In a first embodiment, referred to as the consistent loop iteration count (CLIC) embodiment, the PRU 102 employs the LastIterCnt 2014 to detect a loop body ME upon which the program instruction stream loops with a consistent loop iteration count. In a second embodiment, referred to as the minimum loop iteration count (MLIC), the PRU 102 employs the MinIterCnt 2014 to detect a loop body ME upon which the program instruction stream loops with a minimum loop iteration count. That is, the loop iteration count may be (and typically is) inconsistent, however the PRU 102 is able to determine with a level of confidence (e.g., indicated by the CC 2008) that the program instruction stream exhibits a minimum loop iteration count that may be used to build a ULP-MF-ME. In a third embodiment, referred to as the histogram loop iteration count (HLIC) embodiment, the PRU 102 employs the HistIterCnt 2014 to detect a loop body ME upon which the program instruction stream also loops with a (permitted and typically) inconsistent loop iteration count, and the PRU 102 employs the histogram 2022 of frequencies of a range of loop iteration counts exhibited by the program instruction stream to select a loop iteration count (HistIterCnt 2014) to use to build the ULP-MF-ME.

As may be observed from FIG. 18, the InTraining indicator 2002 indicates whether the ME is currently being trained for an MF-ME build, more specifically either for use as a constituent ME in a SEQ-MF-ME build or as a loop body ME in a ULP-MF-ME build. As may be observed from FIG. 18, the TrainingMode indicator 2004 indicates which of the two training modes, or states—SEQ Training state or ULP Training state—the ME is currently being trained in if the InTraining indicator 2002 indicates the ME is currently being trained. The DoNotTrain indicator 2006 indicates whether or not the PRU 102 should attempt to train the ME. In an embodiment, the DoNotTrain indicator 2006 is set to a true value when a build constraint within a set of known build constraints was encountered during an attempt to build an MF-ME that includes the ME.

Unless otherwise indicated, the PRU 102 increments the CC 2008 of the ME each time the PRU 102 predicts the ME is present in the program instruction stream. The PRU 102 saturates the CC 2008 value at its maximum value rather than rolling over. In an embodiment, the CC 2008 is used by the PRU 102 when the ME is in the SEQ Training state, the ULP Training state, or the Abort Invalidate Training state; the expectedNextMEId 2012 is used by the PRU 102 when the ME is in the SEQ Training state; the LastIterCnt/ MinIterCnt/HistIterCnt 2014 is used by the PRU 102 when the ME is in the ULP Training state; and the ULPIterCnt 2016 is used by the PRU 102 when the ME is in the ULP Maintenance state. The training fields 331 are employed by the PRU 102 to perform various operations including the training and building of MEs, including: the building of SF-MEs and the building of MF-MEs, including SEQ-MF-MEs and ULP-MF-MEs; the incremental growing of MEs; the facilitation of same-FBSA co-residency of a ULP-MF-ME and its loop body ME (including a loop body MF-ME) via the processing of a multi-hit in the MOC; and the selective invalidation of an ME after causing an abort. In an embodiment, some of the training fields 331 may share space within an MTR entry 330 and/or have different uses based on the current training mode, e.g., expectedNextMEId 2012, LastIterCnt/MinIterCnt/HistIterCnt 2014, ULPIterCnt 2016, ULP indicator 2018, and histogram 2022. In an embodiment, the MOC 171 includes a training RAM (not shown) that is arranged as a set associative structure corresponding to the set associative MTR 173, and the training RAM holds the training fields 331.

When the ME is in SEQ Training state, the CC 2008 indicates a level of consistency that the ME has been immediately succeeded in the program instruction stream by the ME identified by the expectedNextMEId field 2012, i.e., that the ME and the ME identified by the expectedNextMEId field 2012 are a sequence in the program instruction stream. In an embodiment, the CC 2008 is a count of the number of consecutive times the ME has been immediately succeeded in the program instruction stream by the ME identified by the expectedNextMEId field 2012. When the ME is in ULP Training state, the CC 2008 indicates a level of consistency of a loop iteration count by the ME while functioning as a loop body ME. In an embodiment, the CC 2008 is a count of the number of consecutive times the loop body ME has had the same loop iteration count in the program instruction stream. When the ME is in Abort Invalidation state, indicates a level of confidence that the ME should be retained in the MOC 171 rather than invalidated. In an embodiment, the CC 2008 indicates the number of times the PRU 102 has predicted the ME is present in the program instruction stream since the ME was transitioned to the Abort Invalidation state.

When the current ME is in the SEQ Training state, the expectedNextMEId field 2012 holds the MEId of the ME that the PRU 102 expects will immediately follow the current ME in the program instruction stream. In the CLIC embodiment, when the ME is in ULP Training mode, the LastIterCnt field 2014 indicates the loop iteration count on the ME, while functioning as a loop body ME, during the most recent instance of a loop on the loop body ME, as described more with respect to FIG. 22 and FIG. 33. In the MLIC embodiment, the MinIterCnt field 2014 indicates the minimum loop iteration count on the loop body ME observed since the ME entered the ULP Training mode, as described more with respect to FIG. 36 and FIG. 39. In the HLIC embodiment, the HistIterCnt field 2014 indicates the loop iteration count on the loop body ME selected by the PRU 102 based on the histogram 2022 of frequencies of ranges of loop iteration counts observed since the ME entered the ULP Training mode, as described more with respect to FIG. 37 and FIG. 40.

The installation by the PRU 102 of a ULP-MF-ME into the MOC 171 includes initializing the ULP-MF-ME to the ULP Maintenance mode (e.g., per arc (31) of FIG. 22) and populating the ULPIterCnt 2016. The ULPIterCnt 2016 indicates the number of iterations of the ULP-MF-ME (in contrast to iterations of the loop body ME used to build the ULP-MF-ME) that the PRU 102 should predict in response to a hit on the ULP-MF-ME, e.g., as described with respect to FIG. 44. In the CLIC embodiment, the PRU 102 may select a value of the loopUnrollFactor (F) 1912 used to build the ULP-MF-ME that is an integer submultiple of the LastIterCnt 2014 of the loop body ME used to build the ULP-MF-ME (i.e., there is no remainder in the quotient of LastIterCnt 2014 and F), and the PRU 102 may populate the ULPIterCnt 2016 with the quotient of the LastIterCnt 2014 and F. In an alternate embodiment, the PRU 102 may select a value of F that is not necessarily an integer submultiple of the LastIterCnt 2014 (i.e., there may be a remainder in the quotient of LastIterCnt 2014 and F), and the PRU 102 may populate the ULPIterCnt 2016 with a floor function of the quotient of the LastIterCnt 2014 and F.

In the MLIC embodiment, the PRU 102 may select a value of F that is not necessarily an integer submultiple of the MinIterCnt 2014, and the PRU 102 may populate the ULPIterCnt 2016 with a floor function of the quotient of the MinIterCnt 2014 and F, or the PRU 102 may populate the ULPIterCnt 2016 with a ceiling function of the quotient of the MinIterCnt 2014 and F, depending upon the value of the remainder. That is, by applying the floor function, the PRU 102 may reduce the risk of a need for an abort if the actual loop iteration count on a subsequent instance of a loop on the loop body ME is less than the product of F and the ULPIterCnt 2016, or by applying the ceiling function the PRU 102 may increase the risk of a need for an abort in exchange for potentially increased performance by potentially reducing the number of tail iterations, which are described with respect to FIG. 44, for example, when processing a hit on a ULP-MF-ME.

In the HLIC embodiment, the PRU 102 may similarly populate the ULPIterCnt 2016 with either a floor or a ceiling function of the quotient of the HistIterCnt 2014 and F. When the ULP-MF-ME is hit upon in the MOC 171, the PRU 102 generates a number of FBDs 191 equal to the ULPIterCnt 2016 to cause the IFU 106 to fetch the number of copies of the ULP-MF-ME from the MOC 171. For example, if the LastIterCnt 2014 of the loop body ME used to build the ULP-MF-ME was fifteen and the loopUnrollFactor (F) 1912 that was used to build the ULP-MF-ME was three, then the PRU 102 may populate the ULPIterCnt 2016 with a value of five, and when the ULP-MF-ME is hit on in the MOC 171, the PRU 102 will generate five FBDs 191 to cause five copies of the ULP-MF-ME to be fetched from the MOC 171. The PRU 102 may also use the ULPIterCnt 2016 to determine how many times to iterate through generating the next FBSA 449 and updating the branch history 1105 and RAP 1146 of FIG. 11 to process a hit on the ULP-MF-ME, as described with respect to FIG. 43.

The ULP indicator 2018, if true, indicates the current ME is a ULP-MF-ME. The ULP indicator 2018, if false, indicates the current ME is not an ULP-MF-ME. The ULP indicator 2018 facilitates co-residency in the MOC 171 of a ULP-MF-ME (whose ULP indicator 2018 is set to true) and its loop body SEQ-MF-ME (whose ULP indicator 2018 is set to false), which may provide a performance benefit.

The numFBlksLoopBody field 2019 is populated, when a new ULP-MF-ME is built, with the numFBlks 335 of the loop body ME used to build the new ULP-MF-ME. The numFBlksLoopBody 2019 may be used to handle tail iterations, as described with respect to FIG. 45.

In an HLIC embodiment shown in FIG. 20, the histogram 2022 comprises a set of B frequency bins, or counters, that count frequencies, denoted "freq[ ]", corresponding to a range of B loop iteration counts that are used for ULP training. In FIG. 20, freq[0], freq[1], freq[J], and freq[B−1] are shown. For example, assume B is eight, and assume freq[0] corresponds to a loop iteration count of 22, freq[1] corresponds to a loop iteration count of 23, and so forth to freq[7] corresponds to a loop iteration count of 29. In such an example, when a loop body ME is in ULP Training state, the PRU 102 increments freq[0] if an instance of a loop on the loop body ME has a loop iteration count of 22, the PRU 102 increments freq[1] if the instance of a loop on the loop body ME has a loop iteration count of 23, and so forth such that the PRU 102 increments freq[7] if the instance of a loop on the loop body ME has a loop iteration count of 29. The histogram field 2022 need not be present in the MTR entry 330 for the CLIC and MLIC embodiments.

FIG. 21 is a block diagram illustrating an MBRF entry (MBRFE) 2100 in the MBRF 179 of FIG. 1 in accordance with embodiments of the present disclosure. An MBRFE 2100 includes an MeType indicator 2102, a BuildValid indicator 2104, a BuildReady indicator 2106, a NumFBlks field 2108, a VaTagInfo field 2114, an initial MDR pointers field 2116, a NumMDREs field 2118, and an FBlkID field 2117. To cooperatively build a new ME 350 in the MOC 171, the PRU 102 and AFE 181 use one or more MBRFEs 2100 within the MBRF 179 to communicate. That is, the AFE 181 and the PRU 102 each build a respective portion of the new ME 350. Generally speaking, the AFE 181 builds the one or more MDREs 340 of the new ME 350, and the PRU 102 builds the MTR entry 330 of the new ME 350 and marks it valid for use. More specifically, the PRU 102 requests the AFE 181 to start the build of the new ME 350 by pushing one or more MBRFEs 2100 into the MBRF 179; the AFE 181 requests free MDREs 340 from the MOC 171 as needed, the MOC 171 provides the MDREs 340 from the free list, and the AFE 181 populates the MOPs 342 and the next MDR pointer 344 of each obtained MDRE 340 of the new ME 350; the AFE 181 sends an install request to the PRU 102; and the PRU 102 employs its replacement policy to select an MTRE 330 to replace in the MTR 173, populates the selected MTRE 330, marks the populated MTRE 330 valid, and returns to the free list the MDREs 340 previously allocated to the replaced ME 350.

The MeType indicator 2102 indicates whether the MBRFE 2100 is a request for the AFE 181 to build an SF-ME or to build an MF-ME. If the MeType indicator 2102 indicates an SF-ME build, the PRU 102 will only push a single MBRFE 2100 into the MBRF 179 to accomplish the build of the SF-ME, and the single MBRFE 2100 will be associated with a single FBlk whose MOPs (decoded by the DEC 112 from AIs of the FBlk) are used by the AFE 181 to build the SF-ME. If the MeType indicator 2102 indicates an MF-ME build, the PRU 102 will push multiple MBRFEs 2100 into the MBRF 179 to accomplish the build of the MF-ME. Each of the multiple MBRFEs 2100 is associated with a different respective one of the multiple constituent MEs 350 whose MOPs (provided by the MOC 171) are used to build the new MF-ME. In the case of an MF-ME build, the MeType indicator 2102 also indicates whether the ME 350 associated with the MBRFE 2100 is the first ME of the new MF-ME, a middle ME of the new MF-ME, or the last ME of the new MF-ME. More specifically, the MeType indicator 2102 also indicates whether the ME 350 associated with the MBRFE 2100 is the first, middle, or last ME in sequence of a new SEQ-MF-ME or is the first, middle, or last copy of the F (loop unroll factor) copies of a loop body ME of a new ULP-MF-ME.

The BuildValid indicator 2104, indicates whether or not the MBRFE 2100 is valid. The PRU 102 sets the BuildValid indicator 2104 to true when the PRU 102 pushes the MBRFE 2100 into the MBRF 179. The AFE 181 clears the BuildValid indicator 2104 to false when the AFE 181 completes its portion of the build in the MOC 171 of the ME 350 associated with the MBRFE 2100, e.g., has populated the MDREs 340 in the MDR 175 associated with the new ME 350. The AFE 181 may also clear the BuildValid indicator 2104 if it cancels a build of an ME 350 before the build completes, e.g., because a build constraint is encountered, or an external snoop requires cancellation of the build. In an embodiment, if the AFE 181 encounters a build constraint (e.g., exceeding the maximum number of MOPs of an ME 350), the AFE 181 may shorten the ME 350 build, i.e., the AFE 181 may build a new MF-ME out of fewer constituent MEs 350 than originally requested by the PRU 102. In such case, the AFE 181 may clear to false only the BuildValid indicator 2104 of the MBRFEs 2100 associated with the constituent MEs 350 used in the shortened build and leave set to true the BuildValid indicator 2104 of the remaining MBRFEs 2100 since the AFE 181 may subsequently perform a build of a second MF-ME from the remaining MBRFEs 2100 associated with the remaining constituent MEs 350.

The BuildReady indicator 2106 indicates whether or not the AFE 181 has completed the build in the MOC 171 of the ME 350 associated with the MBRFE 2100. The PRU 102 clears the BuildReady indicator 2106 to false when the PRU 102 pushes the MBRFE 2100 into the MBRF 179. The AFE 181 sets the BuildReady indicator 2106 to true when the AFE 181 has completed its portion of the build in the MOC 171 of the ME 350 associated with the MBRFE 2100. The AFE 181 then sends an install request to the PRU 102 to request the PRU 102 to perform its portion of the build in the MOC 171 of the ME 350 associated with the MBRFE 2100. The PRU 102 may use information from the MBRF 179 to populate the selected MTR entry 330, e.g., the NumFBlks 2108, VaTagInfo 2114, initial DR pointers 2116, and numMDREs 2118, each of which is described below.

NumFBlks field 2108 indicates the number of FBlks associated with the MBRFE 2100. In the case of an SF-ME MBRFE 2100, the NumFBlks 2108 is one. In the case of an MF-ME MBRFE 2100, the NumFBlks 2108 is the number of FBlks associated with the constituent ME 350 associated with the MBRFE 2100. The constituent ME may be a loop body ME. Thus, if the constituent ME 350 is an SF-ME, the NumFBlks 2108 is one, whereas if the constituent ME 350 is an MF-ME, the NumFBlks 2108 is greater than one. In response to the install request, the PRU 102 may add the NumFBlks 2108 values of all the MBRFEs 2100 of the MF-ME build and use the resulting sum to populate the numFBlks field 335 of the selected MTRE 330. In the case of a ULP-MF-ME, the NumFBlks 2108 value of each of the F (loop unroll factor) MBRFEs 2100 will be the numFBlks 335 of the loop body ME, and the PRU 102 will add the NumFBlks 2108 values of all the F MBRFEs 2100 of the MF-ME build and use the resulting sum, which will be F*numFBlks of the loop body ME, to populate the numFBlks field 335 of the MTRE 330 selected for the new ULP-MF-ME.

The VaTagInfo field 2114 includes the virtual address (e.g., FBSA) of the FBlk of an SF-ME build or the virtual address of the FBlk associated with the first ME 350 of an MF-ME build. The VaTagTnfo field 2114 may also include other values, e.g., an associated address space identifier (ASID), virtual machine identifier (VMID), translation context (TC). In response to the install request, the PRU 102 may use the VaTagInfo field 2114 to populate the MTR tag 332 of the selected MTR entry 330 of the new ME 350.

The initial MDR pointers 2116 holds the pointers (e.g., indexes into the MDR 175) to the initial MDREs 340 of the new ME 350. In response to the install request, the PRU 102 may populate the initial MDR pointers 336 of the selected MTR entry 330 with the initial MDR pointers 2116. Prior to sending the install request, the AFE 181 may populate the initial MDR pointers 2116 with the pointers to the initial MDREs 340 previously obtained from the MOC 171.

The NumMDREs field 2118 is populated by the AFE 181, prior to the install request, with the number of MDREs 340 that the ME 350 comprises, i.e., with the number of MDREs 340 that hold the MOPs of the newly built ME 350 after the AFE 181 has completed its portion of the new ME 350 build. In response to the install request, the PRU 102 may populate the numMDREs 339 of the selected MTR entry 330 with the numMDREs 2118 of the MBRFE 2100.

The FBlkID field 2117 holds an FBlk identifier (FBlkID) that uniquely identifies an ME associated with the MBRFE 2100. The PRU 102 populates the FBlkID field 2117 with the same value as the FBlkID 317 of the FBD 191 of the FBlk associated with the MBRFE 2100, which enables the AFE 181 to match FBlkIDs to obtain from the DEC 112 the MOPs needed to build a new ME 350.

FIG. 22 is a state diagram illustrating operation of the PRU 102 of FIG. 1 in accordance with embodiments of the present disclosure. The state diagram describes the state of a single ME within the MOC 171, which will be referred to as "this ME" or "the current ME." The state of the current ME at any given time is one of the four states of FIG. 18: SEQ Training, ULP Training, ULP Maintenance, and Abort Invalidation, which are shown as an oval or a circle. The state of the current ME either remains the same, transitions to a different state, or is new, depending upon events that occur. Arcs are shown, and each arc is numbered in parenthesis. The arcs may indicate that the current ME is:

remaining in the same state—arcs (12), (13), (14), (18), (19), (22), (23), (24), (26), (27), (45);

transitioning from one state to another—arcs (16), (17), (21), (32), (41), (43);

being installed in the MOC 171 (a new ME) and thus entering a state—arcs (11), (15), (31); or being invalidated from the MOC 171—arc (44).

Adjacent to each arc is text indicating the events or conditions that cause the arc. The arcs into the SEQ Training state are numbered (11) through (19). The arcs into the ULP Training state are numbered (21) through (27). The arcs into the ULP Maintenance state are numbered (31) through (32). The arcs into the Abort Invalidation state are numbered (41), (42), (43), and (45). Arc (44) exits the Abort Invalidation state. The actions associated with each arc into a state are shown within the state oval next to the arc's number. The actions primarily involve the update of PRU registers 1900 and/or the update of training fields 331 of the current ME. Arc (11) is associated with the build of a new SF-ME; arc (15) is associated with the build of a new SEQ-MF-ME; and arc (31) is associated with the build of a new ULP-MF-ME. For arcs that loop back into a state, the state of the current ME remains unchanged; whereas, for arcs that represent a transition from one state to another or that indicate a build of a new ME, the relevant training fields 331 of the current ME are updated to reflect the new state. Although the updates of the InTraining 2002 and TrainingMode 2004 fields, for example, are not shown in the ovals of FIG. 22 (with the exception of arc (42)), they may be apprehended from the values of the training fields shown in FIG. 18 for the different states.

For many of the arcs of FIG. 22, the current ME (or "this ME") refers to the ME that is hit upon in the MOC 171 when the PRU 102 looks up the current FBSA (and which also hits in the FBP 152 on an FBP entry 200 associated with the first FBlk of the current ME, which in the case of an SF-ME, is the only FBlk of the current ME). The events associated with arcs (41), (42), (43), and (44) occur at decode/execution time when the current ME causes a need for an abort (e.g., IBM abort 493 of FIG. 4A) and the DEC 112 or the back-end 130 notifies the PRU 102 to update the state of the current ME. The events associated with arcs (11), (15), and (31) occur when the PRU 102 installs the current ME into the MOC 171. The events associated with arc (19) occur when the PRU 102 installs into the MOC 171 a new SEQ-MF-ME whose first constituent ME is the current ME. Similarly, the events associated with arc (27) occur when the PRU 102 installs into the MOC 171 a new ULP-MF-ME whose loop body ME is the current ME. The events associated with the remaining arcs occur when the PRU 102 looks up the current FBSA which hits in the FBP 152 and in the MOC 171 on the current ME. In an alternate embodiment, the events associated with the remaining arcs occur when the current ME is committed to architectural state, e.g., the training fields 331 and relevant PRU registers 1900 are updated when the current ME is committed rather than when the current ME is predicted by the PRU 102. Stated alternatively, the training fields 331 and relevant PRU registers 1900 are updated in a delayed fashion based on the actual program instruction stream according to the back-end 130 rather than the predicted program instruction stream according to the PRU 102.

The term "successor" is used to refer to the ME or FBlk that immediately follows the current ME in the program instruction stream. The term "predecessor" is used to refer to the ME or FBlk that immediately precedes the current ME in the program instruction stream. An ME that does not immediately follow the current ME in the program instruction stream but is instead separated by a FBlk (i.e., the next FBSA misses in the MOC 171) is not a successor ME, and an ME that does not immediately precede the current ME but is instead separated by a FBlk (i.e., the previous FBSA misses in the MOC 171) is not a predecessor ME. The MEId of the current ME is the currMEId 1904. If the successor is an ME, its MEId will be the nextMEId 1906, and if the predecessor is an ME, its MEId will be the prevMEId 1902. In the case of a multiple-hit of the next FBSA in the MOC 171 (i.e., the next FBSA with respect to the current FBSA that is looked up in the MOC 171 when the next FBSA becomes the current FBSA), the MEId of the primary successor ME (MF-ME) will be the nextMEId 1906, and the MEId of the secondary successor ME (SF-ME) will be the nextMEId-secondary 1908.

Figure 23:
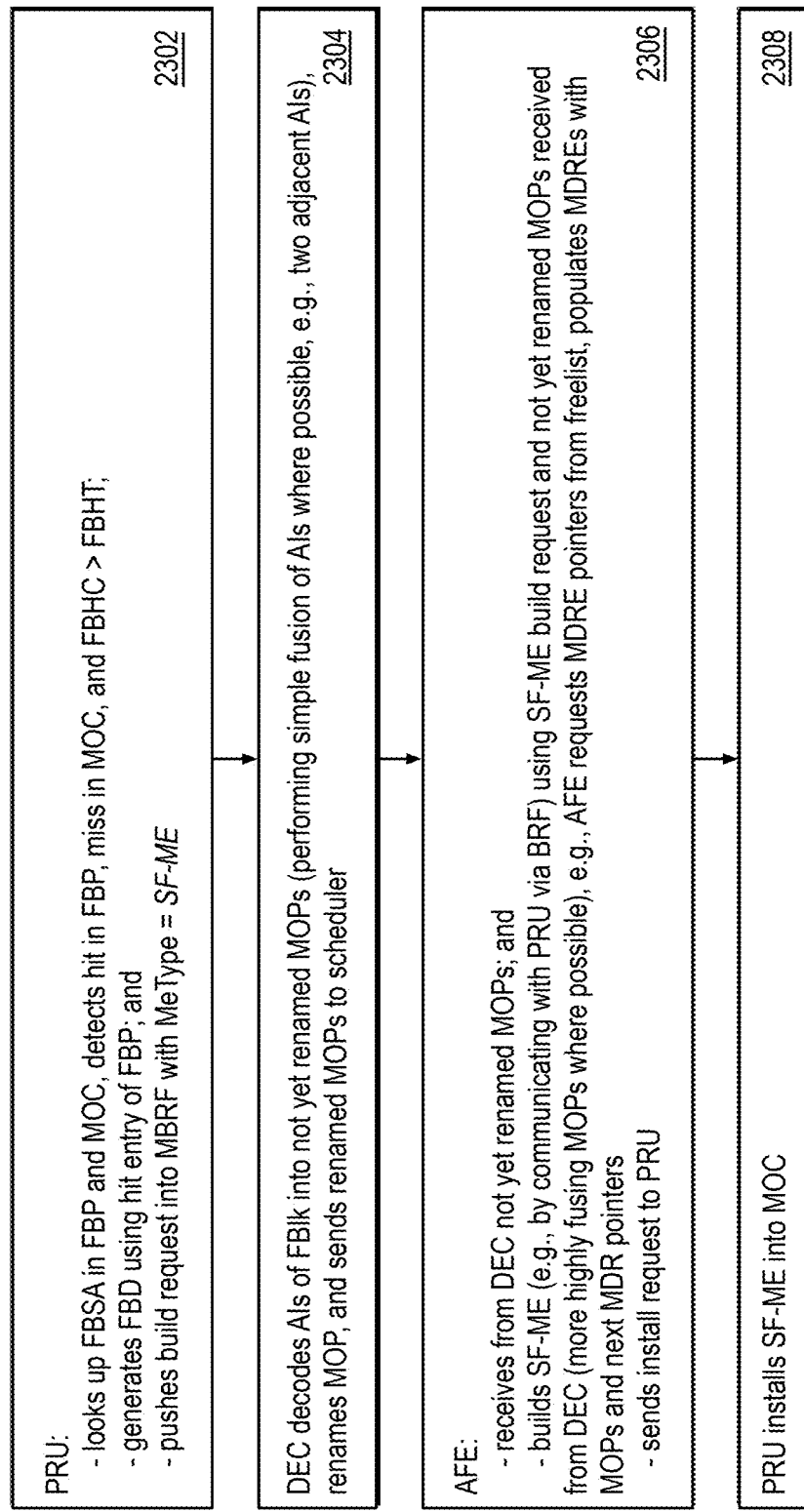
FIG. 23 is a flowchart illustrating operation of the processor of FIG. 1 to build a Single Fetch Block ME (SF-ME) in accordance with embodiments of the present disclosure.

Arc (11) occurs when the current ME is installed as a new SF-ME into the MOC 171, e.g., as described with respect to FIG. 23. For arc (11), the PRU 102 resets the CC 2008 of the current ME to zero and resets the expectedNextMEId 2012 of the current ME to a predetermined value that cannot be the MEId of a valid ME, and the ME is initialized to the SEQ Training state.

Arc (12) occurs when the PRU 102 detects a hit on the current ME, the current ME is in the SEQ Training state, and the successor is not an ME (i.e., the next FBSA misses in the MOC 171) or the successor is a ULP-MF-ME, since in an embodiment a ULP-MF-ME is not allowed to be a constituent ME of a SEQ-MF-ME build. For arc (12), the PRU 102 resets the CC 2008 of the current ME to zero and resets the expectedNextMEId 2012 of the current ME to a predetermined value that cannot be the MEId of a valid ME, and the ME remains in the SEQ Training state.

Arc (13) occurs when the PRU 102 detects a hit on the current ME, the current ME is in the SEQ Training state, and the successor ME is not the expected next ME by the current ME (e.g., expectedNextMEId !=nextMEId). For arc (13), the PRU 102 resets the CC 2008 of the current ME to zero and sets the expectedNextMEId 2012 of the current ME to the MEId of the successor ME (e.g., expectedNextMEId=nextMEId), and the ME remains in the SEQ Training state.

Arc (14) occurs when the PRU 102 detects a hit on the current ME, the current ME is in the SEQ Training state, and the successor is the expected next ME by the current ME (e.g., expectedNextMEId==nextMEId). For arc (14), the PRU 102 increments the CC 2008 of the current ME to indicate higher consistency in the sequence of the current ME and its successor, and the ME remains in the SEQ Training state.

Figure 24:
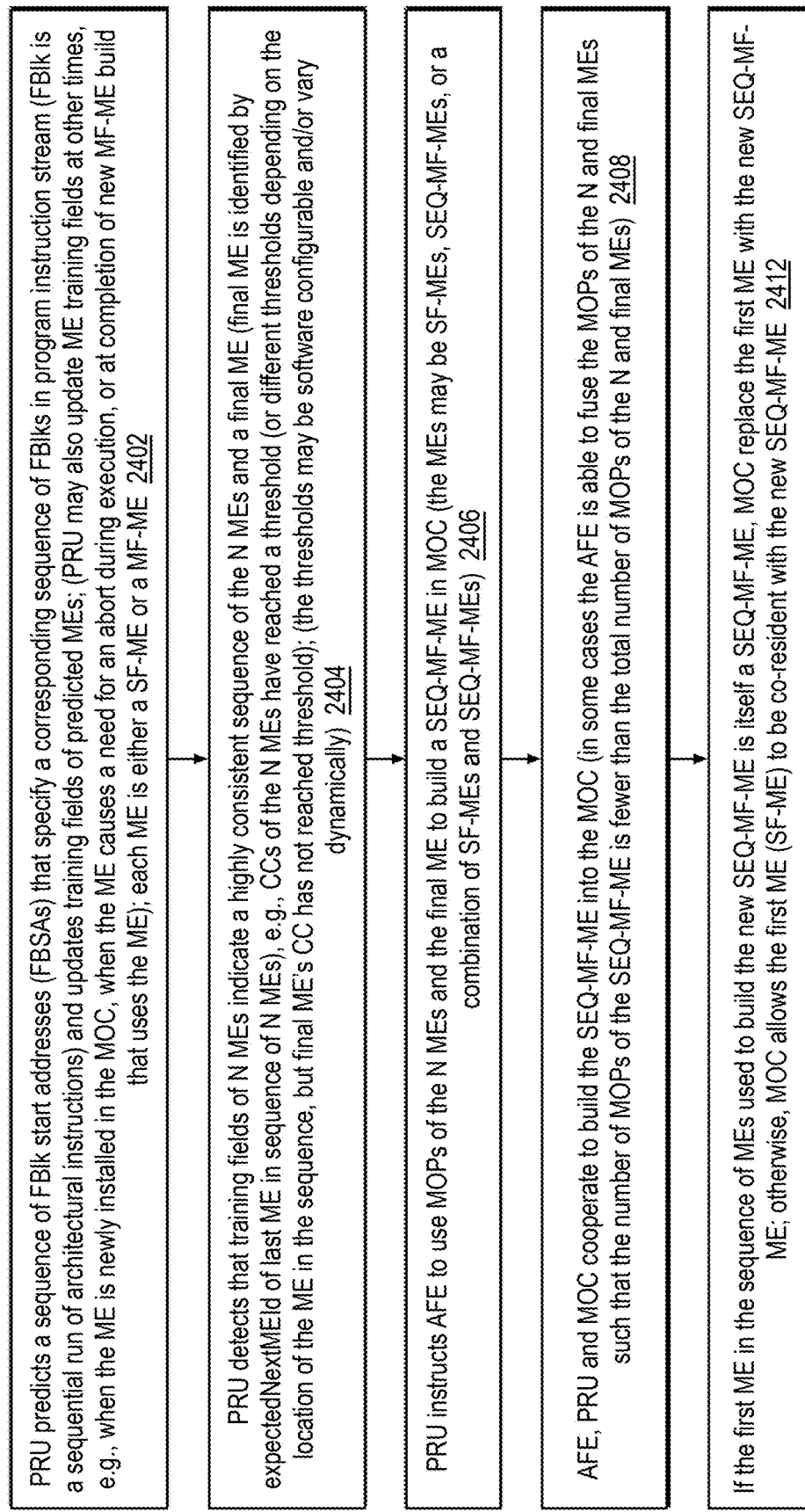
FIG. 24 is a flowchart illustrating operation of the processor of FIG. 1 to build a Sequential Multi-Fetch Block ME (SEQ-MF-ME) in accordance with embodiments of the present disclosure.

Arc (15) occurs when the current ME is installed as a new SEQ-MF-ME into the MOC 171, as described with respect to FIG. 24 and FIG. 25. A SEQ-MF-ME will be built and installed into the MOC 171 when the CCs 2008 of a sequence of MEs indicate the sequence occurs highly consistently within the program instruction stream (e.g., that the CC 2008 of the first constituent ME has reached the SBT 1922 and that the CC 2008 of any middle constituent MEs has reached the CBT 1924). For arc (15), in an embodiment, the PRU 102 copies the CC 2008 and expectedNextMEId 2012 values of the final ME of the build to the respective CC 2008 and expectedNextMEId 2012 fields of the current ME, and the ME is initialized to the SEQ Training state. In an alternate embodiment, the CC 2008 and expectedNextMEId 2012 are merely initialized in the same manner as when a new SF-ME is installed as per arc (11). However, the first embodiment which copies the training fields from the final ME of the build to the training fields 331 of the current ME advantageously retains the previously learned information in the training fields 331, which may enable the new SEQ-MF-ME to be subsequently lengthened (e.g., as described with respect to FIG. 30) sooner than it would according to the alternate embodiment. Similarly, the action taken for arc (18) may also advantageously enable the new SEQ-MF-ME to be subsequently lengthened sooner than it would according to the alternate embodiment.

Arc (16) occurs when the PRU 102 detects a hit on the current ME, the current ME is in the ULP Training state, and the current ME is neither its successor nor its predecessor (e.g., currMEId !=prevMEId and currMEId !=nextMEId), which indicates there is no loop unrolling opportunity since the loop went through only a single iteration. For arc (16), the PRU 102 resets the CC 2008 of the current ME to zero and sets the expectedNextMEId 2012 of the current ME to the MEId of the successor, and the ME is transitioned from the ULP Training state back to the SEQ Training state.

Arc (17) occurs when the PRU 102 detects a hit on the current ME, the current ME is in the Abort Invalidation state, the TrainingMode 2004 is SEQ, and the CC 2008 of the current ME has reached the AVT 1928 before another instance is detected in which execution of the current ME caused a need for an abort, which would have resulted in the current ME being invalidated e.g., per arc (44). These conditions indicate the ME should be retained in the MOC 171, i.e., remain valid, rather than being invalidated. Thus, for arc (17), the PRU 102 resets the CC 2008 of the current ME to zero, sets the expectedNextMEId 2012 of the current ME to the MEId of the successor, and transitions the current ME from the Abort Invalidation state back to the SEQ Training state. Although the embodiment of FIG. 22 describes the PRU 102 retaining the current ME in the MOC 171 and transitioning it out of the Abort Invalidation state when the CC 2008 of the current ME reaches the AVT 1928 before detecting another (i.e., one more) instance in which execution of the current ME has caused a need for an abort, a more general embodiment is contemplated in which the PRU 102 retains the current ME in the MOC 171 and transitions it out of the Abort Invalidation state when the CC 2008 of the current ME reaches the AVT 1928 before detecting a predetermined number of instances in which execution of the current ME has caused a need for an abort, and the predetermined number is greater than one. For example, the predetermined number of instances may be three, in which case the AVT 1928 value may be larger than when the predetermined number of instances is one. The more general embodiment applies not only to arcs (17) and (44), but also to arc (32).

Arc (18) occurs when the PRU 102 detects a hit on the current ME, the current ME is in the SEQ Training state, and the secondary successor of the current ME is the expected next ME by the current ME (e.g., expectedNextMEId==nextMEId-secondary). For arc (18), the PRU 102 increments the CC 2008 of the current ME to indicate higher consistency in the sequence of the current ME and its successor and sets the expectedNextMEId 2012 of the current ME to the MEId of the primary successor, and the ME remains in the SEQ Training state. With respect to arc (15), when a new SEQ-MF-ME is successfully built and installed in the MOC, the CC 2008 and the expectedNextMEId 2012 of the final ME incorporated into the new SEQ-MF-ME's build are copied into the CC 2008 and the expectedNextMEId 2012 of the new (first) SEQ-MF-ME. Later, if and when a successor ME to the first SEQ-MF-ME and another ME that succeeds the successor ME are built into a second SEQ-MF-ME, and if the next PRU 102 prediction in time of the first SEQ-MF-ME is immediately succeeded by a lookup in the MOC of the next FBSA that results in a multiple-hit on both the second SEQ-MF-ME as well as on the first constituent ME of the second SEQ-MF-ME (more specifically, per arc (18), the expectedNextMEId 2012 of the first SEQ-MF-ME matches the MEId of the second SEQ-MF-ME's first constituent ME, which is referred to as the secondary successor above), then the expectedNextMEId 2012 of the first SEQ-MF-ME (the current ME) is updated with the MOC entry ID of the second SEQ-MF-ME, which referred to above as the primary successor, and the existing CC 2008 value of the current ME is maintained. This enables subsequent efficient combining of the first and second SEQ-MF-MEs into a new larger third SEQ-MF-ME build, i.e., directly extending, or lengthening, the first SEQ-MF-ME with the second SEQ-MF-ME, which may be accomplished as described with respect to FIG. 30. In the case that the second SEQ-MF-ME was built first in time, when the first SEQ-MF-ME is built, first it will be initialized per arc (15) from the final ME incorporated into its build, and then the expectedNextMEId 2012 of the first SEQ-MF-ME will, per arc (18), will be updated on its first prediction by the PRU 102 with the MOC entry ID of the second SEQ-MF-ME (assuming the expectedNextMEId 2012 of the first SEQ-MF-ME matches as described above).

Arc (19) occurs when the PRU 102 installs a new SEQ-MF-ME into the MOC 171 and the current ME is the first ME of the new SEQ-MF-ME and the current ME is in the SEQ Training state. For arc (19), in an embodiment, the PRU 102 updates the CC 2008 of the current ME to half the SBT 1922. In an alternate embodiment, the PRU 102 updates the CC 2008 of the current ME to half its current value. In an alternate embodiment, the PRU 102 reduces the CC 2008 of the current ME by a small number, e.g., one or two. In an alternate embodiment, the PRU 102 updates the CC 2008 of the current ME to zero. If the build of the new SEQ-MF-ME fails before the new SEQ-MF-ME is installed in the MOC 171 (e.g., a build constraint is encountered, or the SEQ-MF-ME build must be shortened and only a single ME remains in the sequence—see description of block 2506 of FIG. 25), then the CC 2008 of the current ME will not have been updated, and as a result the CC 2008 of the current ME will still have reached the SBT 1922 such that another build of the new SEQ-MF-ME may be attempted. In an alternate embodiment, the PRU 102 reduces the CC 2008 of the current ME at the time the build of the new SEQ-MF-ME is initiated rather than when the new SEQ-MF-ME is installed in the MOC 171.

In an embodiment, when a SEQ-MF-ME is built and allocated into the MOC 171, an SF-ME that is used as the constituent first ME of the SEQ-MF-ME build is allowed to remain in the MOC 171, i.e., to be co-resident in the MOC 171 with the newly built SEQ-MF-ME. In this case, there are two MEs co-resident in the MOC 171 that have the same FBSA—the constituent first SF-ME and the SEQ-MF-ME. Consequently, both MEs will be allocated into the same set in the MOC 171, but into different ways of the MTR 173. Consequently, when the FBSA is looked up in the MOC 171, the FBSA will hit on both the SF-ME and the SEQ-MF-ME. In an embodiment, the PRU 102 prioritizes the SEQ-MF-ME over the SF-ME, i.e., the PRU 102 uses the SEQ-MF-ME rather than the SF-ME, e.g., to populate the FBD 191 associated with the FBSA 412. Furthermore, in an embodiment, the MOC 171 replacement policy considers the type of ME such that an MF-ME will be chosen for replacement over an SF-ME having the same FBSA. Consequently, a situation may arise in which the SEQ-MF-ME is evicted from the MOC 171, but the constituent first SF-ME remains in the MOC 171. As a result, the next lookup of the FBSA will hit on the constituent first SF-ME and the PRU 102 will begin updating the training fields of the constituent first SF-ME. If the CC of the constituent first SF-ME were not reduced per arc (19), its CC would still likely be above the threshold such that the PRU 102 would immediately initiate a second new SEQ-MF-ME build using the constituent first SF-ME. However, the program instruction stream may have changed such that the training field information may be stale such that it may be undesirable to build the second new SEQ-MF-ME using the constituent first SF-ME. Advantageously, by reducing the CC of the constituent first SF-ME per arc (19), the processor 100 may have the opportunity to predict and execute a significant amount of the current program instruction stream and detect if the successor ME to the constituent first SF-ME is no longer the same (e.g., an abort will occur), in which case the PRU 102 will reset the training fields of the constituent first SF-ME so that it may be re-trained based on the subsequent program instruction stream. On the other hand, in the case that the program instruction stream has not changed in a relevant manner with respect to the constituent first SF-ME, e.g., the successor ME of the constituent first SF-ME is still highly consistently the same, by not resetting the CC of the constituent first SF-ME (according to most of the embodiments described above), a build of a second new SEQ-MF-ME using the constituent first SF-ME may occur sooner. Similarly, in an embodiment, when a ULP-MF-ME is built and allocated into the MOC 171, an SF-ME that is used as the loop body SF-ME of the ULP-MF-ME build is allowed to remain in the MOC 171, i.e., to be co-resident in the MOC 171 with the newly built ULP-MF-ME, and the reduction of the CC of the loop body SF-ME per arc (27) serves a similar purpose as described with respect to arc (19) in the case that the current program instruction stream has changed in a relevant manner, e.g., the loop iteration count is no longer consistent or is different, such that the training field information of the loop body SF-ME is stale.

With respect to the ULP Training state, the following term definitions may be helpful. A loop body ME is an ME that holds a sequence of MOPs that terminates with a conditional branch MOP that transfers control back to the first MOP of the loop body ME if a condition is met. An instance of a loop on a loop body ME, as determined by the PRU, occurs when the PRU predicts the loop body ME immediately succeeds itself at least once before predicting that a different ME or FBlk (i.e., an ME or FBlk other than the loop body ME) in the program instruction stream succeeds the loop body ME. Entering the loop, as determined by the PRU, occurs when the PRU predicts the loop body ME immediately succeeds itself but does not immediately precede itself. Falling out of the loop, as determined by the PRU, occurs when the PRU predicts the different ME or FBlk succeeds the loop body ME. Entering the loop a first time, as determined by the PRU, occurs when the PRU predicts the loop body ME immediately succeeds itself but does not immediately precede itself, and the loop body ME is not yet in the ULP Training state. Re-entering the loop, as determined by the PRU, occurs when the PRU predicts the loop body ME immediately succeeds itself but does not immediately precede itself and the loop body ME is already in the ULP Training state. Staying in the loop, as determined by the PRU, occurs when the PRU predicts the loop body ME both immediately succeeds and precedes itself and the loop body ME is already in the ULP Training state. A loop iteration is an instance of the loop body in the program instruction stream. When the program instruction stream enters a loop, a first loop iteration occurs; when the program instruction stream stays in the loop, an intermediate loop iteration occurs; and just before the program instruction stream falls out of the loop, a final loop iteration occurs. A loop iteration count of an instance of a loop on a loop body is the number of loop iterations on the loop body inclusively between entering the loop until falling out of the loop, i.e., the total number of first, intermediate, and final loop iterations. Built into a ULP-MF-ME are essentially F loop iterations of the loop body ME because F copies of the loop body ME are used to build the ULP-MF-ME (e.g., as described with respect to FIG. 33). Furthermore, a ULP-MF-ME includes a ULPIterCnt 2016 (of FIG. 20), and in response to a hit on the ULP-MF-ME the PRU sends the IFU 106 a number of FBDs equal to the ULPIterCnt to instruct the IFU to fetch ULPIterCnt copies of the ULP-MF-ME (as described with respect to FIG. 43, for example); hence, the PRU effectively predicts there are at least F*ULPIterCnt loop iterations in response to a hit on the ULP-MF-ME, and the PRU may predict subsequent tail iterations of the loop body as described, e.g., with respect to FIG. 44. A loop body ME has exhibited a consistent loop iteration count, as determined by the PRU, when the loop iteration count of at least the last N instances of a loop on the loop body ME has been the same, where N is defined by a threshold.

Arc (21) occurs when the PRU 102 detects a hit on the current ME, the current ME is in the SEQ Training state, the current ME is its successor but not its predecessor (e.g., currMEId==nextMEId and currMEId !=prevMEId), and the current ME is terminated with a conditional branch MOP. These conditions indicate the current ME is a loop body ME and that an instance of a loop on the loop body ME is being entered a first time, e.g., since the current ME last transitioned to the SEQ Training state, which may have been at installation of the current ME, or which may have been on a transition per arc (16) or arc (17). For arc (21), the PRU 102 sets the LastIterCnt 2014 of the current ME to its maximum value (since there is no valid iteration count from a previous instance of a loop on the loop body ME), initializes the CurrIterCnt register 1914 to one since the PRU 102 is predicting a first pass through the loop body ME, i.e., a first iteration of the loop, and resets the CC 2008 of the current ME to zero, and the ME is transitioned from the SEQ Training state to the ULP Training state.

Arc (22) occurs when the PRU 102 detects a hit on the current ME, the current ME is in the ULP Training state, and the current ME is both its successor and its predecessor (e.g., currMEId==nextMEId and currMEId==prevMEId). These conditions indicate the program instruction stream will iterate another time in the current instance of a loop on the current loop body ME (also referred to as staying in the loop). For arc (22), the PRU 102 increments the CurrIterCnt 1914.

Arc (23) occurs when the PRU 102 detects a hit on the current ME, the current ME is in the ULP Training state, the current ME is its predecessor but not its successor (e.g., currMEId==prevMEId and currMEId !=nextMEId), and the CurrIterCnt 1914 equals the LastIterCnt 2104 of the current ME. The conditions that the current ME is in the ULP Training state and is its predecessor but not its successor indicate the program instruction stream is falling out of the current instance of a loop on the current loop body ME (also referred to as falling out of the loop). For arc (23), since the current and last iteration counts are the same, the PRU 102 increments the CC 2008 of the current loop body ME, and the current loop body ME remains in the ULP Training state. In such an embodiment, the CurrIterCnt 1914 is understood by the PRU 102 to hold one less than the actual iteration count, and the LastIterCnt 2014 (when updated per arc (24)) is understood by the PRU 102 to hold one less than the actual iteration count such that the comparison of the CurrIterCnt 1914 and LastIterCnt 2014 performed by the PRU 102 is a correct comparison. In such an embodiment, when the PRU 102 is ready to choose the loopUnrollFactor (F) 1912 and to compute the ULPIterCnt 2016 for building a ULP-MF-ME using the current loop body ME, for example, the PRU 102 adds one to the CurrIterCnt 1914. In an alternate embodiment, if falling out of the loop, the PRU 102 increments the CurrIterCnt 1914 before comparing against the LastIterCnt 2014 per arcs (23) and (24), and the incremented value is used to update the LastIterCnt 2014 per arc (24).

Arc (24) occurs when the PRU 102 detects a hit on the current ME, the current ME is in the ULP Training state, the current loop body ME is its predecessor but not its successor, and the CurrIterCnt 1914 does not equal the LastIterCnt 2104 of the current loop body ME. For arc (24), since the current and last iteration counts are not the same, the PRU 102 resets the CC 2008 of the current loop body ME to zero and updates the LastIterCnt 2014 to the CurrIterCnt 1914, and the current loop body ME remains in the ULP Training state.

Arc (26) occurs when the PRU 102 detects a hit on the current ME, the current ME is in the ULP Training state, and the current ME is its successor but not its predecessor. These conditions indicate the program instruction stream is entering another instance of a loop on the loop body ME (also referred to as re-entering the loop) after falling out of the previous instance of a loop on the current loop body ME, which may have been per arc (23) or arc (24). For arc (26), the PRU 102 initializes the CurrIterCnt 1914 to one.

Arc (27) occurs when the PRU 102 installs a new ULP-MF-ME into the MOC 171 whose loop body ME is the current ME. For arc (27), the PRU 102 updates the CC 2008 of the current ME to half the LBT 1926, and the current ME remains in the ULP Training state. In an alternate embodiment, the PRU 102 updates the CC 2008 of the current ME to half its current value. In an alternate embodiment, the PRU 102 reduces the CC 2008 of the current ME by a small number, e.g., one or two. In an alternate embodiment, the PRU 102 updates the CC 2008 of the current ME to zero. If the build of the new ULP-MF-ME fails before the new ULP-MF-ME is installed in the MOC 171, then the CC 2008 of the current ME will not have been updated, and as a result the CC 2008 of the current ME will still have reached the LBT 1926 such that another build of the new ULP-MF-ME may be attempted.

Arc (31) occurs when the current ME is installed as a new ULP-MF-ME into the MOC 171, as described with respect to FIG. 32 and FIG. 33. A ULP-MF-ME will be built and installed into the MOC 171 when the CC 2008 of a loop body ME indicates that its loop iteration count is highly consistent (e.g., that the CC 2008 has reached the LBT 1926). For arc (31), the PRU 102 resets the ULPIterNum register 1916 to zero, and the ME is initialized to the ULP Maintenance state.

Arc (32) occurs when the PRU 102 detects a hit on the current ME, the current ME is in the Abort Invalidation state, the TrainingMode 2004 is ULP, and the CC 2008 of the current ME has reached the AVT 1928 before another instance is detected in which execution of the current ME caused a need for an abort, which would have resulted in the current ME being invalidated e.g., per arc (44). These conditions indicate the ME should be retained in the MOC 171, i.e., remain valid, rather than being invalidated. Thus, for arc (32), the PRU 102 resets the ULPIterNum register 1916 to zero, sets the CC 2008 of the current ME to the LBT 1926, and transitions the current ME from the Abort Invalidation state back to the ULP Maintenance state.

Arc (41) occurs when the current ME is in the SEQ Training state and the PRU 102 receives a signal from the DEC 112 or the back-end 130 that an execution instance of the current ME has caused a need for an abort. For arc (41), the PRU 102 resets the CC 2008 of the current ME to zero, and the ME is transitioned from the SEQ Training state to the Abort Invalidation state. In an embodiment, the PRU 102 performs the actions associated with arc (41) only if the cause of the need for the abort is within a subset of all abort causes comprehended by (i.e., known to) the processor 100. In an embodiment, the subset of all abort causes comprises microarchitectural abort causes comprehended by the processor. In an embodiment, the microarchitectural abort causes comprehended by the processor comprises a subset of all microarchitectural abort causes comprehended by the processor. In an embodiment, the PRU 102 performs the actions of arc (41) when an internal branch MOP of the current ME does not exhibit an expected behavior built into the current ME, e.g., the branch direction is different than was built into the MF-ME. An internal branch MOP is a branch MOP that is not a terminating branch MOP, i.e., is not the last branch MOP of the ME. A terminating branch MOP of a constituent ME that is built into an MF-ME may become an internal branch MOP, as may be observed from the descriptions herein regarding the building of MF-MEs. The unexpected execution behavior of an internal branch MOP of a SEQ-MF-ME may cause a need for an abort of the SEQ-MF-ME because the program instruction stream did not follow the sequence of MEs that was built into the SEQ-MF-ME. Similarly, the unexpected execution behavior of an internal branch MOP of a ULP-MF-ME may cause a need for an abort of the ULP-MF-ME, e.g., because the actual loop iteration count of the program instruction stream was less than an expectation built into the ULP-MF-ME with respect to the loop iteration count. Additionally, the loop body ME of the ULP-MF-ME may be a SEQ-MF-ME that may include one or more internal branch MOPs. In an embodiment, the PRU 102 does not transition the current ME to Abort Invalidation state for one or more abort causes from the following list of abort causes: (1) architectural aborts, since they are generally transient in nature, i.e. not expected to regularly recur; (2) microarchitectural aborts associated with a branch MOP that terminates the current ME, e.g., due to a branch direction or target address misprediction, since such an abort merely indicates a need to redirect the PRU 102 to predict the successor to the current ME in the program instruction stream, e.g., update one or more branch predictors (e.g., BPs 154), but does not require invalidation of the MOPs of the current ME; and (3) other microarchitectural abort causes, particularly if they are transient in nature.

Arc (42) occurs when the current ME is in the ULP Training state and the PRU 102 receives a signal from the DEC 112 or the back-end 130 that an execution instance of the current ME has caused a need for an abort. For arc (42), the PRU 102 resets the CC 2008 of the current ME to zero, and the ME is transitioned from the ULP Training state to the Abort Invalidation state. Additionally, the TrainingMode 2004 of the current ME is updated from ULP to SEQ so that if and when the current ME transitions out of Abort Invalidation state, it will transition to the SEQ Training state via arc (17).

Arc (43) occurs when the current ME is in the ULP Maintenance state and the PRU 102 receives a signal from the DEC 112 or the back-end 130 that an execution instance of the current ME has caused a need for an abort. For arc (43), the PRU 102 resets the CC 2008 of the current ME to zero, and the ME is transitioned from the ULP Maintenance state to the Abort Invalidation state.

Arc (44) occurs when the current ME is in the Abort Invalidation state, and the PRU 102 receives a signal from the DEC 112 or the back-end 130 that an execution instance of the current ME has caused a need for an abort before the CC 2008 of the current ME has reached the AVT 1928. These conditions indicate the ME should be invalidated in the MOC 171, rather than retained, i.e., there is no longer confidence that the SEQ-MF-ME is a highly consistent sequence of MEs or the ULP-MF-ME exhibits loop iteration counts according to the expectation built into the ULP-MF-ME (e.g., a highly consistent loop iteration count). Thus, for arc (44), the PRU 102 invalidates the current ME within the MOC 171. In an embodiment, the cause of the subsequent abort must be the same cause as the initial abort cause that transitioned the current ME to the Abort Invalidation state, e.g., via arc (41), (42), or (43). For example, in an embodiment such as described with respect to arc (41) in which the PRU 102 only transitions the current ME to the Abort Invalidation state when an internal branch MOP of the current ME exhibits unexpected execution behavior, the PRU 102 only performs the action of arc (44) to invalidate the current ME if the subsequent abort cause is also that an internal branch MOP of the current ME exhibits unexpected execution behavior. Although the embodiment of FIG. 22 describes the PRU 102 invalidating the current ME in response to another (i.e., one more) instance in which the current ME causes a need for an abort (i.e., after the first instance in which the current ME caused a need for an abort that transitioned the current ME to the Abort Invalidation state) before the CC 2008 of the current ME has reached the AVT 1928, in a more general embodiment the PRU 102 invalidates the current ME in response to a predetermined number of instances in which the current ME causes a need for an abort before the CC 2008 of the current ME has reached the AVT 1928, and the predetermined number may be greater than one. For example, the predetermined number of instances may be three, in which case the AVT 1928 value may be larger than when the predetermined number of instances is one, as described with respect to arc (17). In such an embodiment, the PRU registers 1900 may include an additional software programmable register (not shown) that holds the predetermined number of abort instances, and the training fields 331 may include an additional abort instance counter (not shown) that is reset when the current ME is transitioned to architectural instructions and that counts the number of abort instances after the first abort instance that transitions the current ME to the Abort Invalidation state. The PRU 102 increments the abort instance counter each time an abort instance of the current ME is detected and then compares it with the register that holds the predetermined number. If the PRU 102 detects the abort instance counter reaches the predetermined number of abort instances in the register before the CC 2008 has reached the AVT 1928, the PRU 102 invalidates the current ME per arc (44); whereas if the PRU 102 detects the CC 2008 has reached the AVT 1928 before the abort instance counter has reached the predetermined number, the PRU 102 retains the current ME and transitions it out of Abort Invalidation state per arc (17) or arc (32). In an embodiment, when the PRU 102 receives a signal from the DEC 112 or the back-end 130 that an execution instance of the current ME has caused a need for an abort, if the current ME is an SF-ME, the PRU 102 does not transition the current SF-ME to the Abort Invalidation state, and the PRU 102 does not invalidate the current SF-ME.

Arc (45) occurs when the PRU 102 detects a hit on the current ME and the CC 2008 of the current ME is still less than the AVT 1928. For arc (45), the PRU 102 increments the CC 2008 of the current ME, and the current ME remains in the Abort Invalidation state. If the CC 2008 eventually reaches the AVT 1928, the current ME may be retained in the MOC 171 and transitioned out of the Abort Invalidation state.

As may be observed from the description above, when the current ME is used as a constituent ME in an MF-ME build (either a loop body ME being unrolled into a ULP-MF-ME, or an ME being incorporated as the first, middle, or final of a SEQ-MF-ME), the current ME remains in its current state, i.e., either in ULP Training state or SEQ Training state. In an embodiment, if the current ME is itself an MF-ME, it will be replaced by the new MF-ME. However, if the current ME is an SF-ME, it remains in the MOC 171. In the case that the current SF-ME is the loop body ME used in the new ULP-MF-ME, a multiple-hit in the MOC may occur. In the case that the current SF-ME is the first ME in sequence used in the new SEQ-MF-ME, a multiple-hit in the MOC may occur. In the case of a multiple-hit in the MOC 171, the MF-ME will be prioritized over the SF-ME as long as the MF-ME remains in the MOC 171.

When the MF-ME is no longer existent in the MOC 171 (e.g., is replaced or invalidated), the current SF-ME will start to be used again (assuming it is still present). This may result in the PRU 102 initiating a build of a new MF-ME using the current ME based on stale values in its training fields 331. For example, the previously consistent loop iteration count reflected in the LastIterCnt 2014 of the current ME may have changed from what it was when the old ULP-MF-ME that is no longer existent in the MOC 171 was built. Similarly, the successor to the current ME may no longer be reflected in the expectedNextMEId 2012 of the current ME but may instead have changed from what it was at the start of the build of the old SEQ-MF-ME. So, per arcs (19) and (27), the PRU 102 reduces the CC 2008 to provide sufficient opportunity to determine whether the training fields 331 still reflect the consistency of the loop iteration count or the sequence of MEs. In contrast, if the current ME was not the first ME of the new SEQ-MF-ME built, the CC 2008 of the current ME remains unchanged, and the current ME may become part of another new SEQ-MF-ME, e.g. two different "hot" code paths that both flow into the current ME, an example of which is described with respect to FIG. 27.

If the current ME is a ULP-MF-ME, it is in ULP Maintenance state, which prevents it from being used in an MF-ME build, i.e., the current ME can only be used in an MF-ME build if it is in the SEQ Training state or the ULP Training state, despite the fact that the current ME may be a consistent successor of an ME that falls or jumps into the loop. Similarly, if a ULP-MF-ME and an associated loop body SF-ME both remain in the MOC 171, using the SF-ME in an MF-ME build is prevented (again despite the fact that the current ME may be a consistent successor of an ME that falls or jumps into the loop) by the presence of the ULP-MF-ME in the case of a multiple-hit in the MOC 171. This avoids complexities associated with a ULP-MF-ME regarding the consistent loop iteration count that the PRU 102 used to train and build the ULP-MF-ME, and that the PRU 102 expects to remain the same. For example, assume the PRU 102 trained on a consistent loop iteration count of 30, unrolled by a factor of three, and expects the ULP-MF-ME to be used ten times per instance of a loop on the loop body ME used to build the ULP-MF-ME. However, if the first loop iteration were allowed to be performed by another ME (e.g., that falls or branches into the loop), then the PRU 102 would need to include the complexity to use the ULP-MF-ME for the remaining 29 iterations. Finally, if the current ME is in the Abort Invalidation state, it is prevented from being used in an MF-ME build.

The Figures below describe different aspects of the operation of the PRU 102, and in some cases their description of the operation of the PRU 102 overlaps with the description given with respect to FIG. 22.

SF-ME Building

FIG. 23 is a flowchart illustrating operation of the processor 100 of FIG. 1 to build an SF-ME in accordance with embodiments of the present disclosure. Operation begins at block 2302.

At block 2302, the PRU 102 looks up an FBSA 412 in the FBP 152, BPs 154, and the MOC 171 (e.g., in the MTR 173) and detects a hit in the FBP 152 (predicting the associated FBlk is present again in the program instruction stream) and a miss in the MOC 171 (indicating architectural instructions of the FBlk must be fetched from the instruction cache 101 since the MOC 171 does not hold MOPs decoded from the architectural instructions of the FBlk). The hit FBP entry 200 indicates that the associated FBlk is a hot FBlk, i.e., the FBHC 217 is greater than the FBHT 185. In response, the PRU 102 (e.g., FBD formation logic 406) generates a FBD 191 using the hit FBP entry 200. The PRU 102 (e.g., MOC build requestor 475) also generates a MOC build request 177 to push into the MBRF 179 a MBRFE 2100 that includes the FBlkID and an MeType that indicates an SF-ME. In an embodiment, the PRU 102 also generates a unique FBlkID for the FBlk and populates the FBD 191 FBlkID 317 and the MBRFE 2100 FBlkID 2117 with the generated FBlkID. Operation proceeds to block 2304.

At block 2304, the DEC 112 decodes architectural instructions (fetched by the IFU 106 from the instruction cache 101 into the FBlk FIFO 108) of the FBlk described by the FBD 191 generated at block 2302 into not yet renamed MOPs. The decoding may include performing simple fusion of the architectural instructions where possible, e.g., the fusing of two architectural instructions that are adjacent in the program instruction stream into a single MOP. The DEC 112 then renames the not yet renamed MOPs and issues them to the scheduler 121. Operation proceeds to block 2306.

At block 2306, the AFE 181 receives from the DEC 112 the not yet renamed MOPs generated by the DEC 112 at block 2304. In an embodiment, in response to the MBRFE 2100 pushed at block 2302, the AFE 181 may snoop a bus of the DEC 112 and detect a match of the FBlkID 2117 of the MBRFE 2100 and the FBlkID 317 of the FBlk and in response grab the not yet renamed MOPs (e.g., MOPs 197) generated by the DEC 112. The AFE 181 then builds the SF-ME specified by the MBRFE 2100 using the not yet renamed MOPs. Where possible, the AFE 181 fuses the received not yet renamed MOPs into the SF-ME MOPs, which typically will be a higher level of fusion than the fusion performed by the DEC 112 on the architectural instructions of the FBlk. As a result, typically the number of MOPs of the SF-ME are fewer than the number of received MOPs. As a result, space in the MOC 171 may be saved (i.e., the number of MDREs needed to hold the MOPs of the SF-ME may be less), and the back-end 130 may be able to execute the SF-ME MOPs more efficiently than it would have been able to execute the received MOPs both in terms of performance and power consumption. That is, typically fewer resources will be consumed (e.g., ROB 122 entries, DEC 112 slots, scheduler 121 entries, execution unit slots), and it will take the back-end 130 fewer clock cycles to execute the SF-ME MOPs than it would have taken the back-end 130 to execute the received MOPs (i.e., the MOPs generated by the DEC 112), thereby reducing the power consumed and improving the performance of the processor 100 both in terms of reduced clocks per instruction (CPI) and increased instructions per clock (IPC). In the worst case, the SF-ME MOPs are identical to the received MOPs, i.e., in the event that the AFE 181 was not able to further fuse the received MOPs. The AFE 181 communicates with the PRU 102, e.g., via the MBRF 179, to accomplish the SF-ME build. For example, the AFE 181 obtains free MDREs 340 from the MDR 175 and populates them with the SF-ME MOPs and with pointers to the next MDREs 340. The AFE 181 also sends an install request 183 to the PRU 102. Operation proceeds to block 2308.

At block 2308, the PRU 102 (e.g., MTRE update logic 495), in response to the install request 183, selects an MTR entry 330 for replacement and populates the selected MTR entry 330, using information from the MBRFE 2100, in order to install the SF-ME into the MOC 171. Now that the new SF-ME has been installed in the MOC 171, the new SF-ME may be hit upon by the current FBSA, in response to which the PRU 102 will generate an FBD 191 that instructs the IFU 106 to fetch the SF-ME from the MDR 175 and send it to the DEC 112, which will rename the MOPs of the SF-ME and dispatch them to the scheduler 121 for issuance and execution, as described with respect to FIG. 1 through FIG. 17. The termination type of the SF-ME is the termination type (e.g., termination type 214 of FIG. 2 output as termination type 434 by the FBP 152 of FIG. 4A when the SF-ME is hit in the MOC 171) of the FBlk from which the SF-ME was built. The numFBlks 335 is set to one.

SEO-MF-ME Building

FIG. 24 is a flowchart illustrating operation of the processor 100 of FIG. 1 to build a SEQ-MF-ME in accordance with embodiments of the present disclosure. Operation begins at block 2402.

At block 2402, the PRU 102 continuously predicts a sequence of FBSAs that specify a corresponding sequence of FBlks in the program instruction stream and updates the training fields 331 of the MEs 350 as it predicts them, e.g., per the state machine of FIG. 22. Generally speaking, the PRU 102 predicts a sequence of FBSAs 412 (e.g., as described with respect to embodiments related to FIG. 4A and FIG. 11) and looks up each FBSA 412 in the FBP 152, BPs 154, and MTR 173 (although see MTR 173 power savings embodiments in the description of SEQ-MF-ME and ULP-MF-ME processing with respect to FIG. 25 and FIG. 43). In response to a hit of an FBSA in the FBP 152 and MTR 173, the PRU 102 generates a FBD 191 that describes an ME specified by the FBSA. Thus, the PRU 102 generates a sequence of FBDs. However, as will now be described, because an MF-ME may correspond to multiple FBlks, the sequence of FBDs may not be in a one-to-one correspondence to the sequence of FBSAs predicted by the PRU 102.

As further described herein, for each FBD 191 of the sequence of FBDs generated by the PRU 102, the IFU 106 fetches either a FBlk of architectural instructions from the instruction cache 101 for provision to the DEC 112 or an ME 350 of MOPs from the MOC 171 for provision to the DEC 112. In the case of a hit on an ME 350 in the MTR 173, the hit ME 350 is either an SF-ME or an MF-ME. In the case of an SF-ME hit, the PRU 102 effectively predicts a single FBlk worth of architectural instructions in the program instruction stream, and in the case of an MF-ME hit, the PRU 102 effectively predicts multiple FBlks worth of architectural instructions in the program instruction stream. But since the MOC 171 holds an entry 350 for the SF-ME/MF-ME, rather than fetching the architectural instructions of the associated single FBlk/multiple FBlks, the IFU 106 will fetch the MOPs of the SF-ME/MF-ME from the MOC 171. Thus, the PRU 102 may be understood to predict not a sequence of only FBlks in the program instruction stream, but to predict a sequence of a mixture of FBlks and MEs, in which each ME corresponds to either one FBlk (SF-ME) or multiple FBlks (MF-ME). That is, with respect to each SF-ME, the DEC 112 previously decoded a single FBlk worth of architectural instructions into simple MOPs, and the AFE 181 fused the simple MOPs into the MOPs of the SF-ME; whereas, with respect to each MF-ME, the AFE 181 previously fused the MOPs of multiple SF-MEs and/or multiple SEQ-MF-MEs into the MOPs of the MF-ME.

In the case of a hit on an ME in the MTR 173, the PRU 102 also updates the training fields 331 of the hit ME depending upon various factors, such as the FBlks and/or MEs that precede and succeed the hit ME within the program instruction stream, characteristics of the hit ME (e.g., whether it is terminated with a conditional branch), values of the training fields 331 when the ME is hit on in the MOC 171 (i.e., the current values of the training fields 331 prior to being updated) such as various counter values, and values of the PRU registers 1900. In an embodiment, the state diagram of FIG. 22 describes much of the operation of the PRU 102 to update many of the training fields 331 of the predicted ME 350. As further described with respect to FIG. 22, the training fields 331 of an ME 350 may also be updated at other times than when the ME 350 is predicted by the PRU 102. For example, the PRU 102 may also update the ME training fields 331 when the ME is newly installed in the MOC (e.g., arcs (11), (15), and (31)), when the ME causes a need for an abort during its execution (e.g., arcs (41) through (44)), or at completion of a new MF-ME build that uses the ME (e.g., arcs (19) and (27)). Each ME is either a SF-ME or a MF-ME, as described with respect to FIG. 18, e.g., respectively based on whether its associated number of FBlks (e.g., numFBlks 335) is one (SF-ME) or greater than one (MF-ME). Operation proceeds to block 2404.

At block 2404, the PRU 102 detects that the CCs 2008 of one or more (N) MEs in the program instruction stream indicate a highly consistent sequence of the N MEs and a final ME in the sequence. The final ME of the sequence is an ME identified by the expectedNextMEId 2012 of the last ME in the sequence of the N MEs. In an embodiment, the CCs 2008 of N MEs indicate the highly consistent sequence when the CC 2008 of each of the N MEs has reached a threshold. However, the CC 2008 of the final ME may not have reached a threshold such that the ME identified by the expectedNextMEId 2012 of the final ME is not included in the build of the SEQ-MF-ME. As described with respect to FIG. 19, there may be multiple thresholds employed, depending upon the location of each ME in the sequence of the N MEs. For example, in an embodiment, the CC 2008 of the first ME in the sequence must have reached a first threshold (e.g., SBT 1922), and the CC 2008 of the middle MEs of the sequence must have reached a second threshold (e.g., CBT 1924), as described in the embodiment with respect to FIG. 25. As described with respect to FIG. 19, in other embodiments there may be other thresholds used in different fashions, and the thresholds may be software configurable and/or dynamically variable by hardware of the microprocessor 100. Operation proceeds to block 2406.

At block 2406, the PRU 102 instructs the AFE 181 to use the MOPs of the N MEs and the final ME to build a SEQ-MF-ME in the MOC 171, e.g., per block 2502, block 2504, and block 2506 of FIG. 25. More specifically, the PRU 102 pushes into the MBRF 179 a MBRFE 2100 corresponding to each of the N MEs and the final ME, e.g., as described in the embodiment of FIG. 25. Some or all of the N MEs and the final ME may be an SF-ME. However, some or all of the N MEs and the final ME may be a SEQ-MF-ME. That is, the N MEs and the final ME may be a combination of SF-MEs and SEQ-MF-MEs. However, in an embodiment, none of the N MEs nor the final ME may be a ULP-MF-ME. Operation proceeds to block 2408.

At block 2408, the AFE 181 cooperates with the PRU 102 and MOC 171 to build the SEQ-MF-ME, e.g., per block 2508 and block 2512 of FIG. 25. In the case of some MEs, the AFE 181 is able to fuse the MOPs of the constituent N and final MEs such that the number of MOPs of the resultant SEQ-MF-ME is fewer than the total number of MOPs of the N and final MEs that were input to the AFE 181, i.e., that the AFE 181 used to build the new SEQ-MF-ME. Operation proceeds to block 2412.

Figures 28A, 28B:
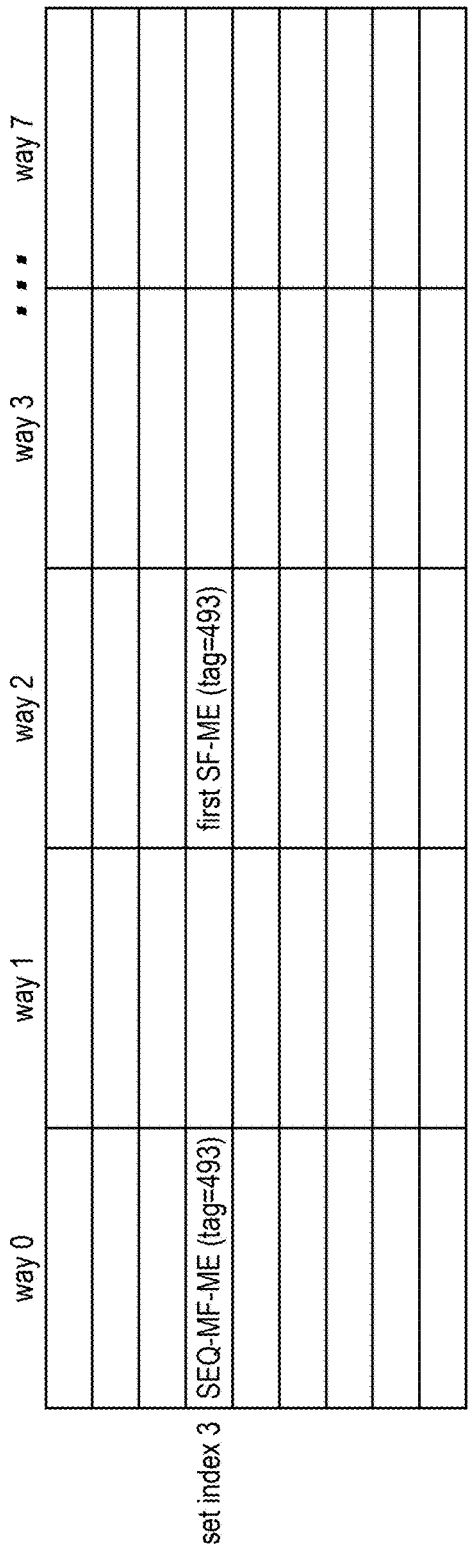
FIG. 28A is a block diagram illustrating an example of same-Fetch Block Start Address (FBSA) co-residency in the MTR of FIG. 1 of a SEQ-MF-ME and a first constituent SF-ME used to build the SEQ-MF-ME in accordance with embodiments of the present disclosure.
FIG. 28B is a flowchart illustrating operation of the PRU in the case of a multiple-hit of an FBSA in the MOC on a same-FBSA co-resident SEQ-MF-ME and a first constituent SF-ME of the SEQ-MF-ME in accordance with embodiments of the present disclosure.

At block 2412, in the embodiment of FIG. 24, if the first ME in the sequence of MEs used to build the new SEQ-MF-ME is itself an SEQ-MF-ME, then the MOC 171 replaces the first ME (i.e., the SEQ-MF-ME currently present in the MOC 171) with the new SEQ-MF-ME. Otherwise, the first ME is a SF-ME (since a ULP-MF-ME is not allowed to be a constituent ME of a build of a SEQ-MF-ME), and the first ME (SF-ME) is allowed to remain co-resident in the MOC 171 with the new SEQ-MF-ME, as shown in FIG. 28A. The first SF-ME and the new MF-ME have the same FBSA. Therefore, once the new SEQ-MF-ME is installed in the MOC 171, the FBSA will hit in the MOC 171 on both the first SF-ME and the new SEQ-MF-ME (assuming neither of them has been replaced, i.e., assuming they are both still resident in the MOC 171), in which case the PRU 102 will give priority to the SEQ-MF-ME, as described in the embodiment of FIG. 28B. In an embodiment, the replacement policy of the MOC 171 explicitly avoids replacing the first SF-ME. Generally, any constituent SF-ME is allowed to remain co-resident in the MOC 171 with the resulting SEQ-MF-ME, even if the SF-ME is the first SF-ME used in the new MF-ME build.

FIG. 25 is a flowchart illustrating operation of the processor 100 of FIG. 1 to build a SEQ-MF-ME in accordance with embodiments of the present disclosure. Operation begins at block 2502.

At block 2502, for the current FBSA (e.g., for the FBSA of the first constituent ME in the sequence of N MEs of FIG. 24), the PRU 102 detects the following conditions: (1) the current FBSA hits in the FBP 152 and in the MOC 171 (the hit MOC entry 350 in the MOC 171 is referred to as the current ME); (2) the SequenceState 1918 is NOT_STARTED indicating that the PRU 102 has not yet started building the SEQ-MF-ME; and (3) the current ME is in the SEQ Training state (of FIG. 18), the CC 2008 of the current ME has reached the value of the SBT 1922, and the expectedNextMEId 2012 of the current ME equals the nextMEId, i.e., the expected successor. When conditions (1), (2) and (3) are satisfied, the PRU 102 takes the following actions: (A) generates an FBD 191 using the hit entry of the FBP 152 and the current ME; (B) pushes a MBRFE 2100 into the MBRF 179 with an MeType 2102 of MF-ME first; and (C) sets the SequenceState 1918 to STARTED to indicated the PRU 102 has now started to build the SEQ-MF-ME. Operation proceeds to block 2504.

At block 2504, for each next immediately succeeding current FBSA after the current FBSA of block 2502 (e.g., as the current FBSA gets updated as the PRU 102 predicts the sequence of FBSAs, for the FBSA of each ME of the constituent MEs in the sequence of the N MEs of FIG. 24 (except the first constituent ME, which is processed at block 2502) which may be zero or more constituent MEs), the PRU 102 detects the following conditions: condition (1) of block 2502; (4) the SequenceState 1918 is STARTED; and (5) the current ME is in the SEQ Training state, the CC 2008 of the current ME has reached the value of the CBT 1924 (rather than the SBT 1922, although in an embodiment the SBT and CBT could be the same), and the expectedNextMEId 2012 of the current ME equals the nextMEId. While conditions (1), (4) and (5) are satisfied, the PRU 102 takes the following actions for each current ME: action (A) of block 2502; and (D) pushes a MBRFE 2100 into the MBRF 179 with an MeType 2102 of MF-ME middle (rather than first or last). If at block 2504 there is not an immediately succeeding current FBSA that satisfies conditions (1), (4), and (5), i.e., no middle constituent ME is found, then the current FBSA of block 2504 becomes the current FBSA at block 2506. Operation proceeds to block 2506.

At block 2506, for the next immediately succeeding current FBSA after the last current FBSA of block 2504 (e.g., for the final ME of FIG. 24), the PRU 102 detects the following conditions: conditions (1) and (4) of block 2504; and (6) the current ME is in the SEQ Training state, the CC 2008 of the current ME has not reached the value of the CBT 1924, and the expectedNextMEId 2012 of the current ME equals the nextMEId. If conditions (1), (4) and (6) are satisfied, the PRU 102 takes the following actions for the current ME: action (A) of block 2502; and (E) pushes a MBRFE 2100 into the MBRF 179 with an MeType 2102 of MF-ME final (rather than first or middle). If conditions (1), (4) and (6) are not satisfied, the PRU 102 takes the following actions for the current ME (which may be merely a FBlk, i.e., the current FBSA may have missed in the MOC 171): (F) if there is only a single constituent ME that would be used to build the new SEQ-MF-ME, the PRU 102 cancels the build of the SEQ-MF-ME (e.g., invalidates the one MBRFE 2100 pushed at block 2502); otherwise, the PRU 102 (G) changes the last MBRFE 2100 pushed into the MBRF 179 at block 2504 to have an MeType of final. With respect to action (G), the PRU 102 effectively shortens the SEQ-MF-ME build such that the last ME of block 2504 becomes the final ME of the sequence, and the ME identified by the expectedNextMETd 2012 of the last ME of block 2504 is not included in the SEQ-MF-ME build because it did not succeed the last ME of block 2504. In an embodiment, action (G) (and possibly action (F)) may also need to be taken if a build constraint is encountered. Finally, the PRU 102 updates the SequenceState 1918 back to NOT_STARTED (not shown). In an embodiment, at block 2502, block 2504 and block 2506, the PRU 102 also populates the FBD 191 FBlkID 317 and the MBRFE 2100 FBlkID 2117 with the FBlkID that identifies the current ME. Operation proceeds to block 2508.

At block 2508, the IFU 106 fetches from the MOC 171 the not yet renamed MOPs of the constituent MEs of the to-be-built SEQ-MF-ME in response to the FBDs 191 generated at block 2502, block 2504, and block 2506, which the DEC 112 renames and sends the renamed MOPs to the scheduler 121. The AFE 181 receives from the DEC 112 the not yet renamed MOPs of the constituent MEs and builds the SEQ-MF-ME using them along with the MF-ME first, middle, and last MBRFEs 2100 pushed into the MBRF 179 at block 2502, block 2504, and block 2506. In most cases the AFE 181 is able to fuse the MOPs of the constituent MEs more highly into fewer MOPs of the SEQ-MF-ME. In an embodiment, the AFE 181 may match the FBlkID of each MBRFE 2100 with the FBlkID 317 of a corresponding constituent ME as the DEC 112 receives the not yet renamed MOPs of the constituent ME from the FBlk FIFO 108, in response to which the AFE 181 may load the MOPs into a MOP buffer of the AFE 181 for use in building the SEQ-MF-ME. The AFE 181 then sends an install request 183 to the PRU 102. Operation proceeds to block 2512.

At block 2512, the PRU 102 (e.g., MTRE update logic 495), in response to the install request 183, selects an MTR entry 330 for replacement and populates the selected MTR entry 330, using information from the MBRFE 2100, in order to install the new SEQ-MF-ME into the MOC 171. As described with respect to block 2412 of FIG. 24, the PRU 102 may replace an existing SEQ-MF-ME in the MOC 171 that has the same FBSA as the new SEQ-MF-ME, i.e., if the existing SEQ-MF-ME was the first constituent ME used to build the new SEQ-MF-ME. However, if the first constituent ME used to build the new SEQ-MF-ME was an SF-ME, the first constituent SF-ME may remain co-resident with the new SEQ-MF-ME in the MOC 171, as described with respect to block 2412 of FIG. 24, an example of which is shown in FIG. 28A.

Once the new SEQ-MF-ME has been installed in the MOC 171, the new SEQ-MF-ME may be hit upon by the current FBSA as the PRU 102 predicts the sequence of FBlks of the program instruction stream. When the SEQ-MF-ME is hit upon, the PRU 102 generates a single FBD 191 that instructs the IFU 106 to fetch the SEQ-MF-ME from the MDR 175 and send its MOPs to the DEC 112, which will rename the MOPs of the SEQ-MF-ME and dispatch them to the scheduler 121 for issuance and execution, e.g., as described with respect to FIG. 1 through FIG. 17. A SEQ-MF-ME is associated with a number of FBlks indicated by numFBlks 335 of FIG. 3B. When processing a FBlk (or an SF-ME), the PRU 102 generates a single FBD for a single FBlk (or a single SF-ME), i.e., there is a one-to-one correspondence between generation of FBDs and FBlks/SF-MEs. However, when processing a hit in the MTR 173 on a SEQ-MF-ME, the PRU 102 generates only a single FBD for the entire SEQ-MF-ME, even though there are multiple FBlks associated with the SEQ-MF-ME, as described with respect to block 2804 of FIG. 28B.

In an embodiment, although the PRU 102 generates only a single FBD 191 when processing an MF-ME, beginning with the FBlk specified by the FBSA of the MF-ME (the current FBSA), for each FBlk (the current FBlk) of a number of successive FBlks denoted here as K, the PRU 102 performs a set of actions to predict the next FBSA produced by the current FBlk and updates the current FBSA to be the next FBSA. In the case of a SEQ-MF-ME, K is the numFBlks 335 of the SEQ-MF-ME. (In the case of a ULP-MF-ME, various embodiments are contemplated with various values of K as described below with respect to FIG. 43.) The next FBSA produced by the last of the K FBlks (i.e., the Kth FBlk) is the next FBSA produced by the SEQ-MF-ME itself, which is used by the PRU 102 to continue predicting the sequence of FBlks of the program instruction stream after the SEQ-MF-ME. The set of actions performed for each of the K FBlks is essentially described with respect to FIG. 11 through FIG. 14 and will now be summarized.

The set of actions performed for each of the K FBlks may include: performing lookups in the FBP 152 and branch predictors 154 using the current FBSA to obtain their outputs; using the outputs to determine the next FBSA; updating branch predictor state (e.g., branch history and the top-of-stack (TOS) pointer of the RAP 1146); and updating the current FBSA to be the determined next FBSA. Performing lookups in the FBP 152 and branch predictors 154 using the current FBSA to obtain their outputs may include: looking up the current FBSA in FBP to get its outputs (e.g., the termination type (TT), FBlk length, and PC-relative target address); looking up the current FBSA in combination with the branch history state (e.g., hashing with the GHist and the CPHist) in the CBP to get the direction of a conditional branch instruction; looking up the current FBSA in combination with the branch history state (e.g., hashing with the GHist and the IPHist) in the IBP to get the indirect target address of an indirect branch instruction; and reading an entry from the RAP (e.g., the entry at the TOS pointer) to get the return target address. Using the BP and FBP outputs to determine the next FBSA may include: calculating the next sequential address (NSA) (e.g., as the sum of the current FBSA and the FBlk length); calculating a direct target (e.g., as the sum of the current FBSA and the PC-relative target address); in the case of a conditional branch TT, picking the NSA or the direct target address based on direction predicted by the CBP; in the case of an indirect branch TT, using the indirect target address provided by the IBP; in the case of a return TT, using the return target provided by the RAP; and in the case of an unconditional direct branch TT, picking the direct target address. Updating the branch predictor state may include: updating the branch history state (e.g., GHist, CPHist, and the IPHist); decrementing the RAP TOS pointer (e.g., popping an entry off the RAP) in the case of a return TT; and incrementing the RAP TOS pointer and writing the next FBSA into the RAP entry at the TOS pointer (e.g., pushing an entry onto the RAP) in the case of a call TT. The set of actions may also include generating the SCP output, updating the current branch history with the branch history update information generated by the SCP, applying the updated current branch history to the lookups in the branch predictors, and generating the FSPU prediction which, in addition to the next FBSA produced by the current FBlk, includes the branch direction and the indirect branch indicator produced by the current FBlk.

Finally, the next FBSA that is produced by the Kth (i.e., last) FBlk of the K FBlks becomes the next FBSA produced by the SEQ-MF-ME itself. For example, assume K is seven. Then the PRU 102 will generate the single FBD 191 for the SEQ-MF-ME, but will perform the set of actions seven times for the seven associated FBlks to generate a sequence of seven next FBSAs 449, and the last of the seven next FBSAs 449 will be the next FBSA 449 produced by the SEQ-MF-ME. Additionally, the termination type of the last of the seven FBlks (e.g., termination type 214 of FIG. 2 output as termination type 434 by the FBP 152 of FIG. 4A) becomes the termination type of the SEQ-MF-ME. In an embodiment, as the PRU 102 performs the set of actions K times, the PRU 102 may save power by only looking up the current FBSA in the MTR 173 for the original hit in the MTR 173 on the SEQ-MF-ME but not looking up the remaining K minus one current FBSAs in the MTR 173. In the example, power associated with six MTR 173 lookups may be saved.

In an embodiment, advantageously, the FBD 191 generation is decoupled from the MF-ME training and build decisions. This allows the PRU 102 to wait to determine the successor to the current ME to know whether to start/continue an MF-ME build and to know how to update the training fields 331. For example, the stage(s) of the PRU 102 that perform the update of the training fields 331 and the pushes of the MOC build requests 177 into the MBRF 179 may be later in the PRU 102 pipeline than the stage that performs FBD 191 generation. That is, the PRU 102 may generate the FBD 191 (action (A) for each of block 2502, block 2504, and block 2506) when condition (1) is met, regardless of whether the other conditions are satisfied.

Figure 26A:
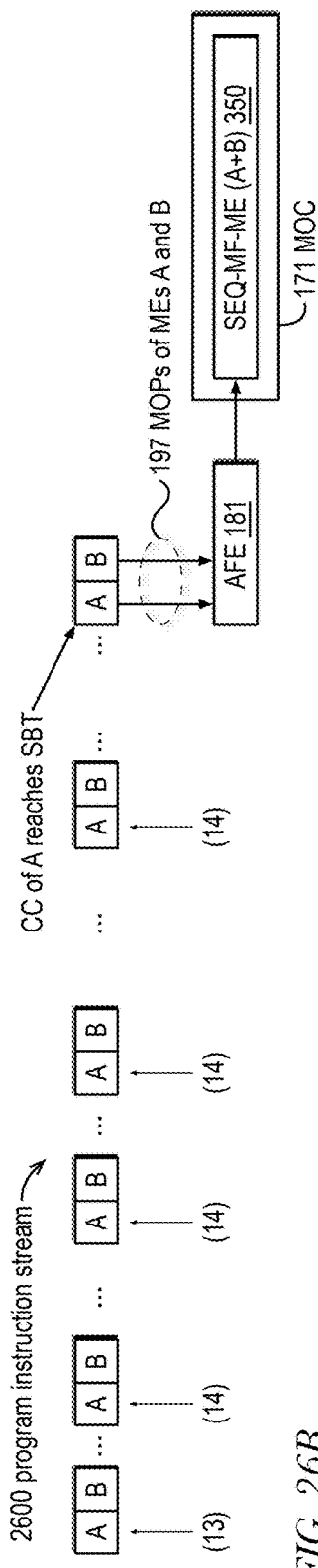
FIG. 26A, FIG. 26B, and FIG. 26C are block diagrams illustrating examples of the building of a SEQ-MF-ME in accordance with embodiments of the present disclosure.

FIG. 26A is a block diagram illustrating an example of the building of a SEQ-MF-ME in accordance with embodiments of the present disclosure. FIG. 26A shows MEs of a program instruction stream 2600 in which time progresses from left to right. More specifically, an ME denoted A is immediately succeeded in the program instruction stream 2600 by an ME denoted as B in a first instance, which the PRU 102 detects and in response populates the expectedNextMEId 2012 of ME A with the MEId of ME B and resets the CC 2008 of ME A to zero (not shown), e.g., per arc (13) of FIG. 22. Later in the program instruction stream, ME A is immediately succeeded by ME B again, which the PRU 102 detects and in response increments the CC 2008 of ME A (not shown), e.g., per arc (14) of FIG. 22. Later in the program instruction stream, ME A is immediately succeeded by ME B multiple additional times, and each time the PRU 102 increments the CC 2008 of ME A. Eventually, the CC 2008 of ME A reaches the SBT 1922, which the PRU 102 detects and in response pushes a MBRFE 2100 for ME A into the MBRF 179, e.g., per block 2502 of FIG. 25, and pushes a MBRFE 2100 for ME B into the MBRF 179, e.g., per block 2506 of FIG. 25. The AFE 181, in cooperation with the MOC 171 and PRU 102, subsequently builds a SEQ-MF-ME using the MOPs 197 of MEs A and B, e.g., per block 2508 and block 2512 of FIG. 25, which is installed in the MOC 171 and denoted SEQ-MF-ME (A+B) in FIG. 26A.

Figure 26B:
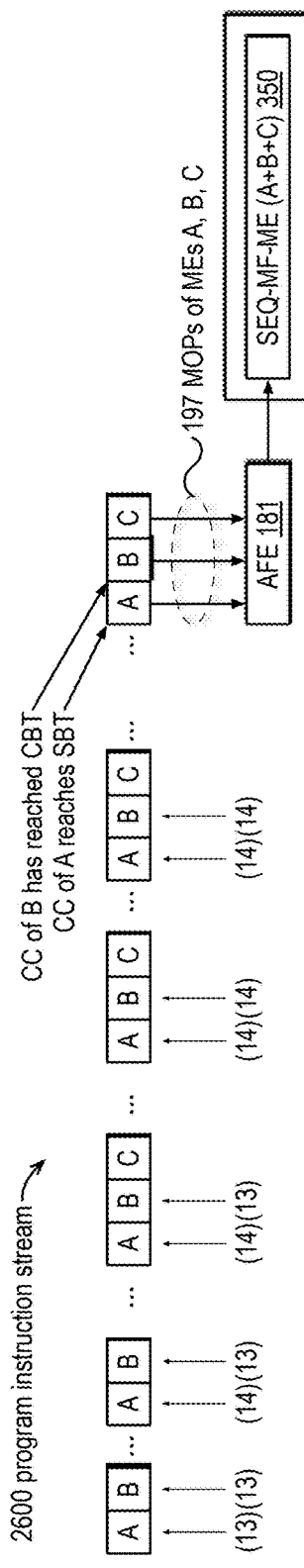

FIG. 26B is a block diagram illustrating an example of the building of a SEQ-MF-ME in accordance with embodiments of the present disclosure. The example of FIG. 26B is similar in many respects to the example of FIG. 26A in that it shows MEs of a program instruction stream 2600. As shown, ME A is succeeded immediately by ME B in a first instance, which the PRU 102 detects and in response populates the expectedNextMEId 2012 of ME A with the MEId of ME B and resets the CC 2008 of ME A to zero. Subsequently, ME A is immediately succeeded by ME B again, which the PRU 102 detects and in response increments the CC 2008 of ME A. Later in the program instruction stream, ME A is immediately succeeded by ME B, which is immediately succeeded by ME C, which the PRU 102 detects and in response increments the CC 2008 of ME A and populates the expectedNextMEId 2012 of ME B with the MEId of ME C and resets the CC 2008 of ME B to zero. Later in the program instruction stream, ME A is immediately succeeded by ME B which is immediately succeeded by ME C multiple additional times, and each time the PRU 102 increments the CC 2008 of ME A and increments the CC 2008 of ME B. Eventually, the CC 2008 of ME A reaches the SBT 1922 and the CC 2008 of ME B reaches the CBT 1924, which the PRU 102 detects and in response pushes a MBRFE 2100 for ME A into the MBRF 179, e.g., per block 2502 of FIG. 25, and pushes a MBRFE 2100 for ME B into the MBRF 179, e.g., per block 2504 of FIG. 25, and pushes a MBRFE 2100 for ME C into the MBRF 179, e.g., per block 2506 of FIG. 25. The AFE 181, in cooperation with the MOC 171 and PRU 102, subsequently builds a SEQ-MF-ME using the MOPs 197 of MEs A and B and C, e.g., per block 2508 and block 2512 of FIG. 25, which is installed in the MOC 171 and denoted SEQ-MF-ME (A+B+C) in FIG. 26B.

Figure 26C:
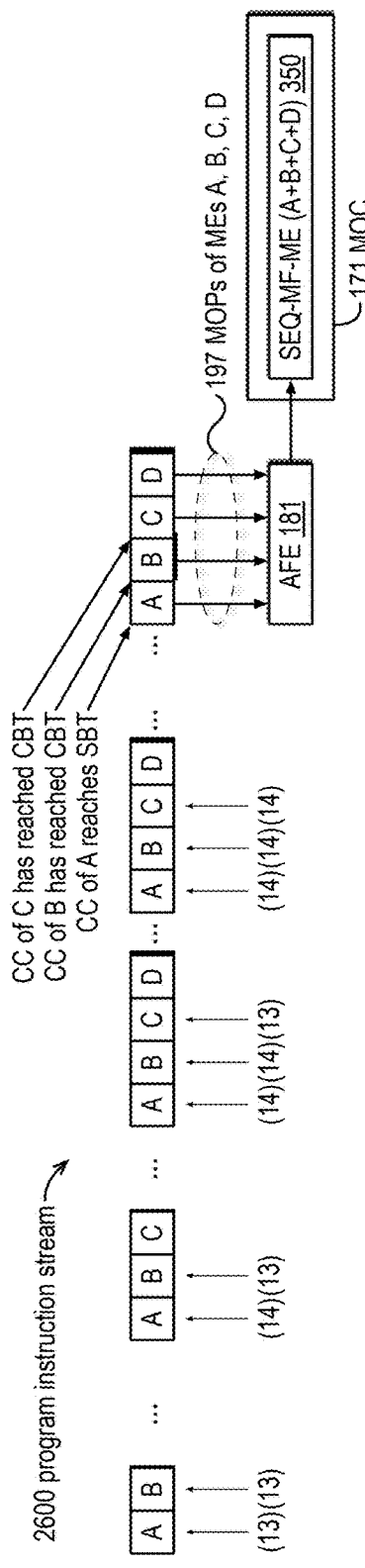

FIG. 26C is a block diagram illustrating an example of the building of a SEQ-MF-ME in accordance with embodiments of the present disclosure. The example of FIG. 26C is similar in many respects to the example of FIG. 26B in that it shows MEs of a program instruction stream 2600. As shown, ME A is succeeded immediately by ME B in a first instance, which the PRU 102 detects and in response populates the expectedNextMEId 2012 of ME A with the MEId of ME B and resets the CC 2008 of ME A to zero. Subsequently, ME A is immediately succeeded by ME B, which is immediately succeeded by ME C, which the PRU 102 detects and in response increments the CC 2008 of ME A and populates the expectedNextMEId 2012 of ME B with the MEId of ME C and resets the CC 2008 of ME B to zero. Subsequently, ME A is immediately succeeded by ME B, which is immediately succeeded by ME C, which is immediately succeeded by ME D, which the PRU 102 detects and in response increments the CC 2008 of ME A and increments the CC 2008 of ME B and populates the expectedNextMEId 2012 of ME C with the MEId of ME D and resets the CC 2008 of ME C to zero. Later in the program instruction stream, ME A is immediately succeeded by ME B which is immediately succeeded by ME C which is immediately succeeded by ME D multiple additional times, and each time the PRU 102 increments the CC 2008 of ME A and increments the CC 2008 of ME B and increments the CC 2008 of ME C. Eventually, the CC 2008 of ME A reaches the SBT 1922 and the CC 2008 of ME B reaches the CBT 1924 and the CC 2008 of ME C reaches the CBT 1924, which the PRU 102 detects and in response pushes a MBRFE 2100 for ME A into the MBRF 179, e.g., per block 2502 of FIG. 25, and pushes a MBRFE 2100 for ME B into the MBRF 179, e.g., per block 2504 of FIG. 25, and pushes a MBRFE 2100 for ME C into the MBRF 179, e.g., per block 2504 of FIG. 25, and pushes a MBRFE 2100 for ME D into the MBRF 179, e.g., per block 2506 of FIG. 25. The AFE 181, in cooperation with the MOC 171 and PRU 102, subsequently builds a SEQ-MF-ME using the MOPs 197 of MEs A and B and C and D, e.g., per block 2508 and block 2512 of FIG. 25, which is installed in the MOC 171 and denoted SEQ-MF-ME (A+B+C+D) in FIG. 26C.

Figure 27:
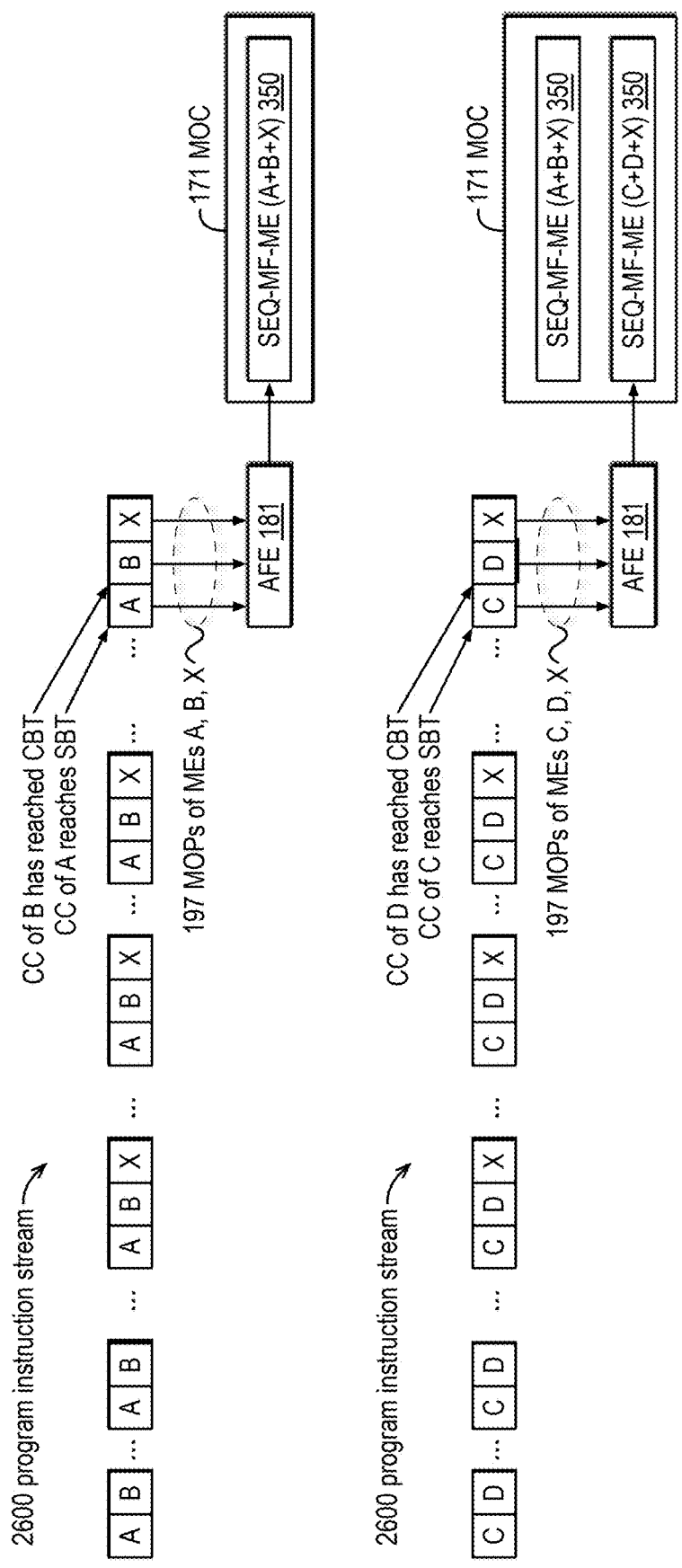
FIG. 27 is a block diagram illustrating an example of the building of two SEQ-MF-MEs that share a common constituent ME in accordance with embodiments of the present disclosure.

FIG. 27 is a block diagram illustrating an example of the building of two SEQ-MF-MEs that share a common constituent ME in accordance with embodiments of the present disclosure. The example of FIG. 27 is similar in many respects to the example of FIG. 26B in that it shows MEs of a program instruction stream 2600. FIG. 27 shows the program instruction stream in two rows denoting the passage of time from left to right in the upper row with time then continuing from left to right in the lower row.

In the upper row, as shown, ME A is succeeded immediately by ME B in a first instance, which the PRU 102 detects and in response populates the expectedNextMEId 2012 of ME A with the MEId of ME B and resets the CC 2008 of ME A to zero. Subsequently, ME A is immediately succeeded by ME B again, which the PRU 102 detects and in response increments the CC 2008 of ME A. Later in the program instruction stream, ME A is immediately succeeded by ME B, which is immediately succeeded by ME X, which the PRU 102 detects and in response increments the CC 2008 of ME A and populates the expectedNextMEId 2012 of ME B with the MEId of ME X and resets the CC 2008 of ME B to zero. Later in the program instruction stream, ME A is immediately succeeded by ME B which is immediately succeeded by ME X multiple additional times, and each time the PRU 102 increments the CC 2008 of ME A and increments the CC 2008 of ME B. Eventually, the CC 2008 of ME A reaches the SBT 1922 and the CC 2008 of ME B reaches the CBT 1924, which the PRU 102 detects and in response pushes a MBRFE 2100 for ME A into the MBRF 179, e.g., per block 2502 of FIG. 25, and pushes a MBRFE 2100 for ME B into the MBRF 179, e.g., per block 2504 of FIG. 25, and pushes a MBRFE 2100 for ME X into the MBRF 179, e.g., per block 2506 of FIG. 25. The AFE 181, in cooperation with the MOC 171 and PRU 102, subsequently builds a SEQ-MF-ME using the MOPs 197 of MEs A and B and X, e.g., per block 2508 and block 2512 of FIG. 25, which is installed in the MOC 171 and denoted SEQ-MF-ME (A+B+X) in FIG. 27.

In the lower row, as shown, ME C is succeeded immediately by ME D in a first instance, which the PRU 102 detects and in response populates the expectedNextMEId 2012 of ME C with the MEId of ME D and resets the CC 2008 of ME C to zero. Subsequently, ME C is immediately succeeded by ME D again, which the PRU 102 detects and in response increments the CC 2008 of ME C. Later in the program instruction stream, ME C is immediately succeeded by ME D, which is immediately succeeded by ME X, which the PRU 102 detects and in response increments the CC 2008 of ME C and populates the expectedNextMEId 2012 of ME D with the MEId of ME X and resets the CC 2008 of ME D to zero. Later in the program instruction stream, ME C is immediately succeeded by ME D which is immediately succeeded by ME X multiple additional times, and each time the PRU 102 increments the CC 2008 of ME C and increments the CC 2008 of ME D. Eventually, the CC 2008 of ME C reaches the SBT 1922 and the CC 2008 of ME D reaches the CBT 1924, which the PRU 102 detects and in response pushes a MBRFE 2100 for ME C into the MBRF 179, e.g., per block 2502 of FIG. 25, and pushes a MBRFE 2100 for ME D into the MBRF 179, e.g., per block 2504 of FIG. 25, and pushes a MBRFE 2100 for ME X into the MBRF 179, e.g., per block 2506 of FIG. 25. The AFE 181, in cooperation with the MOC 171 and PRU 102, subsequently builds a SEQ-MF-ME using the MOPs 197 of MEs C and D and X, e.g., per block 2508 and block 2512 of FIG.

25, which is installed in the MOC 171 and denoted SEQ-MF-ME (C+D+X) in FIG. 27.

As may be observed from FIG. 27, the AFE 181, PRU 102, and MOC 171 may operate in a coordinating fashion to build two or more SEQ-MF-MEs in the MOC 171 that use, or share, a common ME, which may advantageously make efficient use of space in the MOC 171 and reduce power consumption by the AFE 181. Furthermore, as may be understood from the description of the embodiment in which the two-stage process of building an MF-ME is performed (see FIG. 29), the ability to use the same SF-ME in the build of two different MF-MEs may amortize the cost of building of the SF-ME over the creation of multiple MF-MEs. In the embodiment, the common ME is not the first ME of the two or more SEQ-MF-MEs such that there are not two SEQ-MF-MEs in the MOC 171 having the same FBSA.

FIG. 28A is a block diagram illustrating an example of same-FBSA co-residency in the MTR 173 of FIG. 1 of a SEQ-MF-ME and a first constituent SF-ME used to build the SEQ-MF-ME in accordance with embodiments of the present disclosure. In the example of FIG. 28A, the MTR 173 is shown with eight ways, denoted way 0 through way 7. In the example, a set of the MTR 173 at set index 3 has a SEQ-MF-ME with an MTR tag 332 value of 493 resident in way 0. The set of the MTR 173 at set index 3 further has a first constituent SF-ME (used to build the SEQ-MF-ME resident in way 0) with the same MTR tag 332 value of 493 resident in way 2. That is, the SEQ-MF-ME and the first constituent SF-ME have the same FBSA and are co-resident in the MOC 171. Such a co-residency may be present in the MOC 171 as described with respect to block 2412 of FIG. 24 and block 2512 of FIG. 25.

FIG. 28B is a flowchart illustrating operation of the PRU 102 in the case of a multiple-hit of an FBSA in the MOC 171 on a same-FBSA co-resident SEQ-MF-ME and a first constituent SF-ME of the SEQ-MF-ME in accordance with embodiments of the present disclosure. Operation begins at block 2802.

At block 2802, the PRU 102 looks up a current FBSA in the FBP 152 and in the MOC 171, detects a hit in the FBP 152, and detects a multiple-hit in the MTR 173 on a SEQ-MF-ME (e.g., the SEQ-MF-ME resident in way 0 of FIG. 28A) and on an SF-ME (e.g., the SF-ME resident in way 2 of FIG. 28A). The SEQ-MF-ME is referred to as the primary ME, and the SF-ME is referred to as the secondary ME, since the SEQ-MF-ME is given priority over the SF-ME. Operation proceeds to block 2804.

At block 2804, the PRU 102 generates a FBD 191 using the hit FBP entry and the hit SEQ-MF-ME of block 2802. That is, the PRU 102 does not use the hit first constituent SF-ME of block 2802 to generate the FBD 191. Stated alternatively, the PRU 102 generates a FBD 191 to instruct the IFU 106 to fetch the SEQ-MF-ME rather than the SF-ME. Additionally, if the conditions are met to start or continue a build of a new MF-ME, the PRU 102 also pushes a MBRFE 2100 into the MBRF 179 for the hit SEQ-MF-ME. That is, the PRU 102 prioritizes the primary SEQ-MF-ME above the secondary SF-ME. However, the secondary ME may be used in other manners, e.g., by the PRU 102 to update the training fields 331 of an ME, e.g., per arcs (15) and (18) of FIG. 22. As may be observed, although the SEQ-MF-ME is associated with multiple FBlks (i.e., the SEQ-MF-ME was built using the MOPs decoded from the architectural instructions of multiple FBlks), when processing a SEQ-MF-ME, the PRU 102 generates only one FBD, and the single FBD instructs the IFU 106 to fetch all the MOPs of the SEQ-MF-ME and send them to the back-end for dispatch, issuance, and execution.

Operation of the PRU 102 in a multiple-hit in the MOC 171 has been described with reference to FIG. 28A and FIG. 28B in the context of a co-resident SEQ-MF-ME and its first constituent SF-ME. Operation of the PRU 102 during a multiple-hit in the MOC 171 in the context of a co-resident ULP-MF-ME and the loop body ME used to build it are described with respect to FIG. 35B and FIGS. 43 through 46, among others. Briefly, the PRU 102 initially prioritizes the ULP-MF-ME over the loop body ME by generating a FBD 191 using the hit ULP-MF-ME, then for subsequent tail iterations of the loop on the loop body ME the PRU 102 prioritizes the loop body ME until the program instruction stream falls out of the loop.

Two-Stage MF-ME Building

Figure 29:
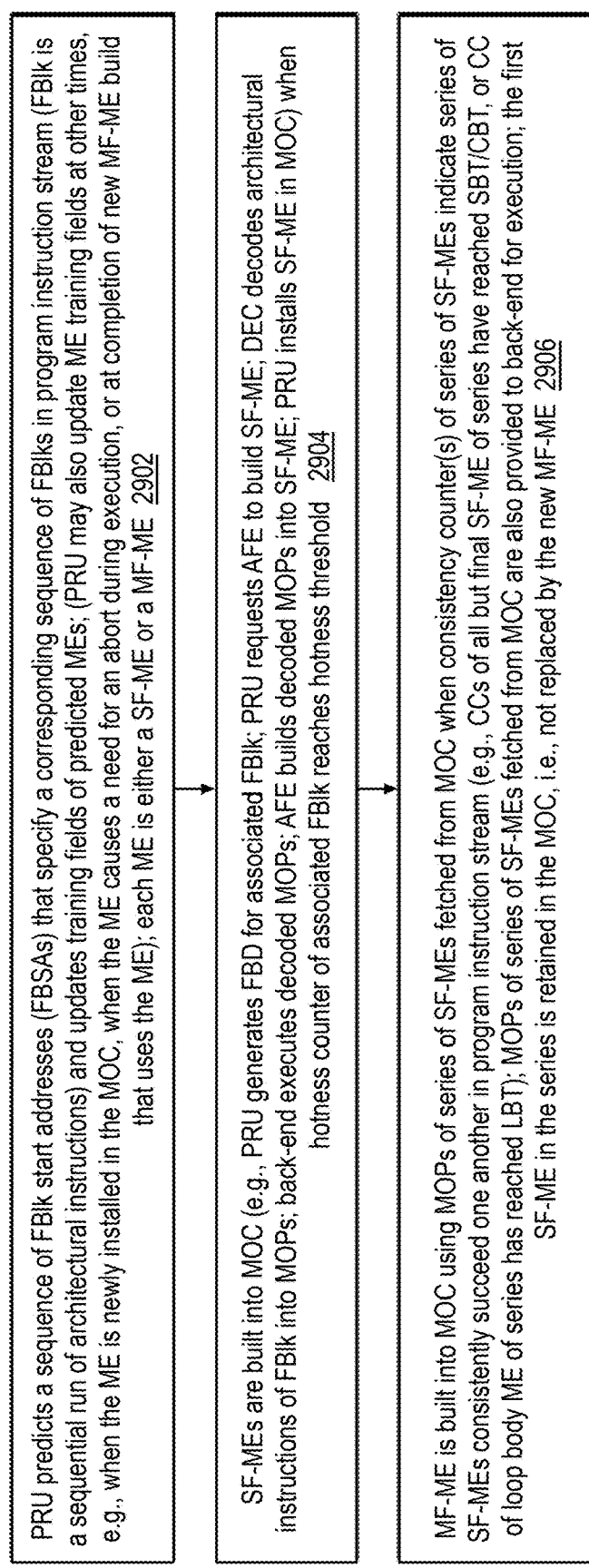
FIG. 29 is a flowchart illustrating operation of the processor of FIG. 1 to build an MF-ME in a two-stage process in accordance with embodiments of the present disclosure.

FIG. 29 is a flowchart illustrating operation of the processor 100 of FIG. 1 to build an MF-ME in a two-stage process in accordance with embodiments of the present disclosure. Operation begins at block 2902.

At block 2902, the PRU 102 continuously predicts a sequence of FBSAs that specify a corresponding sequence of FBlks in the program instruction stream and updates the training fields 331 of the MEs 350 as it predicts them as described with respect to block 2402 of FIG. 24. Operation proceeds to block 2904.

At block 2904, an SF-ME is built into the MOC 171 when the FBHC 217 of an associated FBlk reaches the FBHT 185, e.g., as described with respect to FIG. 23. Many SF-MEs are built in this manner into the MOC 171 over time as many corresponding FBlks become hot FBlks. Each ME in the MOC 171 is either an SF-ME or an MF-ME. That is, a single MOC 171 holds both SF-MEs and MF-MEs. As the architectural instructions of a FBlk are fetched from the instruction cache 101 and decoded by the DEC 112 into MOPs, the MOPs are provided (after being register renamed) by the DEC 112 to the back-end 130 for execution, and in the case of a hot FBlk the MOPs (before being register renamed) are also received by the AFE 181 to be built into the SF-ME. Operation proceeds to block 2906.

Figure 38:
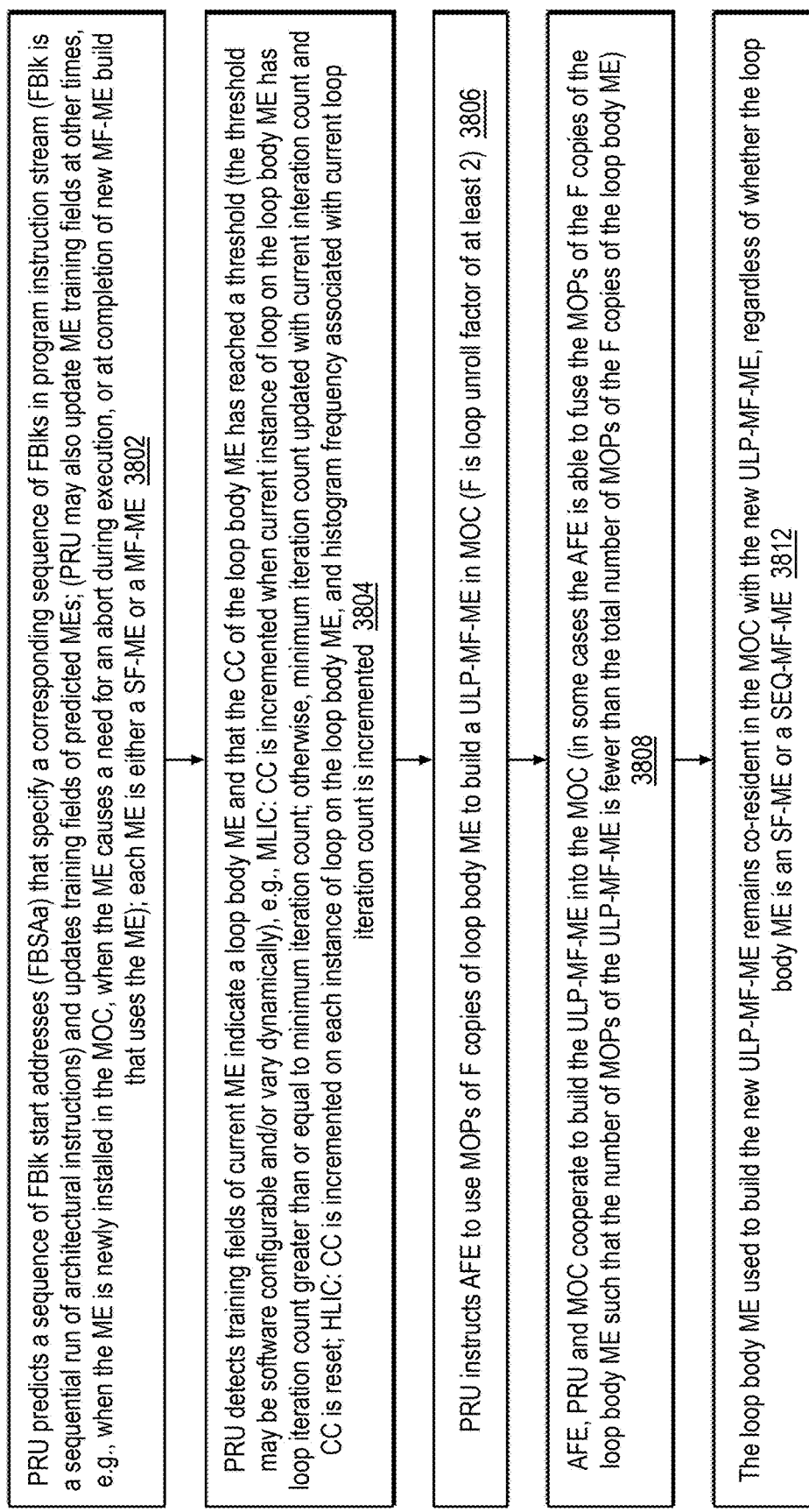
FIG. 38 is a flowchart illustrating operation of the PRU to build a ULP-MF-ME based on an observed inconsistent loop iteration count in accordance with embodiments of the present disclosure.

At block 2906, an MF-ME is built into the MOC 171, using the MOPs of a series of SF-MEs fetched from the MOC 171, when the CC 2008 of the series of SF-MEs indicate the series of SF-MEs consistently succeed one another in the program instruction stream, e.g., as described with respect to FIG. 24, FIG. 32, or FIG. 38. For example, the series of SF-MEs may be a consistent sequence of SF-MEs that are built into a SEQ-MF-ME as described with respect to FIG. 24, or the series of SF-MEs may be a consistent sequence of multiple copies of a loop body SF-ME that are built into a ULP-MF-ME as described with respect to FIG. 32 and FIG. 38. An SEQ-MF-ME may be built when the CC 2008 of the first SF-ME of the series reaches a start build threshold (e.g., SBT 1922) and the CC 2008 of each of the remaining SF-MEs of the series other than the final SF-ME have reached a continue build threshold (e.g., CBT 1924), and a ULP-MF-ME may be built when the CC 2008 of the loop body SF-ME of the series has reached a loop build threshold (e.g., LBT 1926). Many MF-MEs are built in this manner into the MOC 171 over time as many corresponding series of SF-MEs become a hot section of code. As the MOPs of a SF-ME are fetched from the MOC 171 they are provided to the back-end 130 for execution, and in the case of a consistent SF-ME the MOPs are also received by the AFE 181 to be built into the MF-ME. In embodiments, when the new MF-ME is installed into the MOC 171, the first SF-ME of the series (e.g., the first constituent SF-ME of an SEQ-MF-ME, or the loop body SF-ME of a ULP-MF-ME) is retained in the MOC 171, i.e., not replaced by the new MF-ME, but instead is allowed to be same-FBSA co-resident with the new MF-ME, e.g., as described with respect to block 2412 and block 3212. As also described, in addition to being built from only constituent SF-MEs, a SEQ-MF-ME may also be built from a combination of SF-MEs and MF-MEs. As also described, in addition to being built from a loop body SF-ME, a ULP-MF-ME may also be built from a loop body MF-ME.

The benefits of building MF-MEs (e.g., SEQ-MF-MEs and ULP-MF-MEs) into the MOC 171 in terms of increased performance and reduced power consumption are described herein but will now be briefly summarized. The MF-ME may have fewer MOPs than the total number of MOPs of the J constituent MEs used to build it, which may consume less MDR space, which may reduce power consumption when fetching the MF-ME relative to fetching the J constituent MEs and may make more efficient use of the MOC 171 resulting in higher performance. The PRU 102 predicting a single MF-ME rather than the J constituent MEs may reduce power consumption. The DEC 112 may consume less power because it does not have to decode architectural instructions into MOPs. The fewer number of MOPs of the MF-ME may turn into power saving and performance increase due to consumption of fewer resources (e.g., ROB entries, DEC 112 dispatch slots, scheduler entries, and execution unit slots). However, there are also costs associated with building MF-MEs.

Advantageously, the two-stage process of building MF-MEs balances the costs and benefits of building MEs into the MOC 171 by first building less aggressive SF-MEs only for FBlks that are proved—using the FBHC 217 of the associated FBP entry 200—to be hot code, and thereafter spending more effort (e.g., of the AFE 181) to build a more aggressive MF-ME only from SF-MEs that are proved—using the training fields 331 of the associated MTR entries 330—to be not just hot code but a sequence or loop of hot code, e.g., a consistent sequence of constituent MEs (any of which may also be an MF-ME) or a loop body ME (which may also be an MF-ME). Stated alternatively, less expensive builds of SF-MEs provide a basis for learning more about the currently running program using the training fields 331 of the SF-MEs to then drive more expensive builds of MF-MEs in a selective manner. Detecting sequences/loops of hot code and selectively building into the MOC 171 a corresponding MF-ME (e.g., based on the CC 2008 and other training fields 331) may result in a higher micro-op cache hit rate, e.g., by avoiding replacing proven useful MEs with MEs not yet proven to be useful. Therefore, the embodiments may have the advantage of improving performance of the microprocessor and reducing its power consumption. The various MF-ME build thresholds may be configurable by software running on the microprocessor, which may enable the software (e.g., operating system) to tailor the "hotness" required of a sequence/loop of MEs before it is considered worthy for allocation into the MOC 171.

The costs of building an ME into the MOC 171 include the following. First, each ME consumes space in the MOC 171, and installing a new ME likely requires evicting a potentially hot ME currently in the MOC 171. More specifically, an ME consumes one entry in the MTR 173 and typically consumes multiple entries in the MDR 175, depending upon the number of MOPs in the ME. Typically, an MF-ME will consume more space in the MDR 175 than an SF-ME, and the number of MDREs consumed may be relatively large in the case of a lengthy ME. Advantageously, initially a relatively small cost of space in the MDR 175 is incurred to build an SF-ME if the FBHC 217 of the FBP entry 200 of the associated FBlk indicates the worth of the SF-ME, and subsequently a relatively larger cost of space in the MDR 175 is incurred to build an MF-ME if the SF-ME training fields 331 indicate the worth of the MF-ME. Further advantageously, preferably the MTR 173 has a small number of entries (e.g., relative to the number of entries in the FBP 152) such that the space required by the training fields 331 is only incurred in the smaller number of MTR entries 330 rather than in the larger number of FBP entries 200. In an embodiment, the MTR 173 has twenty times more entries than the FBP 152, e.g., $2^{10}$ entries versus $20 \times 2^{10}$ entries.

Second, there is the cost of power consumed by the AFE 181 to build an ME—typically less for an SF-ME and more for an MF-ME. The AFE 181 consumes power receiving the MOPs from the DEC 112, allocating new MDREs, performing the various optimizations such as fusing and eliminating MOPs and the associated housekeeping, and communicating with the PRU 102 to install the newly built ME into the MOC 171. Again, initially a relatively small cost of AFE 181 power consumption is incurred to build an SF-ME if the FBHC 217 indicates its worth, and subsequently a relatively larger cost of AFE 181 power consumption is incurred to build an MF-ME if the SF-ME training fields 331 indicate the worth of the MF-ME. That is, the FBHC 217 and the training fields 331 are employed in a two-stage fashion to only instruct the AFE 181 to consume a modest amount of power to build SF-MEs that are part of hot code and subsequently to consume a relatively larger amount of power to build MF-MEs in hopes that the cost associated with building the ME is amortized over the benefit of many uses of the ME.

Third, there is an AFE occupancy cost that is incurred when the AFE 181 is tied up building an ME, which could be typically in the range of 10-50 clock cycles depending on the size of the ME. In an embodiment, the AFE 181 is unable to build another ME until it is finished building the ME is it currently building such that the AFE 181 may need to drop a build request for a subsequent ME (although the PRU 102 will eventually detect the consistency counter is still above the relevant threshold and start another attempt to build the MF-ME). This results in a longer time until the benefit of the subsequent ME (e.g., the ME whose build request was dropped) may be enjoyed. This undesirable phenomenon could occur frequently if MEs were indiscriminately built into the MOC as they appear in the program instruction stream. However, advantageously the FBHC 217 and the training fields 331 are employed to judiciously install into the MOC 171 only MEs that are hot code initially and subsequently sequences or loops of hot code.

SEO-MF-ME Extending

Embodiments are described herein in which the processor 100 advantageously performs a two-stage process to build an MF-ME. Embodiments will now be described in which the processor 100 effectively performs an N-stage MF-ME build process for SEQ-MF-MEs, where N is 3 or more stages.

Assume, for example, there are five MEs A through E that appear in sequence in the program instruction stream with some level of confidence, but when the CC 2008 of A reaches the SBT 1922, only the first four MEs A through D are included in an SEQ-MF-ME build because, although the CC 2008 of B and C reached the CBT 1924, the CC 2008 of D, although it was close, did not reach the CBT 1924. It may be desirable to later add E to the original SEQ-MF-ME, i.e., once the CC 2008 of D reaches a threshold. Such an adding of an ME to an existing SEQ-MF-ME may be referred to herein as extending the SEQ-MF-ME or lengthening the SEQ-MF-ME.

The ability to lengthen an SEQ-MF-ME may avoid additional complexity in the PRU 102 that might otherwise be required to make sure the optimal-length SEQ-MF-ME is built the first time. Stated alternatively, the ability to lengthen an SEQ-MF-ME means the PRU 102 does not have to be perfect the first and only time it would build the SEQ-MF-ME, i.e., the PRU 102 does not have to include all the MEs that it might later discover are consistently in a sequence. Rather, the PRU 102 can build a first SEQ-MF-ME based on the information (e.g., CCs 2008) it has relative to the threshold(s), and then as it learns more about the consistency of a longer sequence, the PRU 102 can then lengthen the first SEQ-MF-ME to the longer sequence by building a second, longer SEQ-MF-ME. In an embodiment, the second SEQ-MF-ME replaces the first SEQ-MF-ME in the MOC 171.

Figure 30:
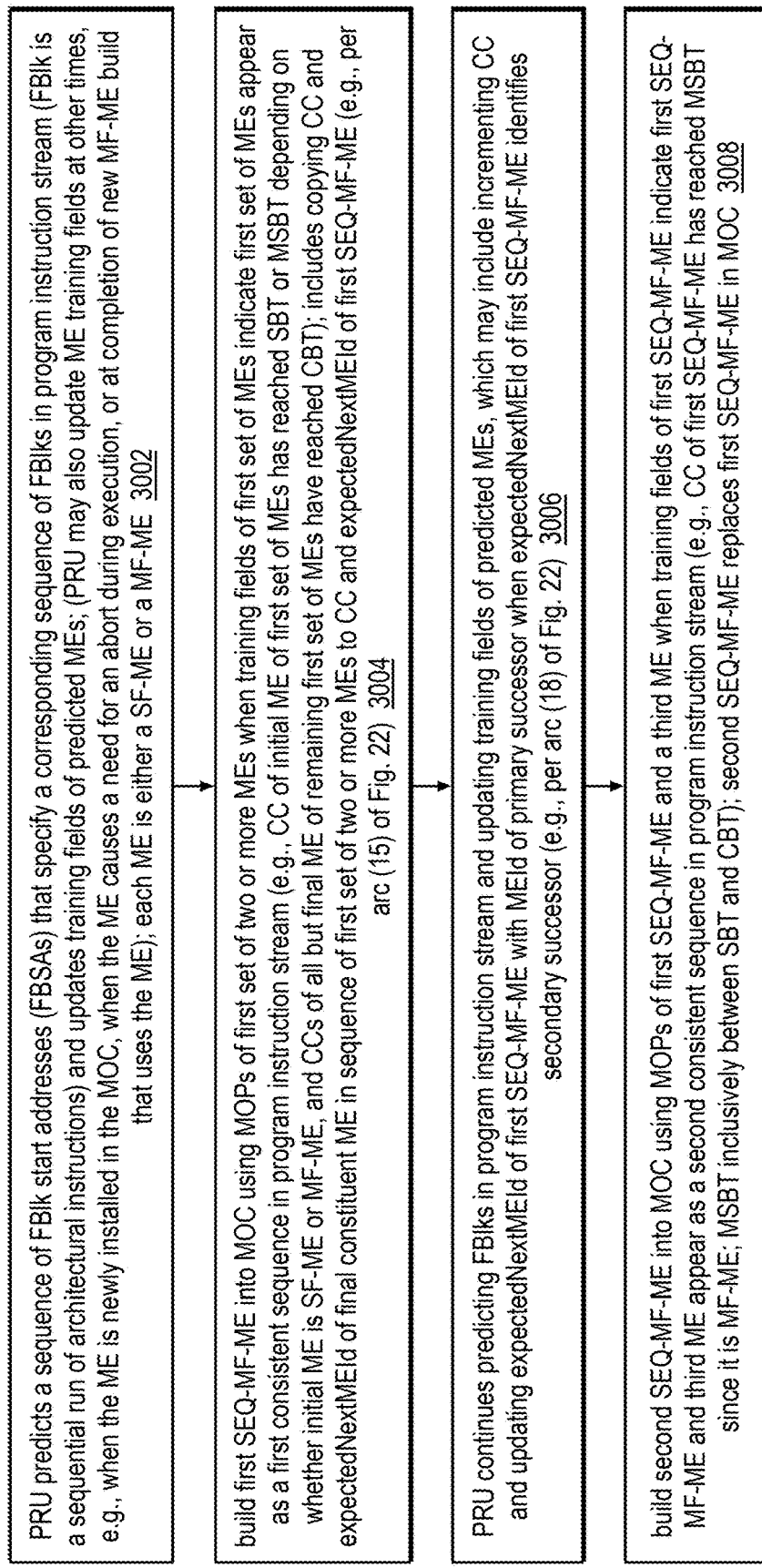
FIG. 30 is a flowchart illustrating operation of the processor of FIG. 1 to extend/lengthen a SEQ-MF-ME in accordance with embodiments of the present disclosure.

FIG. 30 is a flowchart illustrating operation of the processor 100 of FIG. 1 to extend/lengthen a SEQ-MF-ME in accordance with embodiments of the present disclosure. Operation begins at block 3002.

At block 3002, the PRU 102 continuously predicts a sequence of FBSAs that specify a corresponding sequence of FBlks in the program instruction stream and updates the training fields 331 of the MEs 350 as it predicts them as described with respect to block 2402 of FIG. 24. Operation proceeds to block 3004.

At block 3004, a first SEQ-MF-ME is built into the MOC 171 using the MOPs of a first set of two or more MEs when the training fields 331 of the first set of MEs indicate that the first set of MEs appear as a consistent sequence in the program instruction stream, e.g., as described with respect to FIG. 24. In an embodiment, the training fields 331 indicate that the first set of MEs appear as a consistent sequence when the CC 2008 of the initial ME of the first set of MEs has reached the SBT 1922 if the initial ME is an SF-ME or reached the MSBT 1923 if the initial ME is an MF-ME, and the CC 2008 of each of the remaining MEs of the first set other than the final ME have reached the CBT 1924. As described with respect to FIG. 22, per arc (15), the build of the first SEQ-MF-ME includes copying the CC 2008 and expectedNextMEId 2012 of the final ME to the CC 2008 and expectedNextMEId 2012 of the new first SEQ-MF-ME. Operation proceeds to block 3006.

At block 3006, the PRU 102 continues predicting FBlks in the program instruction stream and updating the training fields 331 of the predicted MEs. This may include incrementing the CC 2008 of the first SEQ-MF-ME built at block 3004 and updating the expectedNextMEId 2012 of the first SEQ-MF-ME with the MEId of the primary successor to the first SEQ-MF-ME when the expectedNextMEId 2012 of the first SEQ-MF-ME identifies the secondary successor to the first SEQ-MF-ME, per arc (18) of FIG. 22. Operation proceeds to block 3008.

At block 3008, a second SEQ-MF-ME is built into the MOC 171 using the MOPs of the first SEQ-MF-ME and a third ME when the training fields 331 of the first SEQ-MF-ME indicate that the first SEQ-MF-ME and the third ME appear as a consistent sequence in the program instruction stream. Because the first ME of the sequence (i.e., the first SEQ-MF-ME) is an MF-ME, the training fields 331 of the first SEQ-MF-ME indicate that the first SEQ-MF-ME and the third ME appear as a consistent sequence when the CC 2008 of the first SEQ-MF-ME has reached the MSBT 1923. More specifically, the PRU 102 pushes a MOC build request 177 into the MBRF 179 when the CC 2008 of the first SEQ-MF-ME has reached the MSBT 1923, similar to the manner described with respect to block 2502 of FIG. 25. In an embodiment, the value of the MSBT 1923 is inclusively between the SBT 1922 and the CBT 1924. The second SEQ-MF-ME replaces the first SEQ-MF-ME in the MOC 171. In this manner, the first SEQ-MF-ME is effectively lengthened, or extended, with the third ME.

As may be observed from the description of FIG. 30, the CC 2008 of the first SEQ-MF-ME is incremented to the threshold (e.g., MSBT 1923) in a two-stage fashion. That is, the CC 2008 of the first SEQ-MF-ME is initially incremented toward the threshold when the CC 2008 of first SEQ-MF-ME was originally the CC 2008 of the final ME of the first set of MEs, and the CC 2008 of the first SEQ-MF-ME is incremented the remainder of the way to the threshold when the CC 2008 of the first SEQ-MF-ME is the CC 2008 of the first SEQ-MF-ME, i.e., itself. This is accomplished, at least in part, by the operation of arc (15) of FIG. 22, and by the operation of arc (18) of FIG. 22 in the case that the third ME is an MF-ME.

Selective Abort Invalidation of MF-ME

Figure 31:
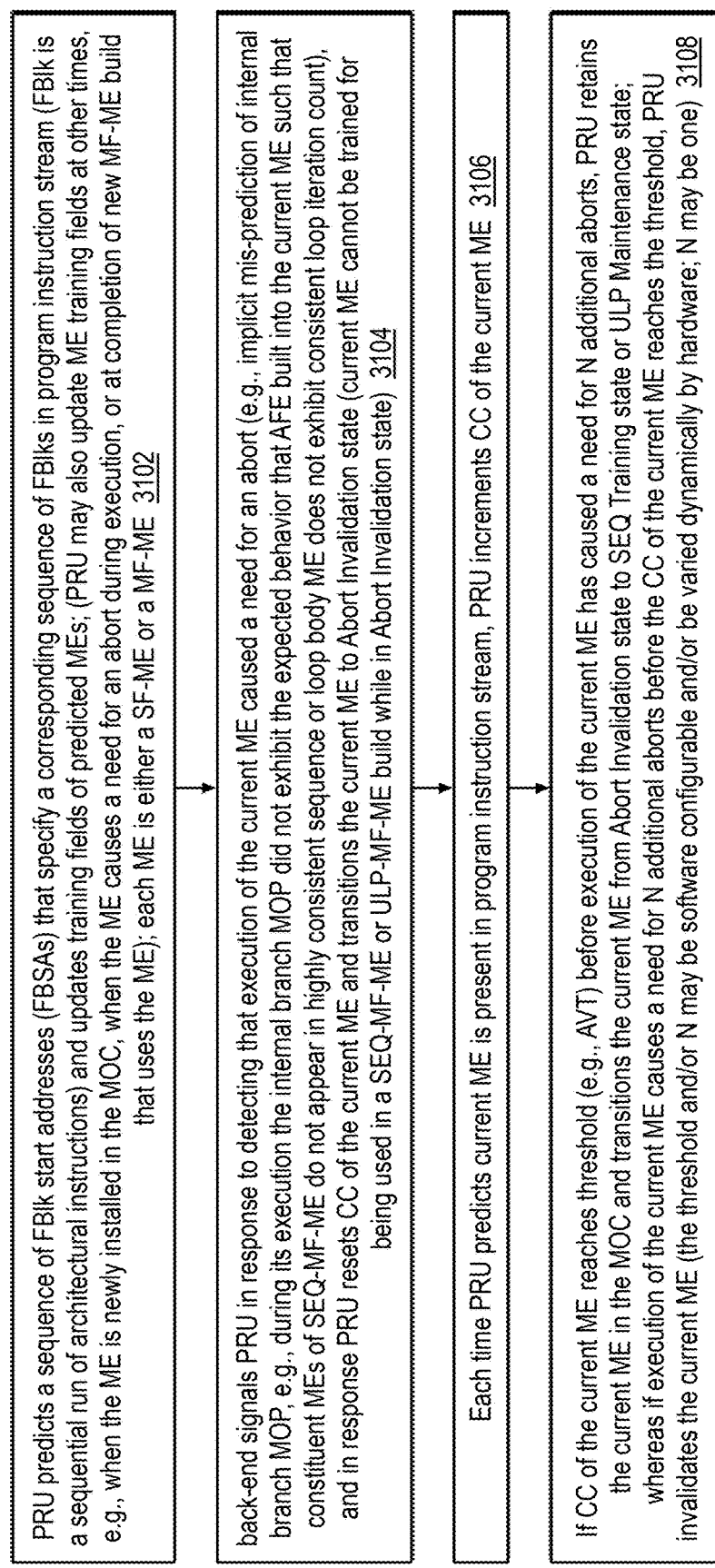
FIG. 31 is a flowchart illustrating operation of the processor of FIG. 1 to selectively invalidate an MF-ME using the Abort Invalidation state of FIG. 18 in accordance with embodiments of the present disclosure.

FIG. 31 is a flowchart illustrating operation of the processor 100 of FIG. 1 to selectively invalidate an MF-ME using the Abort Invalidation state of FIG. 18 in accordance with embodiments of the present disclosure. Operation begins at block 3102.

At block 3102, the PRU 102 continuously predicts a sequence of FBSAs that specify a corresponding sequence of FBlks in the program instruction stream and updates the training fields 331 of the MEs 350 as it predicts them as described with respect to block 2402 of FIG. 24. Operation proceeds to block 3104.

As the PRU 102 predicts FBlks in the program instruction stream, it may predict an ME and generate a FBD 191 that instructs the IFU 106 to fetch the ME from the MOC 171. The PRU 102 will also predict the next FBSA 449 produced by the ME. More specifically, if the ME is terminated with a branch MOP, the PRU 102 will predict the terminating branch MOP, and the predicted next address, which becomes the next FBSA 449 produced by the ME.

However, the PRU 102 does not explicitly predict the direction of internal branch MOPs of an MF-ME. Rather, the direction of an internal branch MOP is a built-in expectation of the MF-ME based on the series of MEs used to build the MF-ME.

In the case of a ULP-MF-ME, when the AFE 181 builds the ULP-MF-ME, the AFE 181 effectively turns the terminating conditional branch MOP of each copy of the loop body ME, other than the last copy, into an internal branch MOP. Additionally, if the loop body ME is a SEQ-MF-ME, the SEQ-MF-ME may include other internal branch MOPs, as will now be described, in addition to the terminating conditional branch MOP of the copies of the loop body ME that the AFE 181 effectively turned into internal branch MOPs of the ULP-MF-ME.

In the case of a SEQ-MF-ME, when the AFE 181 builds the SEQ-MF-ME, the AFE 181 effectively turns any terminating conditional branch MOP of a constituent ME of the sequence of MEs, other than the last constituent ME, into an internal branch MOP in a manner similar to that described above with respect to a ULP-MF-ME. Additionally, if any constituent ME of the newly built SEQ-MF-ME is itself a SEQ-MF-ME, the newly built SEQ-MF-ME may include other internal branch MOPs in addition to any terminating conditional branch MOP of the constituent MEs that the AFE 181 effectively turned into internal branch MOPs of the SEQ-MF-ME as just described.

In an embodiment, when the MF-ME gets fetched and executed, the back-end 130 executes each internal branch MOP, and if it turns out the direction of an internal branch MOP at execution time was different than the built-in expectation of the MF-ME, the back-end 130 will send the PCL 132 an abort request, and the PCL 132 will send an IBM abort 493, e.g., of FIG. 4A and FIG. 11, to the PRU 102.

At block 3104, the back-end 130 detects that execution of the current ME caused a need for an abort and sends the PCL 132 an abort request. The PCL 132 signals the PRU 102, in response to which the PRU 102 clears the CC 2008 of the current ME and transitions the current ME to the Abort Invalidation state (e.g., per arc (41), (42), or (43) of FIG. 22), which prevents the current ME from being used to build an MF-ME. For example, the back-end 130 executes an internal branch MOP of the current MF-ME and detects that the internal branch MOP did not exhibit the built-in expected behavior such that the constituent MEs of a SEQ-MF-ME did not appear in the highly consistent sequence in which they were built or such that the loop body ME of a ULP-MF-ME did not behave according to expectations built into it regarding loop iteration count. Operation proceeds to block 3106.

At block 3106, the current ME is in the Abort Invalidation state, and each time the PRU 102 predicts that it appears in the program instruction stream, the PRU 102 increments the CC 2008 of the current ME (e.g., per arc (45) of FIG. 22). Operation proceeds to block 3108.

At block 3108, if the CC 2008 of the current ME has reached the relevant threshold (e.g., AVT 1928 of FIG. 19) before execution of the current ME has caused a need for N additional aborts, the PRU 102 retains the current ME in the MOC 171 and transitions the current ME from Abort Invalidation state to SEQ Training state or ULP Maintenance state (e.g., per arc (17) or arc (32), respectively, of FIG. 22). On the other hand, if execution of the current ME causes a need for N additional aborts before the CC 2008 of the current ME reaches the threshold, the PRU 102 invalidates the current ME (e.g., per arc (44) of FIG. 22). In an embodiment, the threshold and/or the value of N may be software programmable or be varied dynamically by hardware. In an embodiment, N is one.

ULP-MF-ME Building

FIG. 32 is a flowchart illustrating operation of the processor 100 of FIG. 1 to build a ULP-MF-ME in accordance with embodiments of the present disclosure. Operation begins at block 3202.

At block 3202, the PRU 102 continuously predicts a sequence of FBSAs that specify a corresponding sequence of FBlks in the program instruction stream and updates the training fields 331 of the MEs 350 as it predicts them as described with respect to block 2402 of FIG. 24. Operation proceeds to block 3204.

At block 3204, the PRU 102 detects that the training fields 331 of the current ME indicate that it is a loop body ME exhibiting a consistent loop iteration count within the program instruction stream. In an embodiment, the training fields 331 of the current ME indicate the current ME is a loop body ME exhibiting a consistent loop iteration count when the current ME is in the ULP Training state, its CC 2008 has reached a threshold, e.g., LBT 1926. The thresholds may be software configurable and/or dynamically variable by hardware of the microprocessor 100. The CC 2008 may be incremented when the current and most recent instances of a loop on the loop body ME have equal loop iteration counts as described with respect to arc (23) of FIG. 22, and the CC 2008 may be reset and the LastIterCnt 2014 updated with the CurrIterCnt 1914 if they are not equal as described with respect to arc (24) of FIG. 22. Operation proceeds to block 3206.

At block 3206, the PRU 102 instructs the AFE 181 to use F copies of the MOPs of the loop body ME to build a ULP-MF-ME in the MOC 171. More specifically, the PRU 102 pushes into the MBRF 179 a MBRFE 2100 corresponding to each of the F loop body MEs, e.g., as described in the embodiment of FIG. 33. The loop body ME may be an SF-ME or a SEQ-MF-ME. However, in an embodiment, the loop body ME may not be a ULP-MF-ME. F is the loop unroll factor that the PRU 102 choses based on the LastIterCnt 2014, as described with respect to block 3302 of FIG. 33. Operation proceeds to block 3208.

At block 3208, the AFE 181 cooperates with the PRU 102 and MOC 171 to build the ULP-MF-ME, e.g., per block 3308 and block 3312 of FIG. 33. In the case of some MEs, the AFE 181 is able to fuse the MOPs of the F copies of the loop body ME such that the number of MOPs of the resultant ULP-MF-ME is fewer than the total number of MOPs of the F copies of the loop body ME that were input to the AFE 181, i.e., that the AFE 181 used to build the new ULP-MF-ME. Operation proceeds to block 3212.

At block 3212, in a first embodiment, if the loop body ME used to build the new ULP-MF-ME is itself an MF-ME, then the MOC 171 replaces the loop body ME (i.e., the loop body SEQ-MF-ME currently present in the MOC 171) with the new ULP-MF-ME; otherwise, the loop body ME is a SF-ME (since a ULP-MF-ME is not allowed to be a loop body ME of a build of a ULP-MF-ME), and the loop body ME (SF-ME) is allowed to remain same-FBSA co-resident in the MOC 171 with the new ULP-MF-ME, an example of which is shown in FIG. 35A. In a second embodiment, even if the loop body ME used to build the new ULP-MF-ME is itself an MF-ME, the loop body MF-ME is allowed to remain same-FBSA co-resident in the MOC 171 with the new ULP-MF-ME (and the first constituent SF-ME used to build the loop body MF-ME if it is still resident in the MOC 171), an example of which is shown in FIG. 35B.

FIG. 33 is a flowchart illustrating operation of the processor 100 of FIG. 1 to build a ULP-MF-ME in accordance with consistent loop iteration count (CLIC) embodiments of the present disclosure. Operation begins at block 3302.

At block 3302, for the current FBSA (e.g., for the FBSA of the first copy of the loop body ME of FIG. 32), the PRU 102 detects the following conditions: (1) the current FBSA hits in the FBP 152 and in the MOC 171 (the hit MOC entry 350 in the MOC 171 is referred to as the current ME, which is the loop body ME); and (2) the current ME is in the ULP Training state (of FIG. 18), the current ME is its successor but not its predecessor, and the CC 2008 of the current ME has reached the value of the LBT 1926. When conditions (1) and (2) are satisfied, the PRU 102 takes the following actions: (A) generates an FBD 191 using the hit entry of the FBP 152 and the current ME; (B) pushes a MBRFE 2100 into the MBRF 179 with an MeType 2102 of MF-ME first and initializes the unrollCnt register 1913 of FIG. 19 to a value of two; (C) selects a value of the loop unroll factor and populates the loopUnrollFactor (F) register 1912 with the selected value; and (D) calculates the quotient of the LastIterCnt 2014 of the current ME and the selected value of F, and populates the ULPIterCnt register with the calculated quotient. In an embodiment, the possible values of F are a predetermined set, e.g., 2, 3, or 4, although other embodiments are contemplated. In an embodiment, F is selected such that F is an integer submultiple of the consistent loop iteration count (indicated by LastIterCnt 2014) such that the PRU 102 may process the ULP-MF-ME based merely on the ULPIterCnt, as described with respect to FIG. 43. In an embodiment, logic within the PRU 102 (e.g., MOC build requestor 475) selects the value of F as follows, where Q is the number of FBlks of the loop body ME, and MAX_FBLKS is a predetermined value, e.g., 9.

if (LastIterCnt mod 4)==0 AND (4Q<=MAX_FBLKS), then F=4, else
 if (LastIterCnt mod 3)==0 AND (3Q<=MAX_FBLKS), then F=3, else
 if (LastIterCnt mod 2)==0 AND (2Q<=MAX_FBLKS), then F=2, else
 do not build ULP-MF-ME.

In an alternate embodiment, F is selected such that it is not necessarily an integer submultiple of the consistent loop iteration count. The alternate embodiment enjoys the benefit of being able to build a ULP-MF-ME even when there is no value of F that is an integer submultiple of LastIterCnt. In such an embodiment, the PRU 102 may require an additional state machine to process tail iterations after the iterations of the ULP-MF-ME have been processed, as described with respect to FIG. 44. In such an embodiment, the PRU 102 may calculate the ULPIterCnt as a floor function of the quotient of LastIterCnt and F to round down the quotient so that the PRU 102 does not predict too many iterations of the ULP-MF-ME and cause an abort request. The alternate embodiment also may permit the size of the set of possible F values to be increased since larger beneficial values of F may be accommodated. However, the predetermined set of possible values of F may be limited by the ME build constraint that the product of F and Q (the number of FBlks of the loop body ME) should be less than MAX_FBLKS. Generally speaking, a larger value of F is preferable to a smaller value of F because of the performance and power advantages described herein associated with building an MF-ME using a larger number of SF-MEs. However, tail iterations are likely to require processing when a value of F is chosen that is not an integer submultiple of the LastIterCnt, namely a number of tail iterations equal to the remainder of the quotient of LastIterCnt and F. There may be a performance tradeoff related to the benefits of a larger F and a smaller number of tail iterations. Therefore, in one embodiment, the PRU 102 tends to maximize F, within ME build constraints, while tending to minimize the remainder in a heuristic fashion. For example, assume a LastIterCnt of 27. If F is selected as 4, then ULPIterCnt is 6 and a remainder of 3 results, which means that 3 tail iterations will likely need to be processed. If F is selected as 3, the ULPIterCnt 2016 is 9, and no remainder results, which means no tail iterations need be processed. Thus, the PRU 102 may choose a value of 3 for F, rather than 4. However, performance testing, e.g., using simulations, may be performed on common software workloads for different combinations of values of F and LastIterCnt (or MinIterCnt in the embodiment of FIG. 39, or HistIterCnt in the embodiment of FIG. 40), and selection logic within the PRU 102 may be configured with the well-performing values. Operation proceeds to block 3304.

At block 3304, for each next immediately succeeding current FBSA after the current FBSA of block 3302 (e.g., as the current FBSA progresses, for the FBSA of each copy, except the first, of the F copies of the loop body ME of FIG. 32 which may be zero or more copies of the loop body ME), the PRU 102 detects the following conditions: condition (1) of block 3302; (3) the current ME is in the ULP Training state and is its predecessor; and (4) the unrollCnt 1913 is less than F 1912.

While conditions (1), (3) and (4) are satisfied, the PRU 102 takes the following actions for each current ME: action (A) of block 3302; and (E) pushes a MBRFE 2100 into the MBRF 179 with an MeType 2102 of MF-ME middle (rather than first) and increments the unrollCnt 1913. If at block 3304 there is not an immediately succeeding current FBSA that satisfies conditions (1), (3), and (4), i.e., no middle constituent ME is found (e.g., because F is two), then the current FBSA of block 3304 becomes the current FBSA at block 3306. Operation proceeds to block 3306.

At block 3306, for the next immediately succeeding current FBSA after the last current FBSA of block 3304 (e.g., for the final copy of the loop body ME of FIG. 32), the PRU 102 detects the following conditions: conditions (1) and (3) of block 3304; and (5) the unrollCnt 1913 equals F 1912. If conditions (1), (3) and (5) are satisfied, the PRU 102 takes the following actions for the current ME: action (A) of block 3302; and (F) pushes a MBRFE 2100 into the MBRF 179 with an MeType 2102 of MF-ME final (rather than first or middle). If conditions (1), (3) and (5) are not satisfied, the PRU 102 cancels the build of the ULP-MF-ME (e.g., invalidates the MBRFE 2100 pushed at block 3302 and any MBRFEs 2100 pushed at block 3304). In an embodiment, action (G) may also need to be taken if a build constraint is encountered. In an embodiment, at block 3302, block 3304 and block 3306, the PRU 102 also populates the FBD 191 FBlkID 317 and the MBRFE 2100 FBlkID 2117 with the FBlkID that identifies the current ME. Operation proceeds to block 3308.

At block 3308, the IFU 106 fetches from the MOC 171 the not yet renamed MOPs of the F copies of the loop body ME of the to-be-built ULP-MF-ME in response to the FBDs 191 generated at block 3302, block 3304, and block 3306, which the DEC 112 renames and sends the renamed MOPs to the scheduler 121. The AFE 181 receives from the DEC 112 the not yet renamed MOPs of the F copies of the loop body ME and builds the ULP-MF-ME using them along with the MF-ME first, middle, and last MBRFEs 2100 pushed into the MBRF 179 at block 3302, block 3304, and block 3306. The AFE 181 in most cases is able to fuse the MOPs of the F copies of the loop body ME more highly into fewer MOPs of the ULP-MF-ME. In an embodiment, the AFE 181 may match the FBlkID of each MBRFE 2100 with the FBlkID 317 of a corresponding copy of the loop body ME as the DEC 112 receives the not yet renamed MOPs of the copy of the loop body ME from the FBlk FIFO 108, in response to which the AFE 181 may load the MOPs into a MOP buffer of the AFE 181 for use in building the ULP-MF-ME. The AFE 181 then sends an install request 183 to the PRU 102. Operation proceeds to block 3312.

At block 3312, the PRU 102 (e.g., MTRE update logic 495), in response to the install request 183, selects an MTR entry 330 for replacement and populates the selected MTR entry 330, using information from the MBRFE 2100, in order to install the new ULP-MF-ME into the MOC 171. As described with respect to block 3212 of FIG. 32, in a first embodiment the PRU 102 replaces the loop body MF-ME with the new ULP-MF-ME (an example of which is shown in FIG. 35B), whereas in a second embodiment the PRU 102 allows the loop body MF-ME to remain co-resident with the new ULP-MF-ME (an example of which is shown in FIG. 35B) and sets to true the ULP bit 2018 of the newly built ULP-MF-ME. The PRU 102 also populates the ULPIterCnt 2016 with the value calculated as described with respect to block 3302 for use in ULP-MF-ME processing, e.g., per FIG. 43 or FIG. 44. The PRU 102 also populates the numFBlksLoopBody 2019 of the ULP-MF-ME with the numFBlks 335 of the loop body ME for use in tail iteration processing per the embodiment of FIG. 45. Once the new ULP-MF-ME has been installed in the MOC 171, as the PRU 102 predicts the sequence of FBSAs of the program instruction stream, the new ULP-MF-ME may be hit upon by the current FBSA and processed, e.g., according to FIG. 43 or FIG. 44.

Similar to the manner described with respect to FIG. 25, because the FBD 191 generation is decoupled from the MF-ME training and build decisions, the PRU 102 may generate the FBD 191 (action (A) for each of block 3302, block 3304, and block 3306) when condition (1) is met, regardless of whether the other conditions are satisfied.

Figure 34:
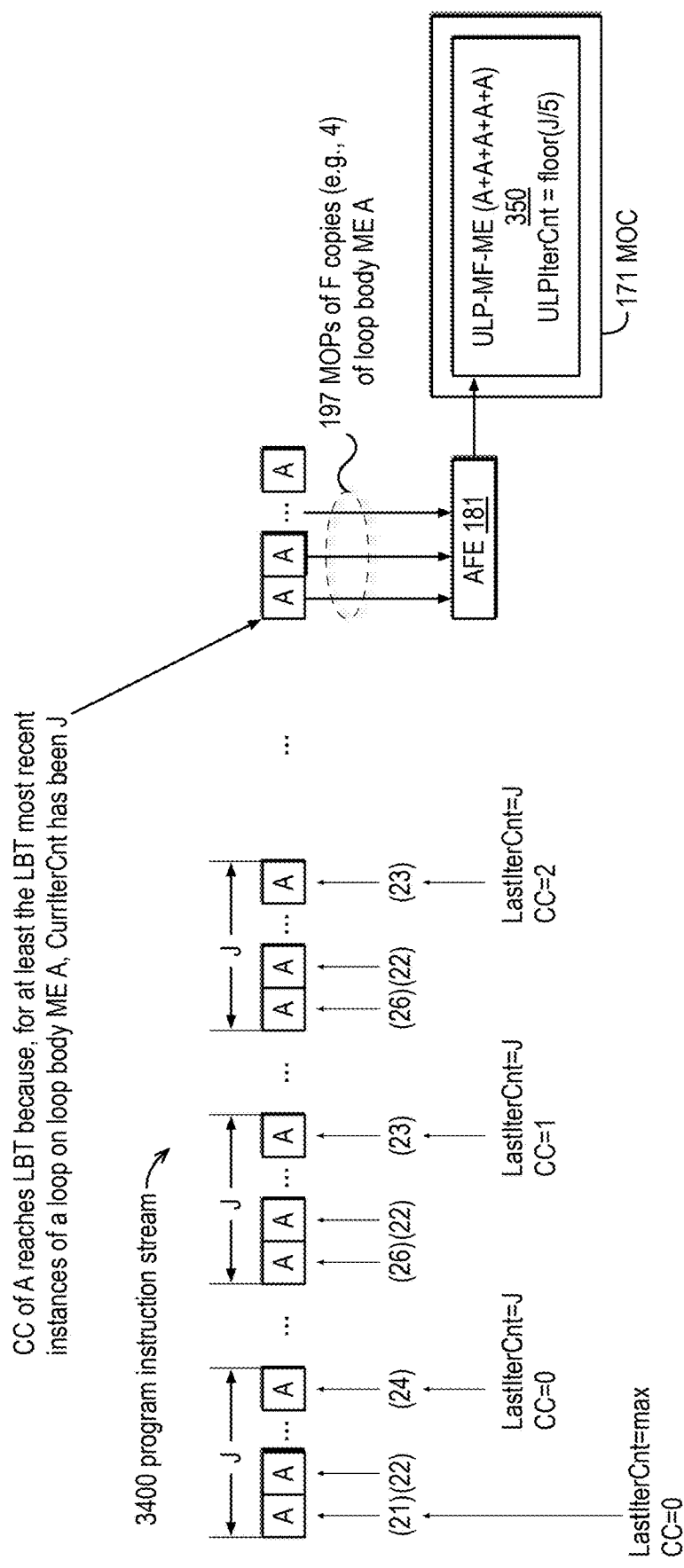
FIG. 34 is a block diagram illustrating an example of the building of a CLIC ULP-MF-ME in accordance with embodiments of the present disclosure.

FIG. 34 is a block diagram illustrating an example of the building of a CLIC ULP-MF-ME in accordance with embodiments of the present disclosure. FIG. 34 shows MEs of a program instruction stream 3400 in which time progresses from left to right.

Initially, a loop body ME, denoted ME A, successively appears in the program instruction stream J times—i.e., the loop iteration count on loop body ME A is J—during a first instance of a loop on the loop body ME A as follows. An initial appearance of ME A is immediately succeeded in the program instruction stream 3400 by itself but is not immediately preceded by itself (i.e., the program instruction stream is entering a loop on the loop body ME A the first time since ME A was placed in the SEQ Training state), which the PRU 102 detects and in response, sets the LastIterCnt to the maximum value, initializes the CurrIterCnt to one (not shown), resets the CC 2008 to zero, and transitions ME A from the SEQ Training state to the ULP Training state to indicate ME A is a loop body ME, e.g., per arc (21) of FIG. 22, as shown in FIG. 34. In response to a second appearance of loop body ME A in the program instruction stream in the first instance of the loop on the loop body ME A, the PRU 102 detects that ME A is both immediately preceded and succeeded by itself (i.e., the program instruction stream is staying in the loop) and in response increments the CurrIterCnt, e.g., per arc (22) of FIG. 22. This continues until in response to the Jth appearance of the loop body ME A in the first instance of the loop, the PRU 102 detects that ME A is immediately preceded by itself but not succeeded by itself (i.e., the program instruction stream is falling out of the loop) and that the CurrIterCnt (J) is not equal to the LastIterCnt (max), and in response the PRU 102 updates the LastIterCnt to the CurrIterCnt (J) and resets the CC 2008 to zero, e.g., per arc (24) of FIG. 22, as shown in FIG. 34.

Subsequently, loop body ME A successively appears in the program instruction stream J times during a second instance of a loop on the loop body ME A, i.e., the loop iteration count of a second instance of a loop on the loop body ME A is also J. In response to a first appearance of loop body ME A in the second instance of the loop on the loop body ME A, the PRU 102 detects that ME A is immediately succeeded by itself but is not immediately preceded by itself (i.e., the program instruction stream is re-entering the loop) and in response initializes the CurrIterCnt to one, e.g., per arc (26) of FIG. 22. In response to a second appearance of loop body ME A in the second instance of the loop, the PRU 102 detects that ME A is both immediately preceded and succeeded by itself and in response increments the CurrIterCnt, e.g., per arc (22). This continues until in response to a Jth appearance of ME A in the second instance of the loop, the PRU 102 detects that ME A is immediately preceded by itself but not succeeded by itself (i.e., the program instruction stream is falling out of the loop) and that the CurrIterCnt is equal to the LastIterCnt, and in response the PRU 102 increments the CC 2008, e.g., per arc (23) of FIG. 22, as shown in FIG. 34.

Subsequently, loop body ME A appears in the program instruction stream J times during more instances of a loop on the loop body ME A having a loop iteration count of J such that the PRU 102 continues to increment the CC 2008 of loop body ME A in the manner described above with respect to the second instance of the loop until eventually—because there are no intervening instances of the loop on the loop body ME A that have a loop iteration count different than J—the CC 2008 reaches the LBT 1926. In response, the PRU 102 selects a value of F=5 in the example, calculates ULPIterCnt=floor (J/5) in the example, pushes a first MBRFE 2100 for ME A into the MBRF 179, e.g., per block 3302 of FIG. 33, pushes three (e.g., F−2, or 5−2=3) middle MBRFEs 2100 for ME A into the MBRF 179, e.g., per block 3304 of FIG. 33, and pushes a final MBRFE 2100 for ME A into the MBRF 179, e.g., per block 3306 of FIG. 33. The AFE 181, in cooperation with the MOC 171 and PRU 102, subsequently builds a ULP-MF-ME using the MOPs 197 of the F=5 copies of ME A, e.g., per block 3308 and block 3312 of FIG. 33, which is installed in the MOC 171 and denoted ULP-MF-ME (A+A+A+A+A) in FIG. 34.

FIG. 35A is a block diagram illustrating an example of same-FBSA co-residency in the MTR 173 of FIG. 1 of a ULP-MF-ME and a loop body SF-ME (LB-SF-ME) used to build the ULP-MF-ME in accordance with embodiments of the present disclosure. As in FIG. 28A, in the example of FIG. 35A, the MTR 173 is shown with eight ways, denoted way 0 through way 7, and set index 3 includes the ULP-MF-ME and LB-SF-ME that are same-FBSA co-resident, and each has an MTR tag 332 value of 493. In the example, set index 3 has the ULP-MF-ME resident in way 0 and further has the LB-SF-ME (used to build the ULP-MF-ME resident in way 0) resident in way 2. Such a co-residency may be present in the MOC 171 as described with respect to block 3312 of FIG. 33, for example.

FIG. 35B is a block diagram illustrating an example of same-FBSA co-residency in the MTR 173 of FIG. 1 of a ULP-MF-ME, a loop body MF-ME (LB-MF-ME) used to build the ULP-MF-ME, and a first constituent SF-ME used to build the LB-MF-ME (which is a SEQ-MF-ME) in accordance with embodiments of the present disclosure. FIG. 35B is similar to FIG. 35A in many respects. However, in the example of FIG. 35B, in addition to the ULP-MF-ME in set 3, co-resident in way 2 of set 3 is the LB-MF-ME having the same-FBSA as the ULP-MF-ME resident in way 0, and co-resident in way 7 of set 3 is the first constituent SF-ME having the same-FBSA as the ULP-MF-ME resident in way 0 and the LB-MF-ME resident in way 2, each having a MTR tag 332 value of 493. Such a co-residency may be present in the MOC 171 as described with respect to the alternate embodiment of block 3312 of FIG. 33, for example.

ULP-MF-ME Building—Inconsistent Loop Iteration Count embodiments (MLIC and HLIC)

Embodiments have been described in which the processor 100 detects a loop body ME having a consistent loop iteration count and builds an unrolled loop MF-ME (ULP-MF-ME) using the MOPs of F copies of the loop body ME. Alternate embodiments will now be described in which the processor 100 detects a loop body ME that may have an inconsistent loop iteration count (ILIC) and nevertheless builds a ULP-MF-ME. Although the loop iteration count may be inconsistent, a value of ULPIterCnt 2016 is nevertheless determined for the ULP-MF-ME, e.g., based on the selected loop unroll factor (F) used to build the ULP-MF-ME and/or a selected loop iteration count. The MLIC and HLIC embodiments are examples of ILIC embodiments.

In the MLIC embodiment, the loop iteration count is selected as a consistent minimum loop iteration count. More specifically, the PRU 102 increments the CC 2008 of the loop body ME if the loop iteration count of the current loop instance is greater than or equal to the smallest previously observed loop iteration count (MinIterCnt 2014 of the training fields 331 of FIG. 20), and otherwise the PRU 102 resets the CC 2008 to zero and updates MinIterCnt to the current loop iteration count. Once the CC 2008 reaches a threshold (e.g., LBT 1926), a confidence is reached that the loop body ME is unlikely to experience a smaller loop iteration count, and the MinIterCnt is settled upon. Thus, even though the loop iteration count is inconsistent in the sense that it may not have been the same for the last number of instances of the loop equal to the threshold, there is still a consistency associated with a ULP-MF-ME, e.g., the loop body ME has exhibited a loop iteration count at or above the MinIterCnt for the last number of instances of the loop equal to the threshold.

In the HLIC embodiment, the loop iteration count is selected from a histogram of frequencies of a range of loop iteration count values observed for a predetermined number of instances of the loop on the loop body ME in the program instruction stream. More specifically, the PRU 102 increments the CC 2008 of the loop body ME each time an instance of a loop on the loop body ME appears in the program instruction stream, and the PRU 102 records the loop iteration count of the loop instance in the histogram. Once the CC 2008 reaches the threshold (e.g., LBT 1926), the PRU 102 uses the histogram information to select a loop iteration count, and to select a loop unroll factor (F) and a ULPIterCnt 2016 with which to build the ULP-MF-ME. Thus, even though the loop iteration count is inconsistent in the sense that it has not been the same for the number of instances of the loop equal to the threshold, there may still be a statistical consistency associated with an ULP-MF-ME based on a relatively large number of samples captured in the histogram and which may be determinable through analysis of the histogram. It may be desirable for the value of threshold to be larger for the HLIC2 embodiment than the MLIC embodiment.

Figure 36:
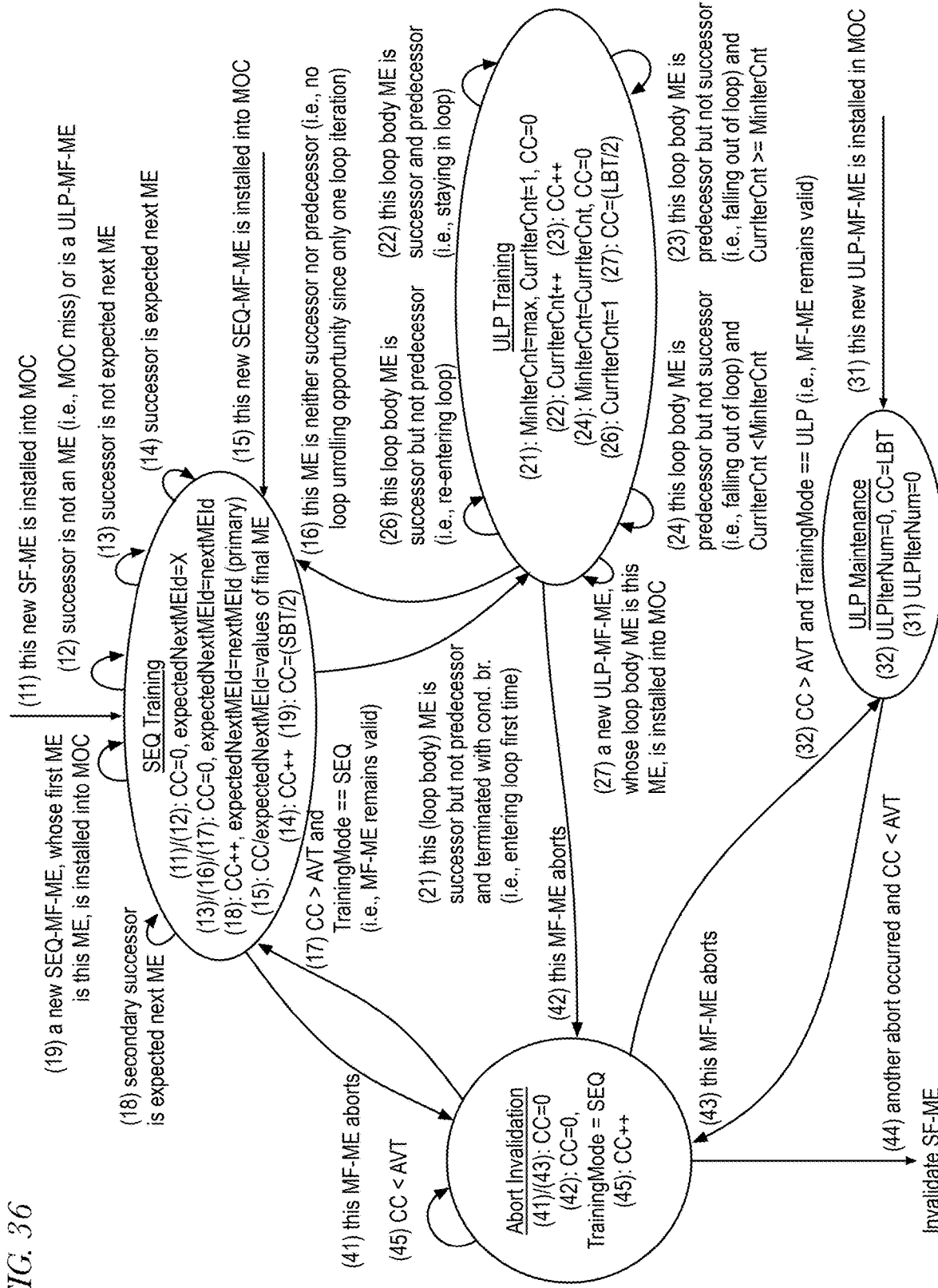
FIG. 36 is state diagram illustrating operation of the PRU of FIG. 1 in accordance with the Minimum Loop Iteration Count (MLIC) embodiment of the present disclosure.

FIG. 36 is a state diagram illustrating operation of the PRU 102 of FIG. 1 in accordance with the MLIC embodiment of the present disclosure. The state diagram of FIG. 36 is similar in many respects to the state diagram of FIG. 22; however, differences between the embodiment of FIG. 36 and FIG. 22 will now be described.

For arc (21), the PRU 102 sets the MinIterCnt 2014 of the current ME to its maximum value (rather than the LastIterCnt 2014 as in FIG. 22), initializes the CurrIterCnt register 1914 to one, and resets the CC 2008 of the current ME to zero, and the ME is transitioned from the SEQ Training state to the ULP Training state.

Arc (23) occurs when the PRU 102 detects a hit on the current ME, the current ME is in the ULP Training state, the current ME is its predecessor but not its successor, and the CurrIterCnt 1914 is greater than or equal to the MinIterCnt 2014 of the current ME (rather than equals the LastIterCnt 2104 as in FIG. 22). For arc (23), since the current iteration count is greater than or equal to the MinIterCnt 2014, the PRU 102 increments the CC 2008 of the current loop body ME, and the current loop body ME remains in the ULP Training state.

Arc (24) occurs when the PRU 102 detects a hit on the current ME, the current ME is in the ULP Training state, the current loop body ME is its predecessor but not its successor, and the CurrIterCnt 1914 is less than the MinIterCnt 2014 of the current loop body ME (rather than equal to the LastIterCnt 2104 as in FIG. 22). For arc (24), since the current iteration count is less than the MinIterCnt 2014, the PRU 102 resets the CC 2008 of the current loop body ME to zero and updates the MinIterCnt 2014 to the CurrIterCnt 1914 (rather than the LastIterCnt 2014 as in FIG. 22), and the current loop body ME remains in the ULP Training state.

Figure 37:
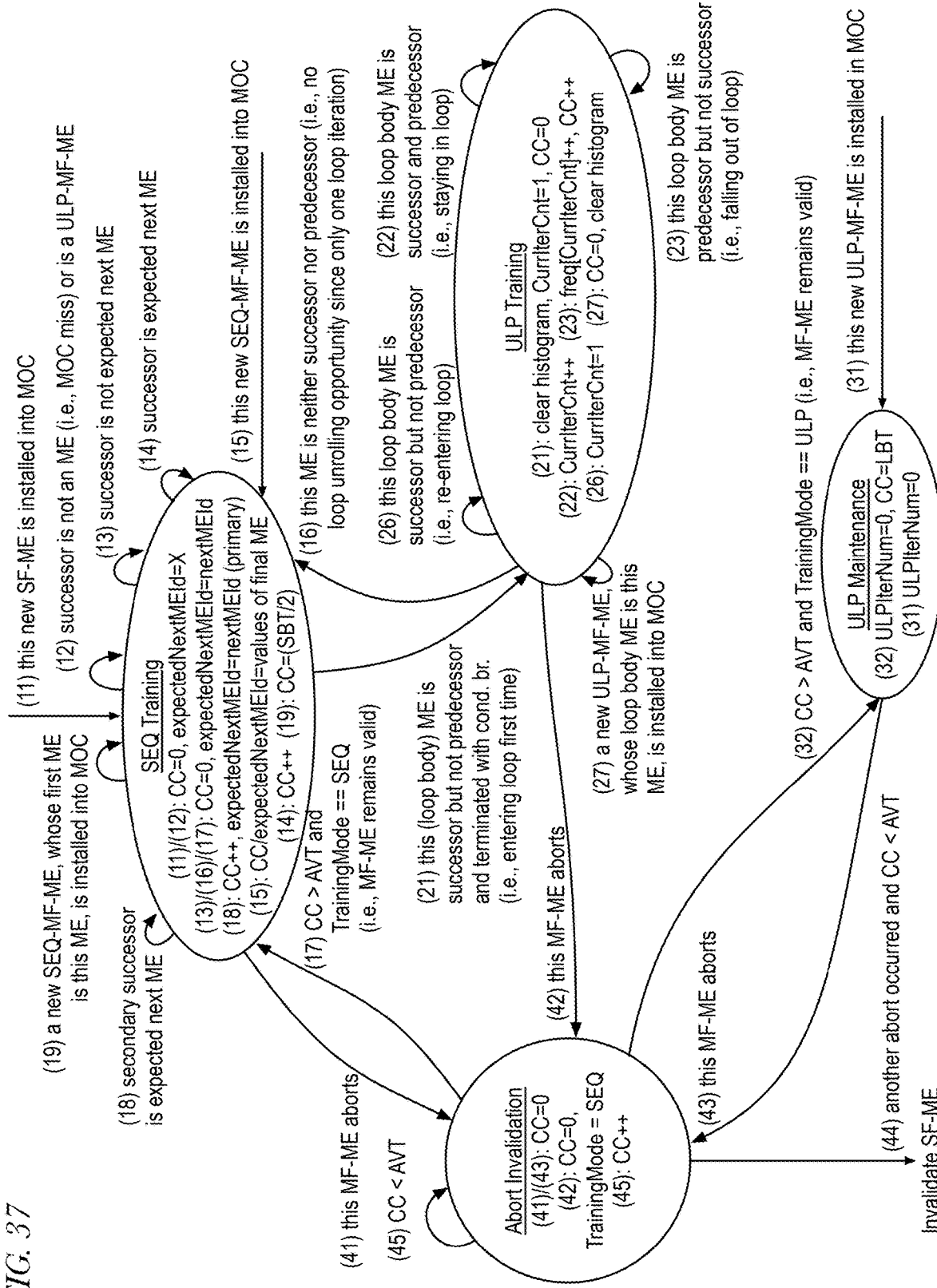
FIG. 37 is a state diagram illustrating operation of the PRU of FIG. 1 in accordance with the Histogram Loop Iteration Count (HLIC) embodiment of the present disclosure.

FIG. 37 is a state diagram illustrating operation of the PRU 102 of FIG. 1 in accordance with the HLIC embodiment of the present disclosure. The state diagram of FIG. 37 is similar in many respects to the state diagram of FIG. 22; however, differences between the embodiment of FIG. 37 and FIG. 22 will now be described.

For arc (21), the PRU 102 initializes the CurrIterCnt register 1914 to one and resets the CC 2008 of the current ME to zero, and the ME is transitioned from the SEQ Training state to the ULP Training state (and the LastIterCnt 2014 is not updated as in FIG. 22).

Arc (23) occurs when the PRU 102 detects a hit on the current ME, the current ME is in the ULP Training state, and the current ME is its predecessor but not its successor (the CurrIterCnt 1914 is not considered in the conditions as it is in FIG. 22). For arc (23), the PRU 102 increments frequency bin freq[J] of the histogram 2022 of the current loop body ME, where J corresponds to the value of the CurrIterCnt 1914 (i.e., the value of the loop iteration count of the current instance of the loop on the loop body ME), increments the CC 2008 of the current loop body ME, and the current loop body ME remains in the ULP Training state. In an embodiment, J is normalized such that index zero corresponds to the smallest CurrIterCnt 1914. As may be observed from FIG. 37, for the HLIC embodiment, the CC 2008 is incremented upon each instance of the loop, regardless of the loop iteration count of the current instance of the loop. In an embodiment, the range of possible CurrIterCnt values is limited by the number of frequency bins of the histogram, denoted B here. In an embodiment, the PRU 102 assigns the loop iteration count of the first instance of the loop (e.g., upon entering the loop the first time via arc (21)) to the middle frequency bin (i.e., freq[B/2]), and the histogram saturates at both ends, e.g., if CurrIterCnt is larger than the largest loop iteration count in the range (e.g., the loop iteration count corresponding to frequency bin freq[B−1]), the PRU 102 increments freq[B−1], and if CurrIterCnt is smaller than the smallest loop iteration count in the range (e.g., the loop iteration count corresponding to frequency bin freq[0]), the PRU 102 increments freq[0].

Arc (24) and its corresponding actions are removed.

For arc (27) the action is changed to reset the CC 2008 to zero, and the histogram is cleared, i.e., the frequencies are all reset to zero, to prevent the creation of a new ULP-MF-ME based on a previous histogram that is potentially contain stale data.

FIG. 38 is a flowchart illustrating operation of the PRU 102 to build a ULP-MF-ME based on an observed inconsistent loop iteration count in accordance with embodiments of the present disclosure. Operation begins at block 3802.

At block 3802, the PRU 102 continuously predicts a sequence of FBSAs that specify a corresponding sequence of FBlks in the program instruction stream and updates the training fields 331 of the MEs 350 as it predicts them as described with respect to block 2402 of FIG. 24. Operation proceeds to block 3804.

At block 3804, the PRU 102 detects that the training fields 331 of the current ME indicate that it is a loop body ME (e.g., that is in the ULP Training state) and that its CC 2008 has reached a threshold (e.g., LBT 1926). The threshold may be software configurable and/or dynamically variable by hardware of the microprocessor 100. According to the MLIC embodiment, the CC 2008 may be incremented when the current instance of a loop on the loop body ME has a loop iteration count (e.g., CurrIterCnt 1914) greater than or equal to the minimum loop iteration count (e.g., MinIterCnt 2014) of the current ME, as described with respect to arc (23) of FIG. 36, and the CC 2008 may be reset and the MinIterCnt 2014 updated with the CurrIterCnt 1914 if CurrIterCnt 1914 is less than MinIterCnt 2014, as described with respect to arc (24) of FIG. 36. According to the HLIC embodiment, the CC 2008 may be incremented for the current instance of the loop on the loop body ME regardless of the CurrIterCnt 1914, and the frequency of the histogram 2022 corresponding to the CurrIterCnt 1914 may be incremented, as described with respect to arc (23) of FIG. 37. Operation proceeds to block 3806.

At block 3806, the PRU 102 instructs the AFE 181 to use F copies of the MOPs of the loop body ME to build a ULP-MF-ME in the MOC 171. More specifically, the PRU 102 pushes into the MBRF 179 a MBRFE 2100 corresponding to each of the F loop body MEs, e.g., as described in the embodiment of FIG. 39 or FIG. 40. The loop body ME may be an SF-ME or a SEQ-MF-ME. However, in an embodiment, the loop body ME may not be a ULP-MF-ME. F is the loop unroll factor that the PRU 102 choses based on the inconsistent loop iteration count, e.g., the MinIterCnt 2014 as described with respect to block 3902 of FIG. 39 or the HistIterCnt 2014 as described with respect to block 4002 of FIG. 40. Operation proceeds to block 3808.

Figure 39:
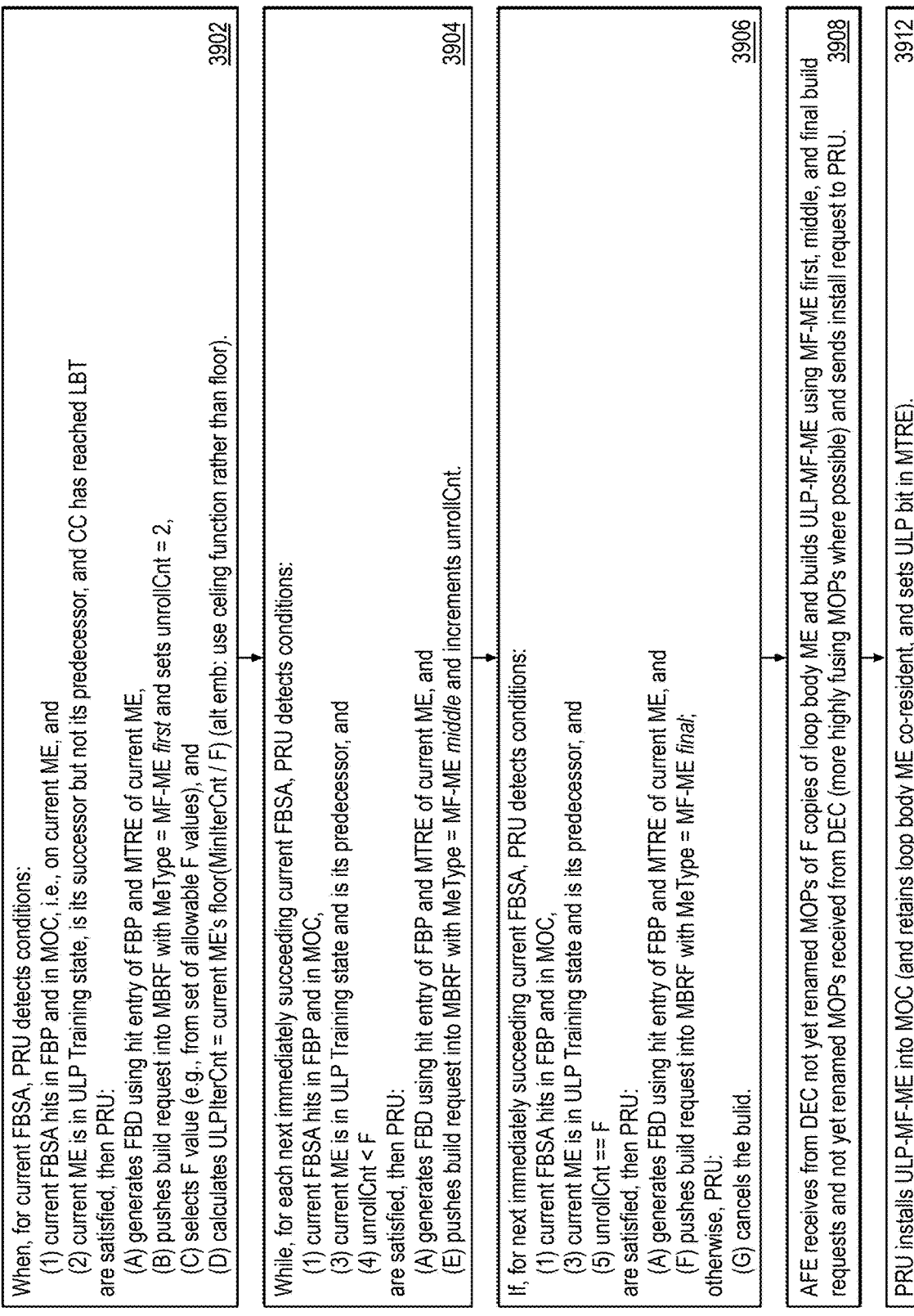
FIG. 39 is a flowchart illustrating operation of the processor of FIG. 1 to build a MLIC embodiment ULP-MF-ME in accordance with embodiments of the present disclosure.
Figure 40:
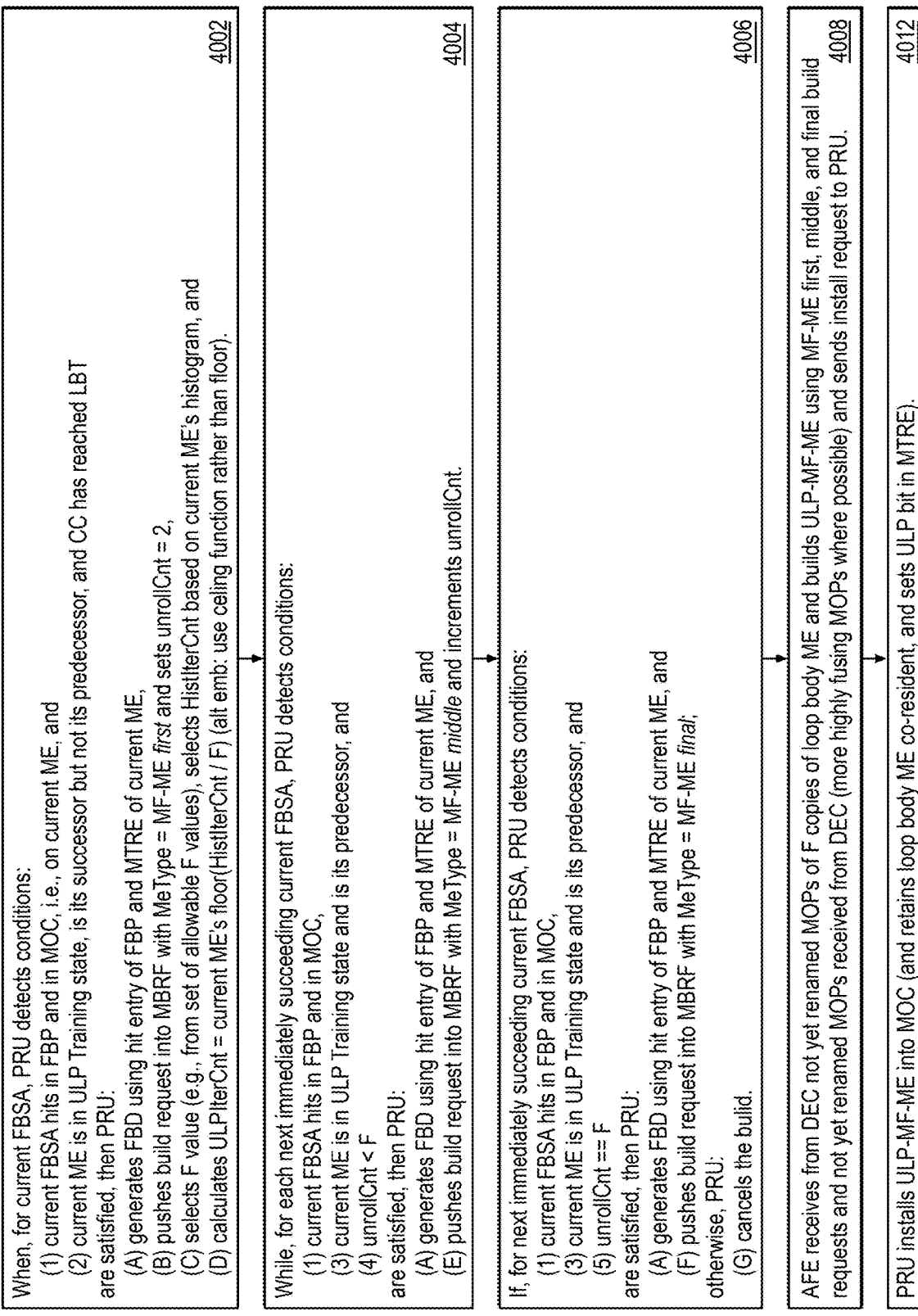
FIG. 40 is a flowchart illustrating operation of the processor of FIG. 1 to build an HLIC embodiment ULP-MF-ME in accordance with embodiments of the present disclosure.

At block 3808, the AFE 181 cooperates with the PRU 102 and MOC 171 to build the ULP-MF-ME, e.g., per block 3908 and block 3912 of FIG. 39 or per block 4008 and block 4012 of FIG. 40. In the case of some MEs, the AFE 181 is able to fuse the MOPs of the F copies of the loop body ME such that the number of MOPs of the resultant ULP-MF-ME is fewer than the total number of MOPs of the F copies of the loop body ME that were input to the AFE 181, i.e., that the AFE 181 used to build the new ULP-MF-ME. Operation proceeds to block 3812.

At block 3812, the loop body ME used to build the new ULP-MF-ME remains co-resident in the MOC 171 with the new ULP-MF-ME regardless of whether the loop body ME is an SF-ME or an MF-ME. The loop body ME and the new ULP-MF-ME have the same FBSA. Therefore, once the new ULP-MF-ME is installed in the MOC 171, the FBSA will hit in the MOC 171 on both the loop body ME and the new ULP-MF-ME (and also on the SF-ME, if still resident in the MOC 171, that was used to build the loop body ME if the loop body ME is an SEQ-MF-ME), in which case the PRU 102 will initially give priority to the ULP-MF-ME and will subsequently give priority to the loop body ME to optimize tail iteration processing once all the iterations of the ULP-MF-ME have been processed, as described with respect to FIG. 45. In an embodiment, the PRU 102 replaces the loop body MF-ME with the new ULP-MF-ME, in which case the PRU 102 will process the tail iterations using the constituent MEs that were used to build the loop body ME that are still resident in the MOC 171 and using FBlks for constituent MEs that are missing in the MOC 171, as described with respect to FIG. 45. Retaining the loop body MF-ME co-resident with the ULP-MF-ME may improve performance in exchange for increased complexity of the PRU 102.

FIG. 39 is a flowchart illustrating operation of the processor 100 of FIG. 1 to build a MLIC embodiment ULP-MF-ME in accordance with embodiments of the present disclosure. The operation of FIG. 39 is similar in many respects to the operation of FIG. 33, hence for brevity the description of similar blocks will not be repeated here; however, differences will now be described.

At block 3902, with respect to action (C), the value of MinIterCnt of the current ME (i.e., the loop body ME) is used, rather than the value of LastIterCnt as in the embodiment of FIG. 33, to select F. With respect to action (D), the PRU 102 calculates the quotient of the MinIterCnt 2014 (instead of the LastIterCnt 2014) and the selected value of F and populates the ULPIterCnt register 2016 with a floor function of the quotient. In an alternate embodiment, a ceiling function may be applied to the quotient (rather than the floor function), effectively rounding up, in order to generate a more aggressive value of ULPIterCnt 2016 as described with respect to FIG. 20.

At block 3912, as described with respect to block 3812 of FIG. 38, the PRU 102 retains the loop body ME co-resident in the MOC 171 with the ULP-MF-ME. Additionally, the PRU 102 sets to true the ULP indicator 2018 of the newly built ULP-MF-ME.

FIG. 40 is a flowchart illustrating operation of the processor 100 of FIG. 1 to build an HLIC embodiment ULP-MF-ME in accordance with embodiments of the present disclosure. The operation of FIG. 40 is similar in many respects to the operation of FIG. 39; however, differences will now be described.

At block 4002, with respect to action (C), the PRU 102 selects the value of HistIterCnt 2014 based on the histogram 2022 of the current ME (i.e., the loop body ME). Furthermore, the value of HistIterCnt is used, rather than the value of MinIterCnt as in the embodiment of FIG. 40, to select F. Furthermore, the value of F may also be selected based on analysis of the histogram 2022. For example, if the combined frequencies of loop iteration counts that are an integer multiple of a particular value of F (e.g., 5) is significantly higher than the combined frequencies of loop iteration counts that are an integer multiple of the other values of F, then the particular value of F may be selected.

With respect to action (D), the PRU 102 calculates the quotient of the HistIterCnt 2014 (instead of the MinIterCnt 2014) and the selected value of F and populates the ULPIterCnt register 2016 with a floor/ceiling function of the quotient.

FIG. 41 is a block diagram illustrating an example of the building of a MLIC ULP-MF-ME in accordance with embodiments of the present disclosure. FIG. 41 shows MEs of a program instruction stream 4100 in which time progresses from left to right.

Initially, a loop body ME, denoted ME A, successively appears in the program instruction stream 89 times—i.e., the loop iteration count on loop body ME A is 89—during a first instance of a loop on the loop body ME A as follows. An initial appearance of an ME A is immediately succeeded in the program instruction stream 4100 by itself but is not immediately preceded by itself (i.e., the program instruction stream is entering a loop on the loop body ME A the first time since ME A was placed in the SEQ Training state), which the PRU 102 detects and in response, sets the MinIterCnt to the maximum value, initializes the CurrIterCnt to one, resets the CC 2008 to zero, and transitions ME A from the SEQ Training state to the ULP Training state to indicate ME A is a loop body ME, e.g., per arc (21) of FIG. 36, as shown in FIG. 41. In response to a second appearance (not shown) of loop body ME A in the program instruction stream in the first instance of the loop on the loop body ME A, the PRU 102 detects that ME A is both immediately preceded and succeeded by itself (i.e., the program instruction stream is staying in the loop) and in response increments the CurrIterCnt (not shown), e.g., per arc (22) of FIG. 36. This continues until in response to the 89th appearance of the loop body ME A in the first instance of the loop, the PRU 102 detects that ME A is immediately preceded by itself but not succeeded by itself (i.e., the program instruction stream is falling out of the loop) and that the CurrIterCnt (89) is not equal to the MinIterCnt (max), and in response the PRU 102 updates the MinIterCnt to the CurrIterCnt (89) and resets the CC 2008 to zero, e.g., per arc (24) of FIG. 36, as shown in FIG. 41.

Subsequently, loop body ME A successively appears in the program instruction stream 91 times during a second instance of a loop on the loop body ME A, i.e., the loop iteration count of a second instance of a loop on the loop body ME A is 91. In response to a first appearance of loop body ME A in the second instance of the loop on the loop body ME A, the PRU 102 detects that ME A is immediately succeeded by itself but is not immediately preceded by itself (i.e., the program instruction stream is re-entering the loop) and in response initializes the CurrIterCnt to one (not shown), e.g., per arc (26) of FIG. 36. In response to a second appearance (not shown) of loop body ME A in the second instance of the loop, the PRU 102 detects that ME A is staying in the loop and in response increments the CurrIterCnt, e.g., per arc (22). This continues until in response to a 91st appearance of ME A in the second instance of the loop, the PRU 102 detects that ME A is immediately preceded by itself but not succeeded by itself (i.e., the program instruction stream is falling out of the loop) and that the CurrIterCnt (91) is greater than the MinIterCnt (89), and in response the PRU 102 increments the CC 2008, e.g., per arc (23) of FIG. 36, as shown in FIG. 41.

Subsequently, loop body ME A successively appears in the program instruction stream 88 times during a third instance of a loop on the loop body ME A, i.e., the loop iteration count of a second instance of a loop on the loop body ME A is 88. In response to a first appearance of loop body ME A in the third instance of the loop on the loop body ME A, the PRU 102 detects that the program instruction stream is re-entering the loop and in response initializes the CurrIterCnt to one. In response to a second appearance (not shown) of loop body ME A in the third instance of the loop, the PRU 102 detects that ME A is staying in the loop and in response increments the CurrIterCnt, e.g., per arc (22). This continues until in response to an 88th appearance of ME A in the second instance of the loop, the PRU 102 detects that the program instruction stream is falling out of the loop and that the CurrIterCnt (88) is less than the MinIterCnt (89), and in response the PRU 102 updates the MinIterCnt to the CurrIterCnt (88) and resets the CC 2008 to zero, e.g., per arc (24) of FIG. 36, as shown in FIG. 41.

Subsequently, loop body ME A successively appears in the program instruction stream 91 times during a fourth instance of a loop on the loop body ME A, i.e., the loop iteration count of a second instance of a loop on the loop body ME A is 91. In response to a first appearance of loop body ME A in the fourth instance of the loop on the loop body ME A, the PRU 102 detects that the program instruction stream is re-entering the loop and in response initializes the CurrIterCnt to one (not shown), e.g., per arc (26) of FIG. 36. In response to a second appearance (not shown) of loop body ME A in the second instance of the loop, the PRU 102 detects that ME A is staying in the loop and in response increments the CurrIterCnt, e.g., per arc (22). This continues until in response to a 91st appearance of ME A in the fourth instance of the loop, the PRU 102 detects that the program instruction stream is falling out of the loop and that the CurrIterCnt (91) is greater than the MinIterCnt (88), and in response the PRU 102 increments the CC 2008, e.g., per arc (23) of FIG. 36, as shown in FIG. 41.

Subsequently, loop body ME A successively appears in the program instruction stream 90 times during a fifth instance of a loop on the loop body ME A, i.e., the loop iteration count of a second instance of a loop on the loop body ME A is 90. In response to a first appearance of loop body ME A in the fifth instance of the loop on the loop body ME A, the PRU 102 detects that the program instruction stream is re-entering the loop and in response initializes the CurrIterCnt to one (not shown), e.g., per arc (26) of FIG. 36. In response to a second appearance (not shown) of loop body ME A in the second instance of the loop, the PRU 102 detects that ME A is staying in the loop and in response increments the CurrIterCnt, e.g., per arc (22). This continues until in response to a 90th appearance of ME A in the fifth instance of the loop, the PRU 102 detects that the program instruction stream is falling out of the loop and that the CurrIterCnt (90) is greater than the MinIterCnt (88), and in response the PRU 102 increments the CC 2008, e.g., per arc (23) of FIG. 36, as shown in FIG. 41.

Subsequently, loop body ME A appears in the program instruction stream during more instances of a loop on the loop body ME A having various loop iteration counts, none of which in the example have a loop iteration count that is less than 88 such that the PRU 102 continues to increment the CC 2008 of loop body ME A in the manner described above with respect to the fourth and fifth instances of the loop until eventually—because there are no intervening instances of the loop on the loop body ME A that have a loop iteration count less than 88—the CC 2008 reaches the LBT 1926. In response, the PRU 102 selects a value of F=4 in the example, calculates ULPIterCnt=22 (e.g., the floor of the quotient of 88 and 4) in the example, pushes a first MBRFE 2100 for ME A into the MBRF 179, e.g., per block 3902 of FIG. 39, pushes two (e.g., F−2, or 4−2=2) middle MBRFEs 2100 for ME A into the MBRF 179, e.g., per block 3904 of FIG. 39, and pushes a final MBRFE 2100 for ME A into the MBRF 179, e.g., per block 3906 of FIG. 39. The AFE 181, in cooperation with the MOC 171 and PRU 102, subsequently builds a ULP-MF-ME using the MOPs 197 of the F=4 copies of ME A, e.g., per block 3908 and block 3912 of FIG. 39, which is installed in the MOC 171 and denoted ULP-MF-ME (A+A+A+A) in FIG. 41.

Figure 42:
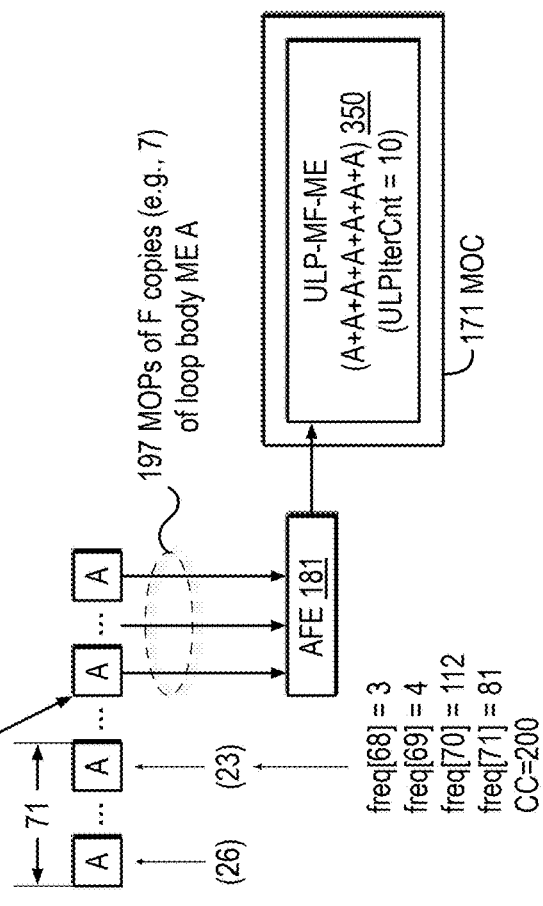
FIG. 42 is a block diagram illustrating an example of the building of a HLIC ULP-MF-ME in accordance with embodiments of the present disclosure.

FIG. 42 is a block diagram illustrating an example of the building of a HLIC ULP-MF-ME in accordance with embodiments of the present disclosure. FIG. 42 shows MEs of a program instruction stream 4200 in which time progresses from left to right.

Initially, a loop body ME, denoted ME A, successively appears in the program instruction stream 69 times—i.e., the loop iteration count on loop body ME A is 69—during a first instance of a loop on the loop body ME A as follows. An initial appearance of an ME A is immediately succeeded in the program instruction stream 4200 by itself but is not immediately preceded by itself (i.e., the program instruction stream is entering a loop on the loop body ME A the first time since ME A was placed in the SEQ Training state), which the PRU 102 detects and in response, clears the histogram (e.g., sets all the frequency bins to zero), initializes the CurrIterCnt to one (not shown), resets the CC 2008 to zero, and transitions ME A from the SEQ Training state to the ULP Training state to indicate ME A is a loop body ME, e.g., per arc (21) of FIG. 37, as shown in FIG. 42. In response to a second appearance (not shown) of loop body ME A in the program instruction stream in the first instance of the loop on the loop body ME A, the PRU 102 detects that ME A is both immediately preceded and succeeded by itself (i.e., the program instruction stream is staying in the loop) and in response increments the CurrIterCnt, e.g., per arc (22) of FIG. 37. This continues until in response to the 69th appearance of the loop body ME A in the first instance of the loop, the PRU 102 detects that ME A is immediately preceded by itself but not succeeded by itself (i.e., the program instruction stream is falling out of the loop) and in response increments the frequency bin associated with the CurrIterCnt (69) and increments the CC 2008, e.g., per arc (23) of FIG. 37, as shown in FIG. 42.

Subsequently, loop body ME A successively appears in the program instruction stream 71 times during a second instance of a loop on the loop body ME A, i.e., the loop iteration count of a second instance of a loop on the loop body ME A is 71. In response to a first appearance of loop body ME A in the second instance of the loop on the loop body ME A, the PRU 102 detects that ME A is immediately succeeded by itself but is not immediately preceded by itself (i.e., the program instruction stream is re-entering the loop) and in response initializes the CurrIterCnt to one (not shown), e.g., per arc (26) of FIG. 37. In response to a second appearance (not shown) of loop body ME A in the second instance of the loop, the PRU 102 detects that ME A is staying in the loop and in response increments the CurrIterCnt, e.g., per arc (22). This continues until in response to a 71st appearance of ME A in the second instance of the loop, the PRU 102 detects that ME A is immediately preceded by itself but not succeeded by itself (i.e., the program instruction stream is falling out of the loop) and in response increments the frequency bin associated with the CurrIterCnt (71) and increments the CC 2008, e.g., per arc (23) of FIG. 37, as shown in FIG. 42.

Subsequently, loop body ME A appears in the program instruction stream during more instances of a loop on the loop body ME A having various loop iteration counts, and the PRU 102 continues to increment the CC 2008 of loop body ME A per arc (23) of FIG. 37 for each instance of the loop on the loop body ME A until eventually the CC 2008 reaches the LBT 1926. In the example of FIG. 42, shown are a third instance of the loop has a loop iteration count of 68 such that the PRU 102 increments the frequency bin associated with the CurrIterCnt (68) and the CC 2008 is incremented to 3, a fourth instance of the loop has a loop iteration count of 70 such that the PRU 102 increments the frequency bin associated with the CurrIterCnt (70) and the CC 2008 is incremented to 4, and this continues until a 200th instance (in the example, LBT=200) of the loop has a loop iteration count of 71 such that the PRU 102 increments the frequency bin associated with the CurrIterCnt (71) and the CC 2008 is incremented to 200. As shown in the example of FIG. 42, there are B=4 frequency bins which have been populated by the 200th instance of the loop on the loop body ME A as follows: freq[68]=3, freq[69]=4, freq[70]=112, freq[71]=81. In response to the CC 2008 reaching the LBT 1926, the PRU 102 selects a value of HistIterCnt=70 in the example, selects a value of F=7 in the example, calculates ULPIterCnt=10 (e.g., the floor of the quotient of 70 and 7) in the example, pushes a first MBRFE 2100 for ME A into the MBRF 179, e.g., per block 4002 of FIG. 40, pushes five (e.g., F−2, or 7−2=5) middle MBRFEs 2100 for ME A into the MBRF 179, e.g., per block 4004 of FIG. 40, and pushes a final MBRFE 2100 for ME A into the MBRF 179, e.g., per block 4006 of FIG. 40. The AFE 181, in cooperation with the MOC 171 and PRU 102, subsequently builds a ULP-MF-ME using the MOPs 197 of the F=7 copies of ME A, e.g., per block 4008 and block 4012 of FIG. 40, which is installed in the MOC 171 and denoted ULP-MF-ME (A+A+A+A+A+A+A) in FIG. 42.

FIG. 43 is a flowchart illustrating operation of the PRU 102 in the case of a hit in the MOC 171 of FIG. 1 on a ULP-MF-ME in accordance with embodiments of the present disclosure. Operation begins at block 4302.

At block 4302, the PRU 102 detects a hit of the current FBSA in the FBP 152 and in the MOC 171 on a ULP-MF-ME. The PRU 102 may detect a multiple-hit of the current FBSA, e.g., if the LB-SF-ME is still co-resident as in the example of FIG. 35A. Operation proceeds to block 4304.

At block 4304, the PRU 102 generates an FBD 191 and sends the FBD 191 for the first iteration of the ULP-MF-ME. The PRU 102 builds the FBD 191 using the hit entry 200 of the FBP 152 and the hit MTR entry 330 of the ULP-MF-ME. In response to the FBD 191, the IFU 106 will fetch the ULP-MF-ME from the MOC 171 and provide the associated MOPs to the DEC 112 which will rename the MOPs and dispatch them to the back-end 130 for execution. It should be understood that an iteration of the ULP-MF-ME is different from an iteration of the loop body itself because the ULP-MF-ME corresponds to multiple iterations of the loop body—more specifically, an iteration of the ULP-MF-ME corresponds to F iterations of the loop body. That is, the ULP-MF-ME was built using the MOPs of F copies of the loop body ME such that a single execution of the MOPs of the ULP-MF-ME is effectively equivalent to F executions of the MOPs of the loop body ME that was used to build the ULP-MF-ME. The PRU 102 also initializes the ULPIterNum 1916 to a value of one to indicate the current number of iterations of the ULP-MF-ME is one. Operation proceeds to block 4308.

At decision block 4308, if the value of ULPIterNum 1916 equals the value of ULPIterCnt 2016 of the ULP-MF-ME, processing of the ULP-MF-ME is complete; otherwise, operation proceeds to block 4312.

At block 4312, the PRU 102 generates an FBD 191 for the next iteration of the ULP-MF-ME and sends the FBD 191 to the IFU similar to the manner described with respect to block 4304. The PRU 102 also increments the ULPIterNum 1916. Operation returns to decision block 4308.

When processing a FBlk (or an SF-ME), the PRU 102 generates a single FBD for a single FBlk (or a single SF-ME) such that there is a one-to-one correspondence between generation of FBDs and FBlks/SF-MEs. However, as may be observed from FIG. 43, when processing a ULP-MF-ME there is not a one-to-one correspondence between the number of FBlks associated with the ULP-MF-ME and the number of FBDs generated by the PRU 102. In the embodiment of FIG. 43, the number of FBlks associated with the ULP-MF-ME is its numFBlks 335 and the number of FBDs generated by the PRU 102 is its ULPIterCnt 2016 (one for each of the ULPIterCnt iterations of the ULP-MF-ME), and the two numbers may be different. Each of the ULPIterCnt FBDs 191 instructs the IFU 106 to fetch the ULP-MF-ME from the MDR 175 and send its MOPs to the DEC 112, which will rename the MOPs of the ULP-MF-ME and dispatch them to the scheduler 121 for issuance and execution, e.g., as described with respect to FIG. 1 through FIG. 17.

In an embodiment, even though the PRU 102 only generates ULPIterCnt FBDs when processing the ULP-MF-ME, beginning with the FBlk specified by the FBSA of the ULP-MF-ME (the current FBSA), for each FBlk (the current FBlk) of a number of successive FBlks denoted here as K, the PRU 102 performs a set of actions to predict the next FBSA produced by the current FBlk and updates the current FBSA to be the next FBSA. The set of actions performed for each of the K FBlks is essentially described after the description of block 2512 of FIG. 25. In one embodiment, K is the product of the ULPIterCnt 2016 and the numFBlks 335 of the ULP-MF-ME, and the next FBSA produced by the last of the K FBlks (i.e., the Kth FBlk) is the next FBSA produced by the ULP-MF-ME itself, which is used by the PRU 102 to continue predicting the sequence of FBlks of the program instruction stream after the ULP-MF-ME. Stated alternatively, for each ULP-MF-ME iteration of the ULPIterCnt iterations, the PRU 102 performs the set of actions numFBlks times (similar to the manner described above after the description of block 2512 of FIG. 25), and as a result the PRU 102 generates a sequence of K next FBSAs, and the next FBSA that is produced by the last (Kth) FBlk becomes the next FBSA produced by the ULP-MF-ME itself.

For example, assume the numFBlks of a ULP-MF-ME is seven, and assume ULPIterCnt is nine. Then the PRU 102 will generate nine FBDs 191 for the hit ULP-MF-ME, but will perform the set of actions 63 times (i.e., seven times for each of the nine iterations of the ULP-MF-ME) to generate a sequence of 63 next FBSAs, and the last of the 63 next FBSAs will be the next FBSA produced by the ULP-MF-ME and become the current FBSA for the PRU 102 to continue processing the next FBlk or ME after the ULPIterCnt iterations of the ULP-MF-ME have been processed. Additionally, the termination type of the last (Kth) FBlk (e.g., termination type 214 of FIG. 2 output as termination type 434 by the FBP 152 of FIG. 4A) becomes the termination type of the ULP-MF-ME. In an embodiment, as the PRU 102 performs the set of actions for each of the K FBlks, it may save power by only looking up the current FBSA in the MTR 173 for the first FBlk (i.e., the original hit in the MTR 173 on the ULP-MF-ME) but not looking up the remaining K minus one current FBSAs in the MTR 173. In the example, power associated with 62 MTR 173 lookups may be saved.

In an alternate embodiment, an optimization is performed in which K is the numFBlks of the ULP-MF-ME. In such an embodiment, the PRU 102 may capture the next FBSA produced at the end of performing the set of actions K times and use the captured next FBSA as the next FBSA of the ULP-MF-ME. Furthermore, the PRU 102 may accumulate the produced branch history state as the set of actions are performed K times during the first iteration of the ULP-MF-ME, and then the PRU 102 may apply the accumulated branch history state ULPIterCnt minus one times over the next ULPIterCnt minus one clock cycles. Such an embodiment may enjoy the benefit of being able to provide to the IFU 106 the ULPIterCnt minus one FBDs subsequent to the first FBD in immediately succeeding clock cycles rather than having to wait numFBlks clock cycles to send each of the subsequent ULPIterCnt minus one FBDs. Such an embodiment may also enjoy the benefit of additional power savings by avoiding a number of lookups in the FBP 152 and BPs 154 that approximates the product of the numFBlks of the ULP-MF-ME and one less than its ULPIterCnt. Other optimizing embodiments are further contemplated. For example, in another embodiment K is the numFBlksLoopBody 2019 of the ULP-MF-ME. In such an embodiment, the PRU 102 may accumulate the produced branch history state as the set of actions are performed K times, and then the PRU 102 may apply the accumulated branch history state Q times over the next Q clock cycles, where Q is one less than the product of ULPIterCnt and F (the loop unroll factor used to build the ULP-MF-ME). In the embodiments described in which the PRU 102 performs the set of actions for each of the K FBlks, additional embodiments are contemplated in which the PRU 102 detects a misprediction during processing of an MF-ME (e.g., misprediction of a built-in expectation of the MF-ME) and signals a misprediction abort to the PCL 132, which may reduce the penalty associated with an MF-ME misprediction relative to detection of the misprediction by the back-end 130.

If, during its execution, the current instance of the loop in the program instruction stream associated with the hit on the ULP-MF-ME of FIG. 43 has an actual loop iteration count that is not equal to the loop iteration count predicted by the PRU 102, then the back-end 130 will signal an abort that may transition the ULP-MF-ME to the Abort Invalidation state per arc (43) of FIG. 22 and may be processed according to the embodiment of FIG. 31.

Figure 44:
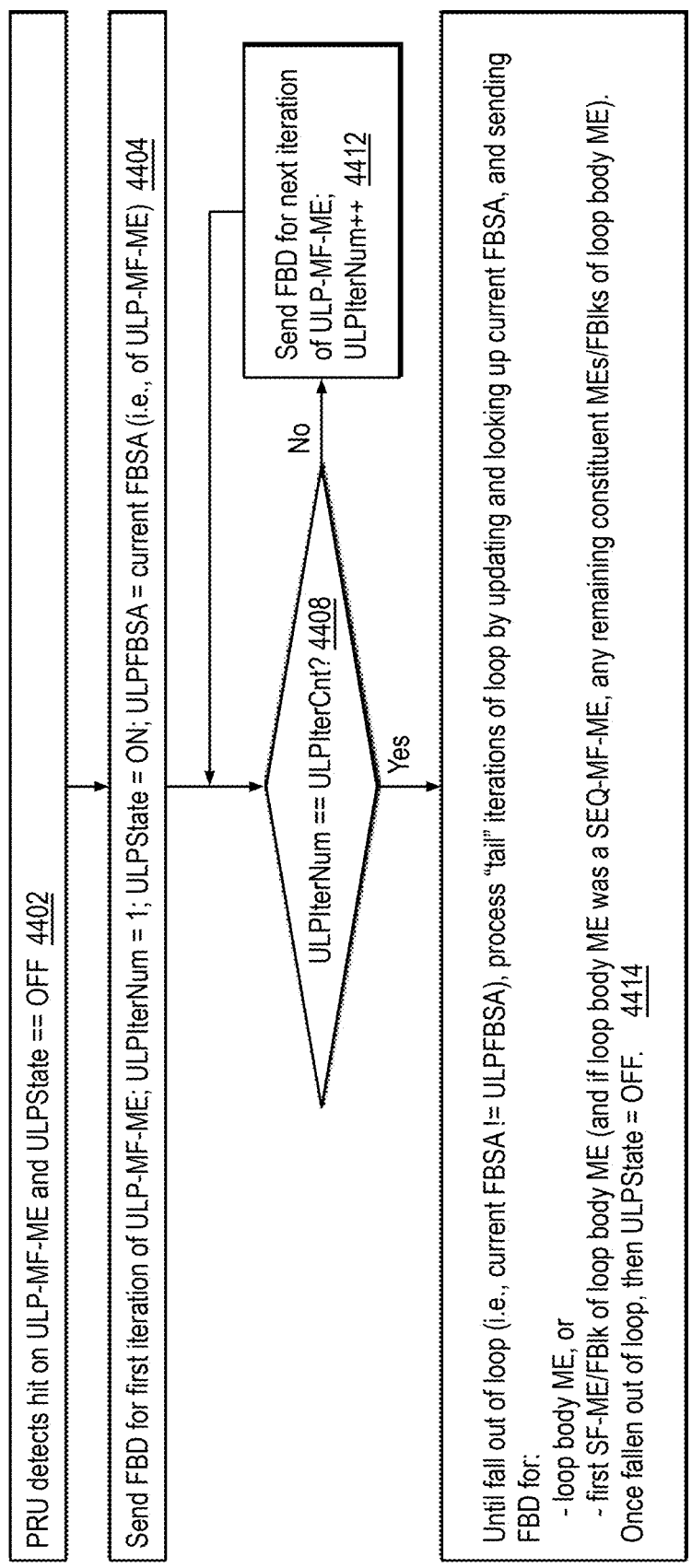
FIG. 44 is a flowchart illustrating operation of the PRU in the case of a hit in the MOC of FIG. 1 on a ULP-MF-ME in accordance with an alternate embodiment of the present disclosure.

FIG. 44 is a flowchart illustrating operation of the PRU 102 in the case of a hit in the MOC 171 of FIG. 1 on a ULP-MF-ME in accordance with an alternate embodiment of the present disclosure. The operation of the alternate embodiment of FIG. 44 is similar in many respects to operation of the embodiment of FIG. 43. However, in the embodiment of FIG. 44 the PRU 102 includes a small state machine that facilitates the processing of "tail iterations" should they occur. Operation begins at block 4402.

At block 4402, the PRU 102 detects a hit of the current FBSA in the FBP 152 and in the MOC 171 on a ULP-MF-ME, and the PRU 102 detects that the ULPState 1934 of FIG. 19 is set to OFF. The PRU 102 may detect a multiple-hit of the current FBSA, e.g., if the LB-SF-ME is still co-resident as in the example of FIG. 35A, or if the LB-MF-ME and/or the first constituent SF-ME are still co-resident as in the example of FIG. 35B. Operation proceeds to block 4404.

At block 4404, the PRU 102 generates an FBD 191 and sends the FBD 191 for the first iteration of the ULP-MF-ME. The PRU 102 builds the FBD 191 using the hit entry 200 of the FBP 152 and the hit MTR entry 330 of the ULP-MF-ME and initializes the ULPIterNum 1916 to a value of one, as described with respect to block 4304. The PRU 102 also sets the ULPState 1934 to ON. Additionally, the PRU 102 saves the current FBSA (i.e., the FBSA of the hit ULP-MF-ME) in the ULPFBSA register 1932. Operation proceeds to decision block 4408.

At decision block 4408, if the value of ULPIterNum 1916 equals the value of ULPIterCnt 2016 of the ULP-MF-ME, operation proceeds to block 4414; otherwise, operation proceeds to block 4412.

At block 4412, the PRU 102 generates an FBD 191 for the next iteration of the ULP-MF-ME and sends the FBD 191 to the IFU similar to the manner described with respect to block 4404 and increments the ULPIterNum 1916. Operation returns to decision block 4408.

At block 4414, the PRU 102 processes tail iterations of the loop until the PRU 102 detects the program instruction stream has fallen out of the loop associated with the ULP-MF-ME, at which time the PRU 102 sets the ULPState 1934 to OFF, and processing of the ULP-MF-ME is complete. A tail iteration with respect to a ULP-MF-ME refers to any loop iteration predicted by the PRU 102 to be in the program instruction stream after the PRU 102 has processed all the ULPIterCnt iterations of the ULP-MF-ME according to blocks 4402 through 4412. In some instances of the loop the number of tail iterations is zero, in which case the program instruction stream will immediately fall out of the loop (i.e., the current FBSA after the processing at blocks 4402 through 4412 does not equal the ULPFBSA 1932) after the PRU 102 has processed all the ULPIterCnt iterations of the ULP-MF-ME.

Figure 45:
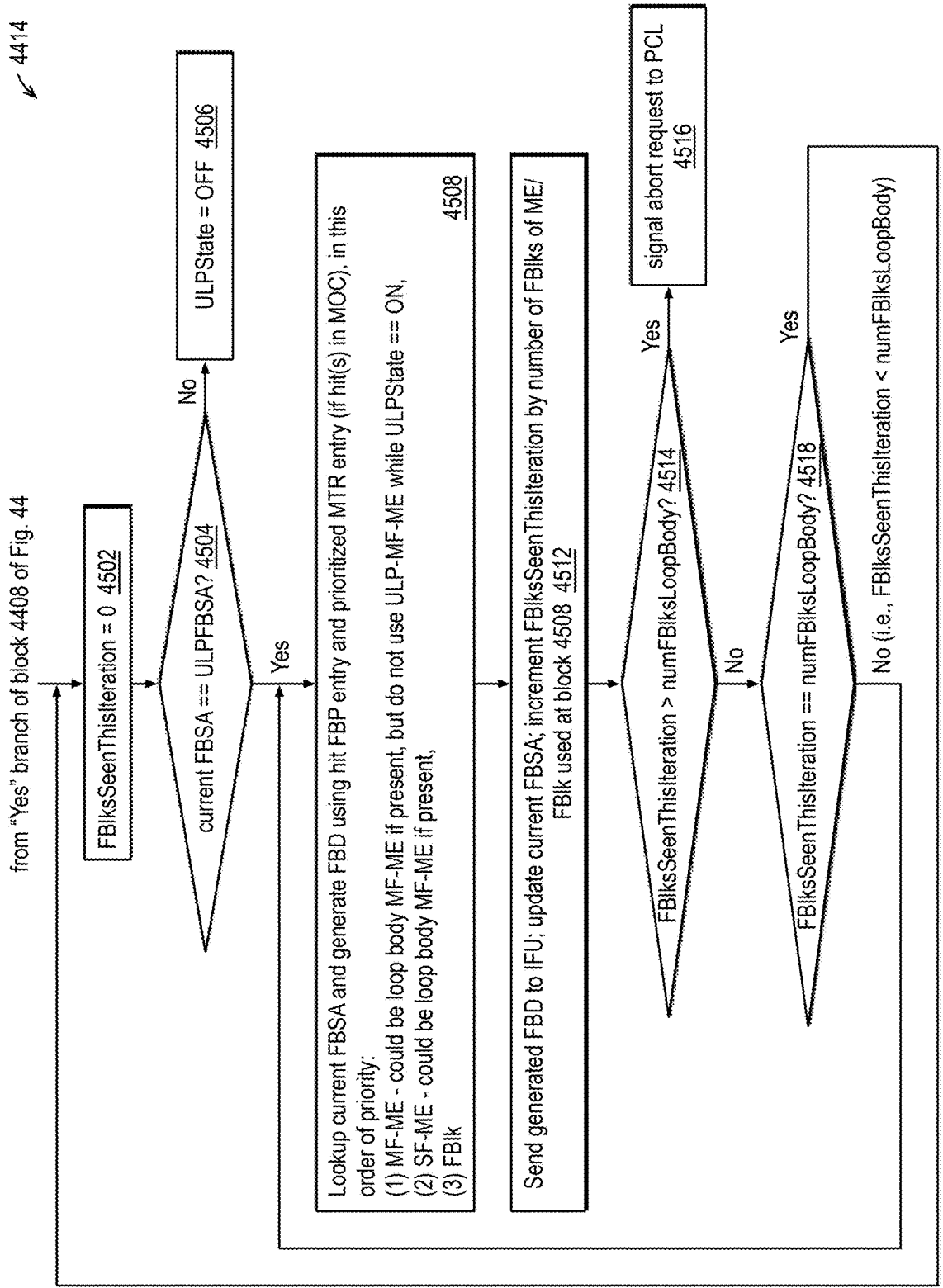
FIG. 45 is a flowchart illustrating operation of the PRU of FIG. 1 to perform the operations of the final block of FIG. 44 in accordance with embodiments of the present disclosure.

Although a detailed description of tail iteration processing is provided with respect to FIG. 45, a general description of an embodiment is provided now. First, the PRU 102 predicts a next FBSA 449 produced by the last iteration of the ULP-MF-ME and updates the current FBSA to the next FBSA. If the current FBSA does not equal the ULPFBSA, then the program instruction stream has fallen out of the loop, and processing of the ULP-MF-ME is complete.

However, if the current FBSA equals the ULPFBSA, then the program instruction stream is still in the loop and the PRU 102 processes tail iterations of the loop body not accounted for by the iterations of the ULP-MF-ME. In embodiments that allow co-residency of the ULP-MF-ME and the loop body ME used to build the ULP-MF-ME, often the loop body ME is co-resident in the MOC 171 such that the tail iterations may be processed by predicting the loop body ME. In such case, the current FBSA hits on the loop body ME (and the ULP-MF-ME), and the PRU 102 predicts the loop body ME (rather than the ULP-MF-ME) to process the tail iterations.

However, there may be instances in which the loop body ME has been replaced in the MOC 171 by another ME or the loop body ME is an MF-ME and the embodiment does not allow such co-residency. In such case, for each tail iteration, the PRU 102 predicts the MEs/FBlks of the loop body until the number of FBlks of the loop body have been fetched, as will now be described.

If the loop body ME is an SEQ-MF-ME and if the first SF-ME of the loop body ME is still present in the MOC 171, the current FBSA hits on the first SF-ME of the loop body ME (and the ULP-MF-ME), the PRU 102 generates an FBD 191 for the first SF-ME of the loop body ME (rather than the ULP-MF-ME), the PRU 102 predicts a next FBSA 449 produced by the first SF-ME of the loop body ME, the PRU 102 updates the current FBSA to the next FBSA, and the PRU 102 increments the number of FBlks seen for this loop iteration by one. Otherwise (i.e., the loop body ME is not an SEQ-MF-ME and the first SF-ME of the loop body ME is no longer present in the MOC 171), the current FBSA misses in the MOC 171, the PRU 102 generates an FBD 191 for the first FBlk of the loop body (if the loop body ME was an SF-ME, then the first FBlk is the only FBlk of the loop body), the PRU 102 predicts a next FBSA 449 produced by the first FBlk of the loop body, and the PRU 102 increments the number of FBlks seen for this loop iteration by one.

The PRU 102 then compares the number of FBlks seen for this loop iteration with the number of FBlks of the loop body. If the number of FBlks seen for this loop iteration is greater than the number of FBlks of the loop body, then the PRU 102 signals an abort request to the PCL 132 to indicate a misprediction by the PRU 102. If the number of FBlks seen for this loop iteration equals the of number of FBlks of the loop body, then the PRU 102 compares the value of the next FBSA 449 (which becomes the current FBSA) with the ULPFBSA. If the current FBSA and the ULPFBSA are not equal, then the program instruction stream is falling out of the loop, and processing of the ULP-MF-ME is complete. If the current FBSA and the ULPFBSA are equal, then the program instruction stream is remaining in the loop for another iteration, so the PRU 102 processes another tail iteration of the loop body in the manner described in this and the previous paragraph. If the number of FBlks seen for this loop iteration is less than the value of number of FBlks of the loop body, then the PRU 102 generates an FBD 191 for the next ME/FBlk of the loop body (depending upon whether the current FBSA hits in the MOC 171), predicts a next FBSA 449 produced by the next ME/FBlk of the loop body, adds the numFBlks 335 to the number of FBlks seen for this loop iteration in the case of a next ME or adds one to the number of FBlks seen for this loop iteration in the case of a next FBlk, performs the comparison of the number of FBlks seen for this loop iteration and number of FBlks of the loop body, and takes the associated action described above based on the comparison to finish processing the current tail iteration instance. An embodiment of the operation of the PRU 102 according to block 4414 is now described with respect to FIG. 45.

FIG. 45 is a flowchart illustrating operation of the PRU 102 of FIG. 1 to perform the operations of block 4414 of FIG. 44 in accordance with embodiments of the present disclosure. Operation begins at block 4502.

At block 4502, the FBlksSeenThisIteration register 1936 is initialized to zero. Operation proceeds to decision block 4504.

At decision block 4504, if the current FBSA is equal to the ULPFBSA 1932 (that was saved at block 4404 of FIG. 44), operation proceeds to block 4508; otherwise, operation proceeds to block 4506.

At block 4506, the PRU 102 clears the ULPState 1934 to OFF and processing of the ULP-MF-ME is complete.

At block 4508, the PRU 102 looks up the current FBSA in the FBP 152 (and BPs 154) and MTR 173. The PRU 102 generates an FBD to send to the IFU 106 either using the hit FBP entry 200 and a prioritized MTR entry 330 assuming one or more hits in the MTR 173 (to specify an FBD to fetch MOPs from the MDR 175) or otherwise using merely the hit FBP entry 200 (to specify an FBD to fetch architectural instructions from the instruction cache 101). The lookup in the MTR 173 may result in a multiple-hit, depending upon the embodiment and the state of the MOC 171 at the time of the lookup, i.e., whether the loop body ME and/or first SF-ME of a loop body SEQ-MF-ME is still present in the MOC 171. The prioritization of the MTRE 330 to use is as follows.

While the ULPState 1934 is ON, the PRU 102 does not use the ULP-MF-ME because all the iterations of the ULP-MF-ME have been processed at blocks 4402 through 4412 of FIG. 44. That is, even though the ULP-MF-ME is hit upon, it is not used to generate an FBD to send to the IFU 106.

If an MF-ME is hit upon other than the ULP-MF-ME, the hit MF-ME is prioritized highest such that its MTR entry 330 is used (along with the hit FBP entry 200) to generate the FBD to fetch MOPs of the hit MF-ME. The hit MF-ME may be the loop body ME if the loop body ME is still resident in the MOC 171 (in an embodiment that allows the loop body ME to be co-resident with the ULP-MF-ME). In such case, operation should pass through block 4512, block 4514, and block 4518 then back to block 4502 for processing of a next tail iteration or a falling out of the loop. Or the hit MF-ME may be a non-first constituent MF-ME used to build the loop body SEQ-MF-ME. In such case, the hit non-first constituent MF-ME has a FBSA different than the ULPFBSA such that the hit MF-ME is hit upon during a non-first iteration (i.e., a second or subsequent iteration) of the inner loop of the flowchart of FIG. 45 constituted by blocks 4508 through 4518.

If no MF-ME other than the ULP-MF-ME is hit upon but an SF-ME is hit upon, the hit SF-ME is prioritized next highest such that its MTR entry 330 is used (along with the hit FBP entry 200) to generate the FBD to fetch the MOPs of the hit SF-ME. The hit SF-ME may be the loop body ME, if it is still resident in the MOC 171. In such case, operation should pass through block 4512, block 4514, and block 4518 then back to block 4502 for processing of a next tail iteration or a falling out of the loop. Or the hit SF-ME may be a non-first constituent SF-ME used to build the loop body SEQ-MF-ME. In such case, the hit non-first constituent SF-ME has a FBSA different than the ULPFBSA such that the hit SF-ME is hit upon during a non-first iteration (i.e., a second or subsequent iteration) of the inner loop of the flowchart of FIG. 45 constituted by blocks 4508 through 4518.

If no ME other than the ULP-MF-ME is hit upon, the hit FBP entry 200 is used to generate the FBD to fetch the architectural instructions of a FBlk from the instruction cache 101. The FBlk may be the FBlk associated with the loop body SF-ME. In such case, operation should pass through block 4512, block 4514, and block 4518 then back to block 4502 for processing of a next tail iteration or a falling out of the loop. Or the FBlk may be associated with a non-first constituent ME used to build the loop body SEQ-MF-ME. In such case, the FBlk has a FBSA different than the ULPFBSA such that the FBlk is hit upon during a non-first iteration (i.e., a second or subsequent iteration) of the inner loop of the flowchart of FIG. 45 constituted by blocks 4508 through 4518.

During normal operation of the processor 100, it is possible that the loop body ME could be replaced in the MOC 171, even after an initial multiple-hit on the loop body ME at block 4402 of FIG. 44. Thus, for a first (or subsequent) tail iteration the current FBSA could multiple-hit on the loop body ME (and on the ULP-MF-ME) such that the PRU 102 prioritizes the loop body ME at block 4508, the current FBSA could be updated at block 4512, and operation could return to block 4502 to process the next tail iteration. But before the current FBSA lookup at block 4508, the loop body ME could be replaced and therefore be absent from the MOC 171 such that the PRU 102 cannot satisfy the next tail iteration using the loop body ME. In such case, the PRU 102 prioritizes the first SF-ME (if the loop body ME is a SEQ-MF-ME) and other MEs of the sequence of MEs used to build the loop body SEQ-MF-ME or the first FBlk and any subsequent FBlks associated with the sequence of MEs used to build the loop body SEQ-MF-ME at block 4508 or a combination thereof to process the next tail iteration (and any subsequent tail iterations). Operation proceeds from block 4508 to block 4512.

In an alternate embodiment, at block 4508, if the loop body ME is absent from the MOC 171, the PRU 102 does not attempt to fetch any constituent MEs of the loop body ME, but instead only generates FBDs for FBlks associated with the loop body ME to process the tail iteration.

At block 4512, the PRU 102 sends the FBD generated at block 4508 to the IFU 106. The PRU 102 also updates the current FBSA (i.e., the next FBSA 449 produced by the current FBlk or ME becomes the current FBSA 412). Once processing of the ULP-MF-ME completes (e.g., at block 4506), the current FBSA 412 becomes the FBSA of the next FBlk or ME after the ULP-MF-ME in the predicted program instruction stream for the PRU 102 to process. The PRU 102 also increments the FBlksSeenThisIteration 1936 by the number of FBlks associated with the ME or FBlk used at block 4508. Specifically, if a FBlk or SF-ME was used at block 4508, then the PRU 102 increments the FBlksSeenThisIteration 1936 by one, whereas if an MF-ME was used at block 4508, then the PRU 102 increments the FBlksSeenThisIteration 1936 by the numFBlks 335 of the used MF-ME. Operation proceeds to decision block 4514.

At decision block 4514, if the FBlksSeenThisIteration 1936 is greater than the numFBlksLoopBody 2019, operation proceeds to block 4516; otherwise, operation proceeds to decision block 4518.

At block 4516, the PRU 102 signal an abort request to the PCL 132 to indicate that a misprediction has been made by the PRU 102.

At decision block 4518, if the FBlksSeenThisIteration 1936 is equal to the numFBlksLoopBody 2019, operation proceeds to block 4502; otherwise, operation proceeds to block 4508.

Figure 46:
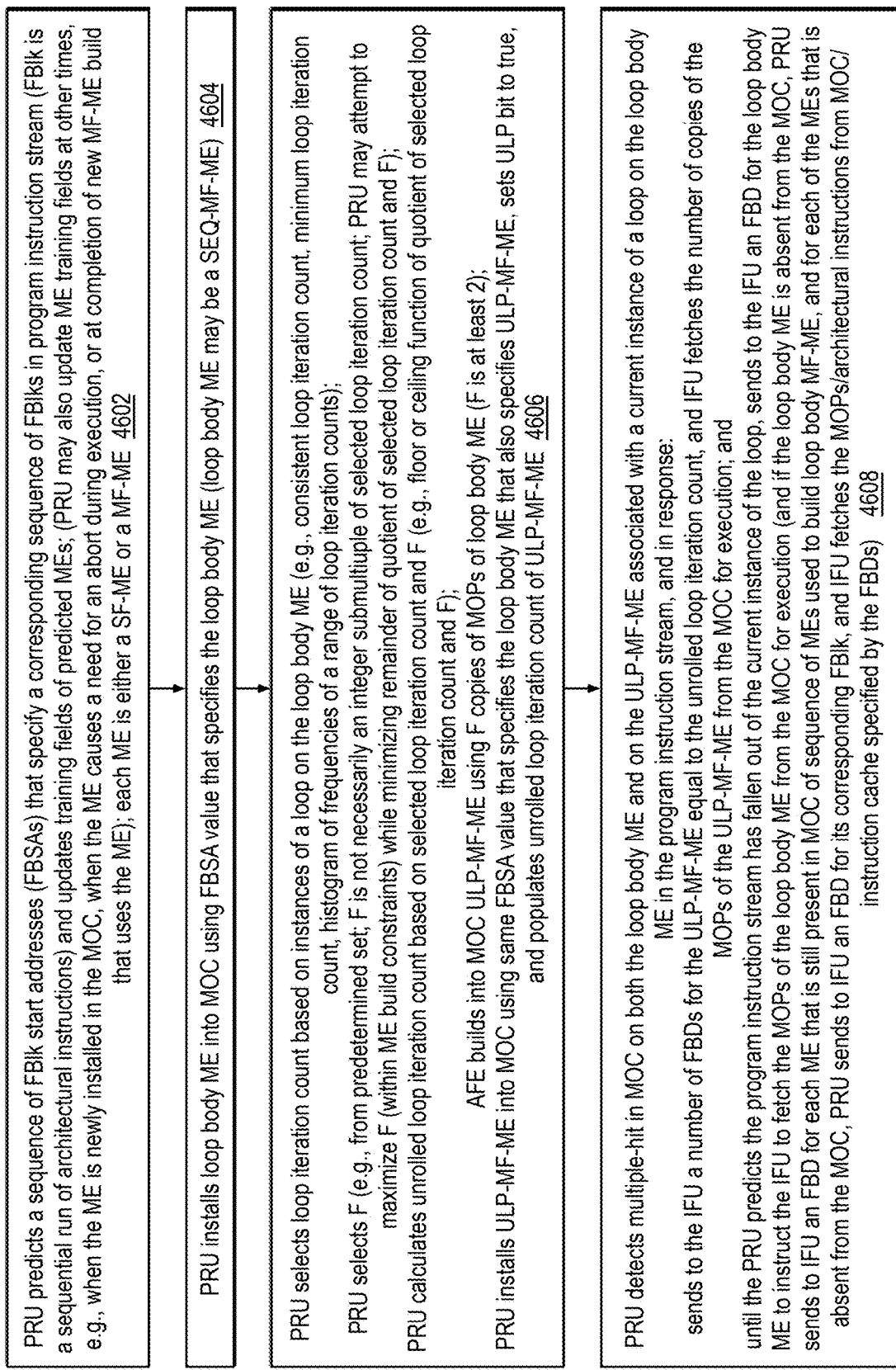
FIG. 46 is a flowchart illustrating operation of the PRU to allow same-FBSA co-residence of a ULP-MF-ME and the loop body ME used to build the ULP-MF-ME in accordance with embodiments of the present disclosure.

FIG. 46 is a flowchart illustrating operation of the PRU 102 to allow same-FBSA co-residence of a ULP-MF-ME and the loop body ME used to build the ULP-MF-ME in accordance with embodiments of the present disclosure. Operation begins at block 4602.

At block 4602, the PRU 102 continuously predicts a sequence of FBSAs that specify a corresponding sequence of FBlks in the program instruction stream and updates the training fields 331 of the MEs 350 as it predicts them as described with respect to block 2402 of FIG. 24. Operation proceeds to block 4604.

At block 4604, the PRU 102 installs a loop body ME into the MOC 171 (e.g., in response to an install request 183 from the AFE 181 after the AFE 181 builds the loop body ME into the MOC 171) using an FBSA value that specifies the loop body ME. The loop body ME may be an SF-ME (e.g., built according to FIG. 23) or a SEQ-MF-ME (e.g., built according to FIG. 25). Operation proceeds to block 4606.

At block 4606, the PRU 102 selects a loop iteration count (e.g., LastIterCnt/MinIterCnt/HistIterCnt) based on observed instances of a loop on the loop body ME, e.g., a consistent loop iteration count, a minimum loop iteration count, or a loop iteration count based on analysis of a histogram of frequencies of a range of loop iteration counts. The PRU 102 also selects a value of F, the loop unroll factor. The PRU 102 also calculates the ULPIterCnt based on the selected loop iteration count and the selected value of F. The PRU 102 may select the loop iteration count and F and may calculate the ULPIterCnt as described with respect to the description of the training fields 331 with respect to FIG. 20, block 3208 of FIG. 32, block 3302 of FIG. 33, block 3808 of FIG. 38, block 3902 of FIG. 39, or block 4002 of FIG. 40. For example, the PRU 102 may select F from a predetermined set of values. For another example, F may or may not necessarily be an integer submultiple of the selected loop iteration count. For another example, the PRU 102 may attempt to maximize F within ME build constraints while minimizing the remainder of the quotient of the selected loop iteration count and F. The AFE 181 builds into the MOC 171 a ULP-MF-ME using F copies of the loop body ME, e.g., as described with respect to FIG. 33, FIG. 39, or FIG. 40. The PRU 102 installs the ULP-MF-ME (e.g., in response to an install request from the AFE 181 after the AFE 181 builds the MDREs 340 of the ULP-MF-ME into the MDR 175) into the MTR 173 using the same FBSA value that specifies the loop body ME that also specifies the ULP-MF-ME. The PRU 102 sets the ULP bit 2018 to true to indicate a ULP-MF-ME and populates the ULPIterCnt 2016, e.g., as described with respect to FIG. 33, FIG. 39, or FIG. 40. Operation proceeds to block 4608.

At block 4608, the PRU 102 detects a multiple-hit in the MOC 171 on both the loop body ME and on the ULP-MF-ME associated with a current instance of the loop body ME in the program instruction stream, e.g., as described with respect to block 4402 of FIG. 44, in the case of a same-FBSA co-residency of the loop body ME and on the ULP-MF-ME in the MOC 171. In response, the PRU 102 processes the ULP-MF-ME according to FIG. 44 and FIG. 45. That is, first the PRU 102 sends a number FBDs for the ULP-MF-ME to the IFU 106 that is equal to the ULPIterCnt 2016 of the ULP-MF-ME, and in response to the FBDs the IFU 106 fetches from the MOC 171 for execution the number of copies of the MOPs of the ULP-MF-ME, as described with respect to blocks 4404 through 4412 of FIG. 44. Then, as it continually updates the current FBSA and until it predicts the program instruction stream has fallen out of the current instance of the loop, the PRU 102 sends an FBD for the loop body ME to the IFU 106, and in response to the FBD the IFU 106 fetches from the MOC 171 for execution the MOPs of the loop body ME, as described with respect to block 4414 of FIG. 44 and with respect to FIG. 45. That is, assuming the loop body ME is still present in the MOC 171, the PRU 102 processes the tail iterations using the loop body ME. However, if the loop body ME is absent from the MOC 171, the PRU 102 processes each tail iteration by sending to the IFU 106 an FBD for each ME that is still present in the MOC 171 from the sequence of MEs that was used to build the loop body MF-ME, and for each ME that is absent from the MOC 171, the PRU 102 sends an FBD for the corresponding FBlk. In response to the FBDs, the IFU 106 fetches the MOPs/architectural instructions from the MOC 171/instruction cache 101.

Prediction of MF-ME Successor Fetch Block Start Address and Branch History Update Information As described above, a FBlk is a sequential run of architectural instructions having a length and a termination type. The PRU predicts the sequence of FBlks of the program instruction stream. The PRU does this by looking up the current fetch block start address (FBSA) in the fetch block predictor (FBP) and branch predictors. The hit entry in the FBP provides the PRU with the length and the termination type of the current FBlk specified by the current FBSA. The FBP entry information (FBlk length and termination type) along with the current FBSA enable the PRU to generate the fetch block descriptor (FBD) to send to the instruction fetch unit (IFU) to fetch the FBlk of architectural instructions from the instruction cache. The FBP entry information, the current FBSA, and the outputs of the branch predictors enable the PRU to predict the next FBSA of the next FBlk after the current FBlk in the sequence of FBlks of the program instruction stream (e.g., the next sequential address or the target address of a taken branch, e.g., a PC-relative target address, an indirect target address, or a return target address). The next FBlk is also referred to as the successor FBlk, and the next FBSA is said to be "produced" by the current FBlk. The outputs of the FBP and the branch predictors also enable the PRU to predict the direction (taken or not taken) of the current FBlk and an indicator of whether or not the current FBlk is terminated with an indirect branch. The direction prediction and indirect branch indicator, along with bits of the current FBSA, are used to update branch history for many of the most recently predicted FBlks of the program instruction stream. The branch history is used in combination (e.g., hashed) with the current FBSA to perform the lookups in the branch predictors in order to improve prediction accuracy. The direction prediction and indirect branch indicator produced by the current FBlk and bits of the current FBSA may be referred to as branch history update information (BHUI).

As also described above, the macro-op cache (MOC) includes MOC entries (MEs). The MOC includes the MOC tag RAM (MTR) in the PRU and the MOC data RAM (MDR) in the IFU. Each ME includes one or more entries in the MDR that hold macro-ops (MOPs) into which the architectural instructions of one or more FBlks have been decoded and fused. Each ME also includes an entry in the MTR that specifies information about the ME, including whether the ME is a single FBlk ME (SF-ME) or a multi-FBlk ME (MF-ME). An SF-ME holds MOPs associated with a single FBlk, whereas an MF-ME holds MOPs associated with multiple FBlk. The PRU also looks up the current FBSA in the MTR in parallel with the FBP and branch predictor lookups. In the case of a miss in the MTR, the PRU sends the IFU an FBD to fetch the architectural instructions of the current FBlk from the instruction cache as described above. In the case of a hit on an SF-ME (and on an FBP entry), the PRU uses the FBP entry information and the current FBSA and information from the hit MTR entry associated with the SF-ME to generate an FBD to send to the IFU to fetch the MOPs associated with the single current FBlk from the MDR. Furthermore, the PRU uses the current FBSA and the FBP and branch predictor outputs to predict the FBSA of the successor to the SF-ME, i.e., of the FBlk/ME after the SF-ME in the program instruction stream. Still further, the PRU uses the FBP and branch predictor outputs to predict the BHUI with which to update the branch history for use in the lookups of the FBSA of the successor to the SF-ME.

In the case of a hit on an MF-ME (and on an FBP entry), the PRU also uses the FBP entry information and the current FBSA and information from the hit MTR entry associated with the MF-ME to generate an FBD to send to the IFU to fetch from the MDR the MOPs associated with both the current FBlk and the remaining FBlks of the multiple FBlks associated with the MF-ME. Additionally, the PRU also needs to predict the FBSA of the FBlk that is the successor to the MF-ME so that the PRU can look up the successor FBSA in the FBP and branch predictors and MTR to generate the FBD for the MF-ME successor. However, the current FBSA, i.e., the FBSA of the MF-ME, and the outputs from the lookups of the current FBSA are insufficient information for the PRU to predict the MF-ME successor FBSA because the MF-ME is built from multiple FBlks. That is, although the MF-ME FBSA and the outputs from the lookups of the MF-ME FBSA are sufficient information for the PRU to predict the FBSA of the successor of the first FBlk of the MF-ME, they are not sufficient information for the PRU to predict the FBSA of the successor of the last FBlk of the MF-ME, which is the successor of the MF-ME. Furthermore, by the time the PRU performs the lookup of the MF-ME successor FBSA in the branch predictors, branch history needs to be up to date so that it can be used in combination with the MF-ME successor FBSA in the branch predictor lookups. In other words, the BHUI that would be produced by each of the multiple FBlks of the MF-ME needs to be reflected in the branch history by the time of the branch predictor lookups of the MF-ME successor FBSA. However, the outputs from the lookups of the current/MF-ME FBSA are only sufficient to predict the BHUI produced by the current FBlk, i.e., the first FBlk of the MF-ME, but are insufficient to predict the BHUI produced by each of the remaining FBlks of the MF-ME.

To illustrate by example, assume a hit of the current FBSA on an MF-ME built from a sequence of FBlks A, B, C, and D. The successor to the MF-ME is the successor to FBlk D, not the successor to FBlk A. The PRU has enough information to predict the successor FBSA to FBlk A and to predict the BHUI produced by FBlk A. However, the PRU does not have enough information to predict the successor FBSA to FBlk D (which is the successor to the MF-ME). Nor does the PRU have enough information to predict the cumulative BHUI produced by all of FBlks A, B, C, and D, which is needed to update the branch history prior to the lookups of the successor FBSA in the branch predictors.

A possible solution to the problem may be to store the successor FBSA and the cumulative BHUI within the MF-ME. However, this solution may have drawbacks. First, it may significantly increase the size of each ME. For example, assume several bits (e.g., seven) are required for each BHUI produced by a FBlk, and assume an MF-ME may be built from several FBlks (e.g., nine). Also assume the size of the successor FBSA is 64 bits. In such case, the size of the MF-ME may increase by 16 bytes. Second, the approach may add complexity to the PRU to capture and store the successor FBSA and increment branch history, particularly since the number of FBlks of the MF-ME is variable.

Instead, embodiments are described in which the MF-ME indicates N—the number of FBlks built into the MF-ME (e.g., numFBlks)—and the PRU performs N times a set of actions that includes: looking up the current FBSA in the FBP and looking up the current FBSA in combination with the branch history in the branch predictors to obtain their outputs, using the outputs to predict the next FBSA and the BHUI produced by the current FBlk, updating the branch history with the BHUI produced by the current FBlk, and updating the current FBSA to be the next FBSA produced by the current FBlk. Then the PRU uses the next FBSA produced by the Nth set of actions (i.e., produced by the Nth FBlk) as the FBSA of the successor to the MF-ME, and the branch history has been updated with the BHUI produced by each of the N set of actions (i.e., produced by the N FBlks) such that the branch history is ready to be used in combination with the successor FBSA in branch predictor lookups to continue processing after the MF-ME. In the case of a hit on an unrolled loop MF-ME (ULP-MF-ME), for each of the ULPIterCnt iterations of the ULP-MF-ME, the PRU performs the set of actions N times and sends an FBD to the IFU. The embodiments may advantageously save storage space in the MOC and potentially reduce complexity in the PRU.

This approach is highly likely to produce the same intermediate FBSAs and intermediate branch history update information that are built into the MF-ME and therefore likely to produce the expected successor FBSA to the MF-ME and the branch history updated as of the point in the program instruction stream at the end of the MF-ME. This is because—using again the example above—while the PRU was training on the consistent sequence A, B, C, D of the program instruction stream of FBlks to decide to build the MF-ME, the branch predictors were also being trained on the same program instruction stream of FBlks. Consequently, when the PRU performs the set of actions four times (i.e., N is four), it is highly likely the PRU will predict that FBlk B follows FBlk A, and FBlk C follows FBlk B, and FBlk D follows FBlk C, in which case the successor predicted by the set of actions performed the fourth time is highly likely the successor to FBlk D. More specifically, when the PRU performs the first set of actions that includes the lookups of the first current FBSA (which is FBSA A, which is the FBSA of the MF-ME) to predict a first next FBSA and a first BHUI, they are highly likely to be FBSA B and the FBlk A-produced BHUI that is built into the MF-ME, respectfully; and when the PRU performs the second set of actions that includes the lookups of the second current FBSA (which is the first next FBSA) to predict a second next FBSA and a second BHUI, they are highly likely to be FBSA C and the FBlk B-produced BHUI that is built into the MF-ME, respectfully; and when the PRU performs the third set of actions that includes the lookups of the third current FBSA (which is the second next FBSA) to predict a third next FBSA and a third BHUI, they are highly likely to be FBSA D and the FBlk C-produced BHUI that is built into the MF-ME, respectfully; and when the PRU performs the fourth set of actions that includes the lookups of the fourth current FBSA (which is the third next FBSA) to predict a fourth next FBSA and a fourth BHUI, they are highly likely to be the FBSA of the successor to FBlk D (which is the successor to the MF-ME) and the FBlk D-produced BHUI that is built into the MF-ME, respectfully. In the event that the predicted FBSA of the successor to the MF-ME is incorrect, this will be detected later in the processor pipeline, e.g., by the back-end.

Embodiments are also described in which, when the MF-ME is a ULP-MF-ME, the PRU performs optimizations that may increase performance and reduce power consumption.

Figure 47:
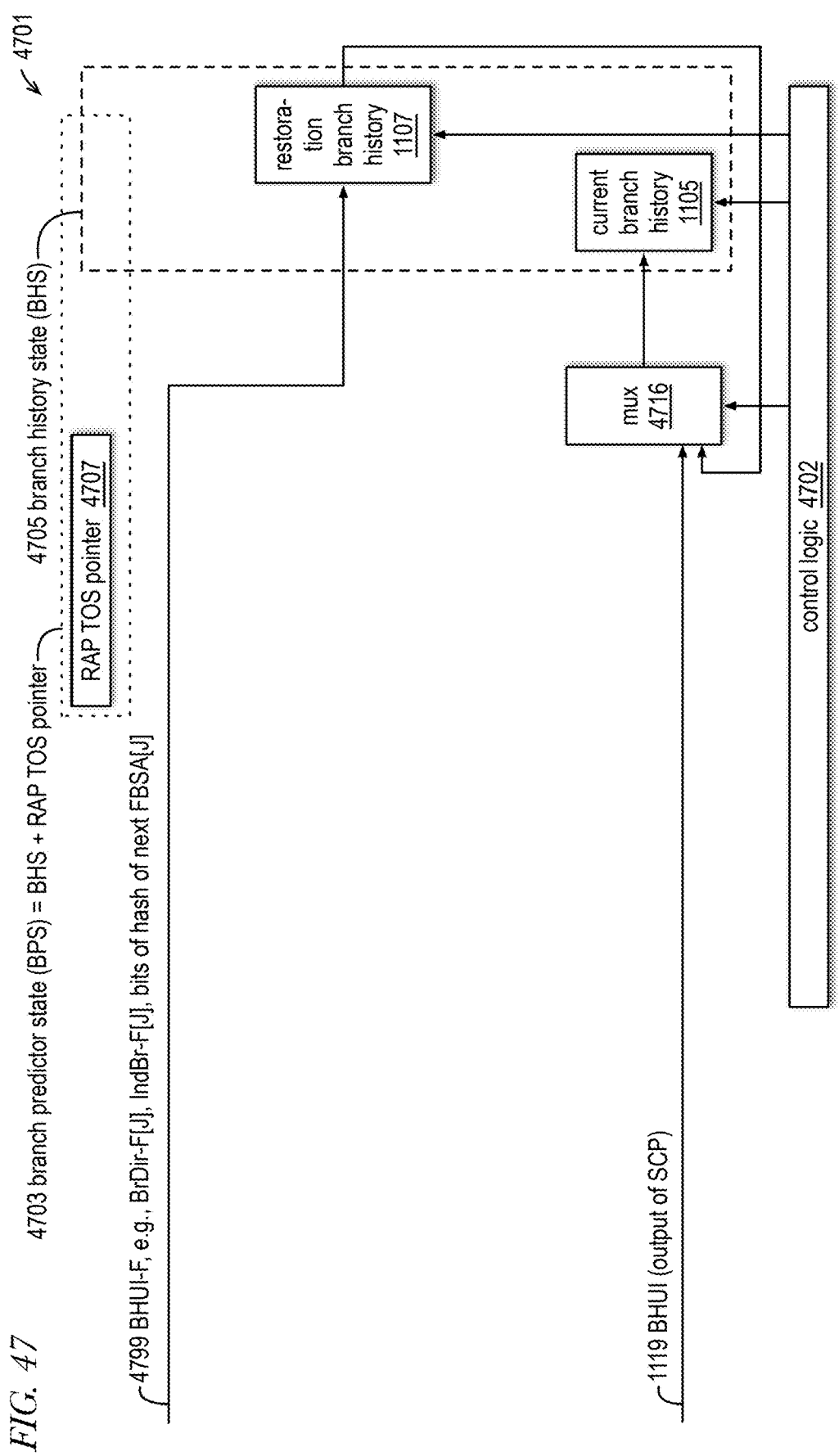
FIG. 47 is a block diagram illustrating circuits of the PRU to predict a successor FBSA to an MF-ME and to predict the branch predictor state generated by the MF-ME by performing a set of actions multiple times in response to a hit on the MF-ME in accordance with embodiments of the present disclosure.

FIG. 47 is a block diagram illustrating circuits 4701 of the PRU 102 to predict a successor FBSA to an MF-ME and to predict the branch predictor state generated by the MF-ME by performing a set of actions multiple times in response to a hit on the MF-ME in accordance with embodiments of the present disclosure. The PRU circuits 4701 include control logic 4702, a branch predictor state (BPS) 4703, a branch history state (BHS) 4705, a RAP TOS pointer 4707, and a mux 4716. The BPS 4703 comprises the BHS 4705 and the RAP TOS pointer 4707 (e.g., the top-of-stack (TOS) pointer of the RAP 1146 of FIG. 11). The BHS 4705 comprises the restoration branch history 1107 and the current branch history 1105 of FIG. 11. The restoration branch history 1107 is updated with a BHUI-F 4799, which comprises a portion of the FSPU prediction 1199 produced by the current FBlk, namely the BrDir-F[J], the IndBr-F[J], and bits of a hash of the next FBSA[J]499 of FIG. 11.

The mux 4716 receives the BHUI 1119 of FIG. 11 on a first input and the restoration branch history 1107 on a second input. In an embodiment, the PRU 102 may include a single-cycle predictor, e.g., such as the SCP 1001 described with respect to FIG. 11. As described with respect to the embodiment of FIG. 11, the SCP 1001 advantageously provides its outputs at rate of one per cycle, which enables the FSPU 1102 to generate FBDs 191 at a rate of one per cycle under most conditions. The BHUI 1119 comprises a portion of the SCP prediction 1005, namely the BrDir-F[J−1], the IndBr-S[J−1], and bits of the HNFAJ[J−1] of FIG. 11. Normally, the control logic 4702 controls the mux 4716 to update the current branch history 1105 with the BHUI 1119. However, the SCP prediction check logic 1108 checks the BHUI 1119 against the BHUI-F 4799, and in the case of a mis-prediction by the SCP 1001, the current branch history 1105 is restored with the restoration branch history 1107. In this manner, the BHUI 1119 is effectively equivalent to the BHUI-F 4799, and the current branch history 1105 is effectively equivalent to the restoration branch history 1107. More specifically, the BrDir-S output is effectively equivalent to the BrDir-F output produced by the corresponding FBlk, the IndBr-S output is effectively equivalent to the IndBr-F output produced by the corresponding FBlk, and the HNFAI and HNFAT outputs are effectively equivalent to hashed versions of the next FBSA 449 output produced by the corresponding FBlk because they are compared and verified (e.g., by the SCP prediction check logic 1108), and if they do not match, the PRU 102 pipeline is flushed, restored, trained and re-started, as described with respect to FIG. 11 and FIG. 12 and FIG. 14. Thus, in the SCP embodiment, the lookups in the BPs 154 using the indexes 1131 and 1133 and tags 1132 and 1134 are effectively equivalent to lookups that would be performed by combining (e.g., hashing) the restoration branch history 1107 with the current FBSA 412 of FIG. 11.

In an embodiment, as described above with respect to FIG. 11, the restoration branch history 1107 and the current branch history 1105 each include a respective global branch history (GHist), conditional path history (CPHist), and indirect path history (IPHist). The global branch history (e.g., GHist described with respect to FIG. 11) may comprise the BrDir produced by each of a predetermined number of the most recent FBlks in the program instruction stream as predicted by the PRU 102). The conditional path history (e.g., CPHist described with respect to FIG. 11) may comprise bits of the current FBSA produced by each of a predetermined number of the most recent FBlks in the program instruction stream as predicted by the PRU 102). The indirect path history (e.g., IPHist described with respect to FIG. 11) may comprise bits of the current FBSA produced by each of a predetermined number of the most recent FBlks in the program instruction stream as predicted by the PRU 102 that are terminated with an indirect branch instruction). Operation of the PRU 102 including the PRU circuits 4701 will now be described.

Figure 48:
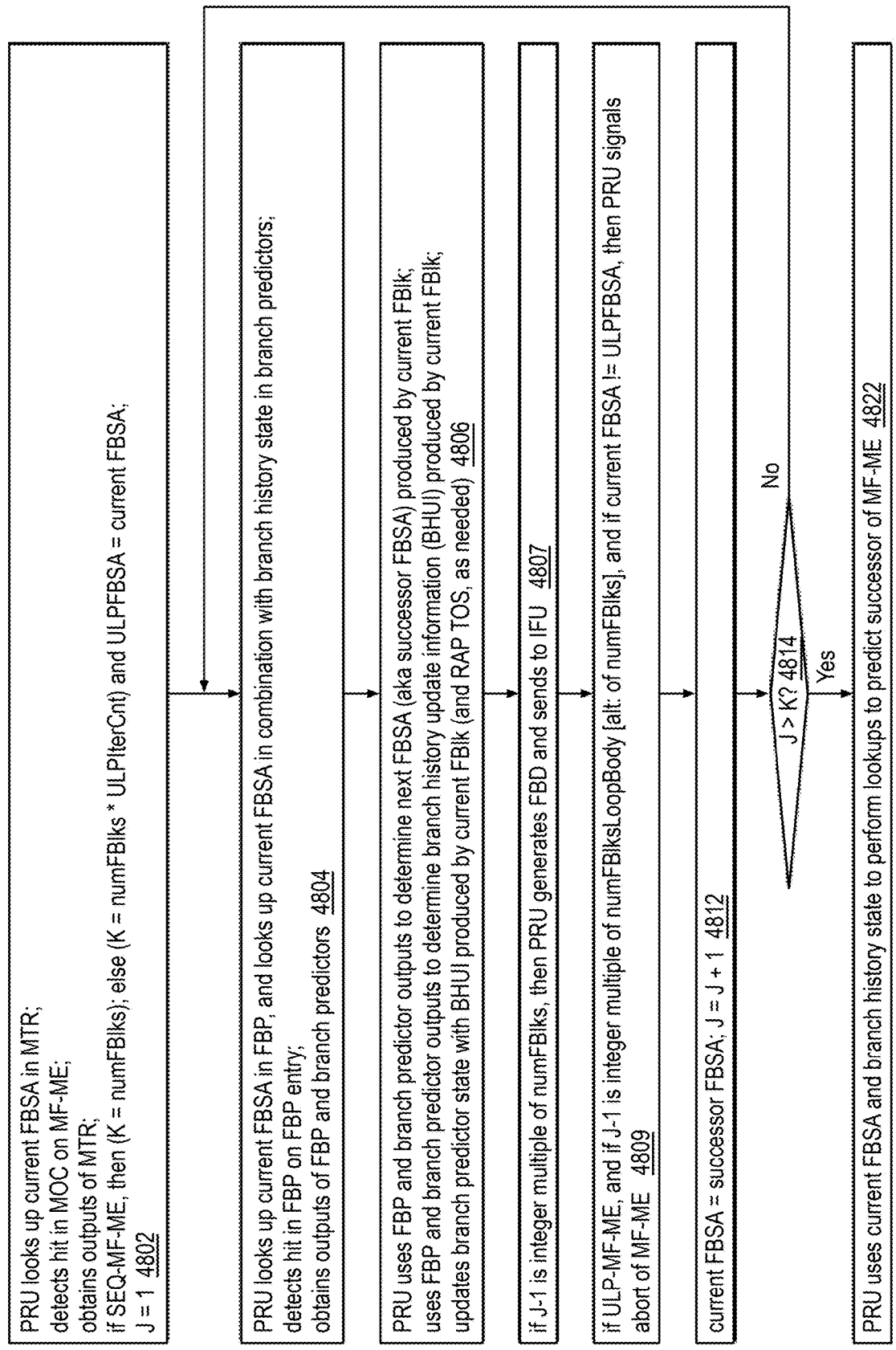
FIG. 48 is a flowchart illustrating operation of the PRU to predict a successor FBSA to an MF-ME and to predict the branch predictor state generated by the MF-ME in accordance with embodiments of the present disclosure.

FIG. 48 is a flowchart illustrating operation of the PRU 102 to predict a successor FBSA to an MF-ME and to predict the branch predictor state generated by the MF-ME in accordance with embodiments of the present disclosure. Operation begins at block 4802.

At block 4802, the PRU 102 looks up the current FBSA in the MTR 173, detects a hit in the hit MF-ME, and obtains the outputs of the hit MF-ME, e.g., the MTRE 330 that was hit and the MOC hit indicator 414. The PRU 102 then initializes a storage element K (e.g., a PRU register 1900 of FIG. 19 that is not shown) with a value that is the number of times the PRU 102 will perform the set of actions described with respect to FIG. 48 (e.g., blocks 4804 through 4812) in response to detecting the hit on the MF-ME. If the hit MF-ME is a SEQ-MF-ME, the PRU 102 initializes K with the number of FBlks built into the SEQ-MF-ME (e.g., numFBlks 335 of FIG. 3B). If the hit MF-ME is a ULP-MF-ME, the PRU 102 initializes K with the product of the number of FBlks built into the ULP-MF-ME (e.g., numFBlks 335 of FIG. 3B) and the number of ULP-MF-ME iterations built into the ULP-MF-ME (e.g., ULPIterCnt). If the hit MF-ME is a ULP-MF-ME, the PRU 102 also saves the current FBSA, i.e., the FBSA of the hit ULP-MF-ME, e.g., in the ULPFBSA register 1932. Finally, the PRU 102 initializes a counter J (e.g., a PRU register 1900 of FIG. 19 that is not shown) with a value of one, where J indicates a time (i.e., an instance within a sequence) the PRU 102 is performing the set of actions described with respect to FIG. 48 in response to detecting the hit on the MF-ME. In an embodiment of the PRU 102 that includes a single-cycle predictor (e.g., such as the SCP 1001 described with respect to FIG. 11), the HCFAI[J] of FIG. 11 may be used to index into the MTR 173. Operation proceeds to block 4804.

At block 4804, the PRU 102 looks up the current FBSA in the FBP 152. The PRU 102 also looks up the current FBSA in combination with (e.g., hashed with) the branch history state (e.g., BHS 4705 of FIG. 47) in the branch predictors (e.g., BPs 154 of FIG. 11). The PRU 102 also detects a hit (e.g., indicated on FBP hit indicator 422) on an entry in the FBP 152 in response to the lookup of the current FBSA. The PRU 102 also obtains the outputs of the FBP 152 (e.g., FBP entry 200 of FIG. 2) and the outputs of the BPs 154 (e.g., conditional branch direction 442, indirect branch target address 444, and return target address 446 of FIG. 11) in response to the lookup of the current FBSA in combination with the branch history state. The lookup of the current FBSA in the FBP 152 and in the BPs 152 may include indexing into the FBP 152 and in the BPs 152 with the HCFAI output of the SCP that corresponds to the current FBSA. Furthermore, the branch history state—that is combined with the current FBSA to generate the indexes 1131 and 1133 and the tags 1132 and 1134 that are used to perform the lookup in the BPs 154—may include the updated branch history formed and hashed by the UBHFHL 1173 of FIG. 11 starting with the current branch history 1105 and updated with branch history update information (BHUI) 1199 portion of the SCP outputs 1005. Although the MTR lookup at 4802 appears before the FBP and BPs lookups performed at block 4804, the MTR lookup at 4802 may be performed in parallel with the FBP and BPs lookups performed at block 4804 that correspond to the first FBlk of the MF-ME. Operation proceeds to block 4806.

At block 4806, the PRU 102 (e.g., next FBSA formation logic 408 of FIG. 11) uses the outputs of the FBP 152 and BPs 154 to determine the next FBSA (e.g., next FBSA 449 of FIG. 11) produced by the current FBlk (i.e., the FBlk specified by the current FBSA). The next FBSA is also referred to as the "successor FBSA" since it specifies the successor FBlk, i.e., the FBlk that is predicted to be the immediate successor to the current FBlk in the program instruction stream. The PRU 102 also uses the outputs of the FBP 152 and BPs 154 to determine BHUI (e.g., BHUI-F 4799 of FIG. 47) produced by the current FBlk. Finally, the PRU 102 updates the branch predictor state (e.g., BPS 4703 of FIG. 47) with the BHUI produced by the current FBlk. The PRU 102 updates the RAP TOS pointer 4707 as needed, e.g., decrementing the RAP TOS pointer (i.e., popping an entry off the RAP) in the case of a return termination type, and incrementing the RAP TOS pointer and writing the next FBSA into the RAP entry at the TOS pointer (i.e., pushing an entry onto the RAP) in the case of a call termination type. In an embodiment, the BHUI produced by the current FBlk includes the BrDir-F output, the IndBr-F output, and bits of a hashed version of the next FBSA 449 of FIG. 11, which are shown in FIG. 47 as BHUI-F 4799. That is, the FSPU 1102 generates the FSPU prediction 1199 based on the current FBSA and outputs of the FBP 152 and BPs 154, and the FSPU prediction 1199 comprises the BHUI-F 4799. In the SCP embodiment, the SCP output 1005 includes the BHUI [J−1] 1119, namely the BrDir-S[J−1], the IndBr-S[J−1], and bits of the HNFAI[J−1] of FIG. 11. Operation proceeds to block 4807.

At block 4807, if J−1 is an integer multiple of the number of FBlks built into the MF-ME, the PRU 102 generates an FBD (e.g., FBD 191 of FIG. 11) for the current iteration of the ULP-MF-ME and sends the FBD to the IFU 106 to fetch the MOPs of the ULP-MF-ME from the MDR 175 (e.g., as described with respect to FIG. 43 and FIG. 44). (Zero is an integer multiple of any integer.) In the case of a SEQ-MF-ME, this results in the PRU 102 generating and sending one FBD. In the case of a ULP-MF-ME, this results in the PRU 102 generating and sending a number of FBDs that is equal to ULPIterCnt 2016 of the ULP-MF-ME. Operation proceeds to block 4809.

At block 4809, if the MF-ME is a ULP-MF-ME, and if J−1 is an integer multiple of the number of FBlks of the loop body that was unrolled to build the ULP-MF-ME (e.g., numFBlksLoopBody 2019 of FIG. 20), and if the current FBSA does not match the ULPFBSA saved at block 4802, then the PRU 102 has detected a misprediction and signals a request to abort the MF-ME (e.g., sends an abort request to the PCL 132, which causes the MF-ME to be aborted). That is, the PRU 102 is detecting that it is predicting a different sequence of FBlks in the program instruction stream than the expected sequence of FBlks built into the ULP-MF-ME. The expected sequence of FBlks is that for each iteration of the loop body except for possibly the last iteration (i.e., the last iteration of the loop body for the last iteration of the ULP-MF-ME), the successor FBlk of the last FBlk of the loop body will be the first FBlk of the loop body (whose FBSA is the FBSA of the ULP-MF-ME), i.e., that the loop body will loop back to itself. By the PRU 102 detecting the misprediction earlier than the back-end detects the misprediction, the misprediction penalty may advantageously be reduced. In an alternate embodiment, the PRU 102 checks to see if J−1 is an integer multiple of the number of FBlks of the MF-ME rather than to see if J−1 is an integer multiple of the number of FBlks of the loop body, i.e., in the alternate embodiment the PRU 102 makes the misprediction check after each iteration of the MF-ME (except the last) rather than making the misprediction check after each iteration of the loop body. Operation proceeds to block 4812.

At block 4812, the PRU 102 updates the current FBSA with the successor FBSA determined at block 4806 and increments J. Operation proceeds to decision block 4814.

At decision block 4814, the PRU 102 compares J and K. If J is greater than K, operation proceeds to block 4822; otherwise, operation returns to block 4804.

At block 4822, the PRU 102 uses the current FBSA (which is the FBSA of the successor FBlk of the MF-ME) and branch history state (i.e., the current FBSA and branch history state that resulted from performing the set of actions of blocks 4804 through 4812 K times) to perform lookups in the FBP 152, BPs 154, and MTR 173 to predict the successor of the MF-ME, e.g., to generate and send to the IFU 106 an FBD for the FBlk or ME that immediately succeeds the MF-ME. The successor of the MF-ME may itself be an MF-ME or an SF-ME or a FBlk. In the case of a ULP-MF-ME, the MF-ME successor is the successor of the last iteration of the ULP-MF-ME, i.e., the successor of ULPIterCnt iterations of the ULP-MF-ME. In the case of a ULP-MF-ME, as described with respect to FIG. 44, the MF-ME successor may be a tail iteration of the loop body such that the MF-ME successor is an MF-ME built using the loop body, an SF-ME built using the loop body (if the loop body is a single FBlk), or a FBlk that is the first FBlk of the loop body. The PRU 102 also uses the lookups to predict the next FBSA and the BHUI produced by the MF-ME successor FBlk.

As a result of the updating of the branch predictor state K times with the K instances of the BHUI produced by the current FBlk at block 4806, when the PRU 102 looks up the successor FBSA in combination with the branch history state in the branch predictors, it is highly likely that the branch predictor state reflects the prediction of the BHUI of all FBlks built into the MF-ME in the case of a SEQ-MF-ME so that the branch predictor lookups are made with the desired branch predictor state. Stated alternatively, as a result of the updating of the branch predictor state K times, the branch predictor state reflects a point in the program instruction stream corresponding to completion of prediction of the last FBlk of the SEQ-MF-ME. And, in the case of a ULP-MF-ME, it is highly likely that the branch predictor state reflects the prediction of the BHUI of all the copies of all the FBlks of the loop body built into the ULP-MF-ME and of all the ULPIterCnt iterations of the ULP-MF-ME so that the branch predictor lookups are made with the desired branch predictor state. Stated alternatively, as a result of the updating of the branch predictor state K times, the branch predictor state reflects a point in the program instruction stream corresponding to completion of prediction of the last FBlk of the last iteration of the ULP-MF-ME.

Embodiments will now be described in which, in the case of a hit on a ULP-MF-ME, the PRU 102 processes the ULP-MF-ME in an optimized manner to reduce power consumption and to improve performance relative to the embodiment described with respect to FIG. 48. The reduction in power consumption is primarily attained by reducing the number of lookups in the FBP 152 and BPs 154 and/or by reducing the number of updates to the branch predictor state. The performance improvement is primarily attained by sending the ULPIterCnt FBDs to the IFU 106 sooner.

Figure 49:
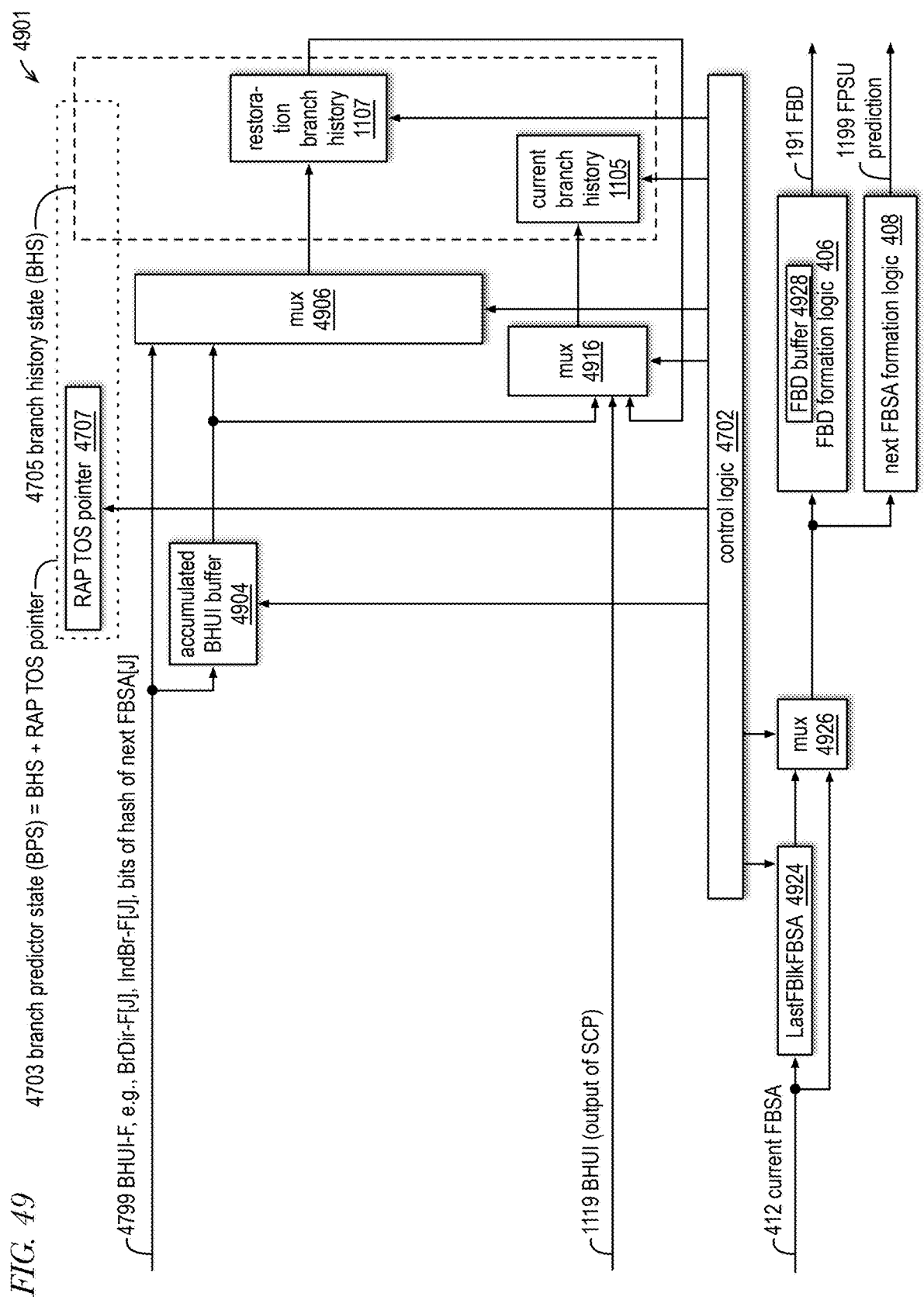
FIG. 49 is a block diagram illustrating optimization circuits of the PRU to process a ULP-MF-ME in an optimized manner in accordance with embodiments of the present disclosure.

FIG. 49 is a block diagram illustrating optimization circuits 4901 of the PRU 102 to process a ULP-MF-ME in an optimized manner in accordance with embodiments of the present disclosure. As may be observed from the description of the embodiment of FIG. 48, in the case of a ULP-MF-ME, the number of FBP 152 and BPs 154 lookups performed is numFBlks*ULPIterCnt. Similarly, the number of branch predictor state updates performed is numFBlks*ULPIterCnt. Furthermore, although the number of FBDs sent to the IFU 106 is only ULPIterCnt, the FBDs are sent over the course of approximately numFBlks*(ULPIterCnt-1) clock cycles. The optimization circuits 4901 of FIG. 49 may be employed to advantageously reduce the number of lookups and branch predictor state updates, thereby reducing power consumption, and to advantageously increase performance by facilitating the sending of the FBDs to the IFU 106 sooner so that the IFU 106 is enabled to supply the back-end 130 with MOPs sooner.

Some of the elements of the optimization circuits 4901 are similar to the PRU circuits 4701 of FIG. 47 and are numbered similarly. The optimization circuits 4901 also include an accumulated BHUI buffer 4904, a first mux 4906, a second mux 4916 (that replaces the mux 4716 of FIG. 47), a LastFBlkFBSA buffer 4924, and a third mux 4926. Additionally, the FBD formation logic 406 includes an FBD buffer 4928. The control logic 4702 controls the accumulated BHUI buffer 4904, the first mux 4906, the restoration branch history 1107, the second mux 4916, the current branch history 1105, the LastFBlkFBSA buffer 4924, the third mux 4926, and the FBD formation logic 406 in the manner described with respect to FIG. 50. In an embodiment, the accumulated BHUI 4904 is sufficiently large to hold a number of instances of BHUI-F 4799 equal to the maximum number of FBlks of that a loop body may comprise. In an alternate embodiment (e.g., with respect to FIG. 53), the accumulated BHUI 4904 is sufficiently large to hold a number of instances of BHUI-F 4799 equal to the maximum number of FBlks of that a ULP-MF-ME may comprise.

The accumulated BHUI buffer 4904 receives the BHUI-F 4799, which is also provided as a first input to the first mux 4906. The output of the accumulated BHUI buffer 4904 is provided as a second input to the first mux 4906. The output of the first mux 4906 is provided to the restoration branch history 1107. Normally (e.g., in the absence of a hit in the MTR 173 on a ULP-MF-ME) the control logic 4702 controls the first mux 4906, the accumulated BHUI buffer 4904, and the restoration branch history 1107 to simply cause the restoration branch history 1107 to be updated with the BHUI-F 4799, as described with respect to FIG. 11. At other times (e.g., for the FBlks of a first iteration of the loop body of a first iteration of the ULP-MF-ME) the control logic 4702 not only causes the restoration branch history 1107 to be updated with the BHUI-F 4799, but in parallel also causes the BHUI-F 4799 to be accumulated into the accumulated BHUI buffer 4904, and subsequently the control logic 4702 causes the restoration branch history 1107 to be updated in a single clock cycle with the accumulated BHUI 4904 as a whole, as described with respect to the embodiments of FIG. 50 and FIG. 52 (and in a single clock cycle with the whole accumulated BHUI 4904 except for the BHUI-F 4799 produced by the last FBlk of the loop body, as described with respect to the embodiment of FIG. 52). In an embodiment, the PRU 102 does not permit a ULP-MF-ME to include indirect branches and therefore the ULP-MF-ME does not affect IPHist such that the accumulated BHUI 4904 only includes accumulated GHist and accumulated CPHist. In an embodiment, the PRU 102 does not permit a ULP-MF-ME to affect the RAP state such that the RAP TOS need not be accumulated.

The output of the second mux 4916 is provided to the current branch history 1105. The second mux 4916 receives as a first input the accumulated BHUI 4904. The second mux 4916 receives as a second input the BHUI 1119. The second mux 4916 receives as a third input the output of the restoration branch history 1107 with which the current branch history 1105 is restored in the case of a misprediction, e.g., by the SCP 1001, as described with respect to FIG. 11. Normally, the control logic 4702 controls the second mux 4916, the accumulated BHUI buffer 4904, and the current branch history 1105 to simply cause the current branch history 1105 to be updated with the BHUI 1119, as described with respect to FIG. 11, e.g., in the absence of a hit in the MTR 173 on a ULP-MF-ME, as well as for the FBlks of a first iteration of the loop body of a first iteration of the ULP-MF-ME, as described with respect to FIG. 50. However, in the case of a hit on a ULP-MF-ME, subsequent to the first iteration of the loop body of the first iteration of the ULP-MF-ME, the control logic 4702 causes the current branch history 1105 to be updated in a single clock cycle with the accumulated BHUI 4904 as a whole, as described with respect to the embodiments of FIG. 50 and FIG. 52 (and in a single clock cycle with the whole accumulated BHUI 4904 except for the BHUI-F 4799 produced by the last FBlk of the loop body, as described with respect to the embodiment of FIG. 52).

The LastFBlkFBSA buffer 4924 receives the current FBSA 412, which is also provided as a second input to the third mux 4926. The output of the LastFBlkFBSA buffer 4924 is provided as a second input to the third mux 4926. The output of the third mux 4926 is provided to the FBD formation logic 406 and to the next FBSA formation logic 408 of FIG. 11. The control logic 4702 controls the LastFBlkFBSA buffer 4924 to capture the current FBSA 412 of the last FBlk of the first iteration of the loop body of the first iteration of the ULP-MF-ME, as described with respect to FIG. 50. Normally, the control logic 4702 controls the third mux 4926 to provide the current FBSA 412 to the FBD formation logic 406 and to the next FBSA formation logic 408, however at other times, the control logic 4702 controls the third mux 4926 to provide the LastFBlkFBSA 4924 to the FBD formation logic 406 and to the next FBSA formation logic 408, as described with respect to FIG. 50.

The FBD buffer 4928 holds a first FBD that is generated based on lookups in the FBP 152, BPs 154, and MTR 173 performed with respect to the first FBlk of the first iteration of the ULP-MF-ME. The first FBD held in the FBD buffer 4928 is then used to generate subsequent FBDs associated with subsequent iterations of the ULP-MF-ME, which enables the PRU 102 to generate and send to the IFU 106 the subsequent FBDs on successive clock cycles after the first FBD without having to wait to perform subsequent lookups in the BPs 154, as described with respect to FIG. 50.

Figure 50A:
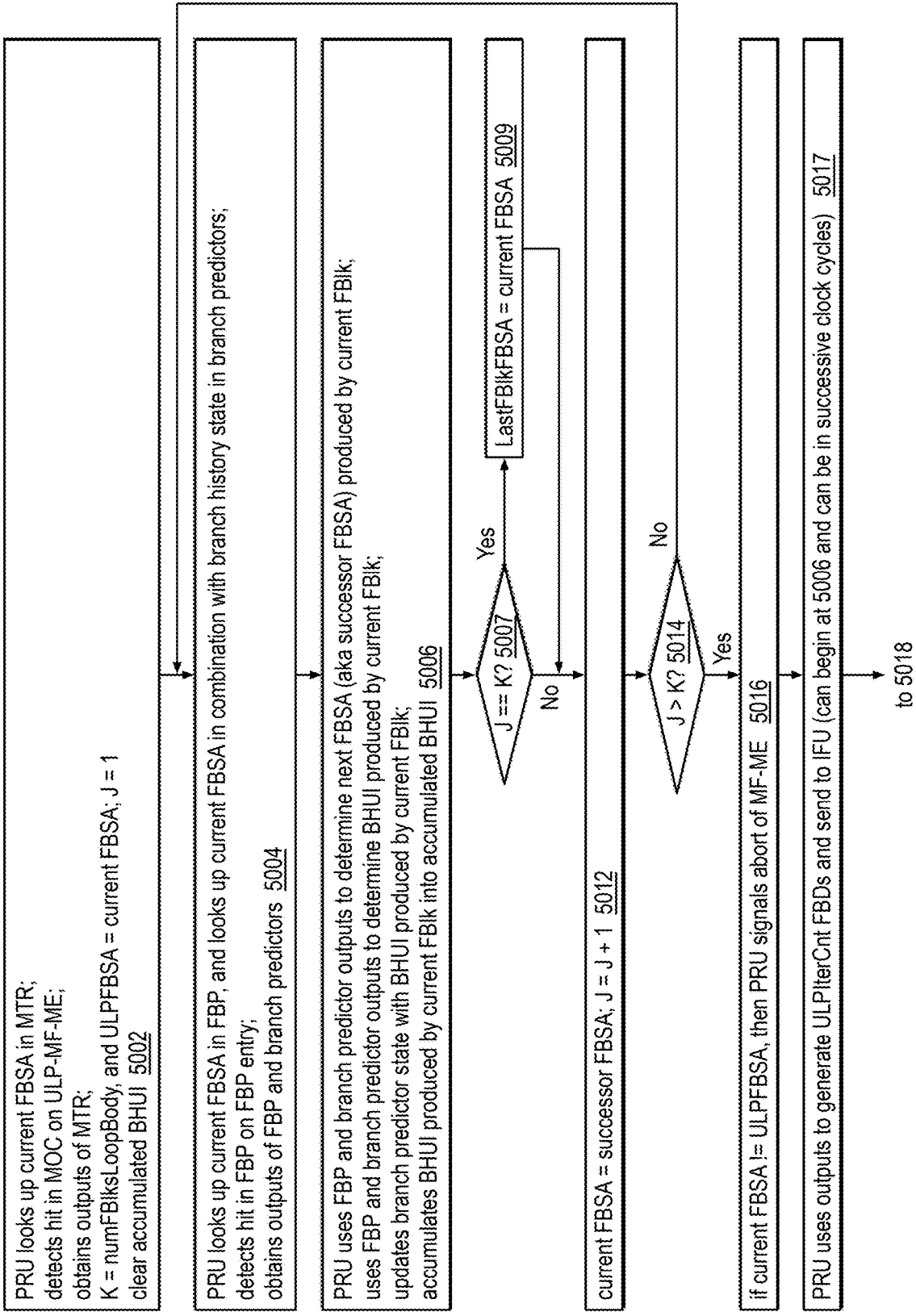
FIGS. 50A and 50B, referred to collectively as FIG. 50, is a flowchart illustrating operation of the PRU to predict a successor FBSA to a ULP-MF-ME and to predict the branch history state generated by the ULP-MF-ME in an optimized manner in accordance with embodiments of the present disclosure.
Figure 50B:
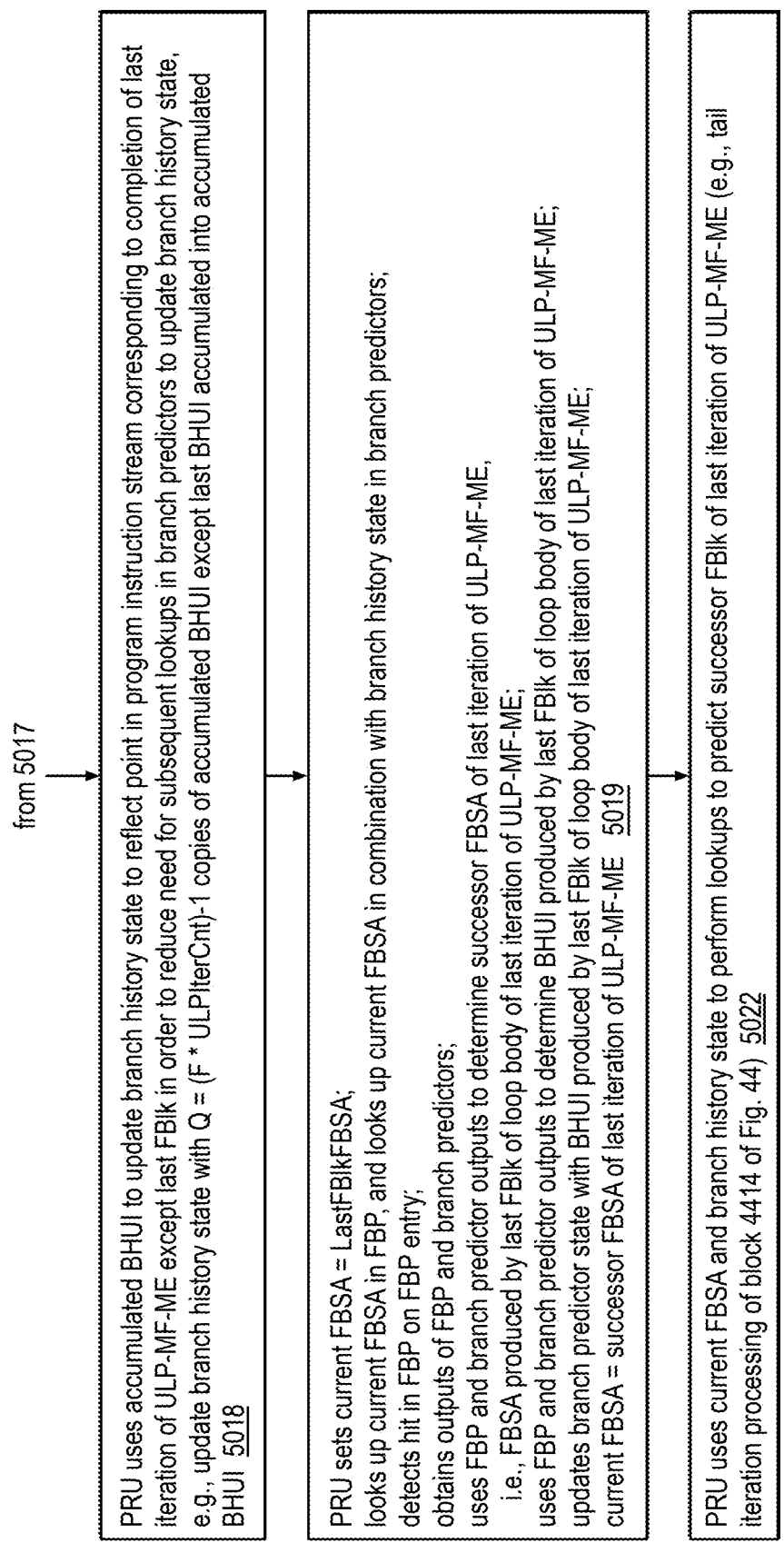

FIGS. 50A and 50B, referred to collectively as FIG. 50, is a flowchart illustrating operation of the PRU 102 to predict a successor FBSA to a ULP-MF-ME and to predict the branch history state generated by the ULP-MF-ME in an optimized manner in accordance with embodiments of the present disclosure. Operation begins at block 5002.

At block 5002, the PRU 102 looks up the current FBSA in the MTR 173, detects a hit in the MTR 173 on an MF-ME, and obtains the outputs of the hit MF-ME, similar to the manner described with respect to block 4802 of FIG. 48. More specifically, the hit MF-ME is a ULP-MF-ME, e.g., a ULP-MF-ME built according to the description of FIG. 33, FIG. 39, or FIG. 40. The PRU 102 then initializes the storage element K with the number of FBlks of the loop body used to build the ULP-MF-ME (e.g., numFBlksLoopBody 2019 of FIG. 20), saves the current FBSA in the ULPFBSA register 1932, and initializes the counter J with a value of one. Additionally, the PRU 102 clears the accumulated BHUI 4904 of FIG. 49. Operation proceeds to block 5004.

At block 5004, the PRU 102 looks up the current FBSA in the FBP 152, looks up the current FBSA in combination with the branch history state in the branch predictors, detects a hit on an entry in the FBP 152, and obtains the outputs of the FBP 152 and the outputs of the BPs 154 in response to the lookup of the current FBSA in combination with the branch history state, similar to the manner described with respect to block 4804 of FIG. 48. Operation proceeds to block 5006.

At block 5006, the PRU 102 uses the outputs of the FBP 152 and BPs 154 to determine the next FBSA produced by the current FBlk (i.e., the successor FBSA), uses the outputs of the FBP 152 and BPs 154 to determine BHUI produced by the current FBlk, and updates the branch predictor state with the BHUI produced by the current FBlk, similar to the manner described with respect to block 4806 of FIG. 48. Additionally, the PRU 102 accumulates the BHUI-F 4799 into the accumulated BHUI buffer 4904. Operation proceeds to decision block 5007.

At decision block 5007, the PRU 102 compares J and K. If J equals K, operation proceeds to block 5009; otherwise, operation proceeds to block 5012.

At block 5009, the PRU 102 captures the FBSA of the current FBlk in the LastFBlkFBSA buffer 4924. Operation proceeds to block 5012.

At block 5012, the PRU 102 updates the current FBSA with the successor FBSA determined at block 5006 and increments J. Operation proceeds to decision block 5014.

At decision block 5014, the PRU 102 compares J and K. If J is greater than K, operation proceeds to block 5016; otherwise, operation returns to block 5004.

At block 5016, if the current FBSA does not match the ULPFBSA saved at block 5002, then the PRU 102 has detected a misprediction and signals a request to abort the MF-ME. That is, the PRU 102 is detecting that it is predicting a different sequence of FBlks in the program instruction stream than the expected sequence of FBlks built into the ULP-MF-ME, which is that for the first iteration of the loop body, the successor FBlk of the last FBlk of the loop body will be the first FBlk of the loop body (whose FBSA is the FBSA of the ULP-MF-ME), i.e., that the loop body will loop back to itself. Operation proceeds to block 5017.

At block 5017, the PRU 102 uses the current FBSA, the outputs obtained at block 5002, and the outputs obtained at block 5004 and values determined at block 5006 the first time the set of actions of blocks 5004 through 5012 is performed (i.e., when J is one) to generate a first FBD for the ULP-MF-ME. In an embodiment, the PRU 102 may generate the first FBD concurrently with the first time it performs the operations at block 5006. The PRU 102 then sends the first FBD to the IFU 106 and stores the first FBD into the FBD buffer 4928. The PRU 102 subsequently sends to the IFU 106 ULPIterCnt−1 more FBDs using the FBD held in the FBD buffer 4928, which is possible because the IFU 106 is being instructed by all the FBDs to fetch the same ULP-MF-ME from the MOC 171 and thus the subsequent FBDs will be the same as the first FBD, although in an embodiment the PRU 102 may update the FBlkID 317 of FIG. 3A to a different value for each FBD. In this manner, the PRU 102 sends the IFU 106 a total of ULPIterCnt FBDs in response to the hit on the ULP-MF-ME at block 5002, i.e., one FBD for each of the ULPIterCnt iterations of the ULP-MF-ME. In an embodiment, the PRU 102 may send the ULPIterCnt−1 additional FBDs of block 5017 in successive clock cycles and may begin to send them in the next clock cycle after sending the first FBD. That is, the PRU 102 may generate and send the ULPIterCnt FBDs in an independent manner relative to the performing K times the set of actions of blocks 5004 through 5012. In this manner, according to the embodiment of FIG. 50, the IFU 106 may receive all the ULPIterCnt FBDs within approximately ULPIterCnt clock cycles after the hit on the ULP-MF-ME at block 5002, whereas according to the embodiment of FIG. 48 the IFU 106 may not receive all the ULPIterCnt FBDs until approximately numFBlks*(ULPIterCnt−1) clock cycles after the hit on the ULP-MF-ME at block 4802. Thus, the embodiment of FIG. 50 may advantageously improve performance by increasing the likelihood of keeping the IFU 106 supplied with FBDs, which may keep the mid-end 120 supplied with MOPs to dispatch to the back-end 130, which may keep the back-end 130 supplied with MOPs to execute in order to optimize performance of the processor 100. The PRU 102 may enjoy the performance improvement by effectively predicting that the sequence of FBlks of the program instruction stream starting with the hit on the first FBlk of the ULP-MF-ME will exhibit an expectation built into the ULP-MF-ME, namely that the program instruction stream will include ULPIterCnt iterations of the sequence of FBlks built into the ULP-MF-ME, i.e., F copies of the FBlks of the loop body built into the ULP-MF-ME, where F is the loop unroll factor. Operation proceeds to block 5018.

At block 5018, the PRU 102 uses the accumulated BHUI 4904 to update the branch history state to a point in the program instruction stream corresponding to the end, or completion, of prediction of the last iteration of the ULP-MF-ME except for the last FBlk of the last iteration of the ULP-MF-ME. Stated alternatively, at block 5018, the PRU 102 uses the accumulated BHUI 4904 to update the branch history state to reflect the point in the program instruction stream in which all the FBlks of all the ULPIterCnt iterations of the ULP-MF-ME except for the last FBlk have produced their BHUI and updated the branch history state. In an embodiment, the PRU 102 uses the accumulated BHUI 4904 to update the branch history state by shifting Q=(F*ULPIterCnt)−1 copies of the accumulated BHUI 4904 into the branch history state but excluding the last BHUI-F 4799 that was accumulated into the accumulated BHUI buffer 4904 on the Kth time of performance of the actions at block 5006. For example, assume K is five such that the BHUI-F 4799 of five FBlks was accumulated into the accumulated BHUI buffer 4904 when the set of actions at blocks 5004 through 5012 were performed five times. In the example, the PRU 102 shifts Q−1 copies of the accumulated BHUI 4904 into the branch history state (e.g., into the restoration branch history 1107 and into the current branch history 1105) and then shifts the oldest four BHUI-F 4799 from the accumulated BHUI buffer 4904 into the branch history state. That is, the PRU 102 then shifts into the branch history state the four BHUI-F 4799 that were accumulated into the accumulated BHUI buffer 4904 during the first four times the actions at block 5006 were performed. Stated alternatively, the Qth/final shift into the branch history state excludes the BHUI-F 4799 produced by the current FBlk during the fifth time the set of actions at blocks 5004 through 5012 were performed, which is highly likely to be the fifth FBlk of the loop body. By excluding the BHUI-F 4799 produced by the last FBlk of the last iteration of the ULP-MF-ME from the update of the branch history state, the PRU 102 is now ready at block 5019 (described below) to perform lookups to predict the next FBSA and the BHUI-F 4799 produced by the last FBlk of the last iteration of the ULP-MF-ME. In an embodiment, the value of Q is stored in the training fields 331 of the MTR entry 330 to enable the PRU 102 to determine the number of times the branch history state is to be updated with the accumulated BHUI 4904. In an alternate embodiment, the value of F is stored in the training fields 331 of the MTR entry 330, and the PRU 102 uses the value of F to perform the computation of Q.

As described with respect to FIG. 49, each copy of the accumulated BHUI 4904 may be shifted as a whole into the branch history state in a single clock cycle. As a result, within approximately K+F*ULPIterCnt clock cycles of the hit on the ULP-MF-ME at block 5002, the branch history is in the state needed by the PRU 102 to perform the lookups in the BPs 154 at block 5022 (described below) with respect to the successor FBlk to the last iteration of the ULP-MF-ME and to generate and send an FBD to the IFU 106 for the successor. This is in contrast to the embodiment of FIG. 48, in which the branch history is in the state needed by the PRU 102 to perform the lookups in the BPs 154 at block 4822 after approximately K*F*ULPIterCnt clock cycles. Thus, the embodiment of FIG. 50 may advantageously improve performance by increasing the likelihood of keeping the IFU 106 supplied with FBDs, which may keep the mid-end 120 supplied with MOPs to dispatch to the back-end 130, which may keep the back-end 130 supplied with MOPs to execute in order to optimize performance of the processor 100. The PRU 102 may enjoy the performance improvement by assuming (1) that when the PRU 102 performed the set of actions of blocks 5004 through 5012 the K times, the PRU 102 predicted the sequence of FBlks of the loop body built into ULP-MF-ME and therefore that the accumulated BHUI 4904 reflects the accumulated BHUI that would be produced by the sequence of FBlks of the loop body built into ULP-MF-ME and (2) that the program instruction stream will loop at least (F*ULPIterCnt)−1 more times through the loop body. Furthermore, power may be saved because approximately (K−1)*[(F*ULPTterCnt)−1] fewer lookups in the BPs 154 and FBP 152 may be performed relative to the embodiment of FIG. 48. Operation proceeds to block 5019.

At block 5019, the PRU 102 updates the current FBSA to be the FBSA captured in the LastFBlkFBSA buffer 4924 at block 5009, i.e., the FBSA of the last FBlk of the first iteration of the loop body of the first iteration of the ULP-MF-ME, which the PRU 102 assumes is also the last FBlk of the last iteration of the ULP-MF-ME. The last FBlk of the last iteration of the ULP-MF-ME will be referred to as "the last FBlk" for brevity in the remaining description of block 5019. The PRU 102 then performs the actions similar to those at blocks 5004, 5006, and 5012 for the last FBlk. That is, the PRU 102 looks up the current FBSA in the FBP 152, looks up the current FBSA in combination with the branch history state in the branch predictors, detects a hit on an entry in the FBP 152, obtains the outputs of the FBP 152 and the outputs of the BPs 154 in response to the lookup of the current FBSA in combination with the branch history state, uses the outputs of the FBP 152 and BPs 154 to determine the next FBSA (successor FBSA) produced by the current/last FBlk (which is the prediction of the FBSA of the successor FBlk to the last iteration of the ULP-MF-ME), uses the outputs of the FBP 152 and BPs 154 to determine BHUI produced by the current/last FBlk, updates the branch predictor state with the BHUI produced by the current/last FBlk, and updates the current FBSA to be the successor FBSA of the last FBlk of the last iteration of the ULP-MF-ME. That is, the PRU 102 does not know whether the successor FBlk to the last iteration of the ULP-MF-ME will be the first FBlk of the loop body (i.e., the program instruction stream remains in the loop by looping back to the top of the loop body such that there are tail iterations of the loop body that must be processed by the PRU 102, e.g., according to FIG. 45) or will be the next sequential FBlk (i.e., the program instruction stream is falling out of the loop). By looking up the FBSA of the last FBlk (by using the FBSA captured in the LastFBlkFBSA buffer 4924 at block 5009) at block 5019, the PRU 102 is able to predict whether the program instruction stream remains in or falls out of the loop. In the case of ULP-MF-ME built based on an observed consistent loop iteration count, it is highly likely the branch predictors will predict the program instruction stream will fall out of the loop (i.e., predict that the next FBSA produced by the last FBlk of the last iteration of the ULP-MF-ME is the next sequent FBSA after the loop body) since the branch predictors were previously trained to predict such while observing the highly consistent loop iteration count. Furthermore, the embodiment of FIGS. 51 and 52 accomplish a further optimization by assuming the program instruction stream will fall out of the loop in the case of a consistent loop iteration count ULP-MF-ME. Operation proceeds to block 5022.

At block 5022, the PRU 102 uses the current FBSA determined at block 5019 and the branch history state updated at block 5018 to perform the lookups in the MTR 173, FBP 152, and BPs 154 to predict the successor FBlk of the last iteration of the ULP-MF-ME, e.g., to determine whether the successor is an ME, to determine the next FBSA and BHUI produced by the successor FBlk, and to generate an FBD for the successor FBlk/ME (or to generate multiple FBDs if the successor is a ULP-MF-ME), which includes determining whether the successor is a tail iteration of the ULP-MF-ME (i.e., if the BPs 154 predict the program instruction stream is remaining in the loop, e.g., according to FIG. 45) and, if so, performing tail iteration processing.

Figure 51:
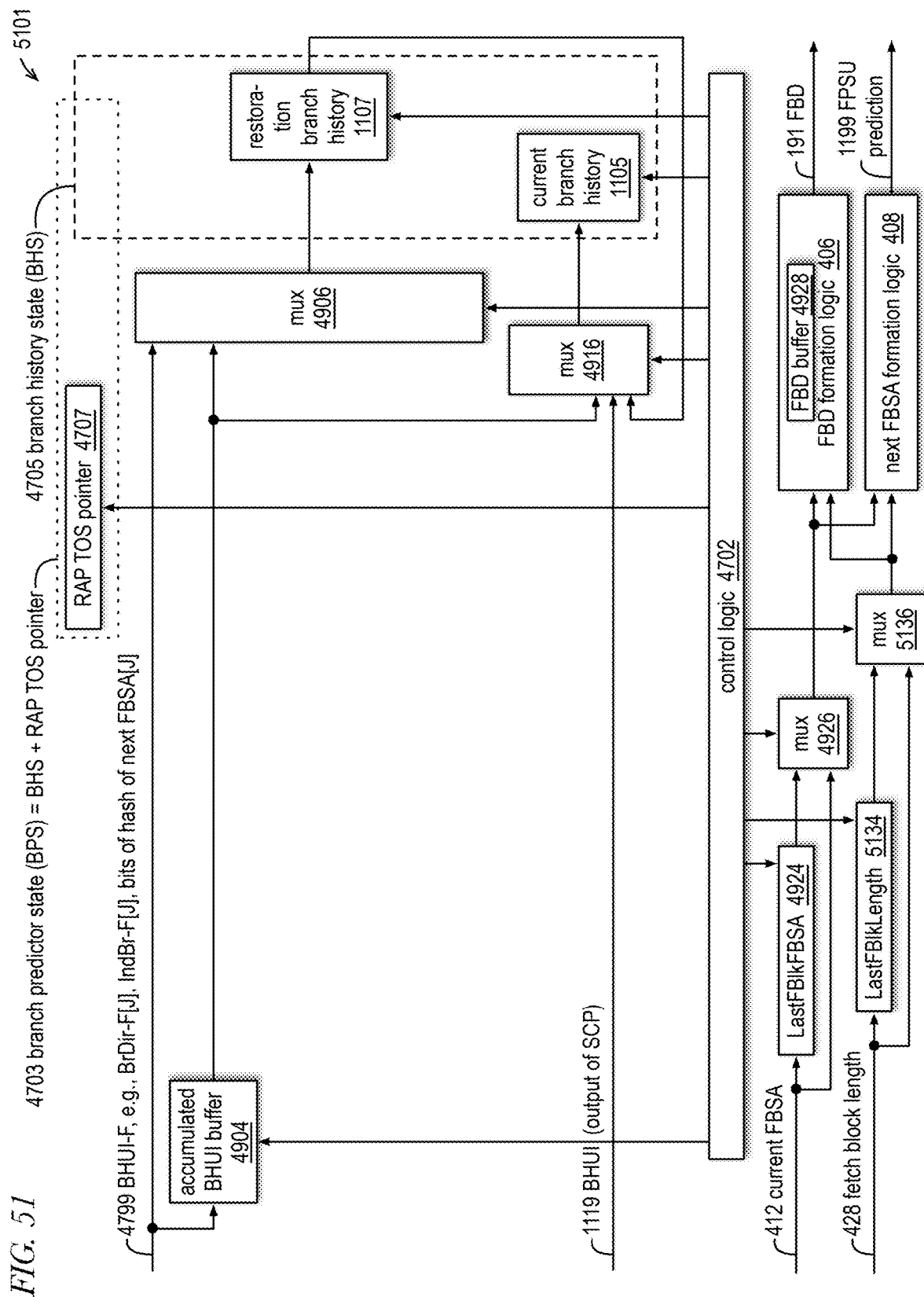
FIG. 51 is a block diagram illustrating optimization circuits of the PRU to process a ULP-MF-ME in an optimized manner in accordance with embodiments of the present disclosure.

FIG. 51 is a block diagram illustrating optimization circuits 5101 of the PRU 102 to process a ULP-MF-ME in an optimized manner in accordance with embodiments of the present disclosure. The optimization circuits 5101 of FIG. 51 are similar in many respects to the optimization circuits 4901 of FIG. 49, however the optimization circuits 5101 of FIG. 51 also include a LastFBlkLength buffer 5134 and a fourth mux 5136. The LastFBlkLength buffer 5134 receives the fetch block length 428 of FIG. 11 that is output by the FBlk, which is also provided as a second input to the fourth mux 5136. The output of the LastFBlkLength buffer 5134 is provided as a second input to the fourth mux 5136. The output of the fourth mux 5136 is provided to the FBD formation logic 406 and to the next FBSA formation logic 408. The control logic 4702 controls the LastFBlkLength buffer 5134 to capture the fetch block length 428 of the last FBlk of the first iteration of the loop body of the first iteration of the ULP-MF-ME, as described with respect to FIG. 52. Normally, the control logic 4702 controls the fourth mux 5136 to provide the fetch block length 428 to the FBD formation logic 406 and to the next FBSA formation logic 408, however at other times, the control logic 4702 controls the fourth mux 5136 to provide the LastFBlkLength 5134 to the FBD formation logic 406 and to the next FBSA formation logic 408, as described with respect to FIG. 52. The additional elements of the optimization circuits 5101 of FIG. 51 enable to the PRU 102 to perform additional optimizations in the case of a ULP-MF-ME that was built based on a consistent loop iteration count.

Figure 52A:
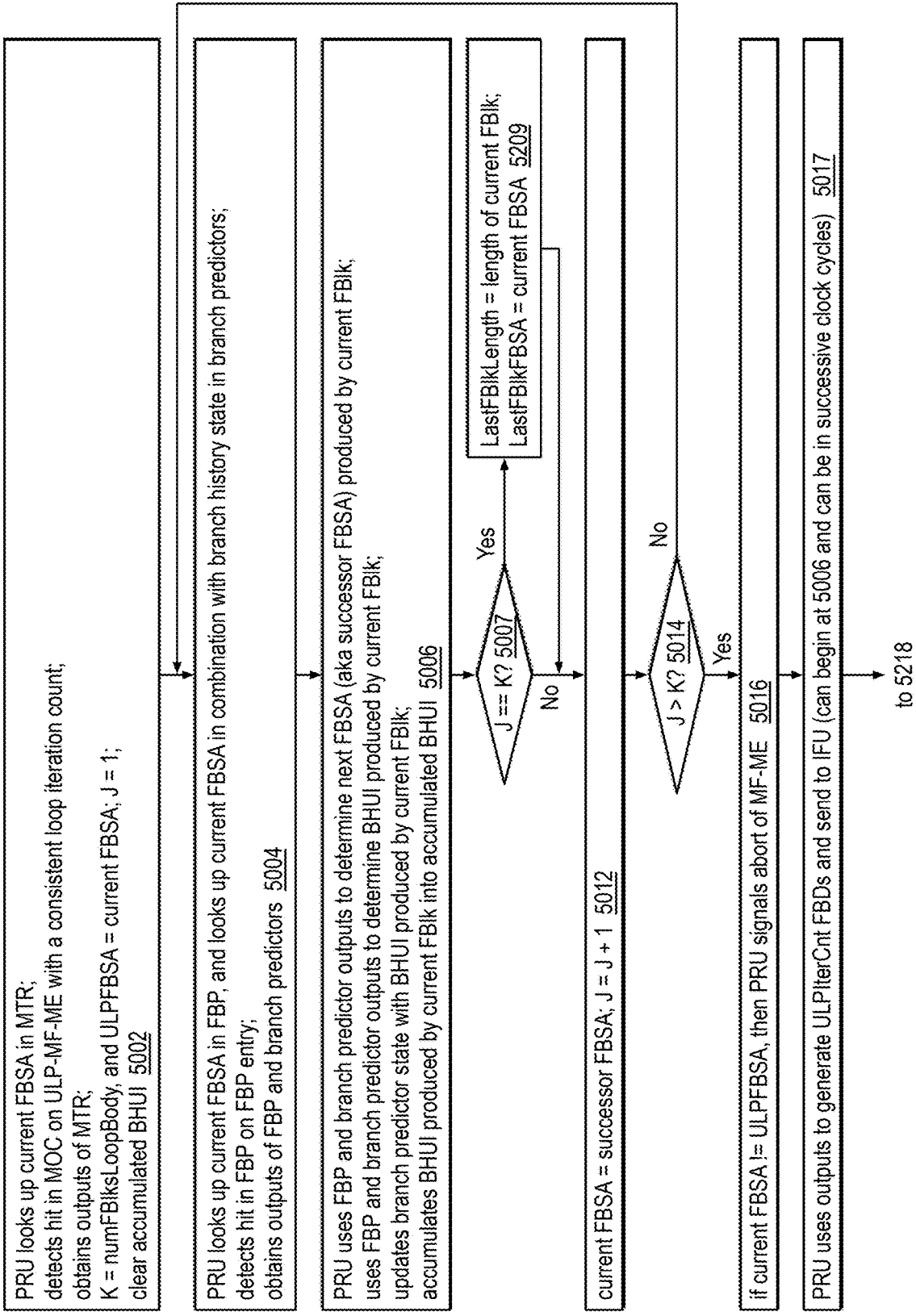

FIGS. 52A and 52B, referred to collectively as FIG. 52, is a flowchart illustrating operation of the PRU 102 to predict a successor FBSA to a ULP-MF-ME and to predict the branch history state generated by the ULP-MF-ME in an optimized manner in accordance with embodiments of the present disclosure. Many of the operations described with respect to FIG. 52 are similar to those described with respect to FIG. 50 such that block numbers of FIG. 50 are retained in FIG. 52 for similar operations. Operation begins at block 5202.

At block 5202, the PRU 102 performs operations similar to those described with respect to block 5002 of FIG. 50, except that the hit MF-ME is a ULP-MF-ME known to have a consistent loop iteration count, e.g., a ULP-MF-ME built according to the description of FIG. 33. In an embodiment, the PRU 102 supports holding in the MOC 171 both consistent loop iteration count ULP-MF-MEs and inconsistent loop iteration count ULP-MF-MEs. In such an embodiment, the training fields 331 of the MTRE 330 may include an indicator that indicates whether the ULP-MF-ME has a consistent loop iteration count. In such an embodiment, the PRU 102 if the indicator indicates a consistent loop iteration count, the PRU 102 may process the ULP-MF-ME according to the operations of FIG. 52. Operation proceeds to block 5004 and proceeds through block 5017 as described with respect to FIG. 50, except that block 5009 is replaced by block 5209. At block 5209, the PRU 102 captures the length and FBSA of the current FBlk in the LastFBlkLength buffer 5134 of FIG. 51 and in the LastFBlkFBSA buffer 4924, respectively. From block 5017, operation proceeds to block 5218.

At block 5218, the PRU 102 uses the accumulated BHUI 4904 to update the branch history state to a point in the program instruction stream corresponding to the end, or completion, of prediction of the last iteration of the ULP- MF-ME. That is, in contrast to the embodiment of FIG. 50, in the embodiment of FIG. 52 the PRU 102 includes, in the update of the accumulated BHUI 4904, the BHUI-F 4799 that was generated by the last FBlk of the first iteration of the loop body of the first iteration of the ULP-MF-ME and that was accumulated into the accumulated BHUI buffer 4904 during the Kth time the set of actions of blocks 5004 through 5012 were performed. In the embodiment of FIG. 52, because the ULP-MF-ME is predicted to have a consistent loop iteration count (i.e., because the program instruction stream is predicted to fall out of the loop after ULPIterCnt iterations of the ULP-MF-ME, i.e., because the final conditional branch of the ULP-MF-ME is assumed to be Not Taken), the PRU 102 forces the direction bit produced by the last FBlk of the last iteration of the ULP-MF-ME to be Not Taken when the branch history state is updated using the accumulated BHUI 4904 at block 5218, e.g., during the shift of the Qth copy of the accumulated BHUI 4904 into the branch history state, where Q=(F*ULPIterCnt)−1. Stated alternatively, at block 5218, the PRU 102 uses the accumulated BHUI 4904 to update the branch history state to reflect the point in the program instruction stream in which all the FBlks of all the ULPIterCnt iterations of the ULP-MF-ME have produced their BHUI and updated the branch history state and with the assumption that the final direction is Not Taken. In an embodiment, the PRU 102 uses the accumulated BHUI 4904 to update the branch history state by shifting Q copies of the accumulated BHUI 4904 into the branch history state. For example, assume K is five such that the BHUI-F 4799 of five FBlks was accumulated into the accumulated BHUI buffer 4904 when the set of actions at blocks 5004 through 5012 were performed five times. In the example, the PRU 102 shifts Q copies of the accumulated BHUI 4904 into the branch history state (e.g., into the restoration branch history 1107 and into the current branch history 1105) and during the Qth shift the PRU 102 forces the final direction bit of the fifth BHUI-F 4799 from the accumulated BHUI buffer 4904 to a Not Taken value before shifting it into the branch history state. Stated alternatively, the Qth/final shift into the branch history state forces the final direction bit to Not Taken, which is highly likely to be the prediction that the CBP 1142 would make if a lookup in it had been made. By forcing the final direction bit to Not Taken, the branch history state is now ready for the PRU 102 at block 5222 (described below) to perform lookups to predict the next FBSA and the BHUI-F 4799 produced by the successor FBlk of the last iteration of the ULP-MF-ME. As described with respect to block 5018, advantageously within approximately K+F*ULPIterCnt clock cycles of the hit on the ULP-MF-ME at block 5002, the branch history is in the state needed by the PRU 102 to perform the lookups in the BPs 154 at block 5222 with respect to the successor FBlk to the last iteration of the ULP-MF-ME and to generate and send an FBD to the IFU 106 for the successor. Thus, the embodiment of FIG. 52 may advantageously improve performance relative to the embodiment of FIG. 48 and further avoids one additional lookup and clock cycle relative to the embodiment of FIG. 50. Furthermore, power may be saved because approximately (K−1)*[(F*ULPIterCnt)−1] fewer lookups in the BPs 154 and FBP 152 may be performed relative to the embodiment of FIG. 48. Operation proceeds to block 5219.

At block 5219, the PRU 102 (e.g., the next FBSA formation logic 408) computes the current FBSA as a sum of the LastFBlkFBSA 4924 and the LastFBlkLength 5134 of FIG. 51. The computed current FBSA is the next sequential FBSA after the last iteration of the ULP-MF-ME, which in the embodiment of FIG. 52 assumes is the FBSA of the successor FBlk of the last iteration of the ULP-MF-ME since the PRU 102 predicts the program instruction stream will fall out of the loop (i.e., control is predicted to pass to the next sequential FBlk after the last FBlk of the last iteration of the consistent loop iteration count ULP-MF-ME) due to the consistent loop iteration count assumption. In an embodiment, the next FBSA formation logic 408 receives the LastFBlkFBSA 4924 and the LastFBlkLength 5134 and adds them to form the prediction of the next FBSA 449 produced by the last FBlk of the last iteration of the consistent loop iteration ULP-MF-ME, and as described with respect to FIG. 11, the next FBSA 449 becomes the current FBSA 412. That is, the current FBSA computed at block 5219 is the predicted successor FBSA of the last iteration of the consistent loop iteration count ULP-MF-ME. Operation proceeds to block 5222.

At block 5222, the PRU 102 uses the current FBSA computed at block 5219 and the branch history state updated at block 5218 to perform the lookups in the MTR 173, FBP 152, and BPs 154 to predict the successor FBlk of the last iteration of the ULP-MF-ME, e.g., to determine whether the successor is an ME, to determine the next FBSA and BHUI produced by the successor FBlk, and to generate an FBD for the successor FBlk/ME (or to generate multiple FBDs if the successor is a ULP-MF-ME).

Figure 53A:
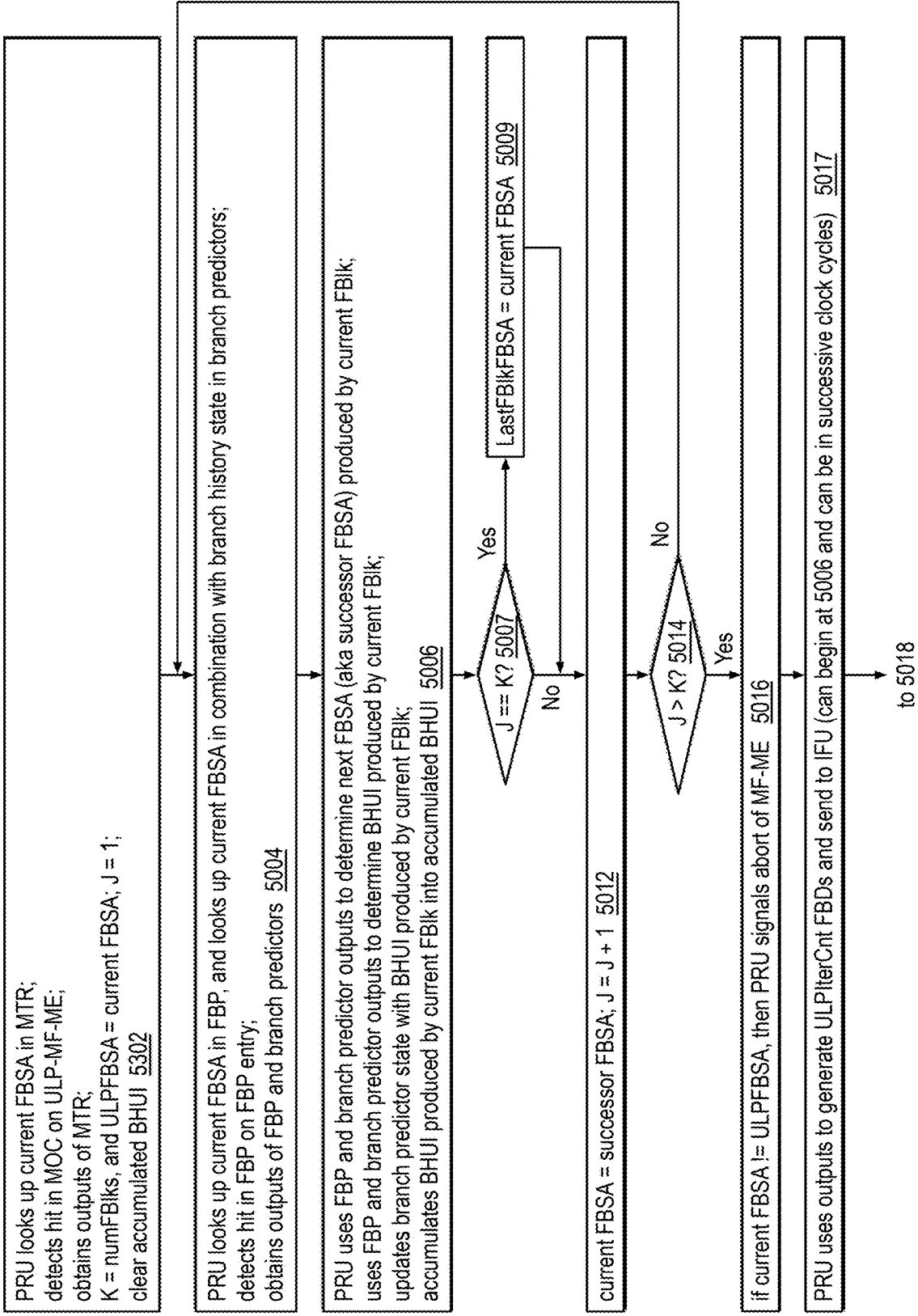
FIGS. 53A and 53B, referred to collectively as FIG. 53, is a flowchart illustrating operation of the PRU to predict a successor FBSA to a ULP-MF-ME and to predict the branch history state generated by the ULP-MF-ME in an optimized manner in accordance with embodiments of the present disclosure.
Figure 53B:
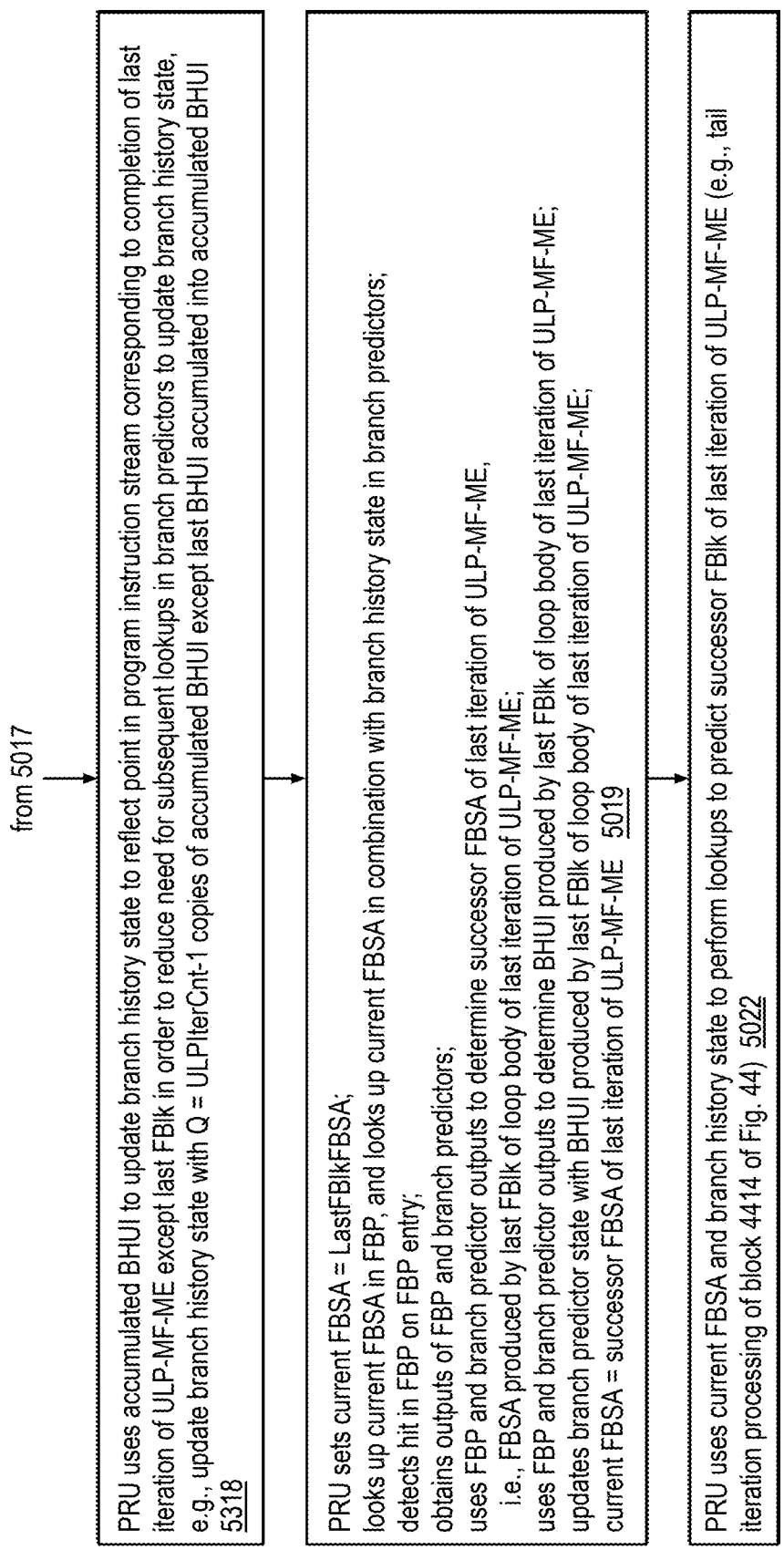

FIGS. 53A and 53B, referred to collectively as FIG. 53, is a flowchart illustrating operation of the PRU 102 to predict a successor FBSA to a ULP-MF-ME and to predict the branch history state generated by the ULP-MF-ME in an optimized manner in accordance with embodiments of the present disclosure. The embodiment of FIG. 53 is similar in many respects to the embodiment of FIG. 50, except that block 5002 is replaced by block 5302, and block 5018 is replaced by block 5308. In block 5302, K is initialized with the value of the number of FBlks built into the ULP-MF-ME (e.g., numFBlks 335 of FIG. 3B), which is the numFBlksLoopBody*F (the loop unroll factor). Thus, in the embodiment of FIG. 53, K is F times larger than in the embodiment of FIG. 50. As a result, the accumulated BHUI buffer 4904 of FIG. 49 is F times larger, and the number of BHUI-F 4799 instances accumulated into the accumulated BHUI buffer 4904 at block 5006 of FIG. 53 is F times as large as the number of BHUI-F 4799 instances accumulated into the accumulated BHUI 4904 at block 5006 of FIG. 50. More specifically, after the performance of the set of actions of blocks 5004 through 5012 K times, where K is numFBlks, the accumulated BHUI 4904 holds the BHUI-F 4799 produced by one iteration of the ULP-MF-ME (in contrast to one iteration of the loop body as in the embodiment of FIG. 50). Accordingly, at block 5318, the number of updates to the BHS 4705 that need to be performed by the embodiment of FIG. 53, which is ULPIterCnt−1, is fewer than the number of updates to the BHS 4705 that need to be performed by the embodiment of FIG. 50 at block 5018, which is (F*ULPIterCnt)−1. As may be observed, the number of clock cycles required to update the BHS 4705 according to the embodiment of FIG. 53 is approximately K+ULPIterCnt clock cycles, whereas the number of clock cycles required to update the BHS 4705 according to the embodiment of FIG. 50 is approximately K+(F*ULPIterCnt) clock cycles. Thus, for some values of K, F and ULPIterCnt, the embodiment of FIG. 50 may require fewer clock cycles, whereas for other values of K, F and ULPIterCnt, the embodiment of FIG. 53 may require fewer clock cycles.

Additionally, although not shown in FIG. 53, as the operation proceeds through each of the K times through the set of actions of blocks 5004 through 5012, an additional check may be made after block 5012 at each loop body boundary (i.e., at the beginning of each loop body iteration) similar to the check at block 4809 of FIG. 48 to determine whether an abort needs to be signaled.

Figure 54:
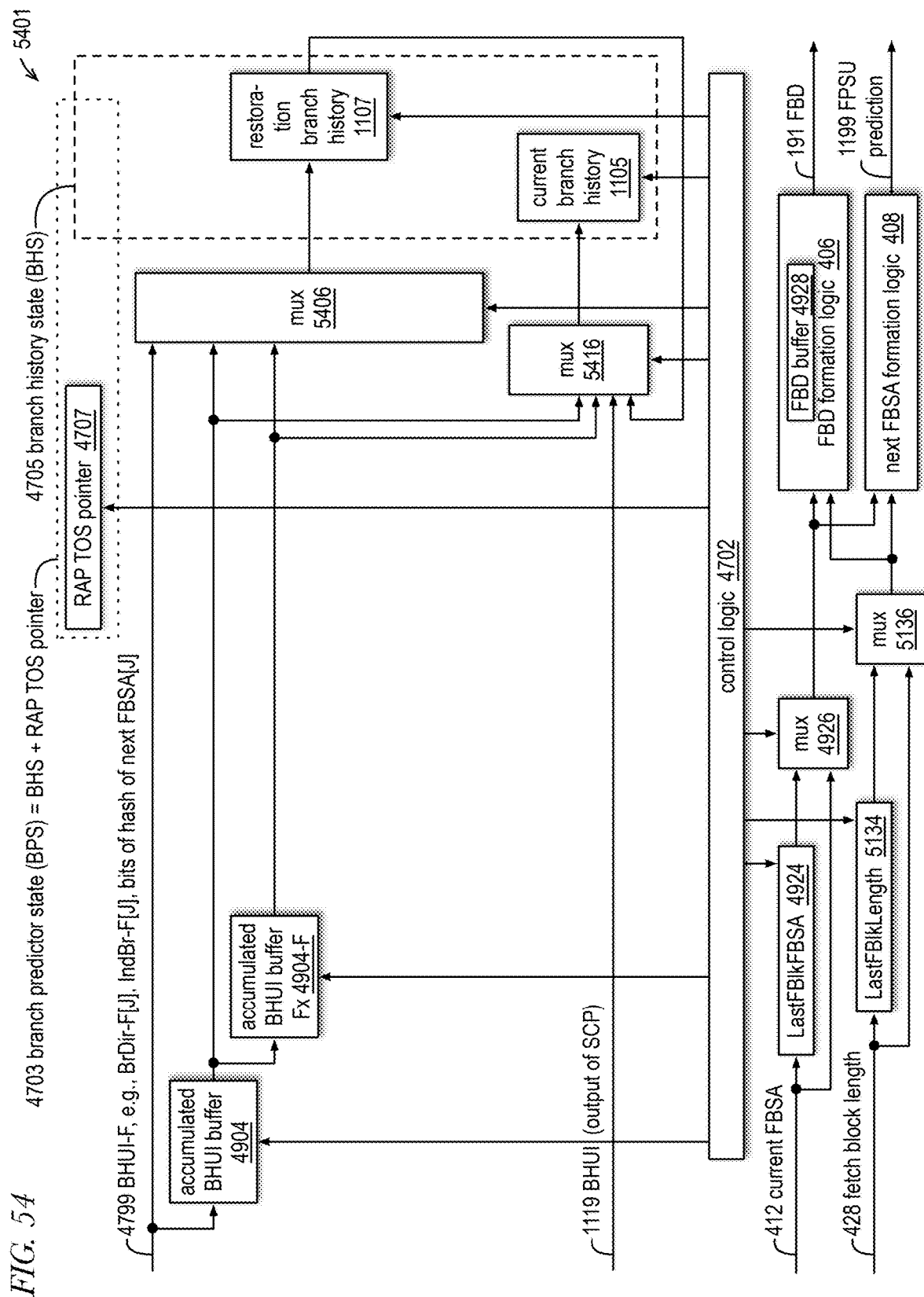
FIG. 54 is a block diagram illustrating optimization circuits of the PRU to process a ULP-MF-ME in an optimized manner in accordance with embodiments of the present disclosure.
Figure 55A:
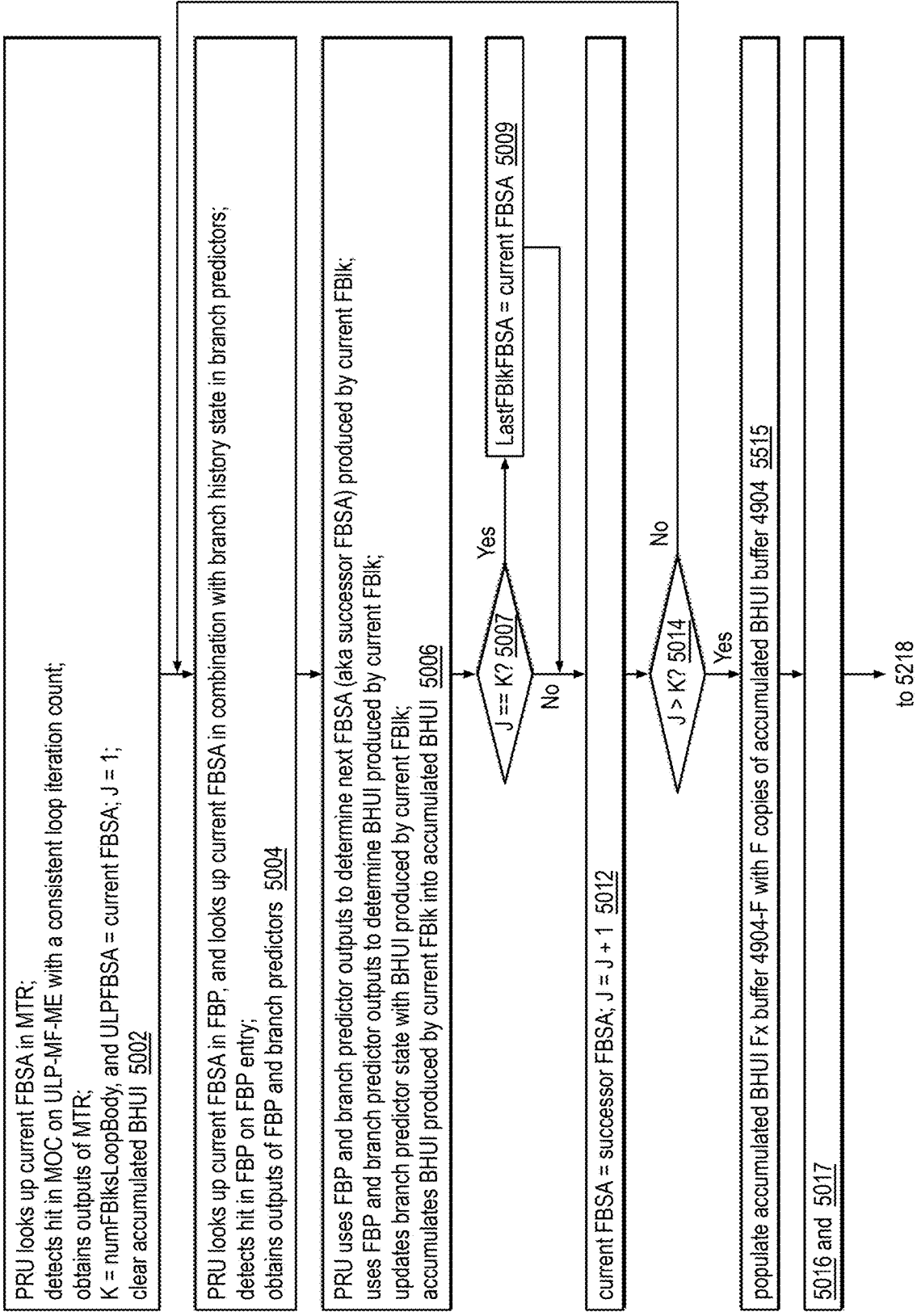

FIGS. 54 and 55 will now be described in conjunction with one another. FIG. 54 is a block diagram illustrating optimization circuits 5401 of the PRU 102 to process a ULP-MF-ME in an optimized manner in accordance with embodiments of the present disclosure. FIGS. 55A and 55B, referred to collectively as FIG. 55, is a flowchart illustrating operation of the PRU 102 to predict a successor FBSA to a ULP-MF-ME and to predict the branch history state generated by the ULP-MF-ME in an optimized manner in accordance with embodiments of the present disclosure. The embodiment of FIG. 55 is similar in many respects to the embodiment of FIG. 50, except that block 5018 is replaced by 5518, and except that new block 5515 is interposed between block 5014 and block 5016 (i.e., operation proceeds from the "Yes" branch out of decision block 5014 into new block 5515, and operation proceeds from new block 5515 to block 5016.

The optimization circuits 5401 of FIG. 54 are similar in many respects to the optimization circuits 5101 of FIG. 51, however the optimization circuits 5401 of FIG. 54 also include an accumulated BHUI Fx buffer 4904-F. Additionally, the first mux 5106 of FIG. 51 is replaced by a first mux 5406 in FIG. 54 that also receives the outputs of the accumulated BHUI Fx buffer 4904-F. Still further, the second mux 5116 of FIG. 51 is replaced by a second mux 5416 in FIG. 54 that also receives the outputs of the accumulated BHUI Fx buffer 4904-F.

In an embodiment, the accumulated BHUI Fx buffer 4904-F receives as input the output of the accumulated BHUI buffer 4904. According to the operation of block 5515 of FIG. 55, once the accumulated BHUI buffer 4904 has accumulated the K instances of the BHUI-F 4799 during the performance of the set of actions of blocks 5004 through 5012 the K times, where K is numFBlksLoopBody per block 5002 of FIG. 55, then the contents of the accumulated BHUI buffer 4904 are copied F times into the accumulated BHUI Fx buffer 4904-F such that the BHUI Fx buffer 4904-F now holds F*K instances of the BHUI-F 4799 produced by one iteration of the ULP-MF-ME (in contrast to one iteration of the loop body).

The additional elements of the optimization circuits 5401 of FIG. 54 enable to the PRU 102 to perform additional optimizations in the case of a ULP-MF-ME that has a relatively large ULPIterCnt. More specifically, at block 5518 of FIG. 55, the PRU 102 uses the accumulated BHUI 4904 and the accumulated BHUI Fx buffer 4904-F to update the branch history state to a point in the program instruction stream corresponding to the end, or completion, of prediction of the last iteration of the ULP-MF-ME except for the last FBlk of the last iteration of the ULP-MF-ME, similar to the manner described with respect to block 5318. In one embodiment, the PRU 102 first updates the branch history state with F-1 copies of the accumulated BHUI 4904, then updates the branch history state with ULPTterCnt-1 copies of the accumulated BHUI Fx buffer 4904-F but excluding the last BHUI-F 4799 that was accumulated into the accumulated BHUI buffer 4904 on the Kth time of performance of the actions at block 5006, which is the last BHUI-F 4799 of the Fth copy of the accumulated BHUI 4904 in the accumulated BHUI Fx buffer 4904-F. At block 5518, the PRU 102 must wait to use the accumulated BHUI Fx buffer 4904-F to update the branch history state until the BHUI Fx buffer 4904-F becomes populated at block 5515. In this manner, the number of clock cycles needed to perform the branch history state updates at block 5518 may approximate K+F+ULPIterCnt (where K=numFBlksLoopBody), in contrast to the approximately K+ULPIterCnt clock cycles (where K=numFBlks) needed to perform the branch history state updates according to the embodiment of FIG. 53, or in contrast to the approximately K+(F*ULPIterCnt) clock cycles (where K=numFBlksLoopBody) needed to perform the branch history state updates according to the embodiment of FIG. 50.

Figure 56:
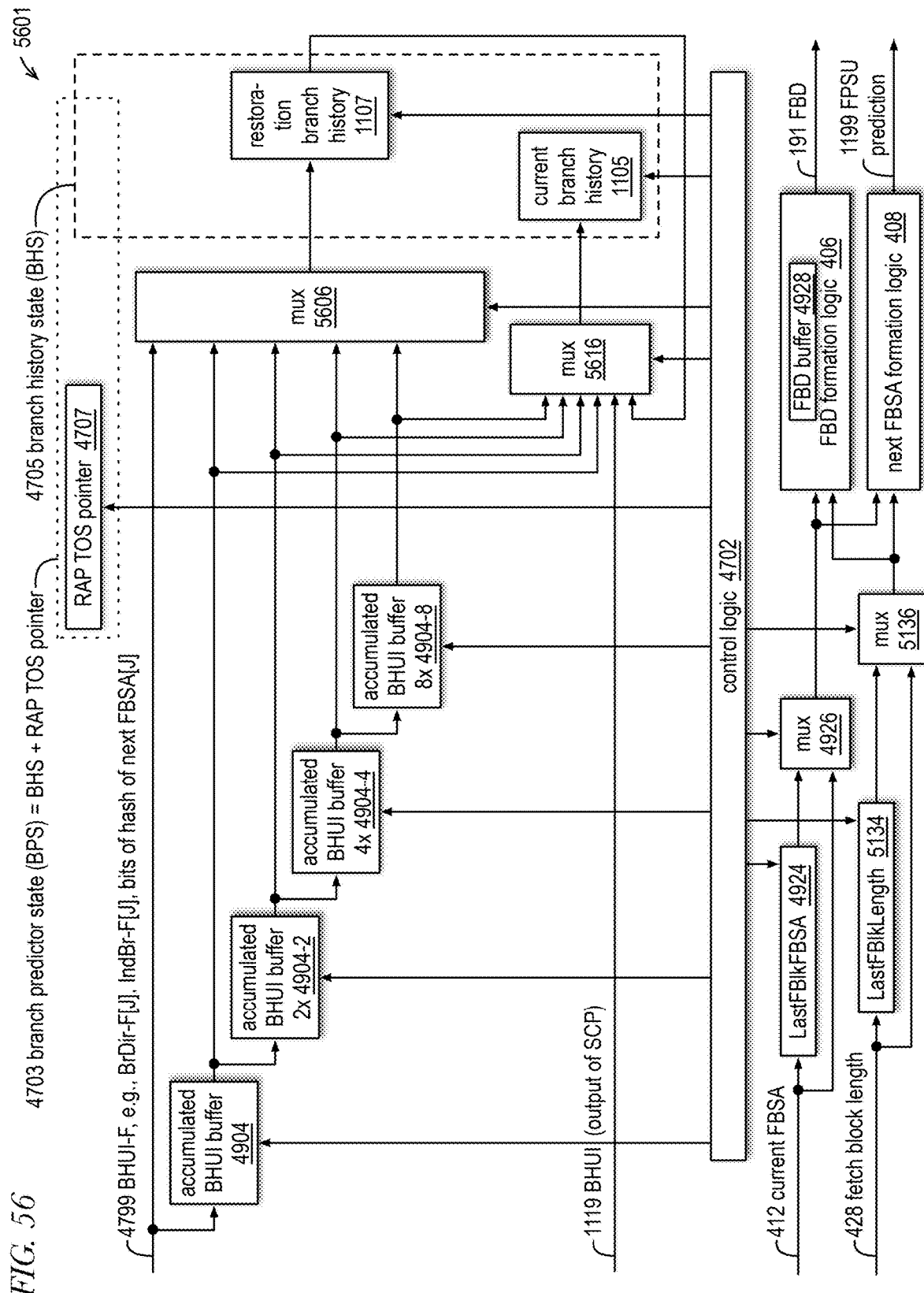
FIG. 56 is a block diagram illustrating optimization circuits of the PRU to process a ULP-MF-ME in an optimized manner in accordance with embodiments of the present disclosure.
Figure 57A:
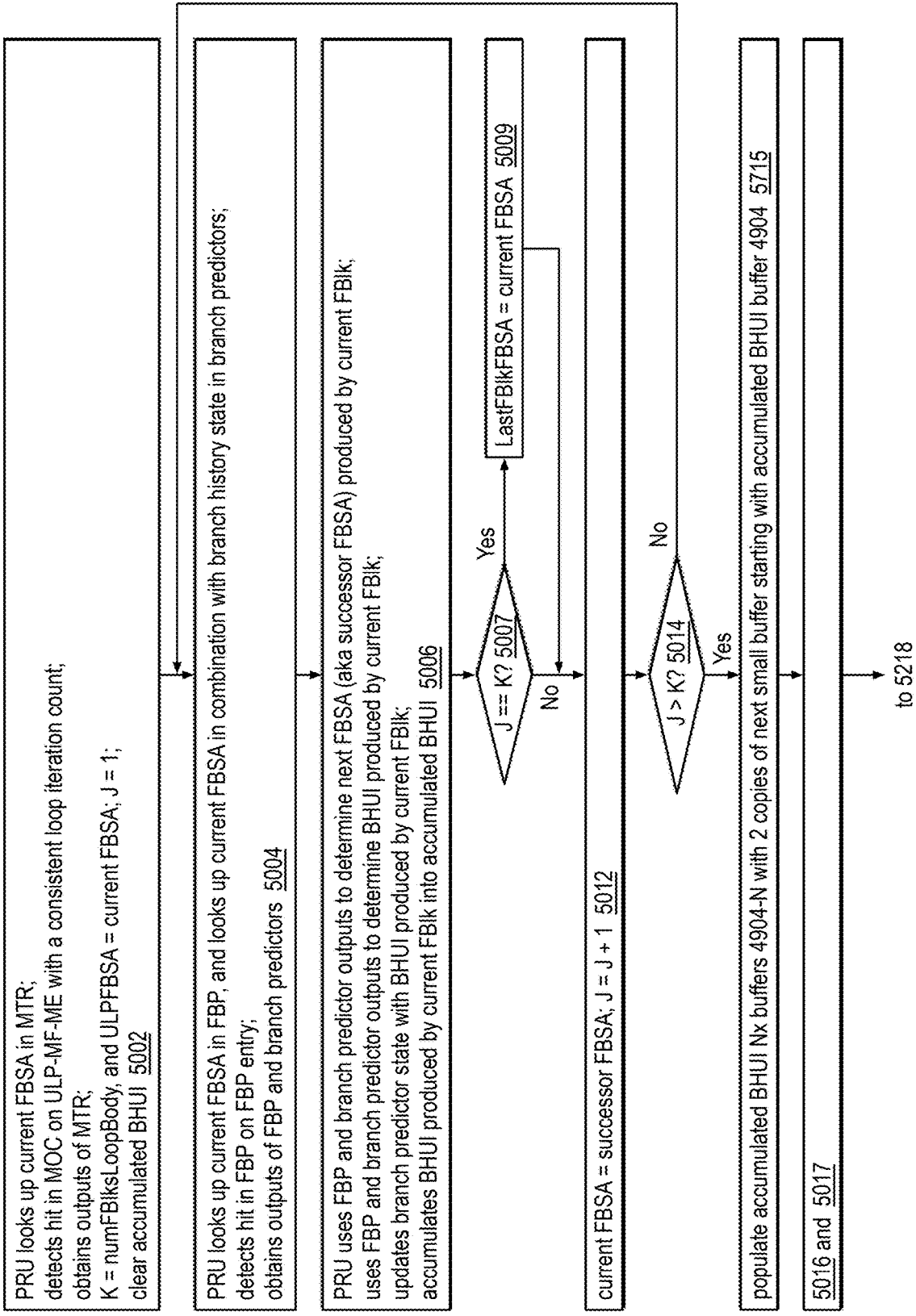
FIGS. 57A and 57B, referred to collectively as FIG. 57, is a flowchart illustrating operation of the PRU to predict a successor FBSA to a ULP-MF-ME and to predict the branch history state generated by the ULP-MF-ME in an optimized manner in accordance with embodiments of the present disclosure.
Figure 57B:
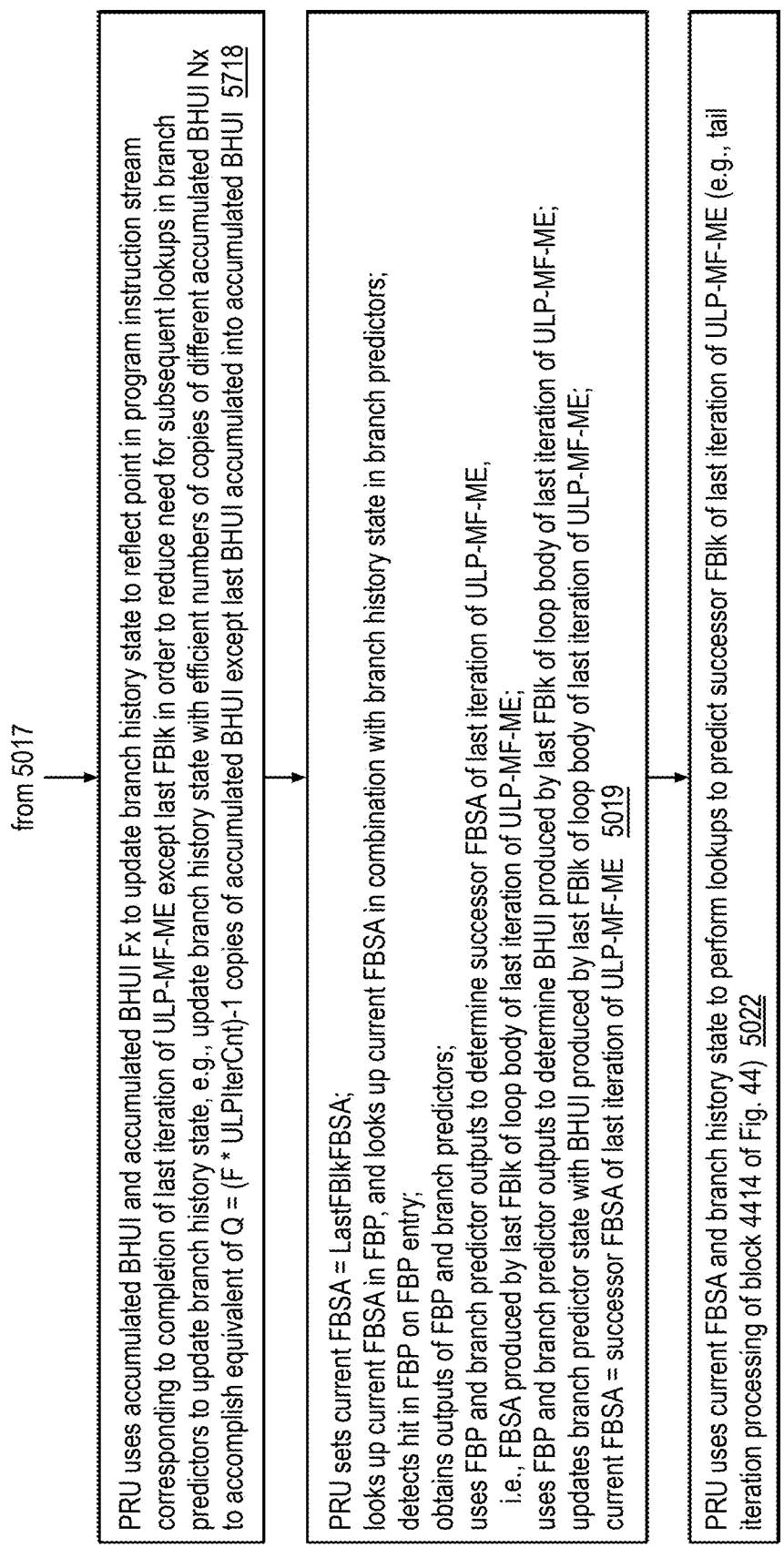

FIGS. 56 and 57 will now be described in conjunction with one another. FIG. 56 is a block diagram illustrating optimization circuits 5601 of the PRU 102 to process a ULP-MF-ME in an optimized manner in accordance with embodiments of the present disclosure. FIGS. 57A and 57B, referred to collectively as FIG. 57, is a flowchart illustrating operation of the PRU 102 to predict a successor FBSA to a ULP-MF-ME and to predict the branch history state generated by the ULP-MF-ME in an optimized manner in accordance with embodiments of the present disclosure. The embodiment of FIG. 57 is similar in many respects to the embodiment of FIG. 50, except that block 5018 is replaced by 5718, and except that new block 5715 is interposed between block 5014 and block 5016 (i.e., operation proceeds from the "Yes" branch out of decision block 5014 into new block 5715, and operation proceeds from new block 5715 to block 5016.

The optimization circuits 5601 of FIG. 56 are similar in many respects to the optimization circuits 5101 of FIG. 54, however rather than accumulated BHUI Fx buffer 4904-F of FIG. 54, the optimization circuits 5601 of FIG. 56 include an accumulated BHUI 2x buffer 4904-2, an accumulated BHUI 4x buffer 4904-4, and an accumulated BHUI 8x buffer 4904-8. These buffers will be referred to generically as accumulated BHUI Nx buffer 4904-N and collectively as accumulated BHUI Nx buffers 4904-N. Additionally, the first mux 5406 of FIG. 54 is replaced by a first mux 5606 in FIG. 56 that also receives the outputs of the accumulated BHUI Nx buffers 4904-N. Still further, the second mux 5416 of FIG. 54 is replaced by a second mux 5616 in FIG. 56 that also receives the outputs of the accumulated BHUI Nx buffers 4904-N.

In an embodiment, the accumulated BHUI 2x buffer 4904-2 receives as input the output of the accumulated BHUI buffer 4904, the accumulated BHUI 4x buffer 4904-4 receives as input the output of the accumulated BHUI 2x buffer 4904-2, and the accumulated BHUI 8x buffer 4904-8 receives as input the output of the accumulated BHUI 4x buffer 4904-4. At block 5715, once the accumulated BHUI buffer 4904 has accumulated the K instances of the BHUI-F 4799 during the performance of the set of actions of blocks 5004 through 5012 the K times, then the contents of the accumulated BHUI buffer 4904 are copied twice into the accumulated BHUI 2x buffer 4904-2 such that the BHUI 2x buffer 4904-2 now holds 2*K instances of the BHUI-F 4799 produced by two iterations of the loop body; once the accumulated BHUI 2x buffer 4904-2 has accumulated the two copies of the accumulated BHUI buffer 4904, then the contents of the accumulated BHUI 2x buffer 4904-2 are copied twice into the accumulated BHUI 4x buffer 4904-4 such that the BHUI 4x buffer 4904-4 now holds 4*K instances of the BHUI-F 4799 produced by four iterations of the loop body; and once the accumulated BHUI 4x buffer 4904-4 has accumulated the two copies of the accumulated BHUI 2x buffer 4904-2, then the contents of the accumulated BHUI 4x buffer 4904-4 are copied twice into the accumulated BHUI 8x buffer 4904-8 such that the BHUI 8x buffer 4904-8 now holds 8*K instances of the BHUI-F 4799 produced by eight iterations of the loop body.

The additional elements of the optimization circuits 5601 of FIG. 56 enable to the PRU 102 to perform additional optimizations in the case of a ULP-MF-ME that has a relatively large ULPIterCnt. More specifically, at block 5718 of FIG. 57, the PRU 102 uses the accumulated BHUI 4904, the accumulated BHUI 2x buffer 4904-2, the accumulated BHUI 4x buffer 4904-4, and the accumulated BHUI 8x buffer 4904-8 to update the branch history state to a point in the program instruction stream corresponding to the end, or completion, of prediction of the last iteration of the ULP-MF-ME except for the last FBlk of the last iteration of the ULP-MF-ME, similar to the manner described with respect to block 5518. Depending upon the values of F and ULPIterCnt, the PRU 102 attempts to use the accumulated BHUI Nx buffers 4904-N in an efficient manner to minimize the number of clock cycles needed to update the branch history state to accomplish the equivalent of Q=(F*ULPIterCnt)−1 copies of the accumulated BHUI 4904 but excluding the last BHUI-F 4799 that was accumulated into the accumulated BHUI buffer 4904 on the Kth time of performance of the actions at block 5006, which is the last BHUI-F 4799 of the second copy of the accumulated BHUI 4904 in the accumulated BHUI 2x buffer 4904-2, and which is the last BHUI-F 4799 of the second copy of the accumulated BHUI 4904 in the accumulated BHUI 4x buffer 4904-4, and which is the last BHUI-F 4799 of the second copy of the accumulated BHUI 4904 in the accumulated BHUI 8x buffer 4904-8. At block 5718, the PRU 102 must wait to use any given one of the accumulated BHUI Nx buffers 4904-N to update the branch history state until the BHUI Nx buffer 4904-N becomes populated at block 5715. To illustrate by example, assume F is 3 and ULPIterCnt is 14 such that Q is 41. During two clock cycles (after the first K clock cycles during which the branch history state is updated and the accumulated BHUI 4904 is being accumulated according to block 5006), the PRU 102 uses the accumulated BHUI 4904 to update the branch history state with a first two of the Q copies. During the next two clock cycles the PRU 102 uses the accumulated BHUI 2x buffer 4904-2 to update the branch history state with four of the Q copies. During the next two clock cycles the PRU 102 uses the accumulated BHUI 4x buffer 4904-4 to update the branch history state with eight of the Q copies. During the next three clock cycles the PRU 102 uses the accumulated BHUI 8x buffer 4904-8 to update the branch history state with 3*8=24 of the Q copies. There are now 3 copies needed, so during the next clock cycle the PRU 102 uses the accumulated BHUI 2x buffer 4904-2 to update the branch history state with two of the Q copies, and during the next clock cycle the PRU 102 uses the accumulated BHUI buffer 4904 to update the branch history state with the last of the Q copies. In this manner, the number of clock cycles needed to perform the branch history state updates at block 5718 may be on the order of K+$\log_2$(F*ULPIterCnt) (where K=numFBlksLoopBody), in contrast to the approximately K+F+ULPIterCnt clock cycles (where K=numFBlksLoopBody) needed to perform the branch history state updates according to the embodiment of FIG. 55, in contrast to the approximately K+ULPIterCnt clock cycles (where K=numFBlks) needed to perform the branch history state updates according to the embodiment of FIG. 53, or in contrast to the approximately K+(F*ULPIterCnt) clock cycles (where K=numFBlksLoopBody) needed to perform the branch history state updates according to the embodiment of FIG. 50.

As may be observed, for significantly larger values of (F*ULPIterCnt), the number of clock cycles needed to perform the branch history state updates according to the embodiment of FIG. 57 approximates K+[(F*ULPIterCnt)/8], since N=8 is the largest of the accumulated BHUI Nx buffers 4904-N. Other embodiments are contemplated in which additional larger buffers are included in the optimization circuits 5601, e.g., 16x or 32x to achieve desired performance goals.

Although embodiments are described with respect to FIGS. 53 through 57 that do not assume a consistent loop iteration count, alternate embodiments are contemplated similar to those of FIGS. 53 through 57 but modified to assume a consistent loop iteration count similar to the embodiment of FIG. 52.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

To aid the Patent Office and any readers of this application and any patent issued on this application in interpreting the claims appended hereto, applicants wish to indicate they do not intend any of the appended claims or claim elements to invoke 35 U.S.C. § 112(f) unless the words "means for" or "step for" are explicitly used in the particular claim. Furthermore, use of the term "configured to" is not intended to invoke 35 U.S.C. § 112(f). Still further, uses of the terms "unit" (e.g., as in "prediction unit", "instruction fetch unit", "decode unit", "execution unit"), or "logic" (e.g., as in "control logic" or "formation logic") or "element" (e.g., as in "storage element") or "engine" (e.g., as in "fusion engine") are intended to connote structure that is included in a microprocessor, which includes circuitry configured to perform disclosed operations, including storage circuitry that stores microcode processed by the circuitry.

The invention claimed is:

1. A microprocessor, comprising:
a prediction unit (PRU) comprising:
a fetch block (FBlk) predictor (FBP) configured to predict a sequence of FBlks of a program instruction stream, wherein each FBlk of the sequence has a corresponding fetch block start address (FBSA); and
one or more branch predictors;
a macro-op (MOP) cache (MOC) comprising MOC entries (MEs), wherein the MEs include multi-FBlk MOC entries (MF-MEs) for holding MOPs decoded from architectural instructions of multiple FBlks;
wherein the PRU is further configured to:
detect a hit of a current FBSA in the MOC on an MF-ME;
determine K from information held in the MF-ME, wherein K is an integer greater than one;
perform a set of actions K times, wherein the set of actions comprises:
looking up the current FBSA in the FBP and in the branch predictors to obtain outputs thereof;
using the outputs to predict a successor FBSA of a successor FBlk to a current FBlk that has the current FBSA; and
updating the current FBSA to be the successor FBSA; and
predict that an FBSA of a successor FBlk to the MF-ME is the current FBSA resulting from performing the set of actions the K times.

2. The microprocessor of claim 1,
wherein by performing the set of actions the K times, the MF-ME is alleviated from including storage to hold the FBSA of the successor FBlk to the MF-ME.

3. The microprocessor of claim 1,
wherein the PRU further comprises:
branch predictor state;
wherein said looking up the current FBSA in the branch predictors comprises looking up the current FBSA in combination with the branch predictor state in the branch predictors; and
wherein the set of actions further comprises:
using the outputs to predict branch history update information produced by the current FBlk; and updating the branch predictor state with the branch history update information.

4. The microprocessor of claim 3,
wherein by performing the set of actions the K times, the MF-ME is alleviated from including storage to hold branch history update information produced by the multiple FBlks of the MF-ME for updating the branch predictor state.

5. The microprocessor of claim 1,
wherein K is a number of FBlks built into the MF-ME.

6. The microprocessor of claim 1,
wherein the PRU unrolls a loop on a loop body of the program instruction stream to build the MF-ME; and
wherein K is a product of:
a number of FBlks built into the MF-ME; and
an iteration count of the MF-ME.

7. The microprocessor of claim 1, further comprising:
a fetch unit configured to fetch MOPs from the MOC;
wherein the PRU unrolls a loop on a loop body of the program instruction stream to build the MF-ME; and
wherein during the performing the set of actions the K times, the PRU is further configured to, for each Jth time of the K times, if J is an integer multiple of a number of FBlks built into the MF-ME:
use the outputs to generate a FBlk descriptor (FBD) to send to the fetch unit to fetch an instance of the MOPs of the MF-ME from the MOC.

8. The microprocessor of claim 1,
wherein the PRU unrolls a loop on a loop body of the program instruction stream to build the MF-ME; and
wherein the PRU is further configured to:
save the current FBSA that hit in the MOC on the MF-ME; and
after each time performing the set of actions a number of FBlks built into the MF-ME:
perform a comparison of the saved current FBSA and the current FBSA; and
abort the MF-ME if the comparison indicates a mismatch.

9. The microprocessor of claim 1,
wherein the PRU unrolls a loop on a loop body of the program instruction stream to build the MF-ME; and
wherein the PRU is further configured to:
save the current FBSA that hit in the MOC on the MF-ME; and
after each time performing the set of actions a number of FBlks comprised by the loop body:
perform a comparison of the saved current FBSA and the current FBSA; and
abort the MF-ME if the comparison indicates a mismatch.

10. The microprocessor of claim 1,
wherein the PRU is further configured to refrain from performing lookups in the MOC of the current FBSA during the performing of the set of actions the K times other than a lookup in the MOC of the current FBSA that hit in the MOC on the MF-ME.

11. A method, comprising:
in a microprocessor comprising:
a prediction unit (PRU) comprising:
a fetch block (FBlk) predictor (FBP) configured to predict a sequence of FBlks of a program instruction stream, wherein each FBlk of the sequence has a corresponding fetch block start address (FBSA); and one or more branch predictors;
a macro-op (MOP) cache (MOC) comprising MOC entries (MEs), wherein the MEs include multi-FBlk MOC entries (MF-MEs) for holding MOPs decoded from architectural instructions of multiple FBlks;
detecting a hit of a current FBSA in the MOC on an MF-ME;
determining K from information held in the MF-ME, wherein K is an integer greater than one;
performing a set of actions K times, wherein the set of actions comprises:
looking up the current FBSA in the FBP and in the branch predictors to obtain outputs thereof;
using the outputs to predict a successor FBSA of a successor FBlk to a current FBlk that has the current FBSA; and
updating the current FBSA to be the successor FBSA; and
predicting that an FBSA of a successor FBlk to the MF-ME is the current FBSA resulting from performing the set of actions the K times.

12. The method of claim 11,
wherein by performing the set of actions the K times, the MF-ME is alleviated from including storage to hold the FBSA of the successor FBlk to the MF-ME.

13. The method of claim 11,
wherein the PRU further comprises:
branch predictor state;
wherein said looking up the current FBSA in the branch predictors comprises looking up the current FBSA in combination with the branch predictor state in the branch predictors; and
wherein the set of actions further comprises:
using the outputs to predict branch history update information produced by the current FBlk; and
updating the branch predictor state with the branch history update information.

14. The method of claim 13,
wherein by performing the set of actions the K times, the MF-ME is alleviated from including storage to hold branch history update information produced by the multiple FBlks of the MF-ME for updating the branch predictor state.

15. The method of claim 11,
wherein K is a number of FBlks built into the MF-ME.

16. The method of claim 11,
wherein the PRU unrolls a loop on a loop body of the program instruction stream to build the MF-ME; and
wherein K is a product of:
a number of FBlks built into the MF-ME; and
an iteration count of the MF-ME.

17. The method of claim 11, further comprising:
wherein the microprocessor further comprises a fetch unit configured to fetch MOPs from the MOC;
wherein the PRU unrolls a loop on a loop body of the program instruction stream to build the MF-ME; and
wherein during said performing the set of actions the K times, for each Jth time of the K times, if J is an integer multiple of a number of FBlks built into the MF-ME:
using the outputs to generate a FBlk descriptor (FBD) to send to the fetch unit to fetch an instance of the MOPs of the MF-ME from the MOC.

18. The method of claim 11, further comprising:
wherein the PRU unrolls a loop on a loop body of the program instruction stream to build the MF-ME; and
saving the current FBSA that hit in the MOC on the MF-ME; and
after each time performing the set of actions a number of FBlks built into the MF-ME:
performing a comparison of the saved current FBSA and the current FBSA; and
aborting the MF-ME if the comparison indicates a mismatch.

19. The method of claim 11, further comprising:
wherein the PRU unrolls a loop on a loop body of the program instruction stream to build the MF-ME; and
saving the current FBSA that hit in the MOC on the MF-ME; and
after each time performing the set of actions a number of FBlks comprised by the loop body:
performing a comparison of the saved current FBSA and the current FBSA; and
aborting the MF-ME if the comparison indicates a mismatch.

20. The method of claim 11, further comprising:
refraining from performing lookups in the MOC of the current FBSA during the performing of the set of actions the K times other than a lookup in the MOC of the current FBSA that hit in the MOC on the MF-ME.

21. A non-transitory computer-readable medium having instructions stored thereon that are capable of configuring a microprocessor comprising a prediction unit (PRU) comprising a fetch block (FBlk) predictor (FBP) configured to predict a sequence of FBlks of a program instruction stream, wherein each FBlk of the sequence has a corresponding fetch block start address (FBSA) and one or more branch predictors, the microprocessor further comprising a macro-op (MOP) cache (MOC) comprising MOC entries (MEs), wherein the MEs include multi-FBlk MOC entries (MF-MEs) for holding MOPs decoded from architectural instructions of multiple FBlks, wherein the instructions configure the microprocessor to perform a method comprising:
detecting a hit of a current FBSA in the MOC on an MF-ME;
determining K from information held in the MF-ME, wherein K is an integer greater than one;
performing a set of actions K times, wherein the set of actions comprises:
looking up the current FBSA in the FBP and in the branch predictors to obtain outputs thereof;
using the outputs to predict a successor FBSA of a successor FBlk to a current FBlk that has the current FBSA; and
updating the current FBSA to be the successor FBSA; and
predicting that an FBSA of a successor FBlk to the MF-ME is the current FBSA resulting from performing the set of actions the K times.

* * * * *